US011111345B2

(12) United States Patent
Arai et al.

(10) Patent No.: US 11,111,345 B2
(45) Date of Patent: Sep. 7, 2021

(54) PREPREG AND CARBON FIBER-REINFORCED COMPOSITE MATERIAL

(71) Applicant: TORAY INDUSTRIES, INC., Tokyo (JP)

(72) Inventors: Nobuyuki Arai, Ehime (JP); Tomoko Ichikawa, Ehime (JP); Hiroshi Taiko, Ehime (JP); Makoto Endo, Ehime (JP); Masanobu Kobayashi, Ehime (JP); Jun Misumi, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 613 days.

(21) Appl. No.: 15/669,794

(22) Filed: Aug. 4, 2017

(65) Prior Publication Data
US 2017/0327657 A1  Nov. 16, 2017

Related U.S. Application Data

(62) Division of application No. 14/417,044, filed as application No. PCT/JP2013/069325 on Jul. 16, 2013, now Pat. No. 9,765,194.

(30) Foreign Application Priority Data

| Jul. 25, 2012 | (JP) | JP2012-165168 |
| Jul. 31, 2012 | (JP) | JP2012-169664 |
| Aug. 7, 2012 | (JP) | JP2012-175032 |
| Sep. 25, 2012 | (JP) | JP2012-211310 |
| Dec. 21, 2012 | (JP) | JP2012-280040 |
| Dec. 21, 2012 | (JP) | JP2012-280236 |
| Jan. 28, 2013 | (JP) | JP2013-013585 |
| Jan. 30, 2013 | (JP) | JP2013-016160 |
| Jan. 30, 2013 | (JP) | JP2013-016161 |

(51) Int. Cl.
| *C08J 5/24* | (2006.01) |
| *C08G 59/38* | (2006.01) |
| *D06M 13/11* | (2006.01) |
| *C08L 63/00* | (2006.01) |
| *D06M 15/55* | (2006.01) |
| *C08J 5/04* | (2006.01) |
| *C08J 5/06* | (2006.01) |
| *B29C 70/46* | (2006.01) |
| *C08K 5/1515* | (2006.01) |
| *C09D 163/00* | (2006.01) |
| *D06M 101/40* | (2006.01) |
| *B29K 63/00* | (2006.01) |
| *B29K 105/08* | (2006.01) |
| *B29K 307/04* | (2006.01) |

(52) U.S. Cl.
CPC ............ *C08J 5/24* (2013.01); *B29C 70/46* (2013.01); *C08G 59/38* (2013.01); *C08J 5/042* (2013.01); *C08J 5/06* (2013.01); *C08K 5/1515* (2013.01); *C08L 63/00* (2013.01); *C09D 163/00* (2013.01); *D06M 13/11* (2013.01); *D06M 15/55* (2013.01); *B29K 2063/00* (2013.01); *B29K 2105/0872* (2013.01); *B29K 2307/04* (2013.01); *C08J 2363/00* (2013.01); *D06M 2101/40* (2013.01); *Y10T 428/249944* (2015.04)

(58) Field of Classification Search
CPC ............... B29C 70/46; B29K 2063/00; B29K 2105/0872; C08G 59/38; C08K 5/1515; C08J 2363/00; C08J 5/042; C08J 5/06; C08J 5/24; Y10T 428/249944
USPC .............................................. 428/378, 298.7
See application file for complete search history.

(56) References Cited

U.S. PATENT DOCUMENTS

| 4,420,512 A | 12/1983 | Ogawa et al. |
| 5,028,478 A | 7/1991 | Odagiri et al. |
| 5,413,847 A | 5/1995 | Kishi et al. |
| 5,462,799 A | 10/1995 | Kobayashi et al. |

(Continued)

FOREIGN PATENT DOCUMENTS

| CN | 1441830 A | 9/2003 |
| CN | 1527895 A | 9/2004 |

(Continued)

OTHER PUBLICATIONS

Chinese Office Action dated Aug. 7, 2015, for Chinese Application No. 201380038917.4.
Extended European Search Report dated Jun. 15, 2015, for European Application No. 13822493.6.
International Search Report, issued in PCT/JP2013/069325, dated Oct. 29, 2013.
Korean Notice of Allowance, dated May 20, 2015, for Korean Application No. 10-2015-7001725.

(Continued)

*Primary Examiner* — Vincent Tatesure
(74) *Attorney, Agent, or Firm* — Birch, Stewart, Kolasch & Birch, LLP.

(57) ABSTRACT

A prepreg includes; sizing agent-coated carbon fibers coated with a sizing agent; and a thermosetting resin composition impregnated into the sizing agent-coated carbon fibers. The sizing agent includes an aliphatic epoxy compound (A) and an aromatic compound (B) at least containing an aromatic epoxy compound (B1). The thermosetting resin composition includes a thermosetting resin (D) and a latent hardener (E), and optionally includes an additive (F) other than the thermosetting resin (D) and the latent hardener (E). The (a)/(b) ratio is within a predetermined range where (a) is the height of a component at a binding energy assigned to CHx, C—C, and C=C and (b) is the height of a component at a binding energy assigned to C—O in a $C_{1s}$ core spectrum of the surfaces of the sizing agent-coated carbon fibers analyzed by X-ray photoelectron spectroscopy.

15 Claims, No Drawings

(56) References Cited

U.S. PATENT DOCUMENTS

| | | | |
|---|---|---|---|
| 5,587,240 A | 12/1996 | Kobayashi et al. | |
| 5,589,055 A | 12/1996 | Kobayashi et al. | |
| 5,691,055 A | 11/1997 | Kobayashi et al. | |
| 6,103,211 A | 8/2000 | Matsuhisa et al. | |
| 6,894,113 B2 | 5/2005 | Court et al. | |
| 7,084,213 B2 | 8/2006 | McGrail et al. | |
| 2002/0061941 A1* | 5/2002 | Masamune | C08J 3/03 523/404 |
| 2004/0034124 A1 | 2/2004 | Court et al. | |
| 2004/0191511 A1 | 9/2004 | Sugiura et al. | |
| 2006/0154039 A1 | 7/2006 | Suzuki et al. | |
| 2006/0240239 A1 | 10/2006 | McGrail et al. | |
| 2010/0159243 A1 | 6/2010 | Inoue | |
| 2010/0280151 A1 | 11/2010 | Nguyen et al. | |
| 2011/0000703 A1 | 1/2011 | Nakayama et al. | |
| 2012/0035299 A1* | 2/2012 | Arai | C08G 59/28 523/427 |
| 2013/0217805 A1 | 8/2013 | Hayashi et al. | |
| 2014/0100320 A1 | 4/2014 | Nagano et al. | |
| 2014/0329075 A1 | 11/2014 | Ichikawa et al. | |

FOREIGN PATENT DOCUMENTS

| | | | | |
|---|---|---|---|---|
| CN | 1946780 A | 4/2007 | | |
| CN | 104011288 A | 8/2014 | | |
| EP | 0524054 B1 | 3/1997 | | |
| EP | 0749987 B1 | 3/1999 | | |
| EP | 1731553 A1 | 12/2006 | | |
| EP | 2799616 A1 | 11/2014 | | |
| JP | 59-41973 A | 3/1983 | | |
| JP | 59-71479 A | 4/1984 | | |
| JP | 62-1717 A | 1/1987 | | |
| JP | 63-170427 A | 7/1988 | | |
| JP | 63-170428 A | 7/1988 | | |
| JP | 64-26651 A | 1/1989 | | |
| JP | 1-104624 A | 4/1989 | | |
| JP | 2-307979 A | 12/1990 | | |
| JP | 3-26750 A | 2/1991 | | |
| JP | 6-43508 B2 | 6/1994 | | |
| JP | 7-279040 A | 10/1995 | | |
| JP | 9-235397 A | 9/1997 | | |
| JP | 11-241230 A | 9/1999 | | |
| JP | 2001-31838 A | 2/2001 | | |
| JP | 2002-173873 A | 6/2002 | | |
| JP | 2002-309487 A | 10/2002 | | |
| JP | 2002-363253 A | 12/2002 | | |
| JP | 2003-26768 A | 1/2003 | | |
| JP | 2003-535181 A | 11/2003 | | |
| JP | 2004-506789 A | 3/2004 | | |
| JP | 2005-179826 A | 7/2005 | | |
| JP | 2005-213687 A | 8/2005 | | |
| JP | 2005-256226 A | 9/2005 | | |
| JP | 2005-280124 A | 10/2005 | | |
| JP | 2008-280624 A | 11/2008 | | |
| JP | 2009-221460 A | 10/2009 | | |
| WO | WO 96/17006 A1 | 6/1996 | | |
| WO | WO 97/45576 A1 | 12/1997 | | |
| WO | WO 02/16456 A2 | 2/2002 | | |
| WO | WO 03/010383 A1 | 2/2003 | | |
| WO | WO 2006/077153 A2 | 7/2006 | | |
| WO | WO 2008/040963 A1 | 4/2008 | | |
| WO | WO 2009/107696 A1 | 9/2009 | | |
| WO | WO 2010/035859 A1 | 4/2010 | | |
| WO | WO-2010109929 A1 * | 9/2010 | | C08G 59/28 |
| WO | WO 2012/043453 A1 | 4/2012 | | |
| WO | WO 2013/099707 A1 | 7/2013 | | |

OTHER PUBLICATIONS

Written Opinion of the International Searching Authority, issued in PCT/JP2013/069325, dated Oct. 29, 2013 with translation.
Chinese Office Action and Search Report dated Jan. 20, 2016, for Chinese Application No. 201380038917.4.
Japanese Notice of Allowance dated Mar. 4, 2014, for Japanese Application No. 2013-013585 with the English translation.
Japanese Notice of Allowance dated May 13, 2014, for Japanese Application No. 2012-280040 with the English translation.
Japanese Notice of Allowance dated May 13, 2014, for Japanese Application No. 2012-280236 with the English translation.
Japanese Notice of Allowance dated May 13, 2014, for Japanese Application No. 2013-016161 with the English translation.
Japanese Notice of Allowance dated May 20, 2014, for Japanese Application No. 2013-016160 with the English translation.
Japanese Office Action dated Mar. 4, 2014, for Application No. 2013-016160 with the English translation.

* cited by examiner

PREPREG AND CARBON FIBER-REINFORCED COMPOSITE MATERIAL

CROSS REFERENCE TO RELATED APPLICATIONS

This application is a Divisional of copending application Ser. No. 14/417,044, filed on Jan. 23, 2015, which is the National Phase under 35 U.S.C. § 371 of International Application No. PCT/JP2013/069325, filed on Jul. 16, 2013, which claims the benefit under 35 U.S.C. § 119(a) to Patent Application No. 2012-165168, filed in Japan on Jul. 25, 2012, Patent Application No. 2012-169664, filed in Japan on Jul. 31, 2012, Patent Application No. 2012-175032, filed in Japan on Aug. 7, 2012, Patent Application No. 2012-211310, filed in Japan on Sep. 25, 2012, Patent Application No. 2012-280040, filed in Japan on Dec. 21, 2012, Patent Application No. 2012-280236, filed in Japan on Dec. 21, 2012, Patent Application No. 2013-013585, filed in Japan on Jan. 28, 2013, Patent Application No. 2013-016160, filed in Japan on Jan. 30, 2013, and Patent Application No. 2013-016161, filed in Japan on Jan. 30, 2013, all of which are hereby expressly incorporated by reference into the present application.

FIELD

The present invention relates to a prepreg and a carbon fiber-reinforced composite material suitably used for aircraft members, spacecraft members, automobile members, ship members, sporting goods such as golf shafts and fishing rods, and other general industrial applications. More specifically, the present invention relates to a prepreg and a carbon fiber-reinforced composite material having excellent adhesiveness between a matrix resin and carbon fibers and capable of suppressing the reduction in mechanical characteristics during a long-term storage.

BACKGROUND

Fiber-reinforced composite materials including reinforced fibers such as carbon fibers and aramid fibers have high specific strength and high specific modulus and thus have been used as structural materials for aircrafts, automobiles, and other products, for sporting goods such as tennis rackets, golf shafts, and fishing rods, and for other general industrial applications.

Carbon fibers are brittle and poor in bindability and abrasion resistance and thus readily generate fluffs or broken threads in a high-order processing step. To address this problem, various sizing agents for carbon fibers have been developed in order to improve the adhesiveness and bindability of carbon fibers. The sizing agents developed include an aliphatic compound having a plurality of epoxy groups, an epoxy adduct of polyalkylene glycol, a diglycidyl ether of bisphenol A, a polyalkylene oxide adduct of bisphenol A, and an adduct prepared by adding an epoxy group to an polyalkylene oxide adduct of bisphenol A. However, a sizing agent composed of a single epoxy compound seems to be insufficient in the adhesiveness and the bindability, and thus a technique of using two or more epoxy compounds in combination depending on an intended function has been developed.

For example, a disclosed sizing agent includes two or more epoxy compounds each having a defined surface energy (see Patent Literatures 1 to 4). Patent Literature 1 discloses a combination of an aliphatic epoxy compound and an aromatic epoxy compound. Patent Literature 1 describes that a sizing agent present in the outer layer in a large amount has an effect of shielding another sizing agent present in the inner layer in a large amount from air, and this prevents the epoxy group form undergoing ring-opening by water in air. Patent Literature 1 also describes that the sizing agent preferably contains the aliphatic epoxy compound and the aromatic epoxy compound in a ratio of 10/90 to 40/60, and the aromatic epoxy compound is preferably contained in a larger amount.

Patent Literatures 3 and 4 disclose a sizing agent including two or more epoxy compounds having different surface energies. Patent Literatures 3 and 4 aim to improve adhesion to a matrix resin, but do not limit the combination of two or more epoxy compounds to the combination of an aromatic epoxy compound and an aliphatic epoxy compound, and describe no typical example of the aliphatic epoxy compound selected in view of adhesion.

Another disclosed sizing agent contains a bisphenol A epoxy compound and an aliphatic polyepoxy resin in a mass ratio of 50/50 to 90/10 (see Patent Literature 5). However, the sizing agent disclosed in Patent Literature 5 also contains the bisphenol A epoxy compound as an aromatic epoxy compound in a large amount.

A disclosed sizing agent specifying the combination of an aromatic epoxy compound and an aliphatic epoxy compound is a combination of a multifunctional aliphatic compound on the surface of carbon fiber bundles and an epoxy resin, a condensate of an alkylene oxide adduct with an unsaturated dibasic acid, and an alkylene oxide adduct of a phenol on the surface of the multifunctional aliphatic compound (see Patent Literature 6).

A disclosed combination of two or more epoxy compounds is a combination of an aliphatic epoxy compound and a bisphenol A epoxy compound as an aromatic epoxy compound. The aliphatic epoxy compound is a cyclic aliphatic epoxy compound and/or a long chain aliphatic epoxy compound (see Patent Literature 7).

A combination of epoxy compounds having different properties, for example, two epoxy compounds that are liquid and solid at 25° C. has also been disclosed (see Patent Literature 8). Furthermore, a combination of epoxy resins having different molecular weights and a combination of a monofunctional aliphatic epoxy compound and an epoxy resin have been developed (see Patent Literatures 9 and 10).

However, the sizing agents (for example, Patent Literatures 7 to 10) containing two or more components practically fail to achieve both the adhesion between carbon fibers and a matrix resin and the stability of a prepreg during long-term storage. The reason is considered as follows: The following three requirements are needed to be satisfied in order to simultaneously achieve the high adhesion and the suppression of the reduction in mechanical characteristics of a prepreg during long-term storage, but a conventional combination of any epoxy resins has failed to satisfy these requirements. Of the tree requirements, the first is that an epoxy component having high adhesion is present in the inner side (carbon fiber side) of a sizing layer, and the carbon fibers and the epoxy compound in the sizing interact strongly; the second is that the surface layer (matrix resin side) of the sizing layer has a function of suppressing the reaction between a matrix resin and the epoxy compound that is present in the inner layer and that has high adhesion to carbon fibers; and the third is that the surface layer (matrix resin side) of the sizing agent necessitates a chemical composition capable of strongly interacting with a matrix resin in order to improve the adhesion to the matrix resin.

For example, Patent Literature 1 discloses a sizing agent having an inclined structure for increasing the adhesion between carbon fibers and the sizing agent, but Patent Literature 1 and any other literatures (for example, Patent Literatures 2 to 5) have no idea that the sizing layer surface simultaneously suppresses the reaction between an epoxy compound having high adhesion to carbon fibers and a component in a matrix and achieves high adhesion to the matrix resin.

Patent Literature 6 discloses a sizing agent including an inner layer containing a multifunctional aliphatic compound and an outer layer containing an aromatic epoxy resin and an aromatic reaction product each having low reactivity. The sizing agent should prevent a prepreg stored for a long period of time from suffering change with time, but the surface layer of the sizing agent contains no multifunctional aliphatic compound having high adhesion, and this makes it difficult to achieve high adhesion to a matrix resin.

By a method of infiltrating an unhardened matrix resin into carbon fibers coated with such a sizing agent to form a prepreg as a sheet-like intermediate material and hardening the prepreg or by resin transfer molding of casting a liquid matrix resin to carbon fibers placed in a mold to yield an intermediate and hardening the intermediate, a carbon fiber composite material is produced. In addition, various techniques have been developed for prepregs and carbon fiber composite materials used in various applications.

Structural materials for aircrafts, automobiles, and other products are severely required to have much lighter weight and much higher material strength, and an epoxy resin as the matrix resin is required to have high heat resistance. A technique of combining a multifunctional epoxy resin with a component such as polyisocyanate has been developed as the epoxy resin composition having small volatile content and high heat resistance (see Patent Literature 11).

Other techniques disclosed include a method of producing carbon fibers having high strength (see Patent Literature 12) and a technique of giving high tensile strength translation rate by adjusting a tensile breaking elongation and a fracture toughness KIc to a particular ratio (see Patent Literature 13).

As a technique for improving toughness, a prepreg having a surface on which resin particles are dispersed has been developed. Specifically, the technique includes dispersing resin particles composed of a thermoplastic resin such as nylon on the surface of a prepreg, thereby imparting high toughness and good heat resistance to the carbon fiber-reinforced composite material (see Patent Literature 14). In addition to Patent Literature 14, another technique disclosed includes combining a matrix resin to which a polysulfone oligomer is added to improve the toughness, with particles composed of a thermosetting resin, thereby achieving high toughness of a carbon fiber-reinforced composite material (see Patent Literature 15).

Another method disclosed includes combining an epoxy resin having a particular skeleton with resin particles insoluble in the epoxy resin, thereby satisfying both the tensile strength and the toughness (Patent Literature 16).

Disclosed epoxy resin compositions giving a carbon fiber-reinforced composite material having excellent compressive strength include an epoxy resin composition including tetraglycidyldiaminodiphenylmethane, a bifunctional epoxy resin such as a bisphenol A epoxy resin and diglycidyl resorcinol, and 3,3'-diaminodiphenylsulfone (see Patent Literature 17), an epoxy resin composition including a multifunctional epoxy resin, a diglycidylaniline derivative, and 4,4'-diaminodiphenylsulfone (see Patent Literature 18), and an epoxy resin composition including a multifunctional epoxy resin, an epoxy resin having a special skeleton, and 3,3'-diaminodiphenylsulfone (see Patent Literature 19).

In addition, a known method of improving the interlaminar toughness and impact resistance of a carbon fiber-reinforced composite material is a technique of dissolving a thermoplastic resin such as polyethersulfone, polysulfone, and polyetherimide or adding such a thermoplastic resin as fine powder, in an epoxy resin used as the matrix resin to uniformly disperse the thermoplastic resin in the epoxy resin (for example, see Patent Literature 20).

Another method disclosed includes adding a styrene-butadiene-methacrylic acid copolymer or a butadiene-methacrylic acid copolymer to an epoxy resin, thereby improving the toughness of the epoxy resin (for example, see Patent Literatures 21 and 22).

In sporting applications, it is well-known that the addition of an amine epoxy resin having high elastic modulus to an epoxy resin composition allows the epoxy resin composition to have higher elastic modulus and the application of the epoxy resin composition, as a matrix resin, to a carbon fiber-reinforced composite material achieves significantly higher bending strength in the fiber direction, which has a strong correlation with a compressive strength in the fiber direction (for example, see Patent Literature 23).

CITATION LIST

Patent Literature

Patent Literature 1: Japanese Patent Application Laid-open No. 2005-179826
Patent Literature 2: Japanese Patent Application Laid-open No. 2005-256226
Patent Literature 3: International Publication WO 03/010383
Patent Literature 4: Japanese Patent Application Laid-open No. 2008-280624
Patent Literature 5: Japanese Patent Application Laid-open No. 2005-213687
Patent Literature 6: Japanese Patent Application Laid-open No. 2002-309487
Patent Literature 7: Japanese Patent Application Laid-open No. 02-307979
Patent Literature 8: Japanese Patent Application Laid-open No. 2002-173873
Patent Literature 9: Japanese Patent Application Laid-open No. 59-71479
Patent Literature 10: Japanese Patent Application Laid-open No. 58-41973
Patent Literature 11: Japanese Patent Application Laid-open No. 2001-31838
Patent Literature 12: Japanese Patent Application Laid-open No. 11-241230
Patent Literature 13: Japanese Patent Application Laid-open No. 9-235397
Patent Literature 14: U.S. Pat. No. 5,028,478
Patent Literature 15: Japanese Patent Application Laid-open No. 03-26750
Patent Literature 16: International Publication WO 2008/040963
Patent Literature 17: International Publication WO 1996/17006
Patent Literature 18: Japanese Patent Application Laid-open No. 2003-26768

Patent Literature 19: Japanese Patent Application Laid-open No. 2002-363253
Patent Literature 20: Japanese Examined Patent Application Publication No. 6-43508
Patent Literature 21: Japanese Translation of PCT Application No. 2003-535181
Patent Literature 22: International Publication WO 2006/077153
Patent Literature 23: Japanese Patent Application Laid-open No. 62-1717

SUMMARY

In view of the above circumstances, it is an object of the present invention to provide a prepreg capable of giving a carbon fiber-reinforced composite material having excellent adhesiveness between a matrix resin and carbon fibers and excellent long-term storage stability.

To solve the above-described problem and achieve the object, a prepreg according to the present invention includes: sizing agent-coated carbon fibers coated with a sizing agent; and a thermosetting resin composition impregnated into the sizing agent-coated carbon fibers, wherein the sizing agent includes an aliphatic epoxy compound (A) and an aromatic compound (B) at least containing an aromatic epoxy compound (B1), the sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°. The thermosetting resin composition includes a thermosetting resin (D) and a latent hardener (E), and optionally includes an additive (F) other than the thermosetting resin (D) and the latent hardener (E).

In the above-described prepreg according to the present invention, the thermosetting resin composition is an epoxy resin composition at least containing an epoxy resin (D11) having two or more ring structures that are four- or more-membered rings and having one or two amine glycidyl groups or ether glycidyl groups that are directly bonded to at least one of the ring structures and an epoxy resin (D12) having three or more functional groups, as the thermosetting resin (D), and
the epoxy resin composition contains the epoxy resin (D11) in an amount of 5 to 60% by mass and the epoxy resin (D12) in an amount of 40 to 80% by mass relative to 100% by mass of the total epoxy resins contained.

In the above-described prepreg according to the present invention, the thermosetting resin composition is an epoxy resin composition at least containing an epoxy resin (D1) as the thermosetting resin (D) and resin particles (F1) insoluble in the epoxy resin (D1) and having a structure of General Formula (1):

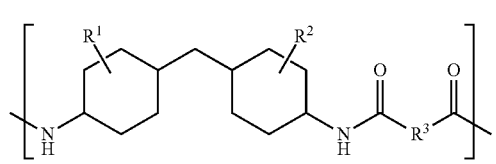

(in Formula (1), $R^1$ and $R^2$ are a $C_{1-8}$ alkyl group or a halogen atom and are optionally the same as or different from each other; and $R^3$ is a $C_{1-20}$ alkylene group) as the additive (F).

In the above-described prepreg according to the present invention, the thermosetting resin composition is an epoxy resin composition at least containing an epoxy resin (D1) as the thermosetting resin (D) and a compound (E1) of General Formula (2):

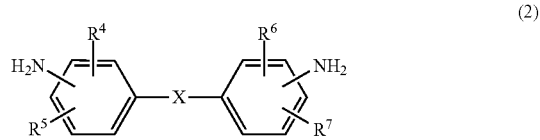

(in Formula (2), $R^4$ to $R^7$ are at least one selected from the group consisting of a hydrogen atom, $C_{1-4}$ aliphatic hydrocarbon groups, alicyclic hydrocarbon groups having a carbon number of 4 or less, and halogen atoms; and X is one selected from —O—, —S—, —CO—, —C(=O)O—, and —C(=O)NH—) as the latent hardener (E).

In the above-described prepreg according to the present invention, the thermosetting resin composition is an epoxy resin composition at least containing an epoxy resin (D1) as the thermosetting resin (D) and at least one block copolymer (F2) selected from the group consisting of S-B-M, B-M, and M-B-M as the additive (F), the blocks in the block copolymer (F2) are linked through a covalent bond or linked through covalent bonds with an intermediate molecule having any chemical structure interposed therebetween. The block M is a homopolymer of methyl methacrylate or a copolymer containing methyl methacrylate in an amount of at least 50% by mass, the block B is incompatible with the block M and has a glass transition temperature of 20° C. or lower, and the block S is incompatible with the blocks B and M and has a glass transition temperature higher than that of the block B.

In the above-described prepreg according to the present invention, the thermosetting resin composition is an epoxy resin composition at least containing a bisphenol epoxy resin (D131) having a number average molecular weight of 1,500 or more, an amine epoxy resin (D141) having three or more functional groups, and a bisphenol epoxy resin (D151) having a number average molecular weight of 150 to 1,200 as the thermosetting resin (D). As for the amounts of the epoxy resins (D131), (D141), and (D151), the bisphenol epoxy resin (D131) is contained in an amount of 20 to 50 parts by mass, the amine epoxy resin (D141) is contained in an amount of 30 to 50 parts by mass, and the bisphenol epoxy resin (D151) is contained in an amount of 10 to 40 parts by mass relative to 100 parts by mass of all the epoxy resin components.

In the above-described prepreg according to the present invention, the thermosetting resin composition is an epoxy resin composition at least containing an epoxy resin (D132) having a softening point of 90° C. or higher, an epoxy resin (D152) having a softening point of 50° C. or lower, an epoxy resin (D142) having a softening point of 50° C. or lower and having a solubility parameter (SP) value that is 1.2 or more larger than an SP value of the epoxy resin (D132) and an SP value of the epoxy resin (D152) as the thermosetting resin (D). An epoxy resin hardened product obtained by hardening the epoxy resin composition has a phase separated structure including a phase rich in the epoxy resin (D132) and a phase rich in the epoxy resin (D142), and the phase separated structure has a phase separated structure period of 1 nm to 5 µm.

In the above-described prepreg according to the present invention, the latent hardener (E) is an aromatic amine hardener (E2).

In the above-described prepreg according to the present invention, the latent hardener (E) is dicyandiamide or a derivative thereof (E3).

In the above-described prepreg according to the present invention, the sizing agent and the compound (E1) of General Formula (2) are used in a combination where when the sizing agent and the compound (E1) are mixed in an amine equivalent/epoxy equivalent ratio of 0.9 and a mixture is stored in an atmosphere of 25° C. and 60% RH for 20 days, the mixture has an increase in glass transition point by 25° C. or smaller.

In the above-described prepreg according to the present invention, the sizing agent and the aromatic amine hardener (E2) are used in a combination where when the sizing agent and the aromatic amine hardener (E2) are mixed in an amine equivalent/epoxy equivalent ratio of 0.9 and a mixture is stored in an atmosphere of 25° C. and 60% RH for 20 days, the mixture has an increase in glass transition point by 25° C. or smaller.

In the above-described prepreg according to the present invention, the sizing agent and the dicyandiamide or the derivative thereof (E3) are used in a combination where when the sizing agent and the dicyandiamide or the derivative thereof (E3) are mixed in an amine equivalent/epoxy equivalent ratio of 1.0 and a mixture is stored in an atmosphere of 25° C. and 60% RH for 20 days, the mixture has an increase in glass transition point by 10° C. or smaller.

In the above-described prepreg according to the present invention, the sizing agent has an epoxy equivalent of 350 to 550 g/eq.

In the above-described prepreg according to the present invention, the sizing agent contains at least the aliphatic epoxy compound (A) in an amount of 35 to 65% by mass and the aromatic compound (B) in an amount of 35 to 60% by mass relative to a total amount of the sizing agent except solvents.

In the above-described prepreg according to the present invention, the aliphatic epoxy compound (A) and the aromatic epoxy compound (B1) are contained in a mass ratio of 52/48 to 80/20.

In the above-described prepreg according to the present invention, the aliphatic epoxy compound (A) is a polyether polyepoxy compound and/or a polyol polyepoxy compound having two or more epoxy groups in a molecule.

In the above-described prepreg according to the present invention, the aliphatic epoxy compound (A) is a glycidyl ether epoxy compound obtained by reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

In the above-described prepreg according to the present invention, the aromatic epoxy compound (B1) is a bisphenol A epoxy compound or a bisphenol F epoxy compound.

In the above-described prepreg according to the present invention, the sizing agent contains an ester compound (C) having no epoxy group in a molecule in an amount of 2 to 35% by mass relative to a total amount of the sizing agent except solvents.

In the above-described prepreg according to the present invention, the sizing agent-coated carbon fibers satisfy relation (III):

$$0.50 \le (I) \le 0.90 \text{ and } 0.60 < (II)/(I) < 1.0 \quad (III)$$

where (I) is a value of (a)/(b) of surfaces of the sizing agent-coated carbon fibers before ultrasonication, (II) is a value of (a)/(b) of the surfaces of the sizing agent-coated carbon fibers where an adhesion amount of the sizing agent is reduced to 0.09 to 0.20% by mass by ultrasonic cleaning of the sizing agent-coated carbon fibers in an acetone solvent, (a) is the height (cps) of a component at a binding energy (284.6 eV) assigned to CHx, C—C, and C═C, and (b) is the height (cps) of a component at a binding energy (286.1 eV) assigned to C—O in a $C_{1s}$ core spectrum of the sizing agent-coated carbon fibers analyzed by X-ray photoelectron spectroscopy using an X-ray at 400 eV at a photoelectron takeoff angle of 55°.

In the above-described prepreg according to the present invention, the sizing agent is a mixture of a water emulsion liquid at least containing the aromatic epoxy compound (B1) and a composition at least containing the aliphatic epoxy compound (A).

In the above-described prepreg according to the present invention, the epoxy resin composition contains an epoxy resin (D11) having a single amine glycidyl group or a single ether glycidyl group directly bonded to the ring structure in an amount of 10 to 40% by mass relative to 100% by mass of the total epoxy resins contained.

In the above-described prepreg according to the present invention, the epoxy resin (D11) has a structure of General Formula (3):

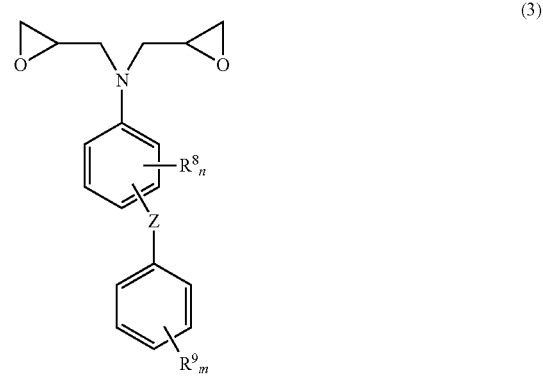

(in Formula (3), each of $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4; m is an integer of 0 to 5; when a plurality of $R^8$s or $R^9$s exist, $R^8$s and $R^9$s are each optionally the same or different; and Z is one selected from —O—, —S—, —CO—, —C(═O)O—, —SO$_2$—, and —C(═O)NH—), and the epoxy resin composition contains the epoxy resin (D11) in an amount of 25 to 50% by mass relative to 100% by mass of the total epoxy resins contained.

In the above-described prepreg according to the present invention, Z is —O— in General Formula (3).

In the above-described prepreg according to the present invention, the epoxy resin (D12) has a structure of General Formula (4):

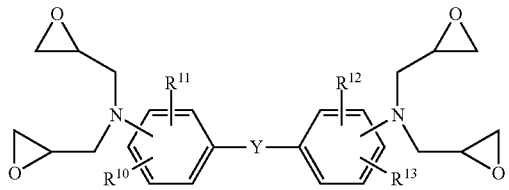

(4)

(in Formula (4), $R^{10}$ to $R^{13}$ are at least one selected from the group consisting of a hydrogen atom, $C_{1-4}$ aliphatic hydrocarbon groups, alicyclic hydrocarbon groups having a carbon number of 4 or less, and halogen atoms; and Y is one selected from —CH$_2$—, —O—, —S—, —CO—, —C(=O)O—, —SO$_2$—, and —C(=O)NH—).

In the above-described prepreg according to the present invention, Y is —CH$_2$— in General Formula (4).

In the above-described prepreg according to the present invention, the epoxy resin (D12) has the structure of General Formula (4) where Y is CH$_2$— and has an epoxy equivalent of 100 to 115 g/eq.

In the above-described prepreg according to the present invention, the epoxy resin composition contains a thermoplastic resin (F3) soluble in the epoxy resin (D11) or the epoxy resin (D12) as the additive (F).

In the above-described prepreg according to the present invention, the thermoplastic resin (F3) is polyethersulfone.

In the above-described prepreg according to the present invention, the polyethersulfone has an average molecular weight of 15,000 to 30,000 g/mol.

In the above-described prepreg according to the present invention, the resin particles (F1) are distributed in a surface region at a higher density than density of an inside region of the prepreg.

In the above-described prepreg according to the present invention, the epoxy resin composition contains, in addition to the resin particles (F1) having the structure of General Formula (1), polyamide particles (F4) having no structure of General Formula (1).

In the above-described prepreg according to the present invention, 90 to 100% by mass of the polyamide particles (F4) are present in a region from each surface to 20% of the depth in the thickness direction of the prepreg.

In the above-described prepreg according to the present invention, the resin particles (F1) and the polyamide particles (F4) are contained in a mass ratio of 10/0 to 5/5.

In the above-described prepreg according to the present invention, the polyamide particles (F4) have an average particle size smaller than an average particle size of the resin particles (F1).

In the above-described prepreg according to the present invention, X is —O— in the compound (E1) of General Formula (2).

In the above-described prepreg according to the present invention, at least one of the amino groups is present at a meta-position in the compound (E1) of General Formula (2).

In the above-described prepreg according to the present invention, the epoxy resin (D1) contains an epoxy resin (D11) having two or more ring structures that are four- or more-membered rings and having one or two amine glycidyl groups or ether glycidyl groups that are directly bonded to the ring structure and contains an epoxy resin (D12) having three or more functional groups.

In the above-described prepreg according to the present invention, the epoxy resin (D12) has a structure of General Formula (4):

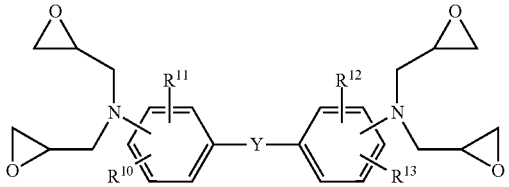

(4)

(in Formula (4), $R^{10}$ to $R^{13}$ are at least one selected from the group consisting of a hydrogen atom, $C_{1-4}$ aliphatic hydrocarbon groups, alicyclic hydrocarbon groups having a carbon number of 4 or less, and halogen atoms; and Y is one selected from —CH$_2$—, —O—, —S—, —CO—, —C(=O)O—, —SO$_2$—, and —C(=O)NH—).

In the above-described prepreg according to the present invention, Y is —CH$_2$— or —O— in General Formula (4) for the epoxy resin (D12).

In the above-described prepreg according to the present invention, at least one of the diglycidyl amino groups is present at a meta-position in General Formula (4) for the epoxy resin (D12).

In the above-described prepreg according to the present invention, the block B of the block copolymer (F2) is poly(1,4-butadiene) or poly(butyl acrylate).

In the above-described prepreg according to the present invention, an epoxy resin hardened product obtained by hardening the epoxy resin composition has a phase separated structure including a phase rich in the bisphenol epoxy resin (D131) and a phase rich in the amine epoxy resin (D141), and the phase separated structure has a phase separated structure period of 1 nm to 5 μm.

In the above-described prepreg according to the present invention, the amine epoxy resin (D141) is an aminophenol epoxy resin having three or more functional groups.

In the above-described prepreg according to the present invention, the bisphenol epoxy resin (D151) has a number average molecular weight of 150 to 450.

In the above-described prepreg according to the present invention, the bisphenol epoxy resin (D131) and the bisphenol epoxy resin (D151) are a bisphenol F epoxy resin.

A carbon fiber-reinforced composite material is produced by molding the prepreg according to any one of the above.

ADVANTAGEOUS EFFECTS OF INVENTION

The present invention can provide a carbon fiber-reinforced composite material having excellent adhesiveness between a matrix resin and carbon fibers, excellent long-term storage stability, and excellent strength characteristics.

DESCRIPTION OF EMBODIMENTS

A prepreg and a carbon fiber-reinforced composite material of the present invention will now be described in more detail.

The present invention provides a prepreg including sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy using $AlK\alpha_{1,2}$ as an X-ray source at a photoelectron takeoff angle of 15°. The thermosetting resin composition includes a thermosetting resin (D) and a latent hardener (E), and optionally includes an additive (F) other than the thermosetting resin (D) and the latent hardener (E). Each embodiment will next be described.

First Embodiment

The prepreg pertaining to First Embodiment of the present invention includes sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy at a photoelectron takeoff angle of 15°. The thermosetting resin composition is an epoxy resin composition at least containing the following components: an epoxy resin (D11) having two or more ring structures that are four- or more-membered rings and having one or two amine glycidyl groups or ether glycidyl groups that are directly bonded to the ring structure; an epoxy resin (D12) having three or more functional groups; and a latent hardener (E). The epoxy resin composition contains the epoxy resin (D11) in an amount of 5 to 60% by mass and the epoxy resin (D12) in an amount of 40 to 80% by mass relative to 100% by mass of the total epoxy resins contained.

Fiber-reinforced composite materials including reinforced fibers such as carbon fibers and aramid fibers have high specific strength and high specific modulus and thus have been used as structural materials for aircrafts, automobiles, and other products, for sporting goods such as tennis rackets, golf shafts, and fishing rods, and for other general industrial applications.

Such a fiber-reinforced composite material is produced by a method of impregnating carbon fibers with a matrix resin unhardened to form a prepreg as a sheet-like intermediate material and hardening the prepreg or by resin transfer molding of casting a liquid matrix resin to carbon fibers placed in a mold to yield an intermediate and hardening the intermediate. In the method of using a prepreg of these production methods, a plurality of prepregs are typically stacked, and then the prepregs are heated and compressed, thus yielding a carbon fiber-reinforced composite material molded product. In many cases, the matrix resin used in the prepreg is thermosetting resins, specifically, epoxy resins in terms of productivity such as processability.

Specifically, the structural materials for aircrafts, automobiles, and other products are severely required to have much lighter weight and much higher material strength as the materials have been increasingly demanded. Thus, the epoxy resin as the matrix resin is required to have high heat resistance.

As for an epoxy resin composition having small volatile content and having high heat resistance, Japanese Patent Application Laid-open No. 2001-31838 discloses a technique of combining a multifunctional epoxy resin with a component such as polyisocyanate. However, the disclosure describes no strength of the carbon fiber-reinforced composite material produced by hardening prepregs stacked.

To enhance the strength of a carbon fiber-reinforced composite material, carbon fibers are required to have higher strength or higher carbon fiber volume fraction (higher Vf), and Japanese Patent Application Laid-open No. H11-241230 discloses a method for producing carbon fibers having high strength. However, the disclosure describes no strength of a carbon fiber-reinforced composite material to be produced. Typically, carbon fibers having higher strength are likely to impart the strength intrinsic in the carbon fibers. For example, if having higher strand strength, the carbon fibers fail to impart sufficient tensile strength, and the tensile strength translation rate (tensile strength of a carbon fiber-reinforced composite material/(strand strength of carbon fibers×carbon fiber volume fraction)×100) is likely to be lowered. Although such carbon fibers having high strength can be obtained, other technical problems are required to be solved in order to achieve the strength of a carbon fiber-reinforced composite material.

Even if carbon fibers have the same strength, the tensile strength translation rate greatly varies with a matrix resin to be combined or other molding conditions. In particular, a carbon fiber-reinforced composite material hardened at a hardening temperature of 180° C. or higher is unlikely to exhibit high strength due to thermal stress remaining in the carbon fiber-reinforced composite material during the hardening. To address this problem, modifications of a matrix resin have been studied in order to sufficiently achieve tensile strength even through a hardening at a temperature of 180° C.

It is known that a matrix resin having higher tensile breaking elongation gives a carbon fiber-reinforced composite material having higher tensile strength translation rate. To improve the tensile breaking elongation of a matrix resin, a reduction in the cross-linking density of the matrix resin is effective, but the reduction of the cross-linking density may reduce the heat resistance of the carbon fiber-reinforced composite material. Thus, the effective formulation is limited. To solve the problem, Japanese Patent Application Laid-open No. H09-235397 discloses a technique of giving high tensile strength translation rate by adjusting a tensile breaking elongation and a fracture toughness KIc to satisfy a particular relation. However, if a thermoplastic resin or a rubber component is added in a large amount to a matrix resin in order to improve the fracture toughness KIc, the matrix resin typically has a higher viscosity and may have poor processability and handleability for the production of prepregs.

First Embodiment of the present invention can provide a prepreg and a carbon fiber-reinforced composite material having excellent adhesiveness between a matrix resin and carbon fibers, excellent long-term storage stability, small volatile content during hardening, excellent heat resistance, and excellent mechanical characteristics in severe use environments such as a low temperature environment.

First, the sizing agent used in the prepreg of First Embodiment will be described. The sizing agent of First Embodiment includes an aliphatic epoxy compound (A) and an aromatic compound (B) at least containing an aromatic epoxy compound (B1).

On the basis of findings by the inventors of the present invention, a sizing agent within the range has excellent interfacial adhesion between carbon fibers and a matrix, and the sizing agent-coated carbon fibers are used to prepare a prepreg, which undergoes a small change with time during storage. The sizing agent is thus preferably used for carbon fibers for a carbon fiber-reinforced composite material.

In the prepreg of First Embodiment, when the sizing agent is applied to carbon fibers, the inner side (carbon fiber side) of the sizing layer contains the aliphatic epoxy compound (A) in a larger amount, and thus the carbon fibers and the aliphatic epoxy compound (A) strongly interact to increase the adhesion. The surface layer (matrix resin side) of the sizing layer contains the aromatic compound (B) containing the aromatic epoxy compound (B1) in a larger amount, and this prevents the aliphatic epoxy compound (A) in the inner layer from reacting with a matrix resin. In addition, the surface layer (matrix resin side) of the sizing layer contains the aromatic epoxy compound (B1) containing a certain number of epoxy groups and the aliphatic epoxy compound (A) containing a certain number of epoxy groups in a certain ratio as a chemical composition capable of achieving strong interaction with the matrix resin, and this also improves the adhesion to the matrix resin.

A sizing agent containing the aromatic epoxy compound (B1) alone but containing no aliphatic epoxy compound (A) advantageously has low reactivity with a matrix resin, and a prepreg to be prepared undergoes a small change in mechanical characteristics during long-term storage. Such a sizing agent also has an advantage of capable of forming a rigid interface layer. However, the aromatic epoxy compound (B1), which is a rigid compound, is ascertained to be slightly inferior in the adhesion between carbon fibers and a matrix resin to the aliphatic epoxy compound (A).

When coated with a sizing agent containing the aliphatic epoxy compound (A) alone, the carbon fibers are ascertained to have high adhesion to a matrix resin. Although not certain, the mechanism is supposed as follows: the aliphatic epoxy compound (A) has a flexible skeleton and a structure having a high degree of freedom; and thus the aliphatic epoxy compound (A) can form a strong interaction with functional groups such as a carboxy group and a hydroxy group on the surface of carbon fibers. However, the aliphatic epoxy compound (A) exhibits high adhesion due to the interaction with the carbon fiber surface but has high reactivity with a compound having a functional group, such as a hardener in the matrix resin. If the aliphatic epoxy compound (A) is stored in a prepreg state for a long period of time, it is ascertained that the interaction between the matrix resin and the sizing agent changes the structure of an interface layer, and this unfortunately reduces mechanical characteristics of a carbon fiber-reinforced composite material obtained from the prepreg.

In First Embodiment, when the aliphatic epoxy compound (A) is mixed with the aromatic compound (B), the following phenomenon occurs: the aliphatic epoxy compound (A) having higher polarity is likely to be present in the carbon fiber side in a larger amount, and the aromatic compound (B) having lower polarity is likely to be present in a larger amount in the outermost layer of the sizing layer opposite to the carbon fibers. As a result of this inclined structure of the sizing layer, the aliphatic epoxy compound (A) present near the carbon fibers has a strong interaction with the carbon fibers and thus can increase the adhesion between the carbon fibers and a matrix resin. In addition, when the sizing agent-coated carbon fibers are processed into a prepreg, the aromatic compound (B) present in the outer layer in a large amount plays a roll of blocking the aliphatic epoxy compound (A) from a matrix resin. This prevents the aliphatic epoxy compound (A) from reacting with a component having high reactivity in the matrix resin, thus achieving stability during long-term storage. If the aliphatic epoxy compound (A) is almost completely covered with the aromatic compound (B), the interaction between the sizing agent and a matrix resin is reduced to lower the adhesion, and thus the ratio of the aliphatic epoxy compound (A) and the aromatic compound (B) present on the surface of the sizing agent is thus important.

In the prepreg of First Embodiment, the sizing agent preferably, at least contains the aliphatic epoxy compound (A) in an amount of 35 to 65% by mass and the aromatic compound (B) in an amount of 35 to 60% by mass relative to the total amount of the sizing agent except solvents. If containing 35% by mass or more of the aliphatic epoxy compound (A) relative to the total amount of the sizing agent except solvents, the sizing agent improves the adhesion between carbon fibers and a matrix resin. If containing 65% by mass or less of the aliphatic epoxy compound (A), even when a prepreg is stored in a long period of time, a carbon fiber-reinforced composite material subsequently produced obtains good mechanical characteristics. The amount of the aliphatic epoxy compound (A) is more preferably 38% by mass or more and even more preferably 40% by mass or more. The amount of the aliphatic epoxy compound (A) is more preferably 60% by mass or less and even more preferably 55% by mass or less.

In the prepreg of First Embodiment, if the sizing agent contains 35% by mass or more of the aromatic compound (B) relative to the total amount of the sizing agent except solvents, the outer layer of the sizing agent can maintain the aromatic compound (B) at a high composition, and this can suppress the deterioration of mechanical characteristics of a prepreg during long-term storage due to the reaction of the aliphatic epoxy compound (A) having high reactivity with a reactive compound in the matrix resin. If containing 60% by mass or less of the aromatic compound (B), the sizing agent can achieve an inclined structure in the sizing layer and thus can maintain the adhesion between carbon fibers and a matrix resin. The amount of the aromatic compound (B) is more preferably 37% by mass or more and even more preferably 39% by mass or more. The amount of the aromatic compound (B) is more preferably 55% by mass or less and even more preferably 45% by mass or less.

In the prepreg of First Embodiment, the sizing agent includes, as epoxy components, an aromatic epoxy compound (B1) as the aromatic compound (B) in addition to the aliphatic epoxy compound (A). The mass ratio (A)/(B1) of the aliphatic epoxy compound (A) and the aromatic epoxy compound (B1) is preferably 52/48 to 80/20. A sizing agent having a ratio (A)/(B1) of 52/48 or more increases the ratio of the aliphatic epoxy compound (A) present on the surface of carbon fibers, and this improves the adhesion between the carbon fibers and a matrix resin. As a result, a carbon fiber-reinforced composite material to be produced obtains higher mechanical characteristics such as tensile strength. A sizing agent having a ratio (A)/(B1) of 80/20 or less reduces the amount of the aliphatic epoxy compound (B) having high reactivity present on the surface of carbon fibers, and this can suppress the reactivity with a matrix resin. Such a ratio is thus preferred. The mass ratio (A)/(B1) is more preferably 55/45 or more and even more preferably 60/40 or more. The mass ratio (A)/(B1) is more preferably 75/35 or less and even more preferably 73/37 or less.

In the prepreg of First Embodiment, the aliphatic epoxy compound (A) is an epoxy compound containing no aromatic ring. The epoxy compound, which has a flexible skeleton with a high degree of freedom, can have strong interaction with carbon fibers. As a result, the epoxy compound can improve the adhesion between carbon fibers coated with the sizing agent and a matrix resin.

In the prepreg of First Embodiment, the aliphatic epoxy compound (A) has one or more epoxy groups in the molecule. This allows a strong binding to be formed between carbon fibers and the epoxy group in the sizing agent. The number of the epoxy groups in the molecule is preferably two or more and more preferably three or more. In the aliphatic epoxy compound (A) that is an epoxy compound having two or more epoxy groups in the molecule, even when one epoxy group forms a covalent bond with an oxygen-containing functional group on the surface of carbon fibers, remaining epoxy groups can form a covalent bond or a hydrogen bond with a matrix resin, and this can further improve the adhesion between the carbon fibers and the matrix resin. Although the upper limit of the number of epoxy groups is not particular limited, a compound having ten epoxy groups is sufficient for the adhesion.

In the prepreg of First Embodiment, the aliphatic epoxy compound (A) is preferably an epoxy compound having two or more types of functional groups, where the number of the functional groups is three or more. The aliphatic epoxy compound (A) is more preferably an epoxy compound having two or more types of functional groups, where the number of the functional groups is four or more. The functional group contained in the epoxy compound is, in addition to the epoxy group, preferably selected from a hydroxy group, an amido group, an imido group, a urethane group, a urea group, a sulfonyl group, or a sulfo group. In the aliphatic epoxy compound (A) that is an epoxy compound having three or more epoxy groups or other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the prepreg of First Embodiment, the aliphatic epoxy compound (A) preferably has an epoxy equivalent of less than 360 g/eq., more preferably less than 270 g/eq., and even more preferably less than 180 g/eq. An aliphatic epoxy compound (A) having an epoxy equivalent of less than 360 g/eq. forms an interaction with carbon fibers at high-density and further improves the adhesion between the carbon fibers and a matrix resin. Although the lower limit of the epoxy equivalent is not particularly limited, an aliphatic epoxy compound having an epoxy equivalent of 90 g/eq. or more is sufficient for the adhesion.

In the prepreg of First Embodiment, specific examples of the aliphatic epoxy compound (A) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include glycidyl ether epoxy compounds obtained by reaction of polyols with epichlorohydrin. The glycidyl ether epoxy compound is exemplified by a glycidyl ether epoxy compound obtained by reaction of epichlorohydrin with a polyol selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. The glycidyl ether epoxy compound is also exemplified by glycidyl ether epoxy compounds having a dicyclopentadiene skeleton.

Examples of the glycidylamine epoxy compound include 1,3-bis(aminomethyl)cyclohexane.

Examples of the glycidyl ester epoxy compound include glycidyl ester epoxy compounds obtained by reaction of dimer acids with epichlorohydrin.

Examples of the epoxy compound obtained by oxidation of a compound having a plurality of double bonds in the molecule include epoxy compounds having an epoxycyclohexane ring in the molecule. The epoxy compound is specifically exemplified by epoxidized soybean oil.

In addition to these epoxy compounds, the aliphatic epoxy compound (A) used in the present invention is exemplified by epoxy compounds such as triglycidyl isocyanurate.

In the prepreg of First Embodiment, the aliphatic epoxy compound (A) preferably has one or more epoxy groups and at least one or more functional groups selected from a hydroxy group, an amido group, an imido group, a urethane group, a urea group, a sulfonyl group, a carboxy group, an ester group, and a sulfo group. Specific examples of the functional group of the aliphatic epoxy compound (A) include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aliphatic epoxy compound (A) having a hydroxy group in addition to an epoxy group include sorbitol polyglycidyl ethers and glycerol polyglycidyl ethers and specifically include Denacol (registered trademark) EX-611, EX-612, EX-614, EX-614B, EX-622, EX-512, EX-521, EX-421, EX-313, EX-314, and EX-321 (manufactured by Nagase ChemteX Corporation).

Examples of the aliphatic epoxy compound (A) having an amido group in addition to an epoxy group include amide-modified epoxy compounds. The amide-modified epoxy can be obtained by reaction of a carboxy group of an aliphatic dicarboxylic acid amide with an epoxy group of an epoxy compound having two or more epoxy groups.

Examples of the aliphatic epoxy compound (A) having an urethane group in addition to an epoxy group include urethane-modified epoxy compounds and specifically include Adeka Resin (registered trademark) EPU-78-13S, EPU-6, EPU-11, EPU-15, EPU-16A, EPU-16N, EPU-17T-6, EPU-1348, and EPU-1395 (manufactured by ADEKA). In addition, the compound can be prepared by reacting the terminal hydroxy group of a polyethylene oxide monoalkyl ether with a polyvalent isocyanate in an amount equivalent to that of the hydroxy group and then reacting the isocyanate residue of the obtained reaction product with a hydroxy group of a polyvalent epoxy compound. Examples of the polyvalent isocyanate used here include hexamethylene diisocyanate, isophorone diisocyanate, and norbornane diisocyanate.

Examples of the aliphatic epoxy compound (A) having a urea group in addition to an epoxy group include urea-modified epoxy compounds. The urea-modified epoxy compound can be prepared by reacting a carboxy group of an aliphatic dicarboxylic acid urea with an epoxy group of an epoxy compound having two or more epoxy groups.

Among the compounds described above, from the viewpoint of high adhesion, the aliphatic epoxy compound (A) used in the prepreg of First Embodiment is more preferably a glycidyl ether epoxy compound obtained by reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

Among them, the aliphatic epoxy compound (A) in the present invention is preferably a polyether polyepoxy compound and/or a polyol polyepoxy compound having two or more epoxy groups in the molecule from the viewpoint of high adhesion.

In the prepreg of First Embodiment, the aliphatic epoxy compound (A) is more preferably polyglycerol polyglycidyl ether.

In the prepreg of First Embodiment, the aromatic compound (B) has one or more aromatic rings in the molecule. The aromatic ring may be an aromatic hydrocarbon ring containing carbons alone or may be a heteroaromatic ring containing a hetero atom including nitrogen and oxygen, such as furan, thiophene, pyrrole, and imidazole. The aromatic ring may also be polycyclic aromatic rings such as naphthalene and anthracene. In a carbon fiber-reinforced composite material including carbon fibers coated with a sizing agent and a matrix resin, what is called an interface layer near the carbon fibers is affected by the carbon fibers or the sizing agent and thus may have different characteristics from those of the matrix resin. When the sizing agent contains the aromatic compound (B) having one or more aromatic rings, a rigid interface layer is formed to improve the stress transmission capacity between the carbon fibers and the matrix resin, and this improves mechanical characteristics such as 0° tensile strength of a carbon fiber-reinforced composite material. Due to the hydrophobicity of the aromatic ring, the aromatic compound (B) has a lower interaction with carbon fibers than that of the aliphatic epoxy compound (A). As a result of the interaction with carbon fibers, the carbon fiber side contains the aliphatic epoxy compound (A) in a larger amount, and the outer layer of the sizing layer contains the aromatic compound (B) in a larger amount. This is preferred because the aromatic compound (B) prevents the aliphatic epoxy compound (A) from reacting with a matrix resin, and this can suppress a change during long-term storage of a prepreg prepared by using carbon fibers coated with the sizing agent of the present invention. By selecting an aromatic compound (B) having two or more aromatic rings, stability during long-term storage of a prepreg to be prepared can be further improved. Although the upper limit of the number of aromatic rings is not particularly limited, an aromatic compound having ten aromatic rings is sufficient for mechanical characteristics and suppression of the reaction with a matrix resin.

In the prepreg of First Embodiment, the aromatic compound (B) may have one or more types of functional groups in the molecule. A single type of aromatic compound (B) may be used, or a plurality of compounds may be used in combination. The aromatic compound (B) at least contains an aromatic epoxy compound (B1) having one or more epoxy groups and one or more aromatic rings in the molecule. The functional group except the epoxy group is preferably selected from a hydroxy group, an amido group, an imido group, a urethane group, a urea group, a sulfonyl group, a carboxy group, an ester group, and a sulfo group, and two or more types of functional groups may be contained in one molecule. The aromatic compound (B) preferably contains, in addition to the aromatic epoxy compound (B1), an aromatic ester compound and an aromatic urethane compound because such a compound is stable and improves high-order processability.

In the prepreg of First Embodiment, the aromatic epoxy compound (B1) preferably has two or more epoxy groups and more preferably three or more epoxy groups. The aromatic epoxy compound (B1) preferably has ten or less epoxy groups.

In the present invention, the aromatic epoxy compound (B1) is preferably an epoxy compound having two or more types of functional groups, where the number of the functional groups is three or more. The aromatic epoxy compound (B1) is more preferably an epoxy compound having two or more types of functional groups, where the number of the functional groups is four or more. The functional group of the aromatic epoxy compound (B1) is preferably, in addition to the epoxy group, a functional group selected from a hydroxy group, an amido group, an imido group, a urethane group, a urea group, a sulfonyl group, and a sulfo group. In the aromatic epoxy compound (B1) that is an epoxy compound having three or more epoxy groups or having an epoxy group and two or more other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the prepreg of First Embodiment, the aromatic epoxy compound (B1) preferably has an epoxy equivalent of less than 360 g/eq., more preferably less than 270 g/eq., and even more preferably less than 180 g/eq. An aromatic epoxy compound (B1) having an epoxy equivalent of less than 360 g/eq. forms a covalent bond at high density and further improves the adhesion between carbon fibers and a matrix resin. Although the lower limit of the epoxy equivalent is not particularly limited, an aromatic epoxy compound having an epoxy equivalent of 90 g/eq. or more is sufficient for the adhesion.

In the prepreg of First Embodiment, specific examples of the aromatic epoxy compound (B1) include glycidyl ether epoxy compounds derived from aromatic polyols, glycidylamine epoxy compounds derived from aromatic amines having a plurality of active hydrogens, glycidyl ester epoxy compounds derived from aromatic polycarboxylic acids, and epoxy compounds obtained by oxidation of aromatic compounds having a plurality of double bonds in the molecule.

The glycidyl ether epoxy compound is exemplified by a glycidyl ether epoxy compound obtained by reaction of epichlorohydrin with a compound selected from bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. The glycidyl ether epoxy compound is also exemplified by a glycidyl ether epoxy compound having a biphenylaralkyl skeleton.

Examples of the glycidylamine epoxy compound include N,N-diglycidylaniline, N,N-diglycidyl-o-toluidine, and glycidylamine epoxy compounds obtained by reaction of epichlorohydrin with a compound selected from m-xylylenediamine, m-phenylenediamine, 4,4'-diaminodiphenylmethane, and 9,9-bis(4-aminophenyl)fluorene.

The glycidylamine epoxy compound is also exemplified by an epoxy compound obtained by reaction of epichlorohydrin with both a hydroxy group and an amino group of an aminophenol such as m-aminophenol, p-aminophenol, and 4-amino-3-methylphenol.

Examples of the glycidyl ester epoxy compound include glycidyl ester epoxy compounds obtained by reaction of epichlorohydrin with phthalic acid, terephthalic acid, and hexahydrophthalic acid.

Examples of the aromatic epoxy compound (B1) used in the prepreg of First Embodiment include, in addition to these epoxy compounds, epoxy compounds synthesized from the epoxy compound exemplified above as a raw material, and the epoxy compound is exemplified by an epoxy compound synthesized by an oxazolidone ring formation reaction of bisphenol A diglycidyl ether and tolylene diisocyanate.

In the prepreg of First Embodiment, the aromatic epoxy compound (B1) preferably has, in addition to one or more epoxy groups, at least one or more functional groups selected from a hydroxy group, an amido group, an imido group, a urethane group, a urea group, a sulfonyl group, a carboxy group, an ester group, and a sulfo group. Examples of the compound include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aromatic epoxy compound (B1) having an amido group in addition to an epoxy group include glycidylbenzamide and amide-modified epoxy compounds. The amide-modified epoxy can be obtained by reaction of a carboxy group of a dicarboxylic amide containing an aromatic ring with an epoxy group of an epoxy compound having two or more epoxy groups.

Examples of the aromatic epoxy compound (B1) having an imido group in addition to an epoxy group include glycidylphthalimide. Specific examples of the compound include Denacol (registered trademark) EX-731 (manufactured by Nagase ChemteX Corporation).

The aromatic epoxy compound (B1) having a urethane group in addition to an epoxy group can be prepared by reacting the terminal hydroxy group of a polyethylene oxide monoalkyl ether with a polyvalent isocyanate having an aromatic ring in an amount equivalent to that of the hydroxy group and then reacting the isocyanate residue of the obtained reaction product with a hydroxy group of a polyvalent epoxy compound. Examples of the polyvalent isocyanate used here include 2,4-tolylene diisocyanate, m-phenylene diisocyanate, p-phenylene diisocyanate, diphenylmethane diisocyanate, triphenylmethane triisocyanate, and biphenyl-2,4,4'-triisocyanate.

Examples of the aromatic epoxy compound (B1) having a urea group in addition to an epoxy group include urea-modified epoxy compounds. The urea-modified epoxy can be prepared by reacting a carboxy group of a dicarboxylic acid urea with an epoxy group of an aromatic ring-containing epoxy compound having two or more epoxy groups.

Examples of the aromatic epoxy compound (B1) having a sulfonyl group in addition to an epoxy group include bisphenol S epoxy.

Examples of the aromatic epoxy compound (B1) having a sulfo group in addition to an epoxy group include glycidyl p-toluenesulfonate and glycidyl 3-nitrobenzenesulfonate.

In the prepreg of First Embodiment, the aromatic epoxy compound (B1) is preferably any of a phenol novolac epoxy compound, a cresol novolac epoxy compound, and tetraglycidyldiaminodiphenylmethane. These epoxy compounds have a large number of epoxy groups, a small epoxy equivalent, and two or more aromatic rings, thus improve the adhesion between carbon fibers and a matrix resin, and also improve the mechanical characteristics such as 0° tensile strength of a carbon fiber-reinforced composite material. The aromatic epoxy compound (B1) is more preferably a phenol novolac epoxy compound and a cresol novolac epoxy compound.

In the prepreg of First Embodiment, the aromatic epoxy compound (B1) is preferably a phenol novolac epoxy compound, a cresol novolac epoxy compound, tetraglycidyldiaminodiphenylmethane, a bisphenol A epoxy compound, or a bisphenol F epoxy compound from the viewpoint of the stability of a prepreg during long-term storage and adhesion between carbon fibers and a matrix resin, and is more preferably a bisphenol A epoxy compound or a bisphenol F epoxy compound.

The sizing agent used in the prepreg of First Embodiment may further include one or more components in addition to the aliphatic epoxy compound (A) and the aromatic epoxy compound (B1) as the aromatic compound (B). If including an adhesion promoting component that improves the adhesion between carbon fibers and the sizing agent or including a material that imparts bindability or flexibility to sizing agent-coated carbon fibers, the sizing agent can increase handleability, abrasion resistance, and fuzz resistance and can improve impregnation properties of a matrix resin. In the present invention, in order to improve the stability of a prepreg during long-term storage, the sizing agent may contain additional compounds except the compounds (A) and (B1). The sizing agent may contain auxiliary components such as a dispersant and a surfactant in order to stabilize the sizing agent during long-term storage.

The sizing agent used in the prepreg of First Embodiment may include, in addition to the aliphatic epoxy compound (A) and the aromatic epoxy compound (B1), an ester compound (C) having no epoxy group in the molecule. In First Embodiment, the sizing agent can contain the ester compound (C) in an amount of 2 to 35% by mass relative to the total amount of the sizing agent except solvents. The amount is more preferably 15 to 30% by mass. If including the ester compound (C), the sizing agent can improve the bindability and the handling properties and can suppress the deterioration of mechanical characteristics of a prepreg during long-term storage due to a reaction of a matrix resin with the sizing agent.

The ester compound (C) may be an aliphatic ester compound having no aromatic ring or may be an aromatic ester compound having one or more aromatic rings in the molecule. When an aromatic ester compound (C1) is used as the ester compound (C), the aromatic ester compound (C1) is included in both the ester compound (C) having no epoxy compound in the molecule and the aromatic compound (B) in the present invention. In such a case, the aromatic compound (B) is not composed of the aromatic ester compound (C1) alone, but the aromatic compound (B) includes the aromatic epoxy compound (B1) and the aromatic ester compound (C1). When the aromatic ester compound (C1) is used as the ester compound (C), the sizing agent-coated carbon fibers obtain higher handling properties, and the aromatic ester compound (C1), which has a small interaction with carbon fibers, is present in the outer layer of a matrix resin, and this improves the suppressive effect of deterioration of mechanical characteristics of a prepreg during long-term storage. The aromatic ester compound (C1) may have, in addition to the ester group, any functional groups except the epoxy group, such as a hydroxy group, an amido group, an imido group, a urethane group, a urea group, a sulfonyl group, a carboxy group, and a sulfo group. Specifically, the aromatic ester compound (C1) preferably used is an ester compound that is a condensate of an unsaturated dibasic acid and an alkylene oxide adduct of a bisphenol. The unsaturated dibasic acid includes lower alkyl esters of acid anhydrides, and fumaric acid, maleic acid, citraconic acid, and itaconic acid are preferably used, for example. Preferably used alkylene oxide adducts of bisphenols are an ethylene oxide adduct of bisphenol, a propylene oxide adduct of bisphenol, and a butylene oxide adduct of bisphenol, for example. Among the condensates, condensates of fumaric acid or maleic acid with an ethylene oxide adduct or/and a propylene oxide adduct of bisphenol A are preferably used.

The addition method of an alkylene oxide to a bisphenol is not limited, and a known method can be employed. The unsaturated dibasic acid may partly contain a saturated dibasic acid or a small amount of a monobasic acid, optionally, as long as adhesiveness and other characteristics are not impaired. The alkylene oxide adduct of a bisphenol may contain, for example, a common glycol, a common polyether glycol, a small amount of a polyhydric alcohol, and a small amount of a monovalent alcohol as long as adhesiveness and other characteristics are not impaired. The alkylene oxide adduct of a bisphenol with the unsaturated dibasic acid may be condensed by a known method.

In the prepreg of First Embodiment, in order to increase the adhesion between carbon fibers and an epoxy compound in the sizing agent, the sizing agent of the present invention can contain at least one compound selected from tertiary amine compounds and/or tertiary amine salts, quaternary ammonium salts having a cation site, and quaternary phosphonium salts and/or phosphine compounds as a component accelerating the adhesion. The sizing agent of the present invention preferably contains the compound in an amount of 0.1 to 25% by mass relative to the total amount of the sizing agent except solvents. The amount is more preferably 2 to 8% by mass.

When the sizing agent containing the aliphatic epoxy compound (A) and the aromatic epoxy compound (B1) and further containing at least one compound selected from tertiary amine compounds and/or tertiary amine salts, quaternary ammonium salts having a cation site, and quaternary phosphonium salts and/or phosphine compounds as the adhesion promoting component is applied to carbon fibers and subjected to heat treatment under particular conditions, the adhesion to carbon fibers is further improved. Although not certain, the mechanism is supposed as follows: First, the compound reacts with an oxygen-containing functional group such as a carboxy group and a hydroxy group of carbon fibers used in the present invention and abstracts a hydrogen ion contained in the functional group to form an anion; and then the anionic functional group undergoes a nucleophilic reaction with an epoxy group contained in the aliphatic epoxy compound (A) or the aromatic epoxy compound (B1). This is supposed to generate a strong binding between the carbon fibers used in the present invention and the epoxy group in the sizing agent, thus improving the adhesion.

Specific examples of the adhesion promoting component preferably include N-benzylimidazole, 1,8-diazabicyclo[5,4,0]-7-undecene (DBU) and salts thereof, and 1,5-diazabicyclo[4,3,0]-5-nonene (DBN) and salts thereof. In particular, 1,8-diazabicyclo[5,4,0]-7-undecene (DBU) and salts thereof and 1,5-diazabicyclo[4,3,0]-5-nonene (DBN) and salts thereof are preferred.

Specific examples of the DBU salt include a phenolate of DBU (U-CAT SA1, manufactured by San-Apro Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

In the prepreg of First Embodiment, the adhesion promoting component to be added to the sizing agent is preferably tributylamine, N,N-dimethylbenzylamine, diisopropylethylamine, triisopropylamine, dibutylethanolamine, diethylethanolamine, triisopropanolamine, triethanolamine, and N,N-diisopropylethylamine and particularly preferably triisopropylamine, dibutylethanolamine, diethylethanolamine, triisopropanolamine, and diisopropylethylamine.

In addition to the compounds above, examples of the additive such as a surfactant include nonionic surfactants including polyalkylene oxides such as polyethylene oxide and polypropylene oxide; adducts of higher alcohols, polyhydric alcohols, alkylphenols, styrenated phenols, and other adduct compounds with polyalkylene oxides such as polyethylene oxide and polypropylene oxide; and block copolymers of ethylene oxide and propylene oxide. A polyester resin, an unsaturated polyester compound, and other additives may be appropriately added to an extent not impairing the effect of the present invention.

Next, the carbon fibers used in the present invention will be described. Examples of the carbon fibers used in the present invention include polyacrylonitrile (PAN) carbon fibers, rayon carbon fibers, and pitch carbon fibers. Among them, the PAN carbon fibers are preferably used due to excellent balance between strength and elastic modulus.

The carbon fibers of the present invention give carbon fiber bundles that preferably have a strand strength of 3.5 GPa or more, more preferably 4 GPa or more, and even more preferably 5 GPa or more. The obtained carbon fiber bundles preferably have a strand elastic modulus of 220 GPa or more, more preferably 240 GPa or more, and even more preferably 280 GPa or more.

In the In the prepreg of First Embodiment, the strand tensile strength and the elastic modulus of carbon fiber bundles can be determined by the test method of resin-impregnated strand described in JIS-R-7608 (2004) in accordance with the procedure below. The resin formulation is "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions are at normal pressure at 130° C. for 30 minutes. Ten strands of carbon fiber bundles are tested, and mean values are calculated as the strand tensile strength and the strand elastic modulus.

The carbon fibers used in the prepreg of First Embodiment preferably have a surface roughness (Ra) of 6.0 to 100 nm. The surface roughness (Ra) is more preferably 15 to 80 nm and even more preferably 30 to 60 nm. Carbon fibers having a surface roughness (Ra) of 6.0 to 60 nm have a surface with a highly active edge part, which increases the reactivity with an epoxy group and other functional groups of the sizing agent described above. This can improve the interfacial adhesion, and such carbon fibers are thus preferred. Carbon fibers having a surface roughness (Ra) of 6.0 to 100 nm have an uneven surface, which can improve the interfacial adhesion due to an anchor effect of the sizing agent. Such carbon fibers are thus preferred.

In order to control the surface roughness (Ra) of the carbon fiber in the range described above, wet spinning is preferably employed as the spinning method described below. The surface roughness (Ra) of the carbon fiber can also be controlled by combining the type of congealed liquid (for example, an aqueous solution of an organic solvent such as dimethyl sulfoxide, dimethylformamide, and dimethylacetamide and an aqueous solution of an inorganic compound such as zinc chloride, and sodium thiocyanate), the concentration and the temperature of the congealed liquid, the drawing speed and the draw ratio of solidified fibers in the spinning process, and the drawing ratios in each of a flame resistant process, a pre-carbonization process, and a carbonization process. The surface roughness (Ra) of the carbon fiber can also be controlled to the predetermined surface roughness (Ra) of the carbon fiber by combining with electrolytic treatment.

The surface roughness (Ra) of the carbon fibers can be determined by using an atomic force microscope (AFM). For example, carbon fibers are cut into pieces having a length of several millimeters; then the fiber pieces are fixed onto a substrate (silicon wafer) with a silver paste; and a three-dimensional surface shape image of the central part of each single fiber is observed under an atomic force microscope (AFM). Usable examples of the atomic force microscope include NanoScope IIIa with Dimension 3000 stage system manufactured by Digital Instruments, and the observation can be performed in the following observation conditions:

Scan mode: tapping mode
Probe: silicon cantilever
Scan field: 0.6 µm×0.6 µm
Scan speed: 0.3 Hz
Number of pixels: 512×512
Measurement environment: at room temperature in the atmosphere For each sample, in the image obtained by the observation of a single area on an individual single fiber, the curve of the fiber cross section is approximated with a three-dimensional curved surface. From the obtained whole image, the average roughness (Ra) is calculated. It is preferable that the average roughness (Ra) of five single fibers be determined, and the average is evaluated.

In the present invention, the carbon fibers preferably have a total fineness of 400 to 3,000 tex. The carbon fibers preferably have a filament number of 1,000 to 100,000 and more preferably 3,000 to 50,000.

In the present invention, the carbon fibers preferably have a single fiber diameter of 4.5 to 7.5 µm. If having a single fiber diameter of 7.5 µm or less, the carbon fibers can have high strength and high elastic modulus and thus are preferred. The single fiber diameter is more preferably 6 µm or less and even more preferably 5.5 µm or less. If having a single fiber diameter of 4.5 µm or more, the carbon fibers are unlikely to cause single fiber breakage and to reduce the productivity and thus are preferred.

In the prepreg of First Embodiment, the carbon fibers preferably have a surface oxygen concentration (O/C) ranging from 0.05 to 0.50, more preferably ranging from 0.06 to 0.30, and even more preferably ranging from 0.07 to 0.25, where the surface oxygen concentration (O/C) is the ratio of the number of oxygen (O) atoms and that of carbon (C) atoms on the surface of the fibers and is determined by X-ray photoelectron spectroscopy. If having a surface oxygen concentration (O/C) of 0.05 or more, the carbon fibers maintain an oxygen-containing functional group on the surface of the carbon fibers and thus can achieve a strong adhesion to a matrix resin. If having a surface oxygen concentration (O/C) of 0.50 or less, the carbon fibers can suppress the reduction in strength of the carbon fiber itself by oxidation.

The oxygen concentration of the surface of carbon fibers is determined by X-ray photoelectron spectroscopy in accordance with the procedure below. First, a solvent is used to remove dust and the like adhering to the surface of carbon fibers; then the carbon fibers are cut into 20-mm pieces; and the pieces are spread and arranged on a copper sample holder. The measurement is carried out by using $AlK\alpha_{1,2}$ as the X-ray source while the inside of a sample chamber is maintained at $1\times10^{-8}$ Torr. The photoelectron takeoff angle is adjusted to 90°. As the correction value for the peak associated with electrification during measurement, the binding energy value of the main peak (peak top) of $C_{1s}$ is set to 284.6 eV. The $C_{1s}$ peak area is determined by drawing a straight base line in a range from 282 to 296 eV. The $O_{1s}$ peak area is determined by drawing a straight base line in a range from 528 to 540 eV. The surface oxygen concentration (O/C) is expressed as an atom number ratio calculated by dividing the ratio of the $O_{1s}$ peak area by a sensitivity correction value inherent in an apparatus. For ESCA-1600 manufactured by Ulvac-Phi, Inc. used as the X-ray photoelectron spectrometer, the sensitivity correction value inherent in the apparatus is 2.33.

The carbon fibers used in the prepreg of First Embodiment preferably have a surface carboxy group concentration (COOH/C) ranging from 0.003 to 0.015, where the surface carboxy group concentration (COOH/C) is expressed by the ratio of the numbers of atoms of the carboxy group (COOH) and the carbon (C) on the surface of carbon fibers determined by chemical modification X-ray photoelectron spectroscopy. The carboxy group concentration (COOH/C) on the surface of carbon fibers is more preferably in a range from 0.004 to 0.010. The carbon fibers used in the present invention preferably have a surface hydroxy group concentration (COH/C) ranging from 0.001 to 0.050, where the surface hydroxy group concentration (COH/C) is expressed by the ratio of the numbers of atoms of the hydroxy group (OH) and the carbon (C) on the surface of carbon fibers determined by chemical modification X-ray photoelectron spectroscopy. The surface hydroxy group concentration (COH/C) on the surface of carbon fibers is more preferably in a range from 0.010 to 0.040.

The carboxy group concentration (COOH/C) and the hydroxy group concentration (COH/C) of the surface of carbon fibers are determined by X-ray photoelectron spectroscopy in accordance with the procedure below.

The surface hydroxy group concentration (COH/C) is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are exposed to a dry nitrogen gas containing 0.04 mol/L of trifluoroacetic anhydride gas at room temperature for 10 minutes, undergoing chemical modification treatment. Then, the treated pieces are mounted on an X-ray photoelectron spectrometer at a photoelectron takeoff angle of 35°. AlK$\alpha_{1,2}$ is used as the X-ray source, and the inside of the sample chamber is maintained at a degree of vacuum of 1×10$^{-8}$ Torr. As the correction for the peak associated with electrification during measurement, the binding energy value of the main peak of $C_{1s}$ is set to 284.6 eV, first. The $C_{1s}$ peak area [$C_{1s}$] is determined by drawing a straight base line in a range from 282 to 296 eV, and the $F_{1s}$ peak area [$F_{1s}$] is determined by drawing a straight base line in a range from 682 to 695 eV. The reaction rate r can be determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C=\{[F_{1s}]/(3k[C_{1s}]-2[F_{1s}])r\}\times 100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The surface carboxy group concentration (COOH/C) is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are is exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces are mounted on an X-ray photoelectron spectrometer at a photoelectron takeoff angle of 35°. AlK$\alpha_{1,2}$ is used as the X-ray source, and the inside of the sample chamber is maintained at a degree of vacuum of 1×10$^{-8}$ Torr. As the correction for the peak associated with electrification during measurement, the binding energy value of the main peak of $C_{1s}$ is set to 284.6 eV, first. The $C_{1s}$ peak area [$C_{1s}$] is determined by drawing a straight base line in a range from 282 to 296 eV, and the $F_{1s}$ peak area [$F_{1s}$] is determined by drawing a straight base line in a range from 682 to 695 eV. The reaction rate r can be determined from $C_{1s}$ peak splitting of polyacrylic acid simultaneously subjected to chemical modification treatment, and the residual rate m of a dicyclohexylcarbodiimide derivative can be determined from $O_{1s}$ peak splitting.

The surface carboxy group concentration COOH/C is expressed by the value calculated in accordance with the equation below.

$$COOH/C=\{[F_{1s}]/(3k[C_{1s}]-(2+13m)[F_{1s}])r\}\times 100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The carbon fibers used in the prepreg of First Embodiment preferably have a polar component of surface free energy of 8 mJ/m$^2$ or more and 50 mJ/m$^2$ or less. Carbon fibers having a polar component of surface free energy of 8 mJ/m$^2$ or more are preferred because the aliphatic epoxy compound (A) comes closer to the surface of carbon fibers to improve the adhesion, and a sizing layer has an uneven structure. Carbon fibers having a polar component of surface free energy of 50 mJ/m$^2$ or less are preferred because the bindability among carbon fibers increases to improve impregnation properties with a matrix resin, and this expands the application of a carbon fiber-reinforced composite material to be produced.

The surface of carbon fibers more preferably has a polar component of surface free energy of 15 mJ/m$^2$ or more and 45 mJ/m$^2$ or less and most preferably 25 mJ/m$^2$ or more and 40 mJ/m$^2$ or less. The polar component of surface free energy of carbon fibers is the polar component of surface free energy calculated by using the Owens equation for approximation on the basis of the contact angle of carbon fibers with a corresponding liquid of water, ethylene glycol, and tricresyl phosphate determined by the Wilhelmy method.

The aliphatic epoxy compound (A) used in the prepreg of First Embodiment only needs to have a polar component of surface free energy of 9 mJ/m$^2$ or more and 50 mJ/m$^2$ or less. The aromatic epoxy compound (B1) only needs to have a polar component of surface free energy of 0 mJ/m$^2$ or more and less than 9 mJ/m$^2$.

The polar components of surface free energy of the aliphatic epoxy compound (A) and the aromatic epoxy compound (B1) are determined as follows: carbon fiber bundles are immersed in a solution containing the aliphatic epoxy compound (A) or the aromatic epoxy compound (B1) alone and pulled up; the carbon fiber bundles are dried at 120 to 150° C. for 10 minutes; and each polar component of surface free energy is calculated by using the Owens equation for approximation on the basis of each contact angle of the carbon fiber bundles with a corresponding liquid of water, ethylene glycol, and tricresyl phosphate determined by the Wilhelmy method as described above.

In the present invention, the polar component of surface free energy of carbon fibers, $E_{CF}$, the polar component of surface free energy of an aliphatic epoxy compound (A), $E_A$, and the polar component of surface free energy of an aromatic epoxy compound (B1), $E_{B1}$, are preferably satisfy the relation, $E_{CF} \geq E_A > E_{B1}$.

A method for producing the PAN carbon fibers will next be described.

Usable examples of the spinning method for preparing precursor fibers of carbon fibers include dry spinning, wet spinning, and dry-wet spinning. To readily produce high-strength carbon fibers, the wet spinning or the dry-wet spinning is preferably employed.

In order to further improve the adhesion between carbon fibers and a matrix resin, the carbon fibers preferably have a surface roughness (Ra) of 6.0 to 100 nm, and in order to prepare carbon fibers having such a surface roughness, the wet spinning is preferably employed to spin precursor fibers.

A spinning solution to be used may be a solution in which a homopolymer or copolymer of polyacrylonitrile is dissolved in a solvent. The solvent used is an organic solvent such as dimethyl sulfoxide, dimethylformamide, and dimethylacetamide or an aqueous solution of an inorganic compound such as nitric acid, sodium rhodanate, zinc chloride, and sodium thiocyanate. Preferred solvents are dimethyl sulfoxide and dimethylacetamide.

The spinning solution is passed through a spinneret for spinning, discharged into a spinning bath or air, and then solidified in the spinning bath. The spinning bath to be used may be an aqueous solution of the same solvent as the solvent used for the spinning solution. The spinning liquid preferably contains the same solvent as the solvent for the spinning solution, and an aqueous dimethyl sulfoxide solution and an aqueous dimethylacetamide solution are preferred. The fibers solidified in the spinning bath are subjected to water-washing and drawing to yield precursor fibers. The obtained precursor fibers are subjected to flame resistant treatment and carbonization treatment and, if desired, further subjected to graphite treatment, yielding carbon fibers. The carbonization treatment and the graphite treatment are preferably carried out under conditions of a maximum heat treatment temperature of 1,100° C. or more and more preferably 1,400 to 3,000° C.

To improve the adhesion to a matrix resin, the obtained carbon fibers are typically subjected to oxidation treatment, which introduces an oxygen-containing functional group. The oxidation treatment method may be gas phase oxidation, liquid phase oxidation, and liquid phase electrolytic oxidation, and the liquid phase electrolytic oxidation is preferably employed from the viewpoint of high productivity and uniform treatment.

In the present invention, the electrolytic solution used for the liquid phase electrolytic oxidation is exemplified by an acid electrolytic solution and an alkaline electrolytic solution. From the viewpoint of adhesion between carbon fibers and a matrix resin, carbon fibers are more preferably subjected to the liquid phase electrolytic oxidation in an alkaline electrolytic solution and then coated with a sizing agent.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid, which exhibit strong acidity, are preferably used.

Examples of the alkaline electrolytic solution specifically include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used electrolytic solutions are aqueous solutions of ammonium carbonate and ammonium hydrogen carbonate because such a solution is free from an alkali metal that interferes with the hardening of a matrix resin, or an aqueous solution of tetraalkylammonium hydroxide exhibiting strong alkalinity is preferably used.

The electrolytic solution used in the present invention preferably has a concentration ranging from 0.01 to 5 mol/L and more preferably ranging from 0.1 to 1 mol/L. If the electrolytic solution has a concentration of 0.01 mol/L or more, the electrolytic treatment can be performed at a lower electrical voltage, which is advantageous in operating cost. An electrolytic solution having a concentration of 5 mol/L or less is advantageous in terms of safety.

The electrolytic solution used in the prepreg of First Embodiment preferably has a temperature ranging from 10 to 100° C. and more preferably ranging from 10 to 40° C. An electrolytic solution having a temperature of 10° C. or more improves the efficiency of electrolytic treatment, and this is advantageous in operating cost. An electrolytic solution having a temperature of less than 100° C. is advantageous in terms of safety.

In the prepreg of First Embodiment, the quantity of electricity during liquid phase electrolytic oxidation is preferably optimized depending on the carbonization degree of carbon fibers, and the treatment of carbon fibers having a high elastic modulus necessitates a larger quantity of electricity.

In the prepreg of First Embodiment, the current density during liquid phase electrolytic oxidation is preferably in a range from 1.5 to 1,000 $A/m^2$ and more preferably from 3 to 500 $A/m^2$ relative to 1 $m^2$ of the surface area of carbon fibers in an electrolytic treatment solution. If the current density is 1.5 $A/m^2$ or more, the efficiency of electrolytic treatment is improved, and this is advantageous in operating cost. A current density of 1,000 $A/m^2$ or less is advantageous in terms of safety.

In the prepreg of First Embodiment, the carbon fibers after electrolytic treatment are preferably washed with water and dried. The washing method may be dipping or spraying, for example. Among them, from the viewpoint of easy washing, the dipping is preferably employed, and the dipping is preferably performed while carbon fibers are vibrated by ultrasonic waves. An excessively high drying temperature readily causes thermal decomposition of a functional group on the outermost surface of carbon fibers, thus decomposing the functional group. The drying is thus preferably performed at a temperature as low as possible. Specifically, the drying temperature is preferably 260° C. or less, more preferably 250° C. or less, and even more preferably 240° C. or less.

Next, sizing agent-coated carbon fibers prepared by coating the carbon fibers with a sizing agent will be described. The sizing agent of the present invention includes the aliphatic epoxy compound (A) and the aromatic compound (B) at least containing the aromatic epoxy compound (B1) and may contain additional components.

In the prepreg of First Embodiment, the method of coating carbon fibers with the sizing agent is preferably a method by single coating using a sizing solution in which the aliphatic epoxy compound (A), the aromatic compound (B) at least containing the aromatic epoxy compound (B1), and other components are simultaneously dissolved or dispersed in a solvent and a method by multiple coating of carbon fibers using sizing solutions in which any of the compounds (A), (B1), and (B) and other components are selected and dissolved or dispersed in corresponding solvents. The present invention more preferably employs one step application of single coating of carbon fibers with a sizing solutions containing all the components of the sizing agent in terms of effect and simple treatment.

In the prepreg of First Embodiment, the sizing agent can be used as a sizing solution prepared by diluting sizing agent components with a solvent. Examples of the solvent include water, methanol, ethanol, isopropanol, acetone, methyl ethyl ketone, dimethylformamide, and dimethylacetamide. Specifically, an aqueous dispersion emulsified with a surfactant or an aqueous solution is preferably used from the viewpoint of handleability and safety.

The sizing solution is prepared by emulsifying components at least containing the aromatic compound (B) with a surfactant to yield a water emulsion liquid and mixing a solution at least containing the aliphatic epoxy compound (A). For a water-soluble aliphatic epoxy compound (A), a method of previously dissolving the aliphatic epoxy compound (A) in water to give an aqueous solution and mixing a water emulsion liquid at least containing the aromatic compound (B) is preferably employed from the viewpoint of emulsion stability. Alternatively, a method of using a water dispersant in which the aliphatic epoxy compound (A), the aromatic compound (B), and other components are emulsified with a surfactant is preferably employed from the viewpoint of stability of the sizing agent during long-term storage.

The sizing solution typically contains the sizing agent at a concentration ranging from 0.2% by mass to 20% by mass.

Examples of the method of applying a sizing agent onto carbon fibers (the method of coating carbon fibers with a sizing agent) include a method of immersing carbon fibers in a sizing solution through a roller, a method of bringing carbon fibers into contact with a roller onto which a sizing solution adheres, and a method of spraying a sizing solution onto carbon fibers. The method of applying a sizing agent may be either a batch-wise manner or a continuous manner, and the continuous manner is preferably employed due to good productivity and small variation. During the application, in order to uniformly apply an active component in the sizing agent onto carbon fibers within an appropriate amount, the concentration and temperature of a sizing solution, the thread tension, and other conditions are preferably controlled. During the application of a sizing agent, carbon fibers are preferably vibrated by ultrasonic waves.

During the coating of carbon fibers with the sizing solution, the sizing solution preferably has a liquid temperature ranging from 10 to 50° C. in order to suppress a concentration change of the sizing agent due to the evaporation of a solvent. Furthermore, by adjusting a throttle for extracting an excess sizing solution after applying the sizing solution, the adhesion amount of the sizing agent can be controlled, and the sizing agent can be uniformly infiltrated into carbon fibers.

After coated with a sizing agent, the carbon fibers are preferably heated at a temperature ranging from 160 to 260° C. for 30 to 600 seconds. The heat treatment conditions are preferably at a temperature ranging from 170 to 250° C. for 30 to 500 seconds and more preferably at a temperature ranging from 180 to 240° C. for 30 to 300 seconds. Heat treatment under conditions at lower than 160° C. and/or for less than 30 seconds fails to accelerate the interaction between the aliphatic epoxy compound (A) in the sizing agent and an oxygen-containing functional group on the surface of carbon fibers, and this may result in insufficient adhesion between the carbon fibers and a matrix resin or may insufficiently dry carbon fibers and remove a solvent. Heat treatment under conditions at higher than 260° C. and/or for more than 600 seconds causes the sizing agent to decompose and volatilize and thus fails to accelerate the interaction with carbon fibers, and this may result in insufficient adhesion between the carbon fibers and a matrix resin.

The heat treatment can be performed by microwave irradiation and/or infrared irradiation. When sizing agent-coated carbon fibers are treated with heat by microwave irradiation and/or infrared irradiation, microwaves enter the carbon fibers and are absorbed by the carbon fibers, and this can heat the carbon fibers as an object to be heated to an intended temperature in a short period of time. The microwave irradiation and/or the infrared irradiation can rapidly heat the inside of the carbon fibers. This can reduce the difference in temperature between the inner side and the outer side of carbon fiber bundles, thus reducing the uneven adhesion of a sizing agent.

The sizing agent-coated carbon fibers of First Embodiment produced as above are characterized by having an (a)/(b) ratio of 0.50 to 0.90 where (a) is the height (cps) of a component at a binding energy (284.6 eV) assigned to CHx, C—C, and C═C and (b) is the height (cps) of a component at a binding energy (286.1 eV) assigned to C—O in a $C_{1s}$ core spectrum of the surface of the sizing agent of the sizing agent-coated carbon fibers analyzed by X-ray photoelectron spectroscopy using $AlK\alpha_{1,2}$ as the X-ray source at a photoelectron takeoff angle of 15°. In the prepreg of First Embodiment, it is found that, when the (a)/(b) ratio is within a particular range, that is, in a range from 0.50 to 0.90, the sizing agent-coated carbon fibers have excellent adhesion to a matrix resin and undergo a small deterioration of mechanical characteristics even when stored in a prepreg state for a long period of time.

In the prepreg of First Embodiment, the sizing agent-coated carbon fibers preferably have an (a)/(b) ratio of 0.55 or more and more preferably 0.57 or more where (a) is the height (cps) of a component at a binding energy (284.6 eV) assigned to CHx, C—C, and C═C and (b) is the height (cps) of a component at a binding energy (286.1 eV) assigned to C—O in a $C_{1s}$ core spectrum of the surface of the sizing agent analyzed by X-ray photoelectron spectroscopy at a photoelectron takeoff angle of 15°. The (a)/(b) ratio is preferably 0.80 or less and more preferably 0.74 or less. A larger (a)/(b) ratio indicates that the surface contains larger amounts of compounds derived from aromatics and smaller amounts of compounds derived from aliphatics.

The X-ray photoelectron spectroscopy is an analytical method by irradiating carbon fibers as a sample with X-rays in an ultrahigh vacuum and analyzing the kinetic energy of photoelectrons discharged from the surface of carbon fibers with what is called an energy analyzer. By analyzing the kinetic energy of photoelectrons discharged from the surface of carbon fibers as the sample, the energy value of X-rays incident on the carbon fibers as the sample is converted to uniquely determine a binding energy, and on the basis of the binding energy and a photoelectron intensity, the types, concentrations, and chemical states of elements present in the outermost layer (the order of nanometers) of the sample can be analyzed.

In the prepreg of First Embodiment, the peak ratio of (a) and (b) of the surface of the sizing agent on sizing agent-coated carbon fibers can be determined by X-ray photoelectron spectroscopy in accordance with the procedure below. Sizing agent-coated carbon fibers are cut into 20-mm pieces, and the pieces are spread and arranged on a copper sample holder. $AlK\alpha_{1,2}$ is used as the X-ray source, and the measurement is carried out while the inside of a sample chamber is maintained at $1\times10^{-8}$ Torr. As the correction for the peak associated with electrification during measurement, the binding energy value of the main peak of $C_{1s}$ is set to 286.1 eV, first. At this time, the $C_{1s}$ peak area is determined by drawing a straight base line in a range from 282 to 296 eV. The straight base line from 282 to 296 eV for calculating the $C_{1s}$ peak area is defined as the origin point (zero point) for photoelectron intensity, then the height (b) (cps: photoelectron intensity per unit time) of the peak at a binding energy of 286.1 eV assigned to a C—O component and the height (a) (cps) of the peak at a binding energy of 284.6 eV assigned to CHx, C—C, and C═C are determined, and the (a)/(b) ratio is calculated.

The sizing agent-coated carbon fibers used in First Embodiment preferably satisfy the relation (III) where (I) and (II) are determined from the (a)/(b) ratio, (a) is the height (cps) of a component at a binding energy (284.6 eV) assigned to CHx, C—C, and C═C, and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using an X-ray at 400 eV at a photoelectron takeoff angle of 55°.

$$0.50 \le (I) \le 0.90 \text{ and } 0.60 < (II)/(I) < 1.0 \qquad (III)$$

where (I) is the value of (a)/(b) of the surface of sizing agent-coated carbon fibers before ultrasonication; and (II) is the value of (a)/(b) of the surface of sizing agent-coated carbon fibers that have been washed to have a sizing agent adhesion amount of 0.09 to 0.20% by mass by ultrasonication of the sizing agent-coated carbon fibers in an acetone solvent.

The value (I) as the value of (a)/(b) of the surface of sizing agent-coated carbon fibers before ultrasonication falling within the range indicates that the surface of the sizing agent contains larger amounts of compounds derived from aromatics and smaller amounts of compounds derived from aliphatics. The value (I) as the value of (a)/(b) before ultrasonication is preferably 0.55 or more and more preferably 0.57 or more. The value (I) as the value of (a)/(b) before ultrasonication is preferably 0.80 or less and more preferably 0.74 or less.

The ratio (II)/(I) as the ratio of the values of (a)/(b) of the surface of sizing agent-coated carbon fibers before and after ultrasonication falling within the range indicates that larger amounts of compounds derived from aliphatics are present in the inner layer of the sizing agent than in the surface of the sizing agent. The ratio (II)/(I) is preferably 0.65 or more. The ratio (II)/(I) is preferably 0.85 or less.

If the values (I) and (II) satisfy the relation (III), the sizing agent-coated carbon fibers have excellent adhesion to a matrix resin and undergo a small deterioration of mechanical characteristics even when stored in a prepreg state for a long period of time. Such carbon fibers are thus preferred.

In the prepreg of First Embodiment, the sizing agent applied onto carbon fibers preferably has an epoxy equivalent of 350 to 550 g/eq. A sizing agent having an epoxy equivalent of 550 g/eq. or less improves the adhesion between carbon fibers coated with the sizing agent and a matrix resin. When the carbon fibers coated with a sizing agent having an epoxy equivalent of 350 g/eq. or more are used to prepare a prepreg, the reaction between a matrix resin component used in the prepreg and the sizing agent can be suppressed, and thus a carbon fiber-reinforced composite material to be produced has good mechanical characteristics even when the prepreg is stored in a long period of time. Such a sizing agent is thus preferred. The sizing agent applied preferably has an epoxy equivalent of 360 g/eq. or more and more preferably 380 g/eq. or more. The sizing agent applied preferably has an epoxy equivalent of 530 g/eq. or less and more preferably 500 g/eq. or less. In order to give a sizing agent applied having an epoxy equivalent within the range, a sizing agent having an epoxy equivalent of 180 to 470 g/eq. is preferably applied. If the epoxy equivalent is 313 g/eq. or less, the adhesion between carbon fibers coated with the sizing agent and a matrix resin is improved. If carbon fibers coated with a sizing agent having an epoxy equivalent of 222 g/eq. or more is used to prepare a prepreg, the reaction between a resin component used in the prepreg and the sizing agent can be suppressed, and thus a carbon fiber-reinforced composite material to be produced has good mechanical characteristics even when the prepreg is stored in a long period of time.

In the prepreg of First Embodiment, the epoxy equivalent of the sizing agent can be determined by dissolving a sizing agent from which a solvent is removed in a solvent typified by N,N-dimethylformamide, then cleaving the epoxy group with hydrochloric acid, and carrying out acid-base titration. The epoxy equivalent is preferably 220 g/eq. or more and more preferably 240 g/eq. or more. The epoxy equivalent is preferably 310 g/eq. or less and more preferably 280 g/eq. or less. The epoxy equivalent of the sizing agent applied to carbon fibers in the present invention can be determined by immersing sizing agent-coated carbon fibers in a solvent typified by N,N-dimethylformamide, carrying out ultrasonic cleaning to extract the sizing agent from the fibers, then cleaving the epoxy group with hydrochloric acid, and carrying out acid-base titration. The epoxy equivalent of the sizing agent applied to carbon fibers can be controlled by, for example, the epoxy equivalent of a sizing agent to be applied and heat history during drying or other steps after coating.

In the prepreg of First Embodiment, the adhesion amount of the sizing agent to carbon fibers is preferably in a range from 0.1 to 10.0 parts by mass and more preferably from 0.2 to 3.0 parts by mass relative to 100 parts by mass of the carbon fibers. If coated with the sizing agent in an amount of 0.1 parts by mass or more, the sizing agent-coated carbon fibers can withstand friction with metal guides or the like through which the carbon fibers pass during preparing a prepreg and weaving, and this prevents fluffs from generating, thus producing a carbon fiber sheet having excellent quality such as smoothness. If the adhesion amount of the sizing agent is 10.0 parts by mass or less, a matrix resin can infiltrate into carbon fibers without interference by a sizing agent coating around the sizing agent-coated carbon fibers. This prevents voids from generating in an intended carbon fiber-reinforced composite material, and thus the carbon fiber-reinforced composite material has excellent quality and excellent mechanical characteristics.

The adhesion amount of the sizing agent is a value (parts by mass) calculated by weighing about 2±0.5 g of sizing agent-coated carbon fibers, subjecting the carbon fibers to heat treatment at 450° C. for 15 minutes in a nitrogen atmosphere, determining the change in mass before and after the heat treatment, and dividing the change in mass by the mass before the heat treatment.

In the prepreg of First Embodiment, the sizing agent layer applied onto carbon fibers and dried preferably has a thickness ranging from 2.0 to 20 nm and a maximum thickness of less than twice a minimum thickness. A sizing agent layer having such a uniform thickness can stably achieve a large adhesion improvement effect and can stably achieve excellent high-order processability.

In the prepreg of First Embodiment, the adhesion amount of the aliphatic epoxy compound (A) is preferably in a range from 0.05 to 5.0 parts by mass, more preferably from 0.2 to 2.0 parts by mass, and even more preferably from 0.3 to 1.0 part by mass relative to 100 parts by mass of the carbon fiber. When the adhesion amount of the aliphatic epoxy compound (A) is 0.05 parts by mass or more, the adhesion between the sizing agent-coated carbon fibers and a matrix resin caused by the aliphatic epoxy compound (A) is improved at the carbon fiber surface, and thus such an amount is preferred.

In the process for producing the sizing agent-coated carbon fibers of the First Embodiment, carbon fibers having a polar component of surface free energy of 8 mJ/m² or more and 50 mJ/m² or less are preferably coated with the sizing agent. Carbon fibers having a polar component of surface free energy of 8 mJ/m² or more are preferred because the aliphatic epoxy compound (A) comes closer to the surface of carbon fibers to improve the adhesion, and the sizing layer has an uneven structure. Carbon fibers having a polar component of surface free energy of 50 mJ/m² or less are preferred because the bindability among carbon fibers increases to improve impregnation properties with a matrix resin, and this expands the application of a carbon fiber-reinforced composite material to be produced. The polar component of surface free energy of the surface of carbon fibers is more preferably 15 mJ/m² or more and 45 mJ/m² or less and most preferably 25 mJ/m² or more and 40 mJ/m² or less.

In First Embodiment, the sizing agent-coated carbon fibers are used in shapes, for example, tows, woven fabrics, knits, braids, webs, mats, and chopped strands. In particular, for an application necessitating high specific strength and specific modulus, a tow prepared by arranging carbon fibers in one direction is most preferred, and a prepreg prepared by further impregnation with a matrix resin is preferably used.

Next, a prepreg and a carbon fiber-reinforced composite material in First Embodiment will be described in detail.

In First Embodiment, the prepreg includes the sizing agent-coated carbon fibers described above and a thermosetting resin (D) as a matrix resin.

The thermosetting resin (D) used in First Embodiment is an epoxy resin composition at least containing the following components (D11), (D12), and (E). The epoxy resin (D11) has two or more ring structures that are four- or more-membered rings and has one or two amine glycidyl groups or ether glycidyl groups that are directly bonded to the ring structures. The epoxy resin (D12) is an epoxy resin having three or more functional groups and (E) is a latent hardener. The epoxy resin composition of First Embodiment includes the epoxy resin (D11) in an amount of 5 to 60% by mass and the epoxy resin (D12) in an amount of 40 to 80% by mass relative to 100% by mass of the total amount of the contained epoxy resin.

In First Embodiment, the epoxy resin (D11) contained in the epoxy resin composition and having two or more ring structures that are four- or more-membered rings means that the epoxy resin (D11) has two or more monocyclic structures of four-membered rings or larger rings such as cyclohexane, benzene, and pyridine or has at least one condensed ring structure in which each ring of the condensed ring is made of a four-membered ring or a larger ring such as phthalimide, naphthalene, and carbazole.

The amine glycidyl group or the ether glycidyl group directly bonded to the ring structures of the epoxy resin (D11) means that the epoxy resin (D11) has the structure in which a N atom in the case of the amine glycidyl group or an O atom in the case of the ether glycidyl group is bonded to the ring structure such as benzene or phthalimide. The glycidyl group has one or two epoxy group(s) in the case of the amine glycidyl group and one epoxy group in the case of the ether glycidyl group (hereinafter, an epoxy resin having one epoxy group may be called an epoxy resin (D111) and an epoxy resin having two epoxy groups may be called an epoxy resin (D112). In the present invention, the epoxy resin (D112) is used as the epoxy resin (D11) as described below.). If the epoxy resin (D11) is contained in a small amount in the matrix resin, the improvement effect of the mechanical characteristics of the carbon fiber-reinforced composite material is hardly exerted. If epoxy resin (D11) is contained in excessively large amount, heat resistance is significantly impaired. As a result, it is required that the epoxy resin (D11) is contained in an amount of 5 to 60% by mass relative to the total mass of the contained epoxy resin. In the epoxy resin (D11), the epoxy resin (D111) having one epoxy group has the more excellent effect of mechanical characteristics development, whereas the epoxy resin (D112) having two epoxy groups has more excellent heat resistance. Therefore, when the epoxy resin (D111) is used, the epoxy resin (D11) is preferably contained in an amount of 10 to 40% by mass and more preferably 15 to 30% by mass relative to the total mass of the contained epoxy resin. When the epoxy resin (D112) is used, the epoxy resin (D11) is preferably contained in an amount of 25 to 60% by mass and more preferably 30 to 50% by mass relative to the total mass of the contained epoxy resin.

Examples of the epoxy resin (D111) include glycidylphthalimide, glycidyl-1,8-naphthalimide, glycidylcarbazole, glycidyl-3,6-dibromocarbazole, glycidylindole, glycidyl-4-acetoxyindole, glycidyl-3-methylindole, glycidyl-3-acetylindole, glycidyl-5-methoxy-2-methylindole, o-phenylphenyl glycidyl ether, p-phenylphenyl glycidyl ether, p-(3-methylphenyl)phenyl glycidyl ether, 2,6-dibenzylphenyl glycidyl ether, 2-benzylphenyl glycidyl ether, 2,6-diphenylphenyl glycidyl ether, 4-α-cumylphenyl glycidyl ether, o-phenoxyphenyl glycidyl ether, and p-phenoxyphenyl glycidyl ether.

The epoxy resin (D112) having two epoxy groups has a structure of General Formula (3):

[Chemical Formula 6]

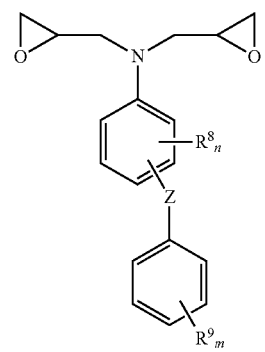

(3)

(in Formula (3), each $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4 and m is an integer of 0 to 5; when a plurality of $R^8$s or $R^9$s exist, they may be the same or different; and Z represents one group selected from —O—, —S—, —CO—, —C(=O)O—, —SO$_2$—, and —C(=O)NH—). The epoxy resin composition preferably includes the epoxy resin (D112) in an amount of 25 to 50% by mass relative to 100% by mass of the total amount of the contained epoxy resin.

Examples of the epoxy resin (D112) used in First Embodiment include N,N-diglycidyl-4-phenoxyaniline, N,N-diglycidyl-4-(4-methylphenoxy)aniline, N,N-diglycidyl-4-(4- tert-butylphenoxy)aniline, and N,N-diglycidyl-4-(4-phenoxyphenoxy) aniline. These resins can be typically obtained by addition of epichlorohydrin to a phenoxyaniline derivative and cyclization of the epichlorohydrin adduct with an alkali compound. The resin having a higher molecular weight has a higher viscosity, and thus N,N-diglycidyl-4-phenoxyaniline in which both $R^8$ and $R^9$ in the epoxy resin (D112) are hydrogens is particularly preferably used from the viewpoint of handling properties.

Specific examples of the phenoxyaniline derivative include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy) aniline, 4-(3-cyclohexylphenoxy)aniline, 4-(2-cyclohexylphenoxy) aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphtyloxyphenoxy)aniline, 4-(1-naphtyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy) aniline.

Next, a method for producing the epoxy resin (D112) used in First Embodiment will be exemplified and described.

The epoxy resin (D112) used in First Embodiment can be produced by a reaction of a phenoxyaniline derivative represented by General Formula (5):

[Chemical Formula 7]

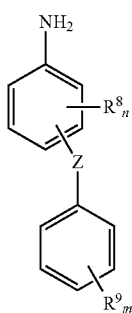

(5)

(in Formula (5), each $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4 and m is an integer of 0 to 5; when a plurality of $R^8$s or $R^9$s, they may be the same or different; and Z represents one group selected from —O—, —S—, —CO—, —C(=O)O—, —SO$_2$—, and —C(=O)NH—) with epichlorohydrin.

More specifically, as the same as general methods for producing epoxy resins, the process for producing the epoxy resin (D112) includes an addition step of adding two molecules of epichlorohydrin to one molecule of the phenoxyaniline derivative to form a dichlorohydrin compound represented by General Formula (6):

[Chemical Formula 8]

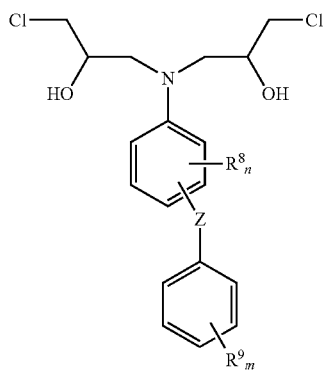

(6)

(in Formula (6), each of $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4; m is an integer of 0 to 5; when a plurality of $R^8$s or $R^9$s exist, they may be the same or different; and Z represents one group selected from —O—, —S—, —CO—, —C(=O)O—, —SO$_2$—, and —C(=O)NH—); and a subsequent cyclization step of eliminating hydrogen chloride from the dichlorohydrin compound by an alkali compound to form an epoxy compound having two epoxy groups represented by General Formula (3):

[Chemical Formula 9]

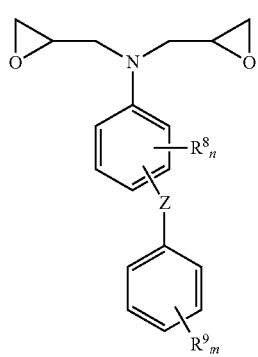

(3)

(in Formula (3), each $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4 and m is an integer of 0 to 5; when a plurality of $R^8$s or $R^9$s, they may be the same or different; and Z represents one group selected from —O—, —S—, —CO—, —C(=O)O—, —SO$_2$—, and —C(=O)NH—).

Examples of the commercially available epoxy resin (D111) include "Denacol (registered trademark)" Ex-731 (glycidylphthalimide, manufactured by Nagase ChemteX Corporation), OPP-G (o-phenylphenyl glycidyl ether, manufactured by SANKO CO., LTD.). Examples of the commercially available epoxy resin (D112) include PxGAN (diglycidyl-p-phenoxyaniline, manufactured by Toray Fine Chemicals Co., Ltd.).

The epoxy resin (D12) having three or more functional groups and used in First Embodiment is a compound that includes three or more epoxy groups in one molecule or a compound that includes three or more functional groups in total of at least one epoxy group and functional groups other than the epoxy group. The epoxy resin (D12) having three or more functional groups is preferably a compound having three or more epoxy groups in one molecule. Examples of the epoxy resin (D12) having three or more functional groups include a glycidylamine epoxy resin and a glycidyl ether epoxy resin.

In the epoxy resin (D12) having three or more functional groups, the number of the functional groups is preferably 3 to 7 and more preferably 3 to 4. Excessive number of the functional groups causes embrittlement of the matrix resin after hardening and thus the impact resistance of the matrix resin may be impaired.

The epoxy resin (D12) used in First Embodiment preferably has a structure of General Formula (4):

[Chemical Formula 10]

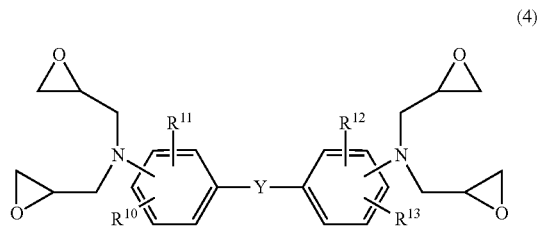

(4)

(in Formula (4), each of $R^{10}$ to $R^{13}$ is at least one selected from the group consisting of a hydrogen atom, $C_{1-4}$ aliphatic hydrocarbon groups, an alicyclic hydrocarbon group having a carbon number of 4 or less, and halogen atoms; and Y is one group selected from —$CH_2$—, —O—, —S—, —CO—, —C(=O)O—, —$SO_2$—, and —C(=O)NH—).

In Formula (4), $R^{10}$, $R^{11}$, $R^{12}$, and $R^{13}$ having excessively large structure result in the excessively high viscosity of the epoxy resin composition and thus handling properties are impaired or impair compatibility to other components in the epoxy resin composition and thus the mechanical characteristics improvement effect may fail to be obtained. As a result, $R^{10}$, $R^{11}$, $R^{12}$, and $R^{13}$ are preferably at least one selected from the group consisting of a hydrogen atom, $C_{1-4}$ aliphatic hydrocarbon groups, an alicyclic hydrocarbon group having a carbon number of 4 or less, and halogen atoms.

Examples of the epoxy resin (D12) include tetraglycidyl-3,4'-diaminodiphenyl ether, tetraglycidyl-3,3'-diaminodiphenyl ether, tetraglycidyl-3,4'-diamino-2,2'-dimethyldiphenyl ether, tetraglycidyl-3,4'-diamino-2,2'-dibromodiphenyl ether, tetraglycidyl-3,4'-diamino-5-methyldiphenyl ether, tetraglycidyl-3,4'-diamino-2'-methyldiphenyl ether, tetraglycidyl-3,4'-diamino-3'-methyldiphenyl ether, tetraglycidyl-3,4'-diamino-5,2'-dimethyldiphenyl ether, tetraglycidyl-3,4'-diamino-5,3'-dimethyldiphenyl ether, tetraglycidyl-3,3'-diamino-5-methyldiphenyl ether, tetraglycidyl-3,3'-diamino-5,5'-dimethyldiphenyl ether, tetraglycidyl-3,3'-diamino-5,5'-dibromodiphenyl ether, tetraglycidyl-4,4'-diaminodiphenyl ether, tetraglycidyl-4,4'-diamino-2,2'-dimethyldiphenyl ether, tetraglycidyl-4,4'-diamino-2,2'-dibromodiphenyl ether, tetraglycidyl-4,4'-diamino-5-methyldiphenyl ether, tetraglycidyl-4,4'-diamino-2'-methyldiphenyl ether, tetraglycidyl-4,4'-diamino-3'-methyldiphenyl ether, tetraglycidyl-4,4'-diamino-5,2'-dimethyldiphenyl ether, tetraglycidyl-4,4'-diamino-5,3'-dimethyldiphenyl ether, tetraglycidyl-4,4'-diamino-5,5'-dimethyldiphenyl ether, tetraglycidyl-4,4'-diamino-5,5'-dibromodiphenyl ether, tetraglycidyl-3,4'-diaminodiphenylmethane, tetraglycidyl-3,3'-diaminodiphenylmethane, tetraglycidyl-3,4'-diamino-2,2'-dimethyldiphenylmethane, tetraglycidyl-3,4'-diamino-2,2-dibromodiphenylmethane, tetraglycidyl-3,4'-diamino-5-methyldiphenylmethane, tetraglycidyl-3,4'-diamino-2'-methyldiphenylmethane, tetraglycidyl-3,4'-diamino-3'-methyldiphenylmethane, tetraglycidyl-3,4'-diamino-5,2'-dimethyldiphenylmethane, tetraglycidyl-3,4'-diamino-5,3'-dimethyldiphenylmethane, tetraglycidyl-3,3'-diamino-5-methyldiphenylmethane, tetraglycidyl-3,3'-diamino-5,5'-dimethyldiphenylmethane, tetraglycidyl-3,3'-diamino-5,5'-dibromodiphenylmethane, tetraglycidyl-4,4'-diaminodiphenylmethane, tetraglycidyl-4,4'-diamino-2,2'-dimethyldiphenylmethane, tetraglycidyl-4,4'-diamino-2,2'-dibromodiphenylmethane, tetraglycidyl-4,4'-diamino-5-methyldiphenylmethane, tetraglycidyl-4,4'-diamino-2'-methyldiphenylmethane, tetraglycidyl-4,4'-diamino-3'-methyldiphenylmethane, tetraglycidyl-4,4'-diamino-5,2'-dimethyldiphenylmethane, tetraglycidyl-4,4'-diamino-5,3'-dimethyldiphenylmethane, tetraglycidyl-4,4'-diamino-5,5'-dimethyldiphenylmethane, tetraglycidyl-4,4'-diamino-5,5'-dibromodiphenylmethane, tetraglycidyl-3,4'-diaminodiphenylsulfone, tetraglycidyl-3,3'-diaminodiphenylsulfone, tetraglycidyl-3,4'-diamino-2,2'-dimethyldiphenylsulfone, tetraglycidyl-3,4'-diamino-2,2'-dibromodiphenylsulfone, tetraglycidyl-3,4'-diamino-5-methyldiphenylsulfone, tetraglycidyl-3,4'-diamino-2'-methyldiphenylsulfone, tetraglycidyl-3,4'-diamino-3'-methyldiphenylsulfone, tetraglycidyl-3,4'-diamino-5,2'-dimethyldiphenylsulfone, tetraglycidyl-3,4'-diamino-5,3'-dimethyldiphenylsulfone, tetraglycidyl-3,3'-diamino-5-methyldiphenylsulfone, tetraglycidyl-3,3'-diamino-5,5'-dimethyldiphenylsulfone, tetraglycidyl-3,3'-diamino-5,5'-dibromodiphenylsulfone, tetraglycidyl-4,4'-diaminodiphenylsulfone, tetraglycidyl-4,4'-diamino-2,2'-dimethyldiphenylsulfone, tetraglycidyl-4,4'-diamino-2,2'-dibromodiphenylsulfone, tetraglycidyl-4,4'-diamino-5-methyldiphenylsulfone, tetraglycidyl-4,4'-diamino-2'-methyldiphenylsulfone, tetraglycidyl-4,4'-diamino-3'-methyldiphenylsulfone, tetraglycidyl-4,4'-diamino-5,2'-dimethyldiphenylsulfone, tetraglycidyl-4,4'-diamino-5,3'-dimethyldiphenylsulfone, tetraglycidyl-4,4'-diamino-5,5'-dimethyldiphenylsulfone, tetraglycidyl-4,4'-diamino-5,5'-dibromodiphenylsulfone, tetraglycidyl-4,4'-diaminodiphenyl thioether, tetraglycidyl-4,4'-diaminobenzanilide, tetraglycidyl-3,3'-diaminobenzanilide, and tetraglycidyl-3,4'-diaminobenzanilide.

Among them, $R^{10}$, $R^{11}$, $R^{12}$, and $R^{13}$ are preferably hydrogen atoms from the viewpoint of compatibility with other epoxy resins and are preferably tetraglycidyl-3,4'-diaminodiphenyl ether, tetraglycidyl-3,3'-diaminodiphenyl ether, tetraglycidyl-4,4'-diaminodiphenylmethane, tetraglycidyl-4,4'-diaminodiphenylsulfone, and tetraglycidyl-3,3'-diaminodiphenylsulfone from the viewpoint of heat resistance. Compounds formed by substituting the above compounds with halogen atoms such as Cl and Br are also a preferable aspect from the viewpoint of flame retardancy.

Next, a method for producing the epoxy resin (D12) used in First Embodiment will be exemplified and described.

The epoxy resin (D12) used in First Embodiment can be produced by a reaction of a diaminodiphenyl derivative represented by General Formula (7):

[Chemical Formula 11]

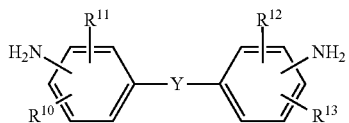

(7)

(in Formula (7), each of $R^{10}$ to $R^{13}$ is at least one selected from the group consisting of a hydrogen atom, $C_{1-4}$ aliphatic hydrocarbon groups, an alicyclic hydrocarbon group having a carbon number of 4 or less, and halogen atoms; and Y represents one group selected from —$CH_2$—, —O—, —S—, —CO—, —C(=O)O—, —$SO_2$—, and —C(=O)NH—) with epichlorohydrin.

More specifically, as the same as general methods for producing epoxy resins, the process for producing the epoxy resin (D12) includes an addition step of adding four molecules of epichlorohydrin to one molecule of the diaminodiphenyl derivative to form a tetrachlorohydrin compound represented by General Formula (8):

[Chemical Formula 12]

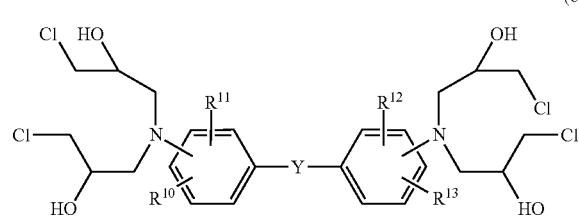

(8)

(in Formula (8), each of $R^{10}$ to $R^{13}$ is at least one selected from the group consisting of a hydrogen atom, $C_{1-4}$ aliphatic hydrocarbon groups, an alicyclic hydrocarbon group having a carbon number of 4 or less, and halogen atoms; and Y represents one group selected from —$CH_2$—, —O—, —S—, —CO—, —C(=O)O—, —$SO_2$—, and —C(=O)NH—); and a subsequent cyclization step of eliminating hydrogen chloride from the tetrachlorohydrin compound by an alkali compound to form a tetrafunctional epoxy compound represented by General Formula (4):

[Chemical Formula 13]

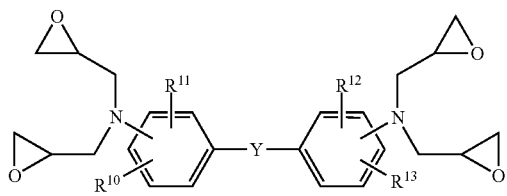

(4)

(in Formula (4), each of $R^{10}$ to $R^{13}$ is at least one selected from the group consisting of a hydrogen atom, $C_{1-4}$ aliphatic hydrocarbon groups, an alicyclic hydrocarbon group having a carbon number of 4 or less, and halogen atoms; and Y represents one group selected from —$CH_2$—, —O—, —S—, —CO—, —C(=O)O—, —$SO_2$—, and —C(=O)NH—).

If the epoxy resin (D12) is contained in an excessively small amount in the matrix resin of First Embodiment, heat resistance is impaired. If the epoxy resin (D12) is contained in an excessively large amount, cross-linking density is high and thus the material may be brittle, which may impair the impact resistance and the tensile strength of the carbon fiber-reinforced composite material. The epoxy resin(D12) is preferably contained in an amount of 40 to 80% by mass and more preferably 50 to 70% by mass relative to 100% by mass of the amount of the combined and added epoxy resin (D11) and epoxy resin (D12) (total amount of epoxy resins).

In First Embodiment, the epoxy resin composition may contain an epoxy resin other than the epoxy resin (D11) and the epoxy resin (D12) or a copolymer of an epoxy resin and a thermosetting resin. Examples of the thermosetting resin used by copolymerizing with the epoxy resin include unsaturated polyester resins, vinyl ester resins, epoxy resins, benzoxazine resins, phenol resins, urea resins, melamine resins, and polyimide resins. These resin compositions and compounds may be used singly or may be used by appropriately adding the resin compositions and compounds. Addition of at least the epoxy resin other than the epoxy resin (D11) and the epoxy resin (D12) satisfies both flowability and heat resistance after hardening of the matrix resin. In order to improve the flowability of the resin, an epoxy resin that is in a liquid state at room temperature (25° C.) is preferably used. Here, the liquid state is defined as follows. When a metal piece having a specific gravity of 7 or more in the same temperature state as a temperature state of a thermosetting resin to be measured is placed on the thermosetting resin and the metal piece is instantaneously buried, the thermosetting resin is defined as the liquid state. Examples of the material of the metal piece having a specific gravity of 7 or more include iron (steel), cast iron, and copper. Addition of at least one epoxy resin in the liquid state and at least one epoxy resin in a solid state imparts an appropriate tuck property and drape property of the prepreg. From the viewpoint of the tuck property and the drape property, the epoxy resin composition of the present invention preferably includes the liquid state epoxy resin including the epoxy resin (D11) and the epoxy resin (D12) in a total amount of 20% by mass or more relative to 100% by mass of the total amount of the contained epoxy resin.

Examples of commercially available diaminodiphenylmethane epoxy resin as the epoxy resin (D12) include "SUMI-EPDXY (registered trademark)" ELM434, ELM100, and ELM120 (manufactured by Sumitomo Chemical Co., Ltd.), YH434L (manufactured by Nippon Steel Chemical Co., Ltd.), "jER (registered trademark)" 604 and 630 (manufactured by Mitsubishi Chemical Corporation), and "Araldite (registered trademark)" MY720, MY721, MY725, MY9512, and MY9663 (manufactured by Huntsman Advanced Materials). Examples of the commercially available diaminodiphenylsulfone epoxy resin include TG4DAS and TG3DAS (manufactured by Mitsui Fine Chemical Inc.).

When the diaminodiphenylmethane epoxy resin is used as the epoxy resin (D12), particularly tetraglycidyldiaminodiphenylmethane having an epoxy equivalent of 100 to 134 g/eq. is preferably used, an epoxy equivalent of 100 to 120 g/eq. is more preferably used, and an epoxy equivalent of 100 to 115 g/eq. is even more preferably used. If the epoxy equivalent is less than 100 g/eq., production of tetraglycidyldiaminodiphenylmethane is difficult and thus production yield may be low. If epoxy equivalent is more than 134 g/eq., a tetraglycidyldiaminodiphenylmethane to be produced has excessively high viscosity. As a result, when a thermoplastic resin for imparting toughness to the thermosetting resin is dissolved, only a small amount of the thermoplastic resin is dissolved and thus the thermosetting resin having high toughness may fail to be obtained. Among them, when the thermoplastic resin is dissolved in tetraglycidyldiaminodiphenylmethane having an epoxy equivalent of 100 to 120 g/eq., a large amount of the thermoplastic resin can be dissolved to an extent not causing trouble in a prepreg forming process and thus high toughness can be imparted to a hardened product without impairing heat resistance. As a result, a high tensile strength can be exerted to the carbon fiber-reinforced composite material.

Examples of the commercially available m-xylylenediamine epoxy resin (D12) include TETRAD-X and TETRAD-C (manufactured by Mitsubishi Gas Chemical Company).

Examples of the commercially available 1,3-bis(aminomethyl)cyclohexane epoxy resin (D12) include TETRAD-C (manufactured by Mitsubishi Gas Chemical Company).

Examples of the commercially available isocyanurate epoxy resin (D12) include TEPIC-P (manufactured by Nissan Chemical Industries, Ltd.).

Examples of the commercially available tris-hydroxyphenylmethane epoxy resin (D12) include Tactix742 (manufactured by Huntsman Advanced Materials).

Examples of the commercially available tetraphenylolethane epoxy resin (D12) include "jER (registered trademark)" 1031S (manufactured by Japan Epoxy Resin Co., Ltd.).

Examples of the commercially available aminophenol epoxy resin (D12) include ELM120 and ELM100 (manufactured by Sumitomo Chemical Co., Ltd.), "jER (registered trademark)" 630 (manufactured by Japan Epoxy Resin Co., Ltd.), and "Araldite (registered trademark)" MY0500, MY0510, MY0600, and MY0610 (manufactured by Huntsman Advanced Materials).

Examples of the commercially available phenol novolac epoxy resin (D12) include DEN431 and DEN438 (manufactured by Dow Chemical Japan Ltd.), "jER (registered trademark)" 152 and 154 (manufactured by Japan Epoxy Resin Co., Ltd.), and "EPICLON (registered trademark)" N-740, N-770, and N-775 (manufactured by DIC Corporation).

Examples of the commercially available o-cresol novolac epoxy resin (D12) include "EPICLON (registered trademark)" N-660, N-665, N-670, N-673, and N-695 (manufactured by DIC Corporation) and EOCN-1020, EOCN-102S, and EOCN-104S (manufactured by Nippon Kayaku Co., Ltd.).

Examples of the commercially available dicyclopentadiene epoxy resin (D12) include "EPICLON (registered trademark)" HP7200, HP7200L, HP7200H, and HP7200HH (manufactured by DIC Corporation).

Among the epoxy resin used in First Embodiment other than the epoxy resin (D11) and the epoxy resin (D12), the glycidylamine epoxy resin formed from phenol as a precursor is preferably used as the epoxy resin having two or more functional groups. Example of such epoxy resins include bisphenol A epoxy resins, bisphenol F epoxy resins, bisphenol S epoxy resins, naphthalene epoxy resins, biphenyl epoxy resins, urethane-modified epoxy resins, hydantoin epoxy resins, and resorcinol epoxy resins.

A liquid state bisphenol A epoxy resin, bisphenol F epoxy resin, and resorcinol epoxy resin have low viscosity and thus these epoxy resins are preferably used in a combination with other epoxy resins.

A solid bisphenol A epoxy resin imparts a structure having a low cross-linking density compared with the liquid state bisphenol A epoxy resin and thus the hardened product has lower heat resistance. However, the solid bisphenol A epoxy resin imparts a structure having higher toughness and thus the solid bisphenol A epoxy resin is used in a combination with the glycidylamine epoxy resin and the liquid state bisphenol A epoxy resin and bisphenol F epoxy resin.

An epoxy resin having a naphthalene skeleton imparts a hardened resin having low moisture absorption rate and high heat resistance. The biphenyl epoxy resin, the dicyclopentadiene epoxy resin, a phenol aralkyl epoxy resin, and a diphenylfluorene epoxy resin also impart hardened resins having low moisture absorption and thus are suitably used. The urethane-modified epoxy resins and the isocyanatemodified epoxy resin impart hardened resins having high fracture toughness and elongation.

Examples of the commercially available bisphenol A epoxy resin as one example of the epoxy resin having two or more functional groups include "EPON (registered trademark)" 825 (manufactured by Japan Epoxy Resin Co., Ltd.), "EPICLON (registered trademark)" 850 (manufactured by DIC Corporation), "EPOTOHTO (registered trademark)" YD-128 (manufactured by Tohto Kasei Co., Ltd.), and DER-331 and DER-332 (manufactured by Dow Chemical Japan Ltd.).

Examples of the commercially available bisphenol F epoxy resin as one example of the epoxy resin having two or more functional groups include "jER (registered trademark)" 806, "jER (registered trademark)" 807, and "jER (registered trademark)" 1750 (manufactured by Japan Epoxy Resin Co., Ltd.), "EPICLON (registered trademark)" 830 (manufactured by DIC Corporation), and "EPOTOHTO (registered trademark)" YD-170 (manufactured by Tohto Kasei Co., Ltd.).

Examples of the commercially available resorcinol epoxy resin as one example of the epoxy resin having two or more functional groups include "Denacol (registered trademark)" EX-201 (manufactured by Nagase ChemteX Corporation).

Examples of the commercially available glycidyl aniline epoxy resin as one example of the epoxy resin having two or more functional groups include GAN and GOT (manufactured by Nippon Kayaku Co., Ltd.).

Examples of the commercially available biphenyl epoxy resin as one example of the epoxy resin having two or more functional groups include "jER (registered trademark)" YX4000H, YX4000, and YL6616 (manufactured by Mitsubishi Chemical Corporation) and NC-3000 (manufactured by Nippon Kayaku Co., Ltd.).

Examples of the commercially available urethane-modified epoxy resin as one example of the epoxy resin having two or more functional groups include AER4152 (manufactured by Asahi Kasei Epoxy Co., Ltd.).

Examples of the commercially available hydantoin epoxy resin as one example of the epoxy resin having two or more functional groups include AY238 (manufactured by Huntsman Advanced Materials).

From the viewpoint of the balance between adhesion to carbon fibers and mechanical characteristics, the glycidylamine epoxy resin is preferably contained in an amount of 30 to 70 parts by mass and more preferably 40 to 60 parts by mass in all the epoxy resin composition.

The epoxy resin composition of First Embodiment is preferably used by adding the latent hardener (E). Here, the latent hardener (E) is a hardener for the epoxy resin contained in the epoxy resin composition of First Embodiment. The hardener is activated by heat application to react with an epoxy group, and the reaction is preferably activated at 70° C. or higher. Here, being activated at 70° C. means that a reaction initiation temperature is around 70° C. The reaction initiation temperature (hereinafter called activation temperature) can be determined by differential scanning calorimetry (DSC), for example. Specifically, to 100 parts by mass of a bisphenol A epoxy compound having an epoxy equivalent of about 184 to 194 g/eq., 10 parts by mass of a hardener to be evaluated is added to prepare an epoxy resin composition; the epoxy resin composition is analyzed by differential scanning calorimetry to give an exothermic curve; and the temperature at the point of intersection of a tangent line at an inflection point of the exothermic curve obtained from differential scanning calorimetry analysis with a tangent line of the base line is determined as the reaction initiation temperature.

The latent hardener (E) is preferably an aromatic amine hardener (E2) or dicyandiamide or a derivative thereof (E3). The aromatic amine hardener (E2) may be any aromatic amines that are used as the epoxy resin hardener, and specific examples include 3,3'-diaminodiphenylsulfone (3,3'-DDS), 4,4'-diaminodiphenylsulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and 2-ethylhexanoic acid ester of 2,4,6-tris(dimethylaminomethyl)phenol, 4,4'-diaminobenzanilide, 3,4'-diaminobenzanilide, and 3,3'-diaminobenzanilide. These hardeners may be used singly or as a mixture of two or more of them.

Examples of the commercially available aromatic amine hardener (E2) include SEIKACURE S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co., Ltd.), 3,3'-DAS (manufactured by Mitsui Chemicals, Inc.), "Lonzacure (registered trademark)" M-DEA, M-DIPA, and M-MIPA (manufactured by Lonza), and DETDA 80 (manufactured by Lonza).

Dicyandiamide or a derivative thereof (E3) is a compound prepared by reaction of at least one of the amino group, the imino group, and the cyano group, and examples include o-tolylbiguanide, diphenylbiguanide, and products of prereaction of the amino group, the imino group, or the cyano group of dicyandiamide with an epoxy group of an epoxy compound to be used in the epoxy resin composition. Examples of the commercially available dicyandiamide include DICY-7 and DICY-15 (manufactured by Japan Epoxy Resin Co., Ltd.).

As the hardener other than the aromatic amine hardener (E2), amines such as alicyclic amines, phenol compounds, acid anhydrides, polyaminoamides, organic acid hydrazides, and isocyanates may be used in combination with the aromatic diamine hardener (E2).

A preferred combination of the sizing agent of First Embodiment and the latent hardener (E) is as below. The sizing agent and the latent hardener (E) are mixed so that the amine equivalent/epoxy equivalent rate of the sizing agent to be applied and the latent hardener (E) would be 0.9, and the glass transition point is determined immediately after the mixing and after storage in an environment at a temperature of 25° C. and a relative humidity of 60% for 20 days. A preferred combination of the sizing agent and the latent hardener (E) has an increase in glass transition point of the mixture by 25° C. or smaller after 20 days. When the combination having an increase in glass transition point by 25° C. or smaller is used to produce a prepreg, the reaction of the outer layer of the sizing agent with the inside of a matrix resin is suppressed, and this suppresses the deterioration of mechanical characteristics such as tensile strength of a carbon fiber-reinforced composite material produced after the prepreg is stored for a long period of time. Such a combination is thus preferred. The increase in glass transition point is more preferably 15° C. or smaller. The increase in glass transition point is even more preferably 10° C. or smaller. The glass transition point can be determined by differential scanning calorimetry (DSC).

The hardeners are preferably contained in a total amount so as to give an amount of an active hydrogen group ranging from 0.6 to 1.2 equivalents and more preferably ranging from 0.7 to 0.9 equivalent relative to 1 equivalent of the epoxy group in all the epoxy resin components. Here, the active hydrogen group is a functional group that can react with the epoxy group of a hardener component. If the amount of an active hydrogen group is less than 0.6 equivalent, a hardened product may have insufficient reaction rate, heat resistance, and elastic modulus, and the carbon fiber-reinforced composite material may have insufficient glass transition temperature and tensile strength. If the amount of an active hydrogen group is more than 1.2 equivalents, a hardened product has sufficient reaction rate, glass transition temperature, and elastic modulus but has insufficient plastic deformability, and thus the carbon fiber-reinforced composite material may have insufficient impact resistance.

A hardening accelerator may be added in order to accelerate the hardening.

Examples of the hardening accelerator include urea compounds, tertiary amines and salts thereof, imidazole and salts thereof, triphenylphosphine or derivatives thereof, metal carboxylates, and Lewis acids, Brønsted acids, and salts thereof. Among them, the urea compound is suitably used from the viewpoint of the balance between long-term storage stability and catalytic ability. In particular, the urea compound is preferably combined with the dicyandiamide (E3) as the latent hardener (E).

Examples of the urea compound include N,N-dimethyl-N'-(3,4-dichlorophenyl)urea, toluene bis(dimethylurea), 4,4'-methylene bis(phenyldimethylurea), and 3-phenyl-1,1-dimethylurea. Examples of the commercially available urea compound include DCMU99 (manufactured by Hodogaya Chemical Co., Ltd.) and "Omicure (registered trademark)" 24, 52, and 94 (manufactured by Emerald Performance Materials, LLC).

The urea compound is preferably contained in an amount of 1 to 4 parts by mass relative to 100 parts by mass of all the epoxy resin components. If the urea compound is contained in an amount of less than 1 part by mass, a reaction may insufficiently proceed to give a hardened product having insufficient elastic modulus and heat resistance. If the urea compound is contained in an amount of more than 4 parts by mass, the self-polymerization of an epoxy compound interferes with the reaction between the epoxy compound and the hardener, and thus the hardened product may have insufficient toughness or a lower elastic modulus.

In addition, the epoxy resin and the hardener or a prereacted product of some of them may be contained in the composition. The technique may be effective in viscosity control or long-term storage stability improvement.

In First Embodiment, the epoxy resin composition is suitably used by dissolving a thermoplastic resin (F3) in it. Examples of such a thermoplastic resin (F3) preferably include a thermoplastic resin generally having a chemical bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. The thermoplastic resin (F3) may have a partial cross-linked structure and may be crystalline or amorphous. It is particularly preferable that at least one resin selected from the group consisting of polyamides, polycarbonates, polyacetals, polyphenylene oxides, polyphenylene sulfides, polyarylates, polyesters, polyamideimides, polyimides, polyetherimides, polyimides having a phenyltrimethylindane structure, polysulfones, polyethersulfones, polyether ether ketones, polyether ether ether ketones, polyaramids, polyether nitriles, and polybenzimidazoles be dissolved in the epoxy resin (D11) or the epoxy resin (D12).

In order to obtain excellent heat resistance, the glass transition temperature (Tg) of the thermoplastic resin (F3) is at least 150° C. or higher and preferably 170° C. or higher. If the glass transition temperature of the contained thermoplastic resin (F3) is lower than 150° C., the epoxy resin composition may tend to cause deformation by heat when the epoxy resin composition is used as a molded product. The terminal functional group of the thermoplastic resin (F3) of a hydroxy group, a carboxy group, a thiol group, an acid anhydride, and other groups can react with a cation-polymerizable compound and thus preferably used. Examples of the thermoplastic resin having a hydroxy group include polyvinyl acetal resins such as polyvinyl formal and polyvinyl butyral, polyvinyl alcohol, and phenoxy resins. Examples of the thermoplastic resin having a sulfonyl group include polyethersulfone.

Among them, polyethersulfone having an average molecular weight of 10,000 to 60,000 g/mol is preferably used. The average molecular weight of polyethersulfone is more preferably 12,000 to 50,000 g/mol, and even more preferably 15,000 to 30,000 g/mol. If a polyethersulfone has an excessively low average molecular weight, a prepreg has an excessive tuck property and thus the handling properties of the prepreg are deteriorated or the toughness of a hardened product may be deteriorated. A polyethersulfone having an excessively low average molecular weight may impart a prepreg having an excessive tuck property and thus handling properties are deteriorated or a prepreg may fail to be formed because the viscosity of the resin is high when the polyethersulfone is dissolved in the thermosetting resin. Above all, when a polyethersulfone having an average molecular weight of 15,000 to 30,000 g/mol and having high heat resistance is dissolved in a thermosetting resin, a large amount of the thermoplastic resin can be dissolved in the thermosetting resin as long as a prepreg process does not cause any trouble. As a result, high toughness can be imparted to the hardened product and high tensile strength can be imparted to the carbon fiber-reinforced composite material while maintaining heat resistance and impact resistance.

Specific usable examples of the commercially available polyethersulfone include "SUMIKAEXCEL (registered trademark) PES3600P, PES5003P, PES5200P, PES7600P", and PES7200P (manufactured by Sumitomo Chemical Co., Ltd.), "Ultrason (registered trademark)" E2020P SR and E2021SR (manufactured by BASF), "GAFONE (registered trademark)" 3600RP and 3000RP (manufactured by Solvay Advanced Polymers), and "Virantage (registered trademark)" PESU VW-10200 and PESU VW-10700 (manufactured by Solvay Advanced Polymers). Examples of the thermoplastic resin include the copolymerized oligomer of polyethersulfone and polyetherethersulfone as described in PCT Patent Publication No. 2004-506789 and "Ultem (registered trademark)" 1000, 1010, and 1040 (manufactured by SABIC Innovative Plastics Japan) as a commercially available polyetherimide. The oligomer means a polymer having a relatively low molecular weight and formed by bonding a limited number of monomers of about 10 to about 100.

Better results may often be obtained when the thermoplastic resin (F3) is dissolved in the epoxy resin than when only the epoxy resin is used. The brittleness of the epoxy resins is compensated with the toughness of the thermoplastic resin (F3) and difficulty in molding of the thermoplastic resin (F3) is compensated with moldability of the epoxy resin. This imparts a well-balanced base resin. From the viewpoint of the balance, the thermoplastic resin (F3) is preferably contained in a ratio (% by mass) of 1 to 40% by mass, more preferably 5 to 30% by mass, and even more preferably 8 to 20% by mass relative to 100% by mass of the thermosetting resin composition as a contained ratio of the epoxy resin and the thermoplastic resin (F3). If the thermoplastic resin (F3) is contained in an excessively large amount, the viscosity of the thermosetting resin composition increases and thus production processability and handling properties of the thermosetting resin composition and the prepreg may be impaired. If the thermoplastic resin (F3) is contained in an excessively small amount, the toughness of the hardened product of the thermosetting resin composition is insufficient and thus the impact resistance and the tensile strength of the carbon fiber-reinforced composite material to be produced may be insufficient.

Preferable usable examples of the combination of the epoxy resin (D12) and the thermoplastic resin (F3) of the present invention include a combination of tetraglycidyldiaminodiphenylmethane having excellent heat resistance and adhesion to carbon fibers and polyethersulfone having excellent heat resistance and toughness because the hardened product to be produced has high heat resistance and toughness. In particular, when the combination of tetraglycidyldiaminodiphenylmethane having an average epoxy equivalent of 100 to 115 g/eq. and polyethersulfone having an average molecular weight of 15,000 to 30,000 g/mol is used, a large amount of polyethersulfone having high heat resistance can be dissolved in tetraglycidyldiaminodiphenylmethane and thus high toughness can be imparted to the hardened product without deteriorating the heat resistance and high tensile strength can be imparted to the carbon fiber-reinforced composite material while retaining the heat resistance and the impact resistance.

In the epoxy resin composition used in First Embodiment, a method of uniformly heating and kneading components (constituents) such as the epoxy resin (D11) and the epoxy resin (D12) other than the latent hardener (E) at about 150 to about 170° C., cooling the mixture to about 60° C., and adding the latent hardener (E) and kneading the resultant mixture is preferable. However, a method for adding each component is not limited to this method.

To the epoxy resin composition used in First Embodiment, thermoplastic resin particles (F5) can also be preferably added. By addition of the thermoplastic resin particles (F5), the toughness of the matrix resin improves and impact resistance of the matrix resin improves when carbon fiber-reinforced composite material is formed.

The material of the thermoplastic resin particles (F5) used in First Embodiment may be the same as the various thermoplastic resins (F3) exemplified above and can be used by mixing in the epoxy resin composition. Among them, the polyamide is the most preferable thermoplastic resin. Among the polyamides, nylon 12, nylon 6, nylon 11, nylon 6/12 copolymer, and nylon forming semi-IPN (Interpenetrating Polymer Network structure) by the epoxy compound (semi-IPN nylon) described in Example 1 in Japanese Patent Application Laid-open No. H01-104624 impart excellent adhesion strength with the epoxy resin (D11) and the epoxy resin (D12). As for the shape, the thermoplastic resin particles (F5) may be spherical particles, nonspherical particles, or porous particles. The spherical particles are preferred for the reasons below. The spherical particles do not deteriorate the flow characteristics of a resin and thus the resin has excellent viscoelasticity. In addition, the spherical particles have no starting point of a stress concentration and impart high impact resistance, and thus the spherical particles are preferable. Examples of the commercially available polyamide particles include SP-500, SP-10, TR-1, TR-2, 842P-48, and 842P-80 (manufactured by Toray Industries Inc.), "TORAYPEARL (registered trademark)" TN (manufactured by Toray Industries Inc.), and "Orgasol (registered trademark)" 1002D, 2001UD, 2001EXD, 2002D, 1702D, 3501D, and 3502D (manufactured by Arkema Inc.).

The epoxy resin composition used in First Embodiment can contain coupling agents, conductive particles such as carbon particles and metal-plated organic particles, thermosetting resin particles, rubber particles such as cross-linked rubber particles and core-shell rubber particles, inorganic fillers such as silica gel, nano silica, and clay, and conductive fillers to an extent not impairing the effect of the present invention. The conductive particles and the conductive fillers are preferably used because the conductivity of a resin hardened product and a carbon fiber-reinforced composite material to be produced can be improved.

Examples of the conductive fillers include carbon blacks, carbon nanotubes, vapor-grown carbon fibers (VGCFs), fullerenes, and metal nanoparticles. The conductive fillers may be used singly or in combination. Among them, the carbon blacks and the carbon particles, which are inexpensive and highly effective, are suitably used. Examples of the carbon black include furnace black, acetylene black, thermal black, channel black, and Ketjen black, and these carbon blacks may be used as a mixture of two or more of them.

The epoxy resin composition used in First Embodiment can impart a prepreg having low volatile portions at the time of hardening, excellent heat resistance, and excellent mechanical characteristics in tough environments such as a low temperature environment by adding the above materials in a predetermined ratio. When the prepreg is formed from the epoxy resin composition used in the present invention, the amount of the volatile matter after leaving the prepreg for 20 minutes in a hot-air dryer is preferably 0.2 to 5% by mass and more preferably 0.02 to 3% by mass. Control of the amount of the volatile matter can impart high heat resistance and can reduce void generation at the time of forming the carbon fiber-reinforced composite material.

The amount of the volatile matter of the epoxy resin composition tends to increase in proportion to rise in exposure temperature. However, the amount of the volatile matter is saturated in a temperature lower than a hardening temperature because the epoxy resin composition forms a gel in shorter time at higher temperature and does not generate the volatile matter. Although depending on a temperature rising rate, the amount of the volatile matter of the aromatic amines requiring high temperature conditions in hardening is saturated at a temperature of 150 to 180° C. For example, when the epoxy resin composition is hardened at 180° C., the amount of the volatile matter is preferably measured at a temperature of 160° C., which has less influence of the temperature rising rate.

Next, a process for producing the prepreg of First Embodiment will be described.

The prepreg of First Embodiment is prepared by impregnating sizing agent-coated carbon fiber bundles with an epoxy resin composition as a matrix resin. The prepreg can be prepared, for example, by a wet method of dissolving a matrix resin in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat application or a method of once preparing a coating film of a matrix resin composition on a release paper or the like, next superimposing the film on each side or one side of sizing agent-coated carbon fiber bundles, and applying heat and pressure to the film to impregnate the sizing agent-coated carbon fiber bundles with the matrix resin. The hot melting method is preferred because no solvent remains in the prepreg.

The method for forming a carbon fiber-reinforced composite material by using the prepreg of First Embodiment is exemplified by a method of stacking prepregs and thermally hardening a matrix resin while applying pressure to the laminate.

Examples of the method of applying heat and pressure include press molding, autoclave molding, bagging molding, a wrapping tape method, and internal pressure molding method. To specifically produce sporting goods, the wrapping tape method and the internal pressure molding method are preferably employed. For aircraft application necessitating a high quality and high performance laminated composite material, the autoclave molding is preferably employed. To produce various vehicle exteriors, the press molding is preferably employed.

The prepreg of First Embodiment preferably has a carbon fiber mass fraction of 40 to 90% by mass and more preferably 50 to 80% by mass. A prepreg having an excessively low carbon fiber mass fraction yields a carbon fiber-reinforced composite material having an excess mass, and this may impair excellent specific strength and specific modulus that are advantages of a carbon fiber reinforced fiber reinforced composite material. A prepreg having an excessively high carbon fiber mass fraction causes poor impregnation of a matrix resin composition, and a composite material to be produced is likely to contain many voids, which may greatly deteriorate mechanical characteristics of the carbon fiber-reinforced composite material.

The prepreg of First Embodiment is preferably has a structure in which a layer containing the thermoplastic resin particle (F5) in a high concentration, that is, a layer in which existence of localized thermoplastic resin particles (F5) is clearly ascertained when the cross section of the prepreg is observed (hereinafter, may be called a particle layer) is formed in a part near the surface of the prepreg.

Such a structure easily form a resin layer between the prepreg layers, that is, carbon fiber-reinforced composite material layers when the prepregs are stacked and the epoxy resin is hardened to form the carbon fiber-reinforced composite material. This improves adhesion of the carbon fiber-reinforced composite material layers each other and a carbon fiber-reinforced composite material to be produced exerts high level impact resistance.

From such a viewpoint, the particle layer preferably exists in a depth range of 20% and more preferably in a depth range of 10% from the surface of the prepreg in a direction of thickness relative to 100% of the thickness of the prepreg by setting the surface as the starting point. The particle layer may exist in only one side. However, this structure generates a front surface and a back surface of the prepreg and thus careful handling is needed. If interlayers having particles and interlayers having no particles exist by mishandling the layer stacking of the prepreg, a carbon fiber-reinforced composite material having low impact resistance is produced. In order to eliminate the distinction between the front surface and the back surface and to facilitate the layer stacking, it is preferable that the particle layers exist on both sides of the prepreg.

The existence rate of the thermoplastic resin particles (F5) existing in the particle layer is preferably 90 to 100% by mass and more preferably 95 to 100% by mass relative to 100% by mass of the total amount of the thermoplastic resin particles (F5) in the prepreg.

For example, the existence ratio of the thermoplastic resin particles (F5) can be evaluated by the following method. A plate-like prepreg hardened product is produced by sandwiching a prepreg between two polytetrafluoroethylene resin plates having smooth surfaces and closely attaching to the polytetrafluoroethylene resin plates and then slowly rising temperature to a hardening temperature for 7 days to carry out gelation and hardening. In both sides of the prepreg hardened product, two lines parallel to the surface of the prepreg are drawn at a depth position of 20% of the thickness from the surface of the prepreg hardened product. Next, the total area of the thermoplastic resin particles (F5) existing between the surface of the prepreg and the lines and the total area of the thermoplastic resin particles (F5) exiting across the thickness of the prepreg are determined. An existence ratio of the thermoplastic resin particles (F5) existing in a range from the surface to the depth of 20% relative to 100% of the thickness of the prepreg is calculated. Here, the total area of the thermoplastic resin particles (F5) is determined by cutting out a thermoplastic resin particle (F5) part from the photograph of the cross section and converting the mass of the part from the photograph into the area. If the thermoplastic resin particles (F5) dispersed in the resin is difficult to be determined in the photograph, a method of staining the thermoplastic resin particles (F5) can be employed.

In First Embodiment, in addition to the method of using a prepreg, a carbon fiber-reinforced composite material can be produced by any molding method such as a hand lay-up Method®, "SCRIMP (registered trademark)", filament winding method, a pultrusion method, and a resin film infusion method, which are appropriately selected for a purpose. Any of the molding method can be employed to produce a carbon fiber-reinforced composite material including the sizing agent-coated carbon fibers and a hardened product of the thermosetting resin composition.

The carbon fiber-reinforced composite material of First Embodiment is preferably used for aircraft structural members, windmill blades, automotive outer panel, computer applications such as IC trays and casings (housings) of notebook computers, and sporting goods such as golf shafts, bats, and rackets for tennis and badminton.

Second Embodiment

The prepreg pertaining to Second Embodiment of the present invention includes sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy at a photoelectron takeoff angle of 15°. The thermosetting resin composition at least contains an epoxy resin (D1), a latent hardener (E), and resin particles (F1) insoluble in the epoxy resin (D1) and having the structure of General Formula (1):

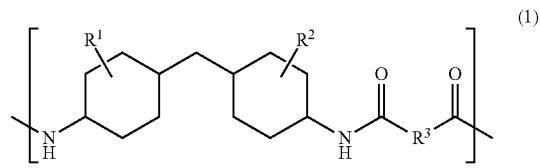

(in Formula (1), $R^1$ and $R^2$ are a $C_{1-8}$ alkyl group or a halogen atom and are optionally the same as or different from each other; and $R^3$ is a $C_{1-20}$ alkylene group).

Carbon fiber-reinforced composite materials, which have excellent specific strength and specific rigidity, are useful, and thus are widely applied to aircraft structural members, windmill blades, automotive outer panels, computer applications such as IC trays and casings (housings) of notebook computers, and other purposes. Consequently, the demand has been growing year after year.

The carbon fiber-reinforced composite material is a heterogeneous material prepared by molding a prepreg including carbon fibers as reinforced fibers and a matrix resin as essential components, and thus the mechanical characteristics in an arranging direction of the reinforced fibers greatly differ from mechanical characteristics in other directions. For example, the impact resistance indicated by the resistance against a drop impact depends on delamination strength that is quantitatively determined by, for example, edge delamination strength. Thus, it is known that a simple improvement in the strength of reinforced fibers fails to achieve radical improvement. In particular, the carbon fiber-reinforced composite material including a thermosetting resin as the matrix resin, which has low toughness, is easily broken by stress from any direction except an arranging direction of the reinforced fibers. To address such characteristics, various techniques have been developed in order to provide a composite material having higher tensile strength in the fiber direction and higher compressive strength as well as higher mechanical characteristics capable of bearing the stress from any direction except an arranging direction of the reinforced fibers.

As a technique of improving the toughness, U.S. Pat. No. 5,028,478 discloses a prepreg having a surface on which resin particles are dispersed. Specifically, the technique includes dispersing resin particles composed of a thermoplastic resin such as nylon on the surface of a prepreg, thereby imparting high toughness and good heat resistance to a carbon fiber-reinforced composite material. In addition, Japanese Patent Application Laid-open No. H03-26750 discloses a technique that includes combining a matrix resin to which a polysulfone oligomer is added to improve the toughness, with particles composed of a thermosetting resin, thereby achieving high toughness of a carbon fiber-reinforced composite material.

International Publication WO 2008-040963 discloses a method that includes combining an epoxy resin having a particular skeleton with resin particles insoluble in the epoxy resin, thereby satisfying both the tensile strength and the toughness. However, the above methods are not necessarily satisfactory in consideration of an increasing demand for further weight reduction and higher toughness.

Second Embodiment can provide a prepreg and a carbon fiber-reinforced composite material having excellent adhesiveness between carbon fibers and a matrix resin and excellent long-term storage stability and having both excellent hot, wet open hole compression and excellent interlaminar toughness.

The sizing agent used in the prepreg of Second Embodiment at least includes an aliphatic epoxy compound (A) and an aromatic epoxy compound (B1) as an aromatic compound (B). In Second Embodiment, the aliphatic epoxy compound (A) and the aromatic epoxy compound (B1) as the aromatic compound (B) are the same as the compounds in First Embodiment and thus description of the compounds is omitted. The carbon fibers used and the sizing agent-coated carbon fibers formed by coating the carbon fibers with the sizing agent can also refer to the description on First Embodiment.

Next, the thermosetting resin composition used in the prepreg of Second Embodiment will be described.

The thermosetting resin composition of Second Embodiment includes an epoxy resin (D1), a latent hardener (E), insoluble resin particles (F1) having a structure of General Formula (1):

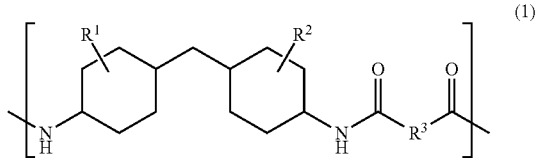

(in Formula (1), each of $R^1$ and $R^2$ is a $C_{1-8}$ alkyl group or a halogen atom, $R^1$ and $R^2$ may be the same as or different from each other, and $R^3$ is a $C_{1-20}$ alkylene group) and insoluble in the epoxy resin (D1).

The thermosetting resin composition of Second Embodiment includes the epoxy resin (D1) as a thermosetting resin (D).

Any epoxy compound can be used in the epoxy resin (D1), and the epoxy compound may be one or more compounds selected from bisphenol epoxy compounds, amine epoxy compounds, phenol novolac epoxy compounds, cresol novolac epoxy compounds, resorcinol epoxy compounds, phenol aralkyl epoxy compounds, naphthol aralkyl epoxy compounds, dicyclopentadiene epoxy compounds, epoxy compounds having a biphenyl skeleton, isocyanate-modified epoxy compounds, tetraphenylethane epoxy compounds, and triphenyl methane epoxy compounds.

Here, in the bisphenol epoxy compound, two phenolic hydroxy groups on a bisphenol compound are glycidylated, and examples of the bisphenol epoxy compound include bisphenol A epoxy compounds, bisphenol F epoxy compounds, bisphenol AD epoxy compounds, bisphenol S epoxy compounds, and halogenated, alkyl-substituted, and hydrogenated products of these bisphenol epoxy compounds. The bisphenol epoxy compound is not limited to monomers, and a polymer having a plurality of repeating units can also be suitably used.

Examples of the commercially available bisphenol A epoxy compound include "jER (registered trademark)" 825, 828, 834, 1001, 1002, 1003, 1003F, 1004, 1004AF, 1005F, 1006FS, 1007, 1009, and 1010 (manufactured by Mitsubishi Chemical Corporation). Examples of the brominated bisphenol A epoxy compound include "jER (registered trademark)" 505, 5050, 5051, 5054, and 5057 (manufactured by Mitsubishi Chemical Corporation). Examples of the commercially available hydrogenated bisphenol A epoxy compound include ST5080, ST4000D, ST4100D, and ST5100 (manufactured by Nippon Steel Chemical Co., Ltd.).

Examples of the commercially available bisphenol F epoxy compound include "jER (registered trademark)" 806, 807, 4002P, 4004P, 4007P, 4009P, and 4010P (manufactured by Mitsubishi Chemical Corporation), "EPICLON (registered trademark)" 830 and 835 (manufactured by DIC Corporation), and "EPOTOHTO (registered trademark)" YDF2001 and YDF2004 (manufactured by Nippon Steel Chemical Co., Ltd.). Examples of the tetramethyl bisphenol F epoxy compound include YSLV-80XY (manufactured by Nippon Steel Chemical Co., Ltd.).

Examples of the bisphenol S epoxy compound include "EPICLON (registered trademark)" EXA-154 (manufactured by DIC Corporation).

Examples of the amine epoxy compound include tetraglycidyldiaminodiphenylmethane, tetraglycidyldiaminodiphenylsulfone, tetraglycidyldiaminodiphenyl ether, triglycidylaminophenol, triglycidylaminocresol, tetraglycidylxylylenediamine, and halogenated, alkynol-substituted, and hydrogenated products of them.

Examples of the commercially available tetraglycidyldiaminodiphenylmethane include "SUMI-EPDXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, and MY725 (manufactured by Huntsman Advanced Materials). Examples of the commercially available triglycidylaminophenol or triglycidylaminocresol include "SUMI-EPDXY (registered trademark)" ELM100 and ELM120 (manufactured by Sumitomo Chemical Co., Ltd.), "Araldite (registered trademark)" MY0500, MY0510, MY0600, and MY0610 (manufactured by Huntsman Advanced Materials), and "jER (registered trademark)" 630 (manufactured by Mitsubishi Chemical Corporation). Examples of the commercially available tetraglycidylxylylenediamine and hydrogenated products thereof include "TETRAD (registered trademark)"-X and "TETRAD (registered trademark)"-C (manufactured by Mitsubishi Gas Chemical Company).

Examples of the commercially available tetraglycidyldiaminodiphenylsulfone include TG4DAS and TG3DAS (manufactured by Mitsui Fine Chemical Inc.).

Examples of the commercially available phenol novolac epoxy compound include "jER (registered trademark)" 152 and 154 (manufactured by Mitsubishi Chemical Corporation) and "EPICLON (registered trademark)" N-740, N-770, and N-775 (manufactured by DIC Corporation).

Examples of the commercially available cresol novolac epoxy compound include "EPICLON (registered trademark)" N-660, N-665, N-670, N-673, and N-695 (manufactured by DIC Corporation), and EOCN-1020, EOCN-102S, and EOCN-104S (manufactured by Nippon Kayaku Co., Ltd.).

Examples of the commercially available resorcinol epoxy compound include "Denacol (registered trademark)" EX-201 (manufactured by Nagase ChemteX Corporation).

Examples of the commercially available glycidyl aniline epoxy compound include GAN and GOT (manufactured by Nippon Kayaku Co., Ltd.).

Examples of the commercially available epoxy compound having a biphenyl skeleton include "jER (registered trademark)" YX4000H, YX4000, and YL6616 (manufactured by Mitsubishi Chemical Corporation), and NC-3000 (manufactured by Nippon Kayaku Co., Ltd.).

Examples of the commercially available dicyclopentadiene epoxy compound include "EPICLON (registered trademark)" HP7200L (an epoxy equivalent of 245 to 250, a softening point of 54 to 58° C.), "EPICLON (registered trademark)" HP7200 (an epoxy equivalent of 255 to 260, a softening point of 59 to 63° C.), "EPICLON (registered trademark)" HP7200H (an epoxy equivalent of 275 to 280, a softening point of 80 to 85° C.), "EPICLON (registered trademark)" HP7200HH (an epoxy equivalent of 275 to 280, a softening point of 87 to 92° C.) (manufactured by Dainippon Ink and Chemicals, Inc.), XD-1000-L (an epoxy equivalent of 240 to 255, a softening point of 60 to 70° C.) XD-1000-2L (an epoxy equivalent of 235 to 250, a softening point of 53 to 63° C.) (manufactured by Nippon Kayaku Co., Ltd.), and "Tactix (registered trademark)" 556 (an epoxy equivalent of 215 to 235, a softening point of 79° C.) (manufactured by Vantico Inc.).

Examples of the commercially available isocyanate-modified epoxy compound include XAC4151 and AER4152 (manufactured by Asahi Kasei Epoxy Co., Ltd.) and ACR1348 (manufactured by ADEKA), which have an oxazolidone ring.

Examples of the commercially available tetraphenylethane epoxy compound include "jER (registered trademark)" 1031 (manufactured by Mitsubishi Chemical Corporation) as a tetrakis(glycidyloxyphenyl)ethane epoxy compound.

Examples of the commercially available triphenylmethane epoxy compound include "Tactix (registered trademark)" 742 (manufactured by Huntsman Advanced Materials).

Among these epoxy compounds, the epoxy resin (D1) at least containing a multifunctional glycidylamine epoxy compound is preferable. This is because the epoxy resin (D1) has a high multi-cross-linking density and thus can improve the heat resistance and the compressive strength of a carbon fiber-reinforced composite material.

Examples of the multifunctional glycidylamine epoxy compound include tetraglycidyldiaminodiphenylmethane, triglycidylaminophenol, triglycidylaminocresol, N,N-diglycidylaniline, N,N-diglycidyl-o-toluidine, N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. These compounds can be typically obtained by addition of epichlorohydrin to a phenoxyaniline derivative and cyclization of the epichlorohydrin adduct with an alkali compound. A compound having a higher molecular weight has a higher viscosity, and thus N,N-diglycidyl-4-phenoxyaniline is particularly preferably used from the viewpoint of handling properties.

Examples of the phenoxyaniline derivative specifically include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphtyloxyphenoxy)aniline, 4-(1-naphtyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy) aniline.

Among them, the multifunctional glycidylamine epoxy compound is preferably an aromatic epoxy compound having at least one glycidylamine skeleton and three or more epoxy groups.

The multifunctional glycidylamine aromatic epoxy compound has an effect of increasing the heat resistance, and the multifunctional glycidylamine aromatic epoxy compound is preferably contained in a ratio of 30 to 100% by mass and more preferably 50% by mass or more in the epoxy resin (D1). A resin containing the glycidylamine epoxy compound in a ratio of 30% by mass or more yields a carbon fiber-reinforced composite material having higher compressive strength and good heat resistance, and thus such a ratio is preferred.

When used, these epoxy compound may optionally contain a catalyst such as an acid and a base. For example, a Lewis acid such as halogenated boron complexes and p-toluenesulfonate is preferably used to harden the epoxy resin (D1).

In addition to the epoxy resin (D1), the thermosetting resin composition used in Second Embodiment may include a thermosetting resin that undergoes cross-linking reaction by heat and at least partially forms a three-dimensional cross-linked structure. Examples of such a thermosetting resin include unsaturated polyester resins, vinyl ester resins, benzoxazine resins, phenol resins, urea resins, melamine resins, and thermosetting polyimide resins and also include modified resins thereof and blended resins of two or more of them. These thermosetting resins may be self-curable by heat application, or a hardener, a hardening accelerator, and other additives may be contained.

The unsaturated polyester resin is exemplified by a solution of an unsaturated polyester obtained by reaction of an alcohol with an acid component containing an α,β-unsaturated dicarboxylic acid, in a polymerizable unsaturated monomer. Examples of the α,β-unsaturated dicarboxylic acid include maleic acid, fumaric acid, itaconic acid, and derivatives such as acid anhydrides of them, and these acids may be used in combination of two or more of them. The α,β-unsaturated dicarboxylic acid may be optionally used in combination with an additional acid component except the α,β-unsaturated dicarboxylic acid, such as saturated dicarboxylic acids including phthalic acid, isophthalic acid, terephthalic acid, tetrahydrophthalic acid, adipic acid, sebacic acid, and derivatives, for example, acid anhydrides of them.

Examples of the alcohol include aliphatic glycols such as ethylene glycol, diethylene glycol, propylene glycol, dipropylene glycol, 1,2-propanediol, 1,2-butanediol, 1,3-butanediol, and 1,4-butanediol; alicyclic diols such as cyclopentanediol and cyclohexanediol; aromatic diols such as hydrogenated bisphenol A, a bisphenol A-propylene oxide (1 to 100 mol) adduct, and xylene glycol; and polyhydric alcohols such as trimethylolpropane and pentaerythritol. These alcohols may be used in combination of two or more of them.

Specific examples of the unsaturated polyester resin include a condensate of fumaric acid or maleic acid with a bisphenol A-ethylene oxide (hereinafter abbreviated as EO) adduct, a condensate of fumaric acid or maleic acid with a bisphenol A-propylene oxide (hereinafter abbreviated as PO) adduct, and a condensate of fumaric acid or maleic acid with a bisphenol A-EO or -PO adduct (the adducts with EO and PO may be either a random adduct or a block adduct). These condensates may be dissolved in a monomer such as styrene, as necessary. Examples of the commercially available unsaturated polyester resin include "U-PiCA (registered trademark)" (manufactured by Japan U-PiCA Company, Ltd.), "Rigolac (registered trademark)" (manufactured by Showa Denko K.K.), and "Polyset (registered trademark)" (manufactured by Hitachi Chemical Co., Ltd.).

Examples of the vinyl ester resin include an epoxy (meth)acrylate obtained by esterification of the epoxy compound with an α,β-unsaturated monocarboxylic acid. Examples of the α,β-unsaturated monocarboxylic acid include acrylic acid, methacrylic acid, crotonic acid, tiglic acid, and cinnamic acid, and these unsaturated monocarboxylic acids may be used in combination of two or more of them. Specific examples of the vinyl ester resin include a bisphenol epoxy compound-(meth)acrylate modified product (for example, a terminal (meth)acrylate-modified resin obtained by reaction of an epoxy group of a bisphenol A epoxy compound with a carboxy group of (meth)acrylic acid), and these modified products may be dissolved in a monomer such as styrene, as necessary. Examples of the commercially available vinyl ester resin include "Diclite (registered trademark)" (manufactured by DIC Corporation), "Neopor (registered trademark)" (manufactured by Japan U-PiCA Company, Ltd.), and "Ripoxy (registered trademark)" (manufactured by Showa Highpolymer Co., Ltd.).

Examples of the benzoxazine resin include o-cresol-aniline benzoxazine resins, m-cresol-aniline benzoxazine resins, p-cresol-aniline benzoxazine resins, phenol-aniline benzoxazine resins, phenol-methylamine benzoxazine resins, phenol-cyclohexylamine benzoxazine resins, phenol-m-toluidine benzoxazine resins, phenol-3,5-dimethylaniline benzoxazine resins, bisphenol A-aniline benzoxazine resins, bisphenol A-amine benzoxazine resins, bisphenol F-aniline benzoxazine resins, bisphenol S-aniline benzoxazine resins, dihydroxydiphenylsulfone-aniline benzoxazine resins, dihydroxydiphenyl ether-aniline benzoxazine resins, benzophenone benzoxazine resins, biphenyl benzoxazine resins, bisphenol AF-aniline benzoxazine resins, bisphenol A-methylaniline benzoxazine resins, phenol-diaminodiphenylmethane benzoxazine resins, triphenylmethane benzoxazine resins, and phenolphthalein benzoxazine resins. Examples of the commercially available benzoxazine resin include BF-BXZ, BS-BXZ, and BA-BXZ (manufactured by Konishi Chemical Ind. Co., Ltd.).

The phenol resin is exemplified by resins obtained by condensation of phenols such as phenol, cresol, xylenol, t-butylphenol, nonylphenol, cashew oil, lignin, resorcin, and catechol with aldehydes such as formaldehyde, acetaldehyde, and furfural, and examples include novolak resins and resol resins. The novolak resin can be obtained by reaction of phenol with formaldehyde in the same amount or in an excess amount of the phenol in the presence of an acid catalyst such as oxalic acid. The resol resin can be obtained by reaction of phenol with formaldehyde in the same amount or in an excess amount of the formaldehyde in the presence of a base catalyst such as sodium hydroxide, ammonia, or an organic amine. Examples of the commercially available phenol resin include "SUMILITERESIN (registered trademark)" (manufactured by Sumitomo Bakelite Co., Ltd.), Resitop (manufactured by Gunei Chemical Industry Co., Ltd.), and "AV Light (registered trademark)" (manufactured by Asahi Organic Chemicals Industry).

The urea resin is exemplified by a resin obtained by condensation of urea and formaldehyde. Examples of the commercially available urea resin include UA-144 (manufactured by Sunbake Co., Ltd.).

The melamine resin is exemplified by a resin obtained by polycondensation of melamine and formaldehyde. Examples of the commercially available melamine resin include "Nikalac (registered trademark)" (manufactured by SANWA Chemical Co., Ltd.).

The thermosetting polyimide resin is exemplified by a resin in which at least a main structure contains an imide ring, and a terminal or main chain has one or more groups selected from a phenylethynyl group, a nadimide group, a maleimide group, an acetylene group, and other groups. Examples of the commercially available polyimide resin include PETI-330 (manufactured by Ube Industries, Ltd.).

The thermosetting resin composition of Second Embodiment is used by adding the latent hardener (E). Here, the latent hardener (E) is a hardener for the thermosetting resin (D) of Second Embodiment. The hardener is activated by heat application to react with a reactive group of the thermosetting resin, for example, an epoxy group, and the reaction is preferably activated at 70° C. or higher. Here, being activated at 70° C. means that a reaction initiation temperature is around 70° C. The reaction initiation temperature (hereinafter called activation temperature) can be determined by differential scanning calorimetry (DSC), for example. When the epoxy resin (D1) is used as the thermosetting resin (D), specifically, to 100 parts by mass of a bisphenol A epoxy compound having an epoxy equivalent of about 184 to 194, 10 parts by mass of a hardener to be evaluated is added to prepare an epoxy resin composition; the epoxy resin composition is analyzed by differential scanning calorimetry to give an exothermic curve; and the temperature at the point of intersection of a tangent line at an inflection point of the exothermic curve obtained from differential scanning calorimetry analysis with a tangent line of the base line is determined as the reaction initiation temperature.

The latent hardener (E) is preferably an aromatic amine hardener (E2) or dicyandiamide or a derivative thereof (E3). The aromatic amine hardener (E2) may be any aromatic amines that are used as the epoxy resin hardener, and specifically, the same as the aromatic amine hardener (E2) in First Embodiment exemplified above can be used.

Usable examples of the commercially available aromatic amine hardener (E2) include the same as the commercially available aromatic amine hardener (E2) in First Embodiment exemplified above.

Usable examples of dicyandiamide or the derivative thereof (E3) include the same as dicyandiamide or the derivative thereof (E3) in First Embodiment exemplified above. Examples of the commercially available dicyandiamide include DICY-7 and DICY-15 (manufactured by Japan Epoxy Resin Co., Ltd.).

As a hardener other than the above hardener, amines such as alicyclic amines, phenol compounds, acid anhydrides, polyaminoamides, organic acid hydrazides, and isocyanates may be used in combination with the aromatic amine hardener (E2).

In the prepreg of Second Embodiment, a preferred combination of the sizing agent and the latent hardener (E) is as below. The sizing agent and the latent hardener (E) are mixed so that the amine equivalent/epoxy equivalent rate of the sizing agent to be applied and the latent hardener (E) would be 0.9, and the glass transition point is determined immediately after the mixing and after storage in an environment at a temperature of 25° C. and a relative humidity of 60% for 20 days. A preferred combination of the sizing agent and the latent hardener (E) has an increase in glass transition point of the mixture by 25° C. or smaller after 20 days. When the combination having an increase in glass transition point by 25° C. or smaller is used to produce a prepreg, the reaction of the outer layer of the sizing agent with the inside of a matrix resin is suppressed, and this suppresses the deterioration of mechanical characteristics such as the tensile strength of a carbon fiber-reinforced composite material produced after the prepreg is stored for a long period of time. Such a combination is thus preferred. The increase in glass transition point is more preferably 15° C. or smaller. The increase in glass transition point is even more preferably 10° C. or smaller. The glass transition point can be determined by differential scanning calorimetry (DSC).

The latent hardener (E) is preferably contained in a total amount so as to give an amount of an active hydrogen group ranging from 0.6 to 1.2 equivalents and more preferably ranging from 0.7 to 0.9 equivalent relative to 1 equivalent of the epoxy group in the epoxy resin (D) component. Here, the active hydrogen group is a functional group that can react with the epoxy group of a hardener component. If the amount of an active hydrogen group is less than 0.6 equivalent, a hardened product may have insufficient reaction rate, heat resistance, and elastic modulus, and a carbon fiber-reinforced composite material to be produced may have insufficient glass transition temperature and strength. If the amount of an active hydrogen group is more than 1.2 equivalents, a hardened product has sufficient reaction rate, glass transition temperature, and elastic modulus but has insufficient plastic deformability, and thus a carbon fiber-reinforced composite material to be produced may have insufficient impact resistance and interlayer toughness.

A hardening accelerator may be added in order to accelerate the hardening.

Examples of the hardening accelerator include urea compounds, tertiary amines and salts thereof, imidazole and salts thereof, triphenylphosphine and derivatives thereof, metal carboxylates, and Lewis acids, Brønsted acids, and salts thereof. Among them, the urea compound is suitably used from the viewpoint of the balance between long-term storage stability and catalytic ability. In particular, the urea compound is preferably combined with the dicyandiamide as the latent hardener (E).

Examples of the urea compound include the same as the urea compound exemplified in First Embodiment.

The urea compound is preferably contained in an amount of 1 to 4 parts by mass relative to 100 parts by mass of the thermosetting resin component. If the urea compound is contained in an amount of less than 1 part by mass, the reaction may insufficiently proceed to give a hardened product having insufficient elastic modulus and heat resistance. If the urea compound is contained in an amount of more than 4 parts by mass, the self-polymerization of the thermosetting resin interferes with the reaction between the thermosetting resin and the hardener, and thus the hardened product may have insufficient toughness or a lower elastic modulus.

In addition, the epoxy resin (D1) and the latent hardener (E) or a prereacted product of some of them may be contained in the thermosetting resin composition. The technique may be effective in viscosity control or long-term storage stability improvement.

Next, resin particles (F1) insoluble into the epoxy resin (D1) having a structure of General Formula (1):

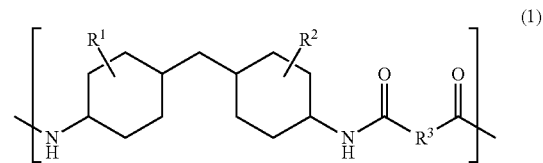

(in Formula (1), each of $R^1$ and $R^2$ is a $C_{1-8}$ alkyl group or a halogen atom, $R^1$ and $R^2$ may be the same as or different from each other, and $R^3$ is a $C_{1-20}$ alkylene group) will be described.

In the present invention, particles of the resin particles (F1) insoluble into the epoxy resin (D1) are resin particles of a polyamide resin having the structure of General Formula (1). The resin particles (F1) have excellent toughness, wet-heat resistance, and solvent resistance and are an essential component in order to exert the impact resistance, the open hole compression under moisture and heat, and the interlayer toughness of the of the carbon fiber-reinforced composite material. Insolubility of the resin particles (F1) into the epoxy resin (D1) enables the resin particles (F1) to maintain the shape in the final carbon fiber-reinforced composite material without dissolving into the epoxy resin (D1) even at a high temperature of 180° C. that is reached when the epoxy resin (D1) as a matrix resin is hardened. This can achieve high impact resistance and interlayer toughness.

Whether the resin particles are insoluble can be determined in the following manner. The insoluble resin particles are added to the epoxy resin at a temperature lower than Tg of the resin particles and then the mixture is stirred for one hour. Then, when the viscosity change between before and after the stirring is within ±10%, the insolubility can be ascertained.

In Second Embodiment, whether the viscosity change in an epoxy resin mixture obtained by prekneading 5 parts by mass of the resin particles (F1) with 100 parts by mass of "EPON (registered trademark)" 825 as the bisphenol A epoxy resin maintained at 70° C. occurs is determined by the following method. The solubility is determined based on this measurement.

The kneaded epoxy resin is casted on a parallel plates having a diameter of 40 mm and the viscosity change of the kneaded epoxy resin is measured with the dynamic viscoelasticity measurement device ARES (manufactured by TA Instruments) for 1 hour under a constant temperature of 80° C., a frequency of 0.5 Hz, and a gap of 1 mm.

If the resin particles (F1) are dissolved, the following behavior can be observed: the viscosity rises just after the start of the measurement and then the viscosity rise is terminated after the completion of the dissolution and the viscosity becomes constant. If the resin particles (F1) are not dissolved, the viscosity change is within ±10% and thus dissolution properties of the resin particles (F1) can be determined.

The polyamide resin as the main component of the resin particles (F1) in Second Embodiment is a polyamide at least containing 4,4'-diaminodicyclohexylmethane and/or a derivative thereof and an aliphatic dicarboxylic acid as essential components. The polyamide resin at least containing 4,4'-diaminodicyclohexylmethane and/or a derivative thereof and an aliphatic dicarboxylic acid as essential components imparts the resin particles (F1) having excellent toughness, wet-heat resistance, and solvent resistance.

Specific examples of 4,4'-diaminodicyclohexylmethane and/or a derivative thereof include 4,4'-diaminodicyclohexylmethane, 4,4'-diamino-3,3'-dimethyldicyclohexylmethane, 4,4'-diamino-3,3'-diethyldicyclohexylmethane, 4,4'-diamino-3,3'-dipropyldicyclohexylmethane, 4,4'-diamino-3,3'-dichlorodicyclohexylmethane, and 4,4'-diamino-3,3'-dibromodicyclohexylmethane. Among them, 4,4'-diaminodicyclohexylmethane and 4,4'-diamino-3,3'-dimethyldicyclohexylmethane are preferable from the viewpoint of heat resistance.

Specific examples of the aliphatic dicarboxylic acid include straight-chain saturated dicarboxylic acids such as oxalic acid, malonic acid, succinic acid, glutaric acid, adipic acid, pimelic acid, suberic acid, azelaic acid, lepargilic acid, sebacic acid, sebacic acid, and 1,12-dodecane dicarboxylic acid, linear unsaturated dicarboxylic acids such as maleic acid and fumaric acid, and alicyclic dicarboxylic acids such as cyclopropane dicarboxylic acid. 1,12-dodecane dicarboxylic acid has a long alkyl chain, and thus improves the toughness of the resin particles containing the polyamide, which is particularly preferred.

The resin particles (F1) containing the polyamide containing 4,4'-diaminodicyclohexylmethane and/or a derivative thereof and an aliphatic dicarboxylic acid as essential components may be resin particles (F1) containing polyamide including a component derived from one or more 4,4'-diaminodicyclohexylmethane and/or a derivative thereof described above and at least one aliphatic dicarboxylic acid described above.

In the resin particles (F1), the polyamide containing 4,4'-diaminodicyclohexylmethane and/or the derivative thereof and the aliphatic dicarboxylic acid having the structure of General Formula (1) as essential components is preferably contained in an amount of 50 to 100% by mass relative to the total polyamides in the resin particles (F1). The amount is preferably 80 to 100% by mass from the viewpoint of maximally exerting the toughness of the polyamide itself.

Examples of the commercially available polyamide containing 4,4'-diaminodicyclohexylmethane and/or the derivative thereof and the aliphatic dicarboxylic acid as essential components include "Grilamid (registered trademark)" TR90 (manufactured by EMS-CHEMIE AG), and "TROGAMID (registered trademark)" CX7323, CX9701, and CX9704 (manufactured by Degussa AG).

The resin particles (F1) insoluble into the epoxy resin in Second Embodiment also may be a polymer made by mixing or copolymerizing a polyamide containing 4,4'-diaminodicyclohexylmethane and/or the derivative thereof and isophthalic acid and 12-aminododecanoic acid as components with the polyamide containing 4,4'-diaminodicyclohexylmethane and/or the derivative thereof and the aliphatic dicarboxylic acid as essential components.

Examples of the 4,4'-diaminodicyclohexylmethane and/or the derivative thereof in the polyamide containing 4,4'-diaminodicyclohexylmethane and/or the derivative thereof and isophthalic acid and 12-aminododecanoic acid as components include 4,4'-diaminodicyclohexylmethane, 4,4'-diamino-3,3'-dimethyldicyclohexylmethane, 4,4'-diamino-3,3'-diethyldicyclohexylmethane, 4,4'-diamino-3,3'-dipropyldicyclohexylmethane, 4,4'-diamino-3,3'-dichlorodicyclohexylmethane, and 4,4'-diamino-3,3'-dibromodicyclohexylmethane. Among them, 4,4'-diaminodicyclohexylmethane and 4,4'-diamino-3,3'-dimethyldicyclohexylmethane are preferable from the viewpoint of heat resistance.

Examples of the commercially available polyamide containing 4,4'-diaminodicyclohexylmethane and/or the derivative thereof and isophthalic acid and 12-aminododecanoic acid as components include "Grilamid (registered trademark)" TR55 (manufactured by EMS-CHEMIE AG).

Example of commercially available copolymer of the polyamide containing 4,4'-diaminodicyclohexylmethane and/or the derivative thereof and the aliphatic dicarboxylic acid as essential components and the polyamide containing components of 4,4'-diaminodicyclohexylmethane and/or the derivative thereof and isophthalic acid and 12-aminododecanoic acid as components include "Grilamid (registered trademark)" TR70LX (manufactured by EMS-CHEMIE AG), "Grilamid (registered trademark)" TR90 (manufactured by EMS-CHEMIE AG) or "TROGAMID (registered trademark)" CX7323 (manufactured by Degussa AG), and "Grilamid (registered trademark)" TR55 (manufactured by EMS-CHEMIE AG) may be used by mixing them.

"Grilamid (registered trademark)" TR90 (manufactured by EMS-CHEMIE AG), "TROGAMID (registered trademark)" CX7323 (manufactured by Degussa AG), or "Grilamid (registered trademark)" TR55 (manufactured by EMS-CHEMIE AG), and "Grilamid (registered trademark)" TR70LX (manufactured by EMS-CHEMIE AG) may be used by mixing them.

In the thermosetting resin composition used in Second Embodiment, polyamide particles different from the resin particles (F1), that is, polyamide particles (F4) not having the structure of General Formula (1) and insoluble into the epoxy resin (D1) can also be contained. Among the polyamide particles (F4), particles containing nylon 12, nylon 6, nylon 11, nylon 6/12 copolymer, and nylon forming semi-IPN (Interpenetrating Polymer Network structure) by the epoxy compound (semi-IPN nylon) described in Example 1 in Japanese Patent Application Laid-open No. H01-104624 impart excellent adhesion strength with the epoxy resin (D1), and thus has an effect of highly improving the interlayer toughness of the carbon fiber-reinforced composite material, high delamination strength of the carbon fiber-reinforced composite material at the time of drop weight impact, and an effect of highly improving impact resistance. Such particles are thus preferably used. Usable examples of the commercially available polyamide particles (F4) include SP-500, SP-10, TR-1, TR-2, 842P-48, and 842P-80 (manufactured by Toray Industries Inc.), "TORAYPEARL (registered trademark)" TN (manufactured by Toray Industries Inc.), and "Orgasol (registered trademark)" 1002D, 2001UD, 2001EXD, 2002D, 1702D, 3501D, and 3502D (manufactured by Arkema Inc.).

When the resin particles (F1) and the polyamide particles (F4) used in the present invention is used in combination, a mass ratio of the resin particles (F1) and the polyamide particles (F4) is preferably 5:5 to 10:0, more preferably 6:4 to 9:1, and even more preferably 7:3 to 8:2. Use of the resin particles (F1) and polyamide particles (F4) in the above range is preferred because the interlayer toughness of the carbon fiber-reinforced composite material is improved.

The resin particles (F1) may include the thermosetting resin as long as the resin particles are insoluble into the epoxy resin (D1). When the resin particles (F1) contain the thermosetting resin, the heat resistance and the elastic modulus of the resin particles (F1) can be controlled. Specific examples of the thermosetting resin contained in the resin particles (F1) containing the polyamide include epoxy resins, benzoxazine resins, vinyl ester resins, unsaturated polyester resins, urethane resins, phenol resins, melamine resins, maleimide resins, cyanate ester resins, and urea resins.

Depending on the process for producing the thermosetting resin composition and the process for forming the carbon fiber-reinforced composite material, the average particle diameter of the resin particles (F1) is preferably from 1 to 150 μm, more preferably from 1 to 100 μm, even more preferably from 5 to 50 μm, and particularly preferably from 10 to 35 μm.

If the average particle diameter of the resin particles (F1) is less than this range, the resin particles (F1) are difficult to produce and the strength of the carbon fiber-reinforced composite material may deteriorate because the alignment of fibers is disturbed by permeating the particles between a fiber and a fiber during the process of producing the carbon fiber-reinforced composite material. If the average particle diameter is larger than 150 μm, clogging of a filter, a slitter, and the like used in the process may occur, and this may cause disadvantage of the carbon fiber-reinforced composite material.

The polyamide particles (F4) different from the resin particles (F1) preferably has a smaller average particle diameter than the average particle diameter of the resin particles (F1). Use of the polyamide particles (F4) having smaller average particle diameter than that of the resin particles (F1) results in permeation of the polyamide particles (F4) into clearances of the resin particles (F1) at the interlayer parts of the stack layers of the carbon fiber-reinforced composite material and thus a high particle filling rate is obtained. As a result, the combination use of the resin particles (F1) and the polyamide particles (F4) may improve the interlayer toughness of the carbon fiber-reinforced composite material compared with single use of the resin particles (F1). When the average particle diameter of the polyamide particles (F4) is smaller than the average particle diameter of the resin particles (F1), the mass ratio of the resin particles (F1) and the polyamide particles (F4) is preferably 5:5 to 10:0, more preferably 6:4 to 9:1, and even more preferably 7:3 to 8:2. When the average particle diameter of the polyamide particles (F4) is smaller than the average particle diameter of the resin particles (F1) and the mass ratio of the resin particles (F1) and the polyamide particles (F4) is within the above range, the polyamide particles (F4) are permeated into clearances of the resin particles (F1) at the interlayer parts of the stack layers of the carbon fiber-reinforced composite material and thus a high particle filling rate is obtained. Such polyamide particles (F4) are thus particularly preferred because the polyamide particles (F4) improve the interlayer toughness of the carbon fiber-reinforced composite material.

The average particle diameter of the polyamide particles (F4) is preferably 1 to 50 μm, more preferably 1 to 15 μm, even more preferably 2 to 9 μm, and particularly preferably 2 to 8 μm. If the average particle diameter of the polyamide particles (F4) is excessively small, the carbon fiber-reinforced composite material are permeated in clearances between a fiber and a fiber during the process of producing the carbon fiber-reinforced composite material and thus the effect of improving the interlayer toughness of the carbon fiber-reinforced composite material may be insufficient. If the average particle diameter of the polyamide particles (F4) is excessively large, the polyamide particles (F4) cannot be permeated in clearances of the resin particles (F1) at the interlayer parts of the stacked layers of the carbon fiber-reinforced composite material and thus the effect of improving the interlayer toughness of the carbon fiber-reinforced composite material may be insufficient Here, the average particle diameter can be calculated by measuring the diameters of any 100 particles from scanning electron photomicrographs and determining an arithmetic average thereof. If the particles are not perfectly circular, that is, if the particles are ellipse-like shape in the photomicrographs, the maximum diameter of the particle is determined as the particle diameter thereof. In order to precisely measure the particle diameter, the particle diameter should be measured at least in a magnification of 1000 and preferably in a magnification of 5000.

The shape of the resin particles (F1) is preferably a spherical shape from the viewpoint of exerting the impact resistance and the interlayer toughness of the carbon fiber-reinforced composite material and the stability of viscosity at the time of forming the carbon fiber-reinforced composite material. However, the resin particles (F1) having an ellipse spherical shape, a flat shape, a rock-like shape, a bur-like shape, and irregular shape can also be used. The inside of the particles also may be hollow or porous.

The shape of the polyamide particles (F4) is preferably a spherical shape as the same as the resin particles (F1) from the viewpoint of achieving the impact resistance and the interlayer toughness of the carbon fiber-reinforced composite material and the stability of viscosity at the time of forming the carbon fiber-reinforced composite material. However, the polyamide particles (F4) having an ellipse spherical shape, a flat shape, a rock-like shape, a bur-like shape, and irregular shape can also be used. The inside of the particles also may be hollow or porous.

Any existing methods may be used for producing the resin particles (F1) and the polyamide particles (F4). Examples of the methods include a method of producing fine particles by freezing a raw material using liquid nitrogen and grinding, a method of dissolving a raw material and spray-drying, a forced melting-kneading emulsification method of forming an island-sea structure by mechanically kneading a resin component to form fine particles and the resin component different from the above resin component and then removing the sea component by a solvent, and a method of dissolving a raw material in a solvent and then re-precipitating or re-agglomerating the dissolved raw material is in a poor solvent.

The surface processing of the resin particles (F1) and the polyamide particles (F4) can impart new functions.

Examples of the surface processing include a method of using the resin particles (F1) and the polyamide particles (F4) of the present invention as a core material and forming shell layers made of the different material on the surfaces of the particles. Although selected materials may be different depending on desired functions, for example, the function of improving the electric conductivity of the matrix resin by imparting a shell layer made of a metal having electrical conductivity such as iron, cobalt, copper, silver, gold, platinum, palladium, tin, and nickel. When the metal is imparted as the shell layer, the thickness of the shell layer should be sufficient thickness in order to obtain characteristics of the desired function. However, the particles cannot be uniformly mixed when the specific gravity of the particles is excessively large or excessively small compared with the specific gravity of the matrix resin at the time of preparing the matrix resin. As a result, the final specific gravity of the particles to which the metal is imparted as the shell layer is preferably in a range from 0.9 to 2.0.

In Second Embodiment, the resin particles (F1) is preferably in an amount of 20% by mass or less relative to the mass of the prepreg. If the resin particles (F1) are contained in an amount of more than 20% by mass relative to the mass of the prepreg, the resin particles (F1) are difficult to be mixed with the epoxy resin (D1) as a base resin and tuck and drape properties of the prepreg may be deteriorated. In other words, in order to impart high impact resistance, the hot, wet open hole compression, and the interlayer toughness of the carbon fiber-reinforced composite material while retaining the characteristics of the epoxy resin (D1) as the base resin, the resin particles (F1) are preferably contained in an amount of 20% by mass or less and more preferably 15% by mass or less relative to the mass of the prepreg. In order to impart more excellent handling properties of the prepreg, the resin particles (F1) are more preferably contained in an amount of 10% by mass or less. In order to impart high impact resistance, the hot, wet open hole compression, and the interlayer toughness of the carbon fiber-reinforced composite material, the resin particles (F1) are preferably contained in an amount of 1% by mass or more and more preferably 2% by mass or more relative to the mass of the prepreg.

In the present invention, when the resin particles (F1) and the polyamide particles (F4) are used in combination, the polyamide particles (F4) is preferably contained in an amount of 20% by mass or less relative to the mass of the prepreg. If the polyamide particles (F4) are contained in an amount of more than 20% by mass relative to the mass of the prepreg, the resin particles (F1) are difficult to be mixed with the epoxy resin (D1) as a base resin and tuck and drape properties of the prepreg may be deteriorated. In other words, in order to impart high impact resistance, the hot, wet open hole compression, and the interlayer toughness of the carbon fiber-reinforced composite material while retaining the characteristics of the epoxy resin (D1) as the base resin, the polyamide particles (F4) are preferably contained in an amount of 20% by mass or less and more preferably 15% by mass or less relative to the mass of the prepreg. In order to impart more excellent handling properties of the prepreg, the polyamide particles (F4) are more preferably contained in an amount of 10% by mass or less. In order to impart high impact resistance, the hot, wet open hole compression under moisture and heat, and the interlayer toughness of the carbon fiber-reinforced composite material when the polyamide particles (F4) and the resin particles (F1) are used in combination, the polyamide particles (F4) are preferably contained in an amount of 1% by mass or more and more preferably 2% by mass or more relative to the mass of the prepreg.

Next, a thermoplastic resin (F6) soluble into the epoxy resin (D1) which can be contained in the thermosetting resin composition of the present invention will be described.

The viscosity of thermosetting resin composition of the present invention can be adjusted in an appropriate region by adding the thermoplastic resin (F6) soluble into the epoxy resin (D1). This can adjust the tuck property and the drape property in a range suitable for intended use when the prepreg is formed in combination with the carbon fibers. The impact resistance and the interlayer toughness of the thermosetting resin composition can be improved by adding the thermoplastic resin (F6) soluble into the epoxy resin (D1) to the thermosetting resin composition. Here, the state "soluble" can be determined that a thermoplastic resin is added to the epoxy resin (D1) at a temperature lower than TG and a melting point to stir the mixture for one hour and whether the viscosity change between before and after the stirring is lower than −10% or higher than 10%.

The same thermoplastic resin (F3) used in First Embodiment exemplified above can be used as such a thermoplastic resin (F6).

Better results may often be obtained particularly when the thermoplastic resin (F6) is dissolved in the thermosetting resin, particularly the epoxy resin (D1) than when only the resin is used. The brittleness of the epoxy resin (D1) is compensated with the toughness of the thermoplastic resin (F6) and difficulty in molding of the thermoplastic resin (F6) is compensated with moldability of the epoxy resin (D1). This imparts a well-balanced base resin. From the viewpoint of the balance, the thermoplastic resin (F6) is preferably contained in a ratio (% by mass) of 1 to 40% by mass, more preferably 5 to 30% by mass, and even more preferably 8 to 20% by mass relative to 100% by mass of the thermosetting resin composition as a contained ratio of the epoxy resin (D1) and the thermoplastic resin (F6). If the thermoplastic resin (F6) is contained in an excessively large amount, the viscosity of the thermosetting resin composition increases and thus production processability and handling properties of the thermosetting resin composition and the prepreg may be impaired. If an excessively small amount of the thermoplastic resin (F6) is added, the toughness of the hardened product of the thermosetting resin composition is insufficient and thus the impact resistance and the interlayer toughness of a carbon fiber-reinforced composite material to be produced may be insufficient.

The thermosetting resin composition used in Second Embodiment can contain coupling agents, conductive particles such as carbon particles and metal-plated organic particles, thermosetting resin particles, rubber particles such as cross-linked rubber particles and core-shell rubber particles, or inorganic fillers such as silica gel, nano silica, and clay, and conductive fillers to an extent not impairing the effect of the present invention. The conductive particles and the conductive fillers are preferably used because the conductivity of a resin hardened product and a carbon fiber-reinforced composite material to be produced can be improved. The rubber particles are preferably used because the interlayer toughness and fatigue characteristics of a carbon fiber-reinforced composite material to be produced can be improved.

The same the conductive fillers used in First Embodiment is suitably used as the conductive fillers.

The rubber particles are preferably cross-linked rubber particles and core-shell rubber particles obtained by graft polymerization of the surface of cross-linked rubber particles with a different polymer from the viewpoint of handling properties and the like.

Examples of the commercially available core-shell rubber particles include "PARALOID (registered trademark)" EXL-2655, EXL-2611, and EXL-3387 (manufactured by Rohm & Haas) containing a butadiene-alkyl methacrylate-styrene copolymer, "STAPHYLOID (registered trademark)" AC-3355 and TR-2122 (manufactured by GANZ Chemical Co., Ltd.), "NANOSTRENGTH (registered trademark)" M22, 51, 52, and 53 (manufactured by Arkema Inc.), and "Kane Ace (registered trademark)" MX (manufactured by Kaneka Corporation) containing an acrylate-methacrylate copolymer.

Next, the prepreg and a process for producing the prepreg of Second Embodiment will be described.

Generally, a prepreg is a molding intermediate substrate formed by impregnating reinforcement fibers with a matrix resin and, in Second Embodiment, carbon fibers are used as the reinforcement fibers and the thermosetting resin composition is used as the matrix resin. In the prepreg, the thermosetting resin composition is in an unhardened state and the carbon fiber-reinforced composite material is obtained by stacking and hardening the prepregs. The carbon fiber-reinforced composite material is also obtained by hardening the single layer of the prepreg. In the carbon fiber-reinforced composite material produced by stacking and hardening a plurality of prepregs, the surface parts of the prepregs are the interlayer parts of the stacked layers of the carbon fiber-reinforced composite material and the inside part of the prepregs is the inside part of the stacked layers of the carbon fiber-reinforced composite material.

The prepreg in Second Embodiment can be produced by applying the methods disclosed in Japanese Patent Application Laid-open No. H01-26651, Japanese Patent Application Laid-open No. S63-170427, or Japanese Patent Application Laid-open No. S63-170428. Specific examples of the production method of the prepreg in Second Embodiment include a method of applying the resin particles (F1) and the polyamide particles (F4) in the form of particle to the surface of a primary prepreg made of carbon fibers, the epoxy resin (D1) as the matrix resin, the latent hardener (E), and the thermoplastic resin (F6), a method of preparing a thermosetting resin composition produced by uniformly mixing the resin particles (F1) and the polyamide particles (F4) in a matrix resin containing the epoxy resin (D1), the latent hardener (E), and the thermoplastic resin (F6), and localizing the resin particles (F1) and the polyamide particles (F4) on the surface part of the prepreg by blocking penetration of the resin particles (F1) and the polyamide particles (F4) with the carbon fibers in a process of impregnating carbon fibers with the thermosetting resin composition, or a method of impregnating carbon fibers with a matrix resin made of the epoxy resin (D1), the latent hardener (E), and the thermoplastic resin (F6) to previously prepare a primary prepreg, and attaching a film of the thermosetting resin composition containing the resin particles (F1) and the polyamide particles (F4) in a high concentration to the surface of the primary prepreg. Uniform existence of the resin particles (F1) and the polyamide particles (F4) in a range from the surface to a depth of 20% of the prepreg thickness imparts the prepreg for the carbon fiber-reinforced composite material having high interlayer toughness.

The prepreg of Second Embodiment is prepared by impregnating sizing agent-coated carbon fiber bundles with a thermosetting resin composition as a matrix resin. The prepreg can be prepared, for example, by a wet method of dissolving a thermosetting resin composition in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a thermosetting resin composition, then pulling up the carbon fiber bundles, and evaporating the solvent with an oven or other units.

In the hot melting method, a prepreg is prepared by a method of directly impregnating sizing agent-coated carbon fiber bundles with a thermosetting resin composition having a viscosity lowered by heat application or a method of once preparing a coating film of a thermosetting resin composition on a release paper or the like, next superimposing the film on each side or one side of sizing agent-coated carbon fiber bundles, and applying heat and pressure to the film to impregnate the sizing agent-coated carbon fiber bundles with the thermosetting resin composition. The hot melting method is preferred because no solvent remains in the prepreg.

The prepreg of Second Embodiment preferably has a carbon fiber mass fraction of 40 to 90% by mass and more preferably 50 to 80% by mass. A prepreg having an excessively low carbon fiber mass fraction yields a carbon fiber-reinforced composite material having an excess mass, and this may impair excellent specific strength and specific modulus that are advantages of a carbon fiber-reinforced composite material. A prepreg having an excessively high carbon fiber mass fraction causes poor impregnation of a thermosetting resin composition, and a carbon fiber-reinforced composite material to be produced is likely to contain many voids, which may greatly deteriorate mechanical characteristics of the composite material.

The prepreg of Second Embodiment is preferably has a structure in which a layer containing particles in a high concentration, that is, a layer in which existence of localized resin particles (F1) insoluble into the epoxy resin (D1) and the polyamide particles (F4) different from the resin particles (F1) is clearly ascertained when the cross section of the prepreg is observed (hereinafter, may be called a particle layer) is formed in a part near the surface of the prepreg.

Such a structure easily form a resin layer between the prepreg layers, that is, carbon fiber-reinforced composite material layers when the prepregs are stacked and the epoxy resin (D1) is hardened to form the carbon fiber-reinforced composite material. This improves adhesion of the carbon fiber-reinforced composite material layers each other and a carbon fiber-reinforced composite material to be produced exerts high level interlayer toughness and impact resistance.

From such a viewpoint, the particle layer preferably exists in a depth range of 20% and more preferably in a depth range of 10% from the surface of the prepreg in a direction of thickness relative to 100% of the thickness of the prepreg by setting the surface as the starting point. The particle layer may exist in only one side. However, this structure generates a front surface and a back surface of the prepreg and thus careful handling is needed. If interlayers having particles and interlayers having no particles exist by mishandling the layer stacking of the prepreg, a carbon fiber-reinforced composite material having low interlayer toughness is produced. In order to eliminate the distinction between the front surface and the back surface and to facilitate the layer stacking, it is preferable that the particle layers exist on both sides of the prepreg.

The existence ratio of the resin particles (F1) existing in the particle layers is preferably 90 to 100% by mass and more preferably 95 to 100% by mass relative to the total amount of the resin particles (F1) in the prepreg.

Similarly, the existence ratio of the polyamide particles (F4) existing in the particle layers is preferably 90 to 100% by mass and more preferably 95 to 100% by mass relative to the total amount of the polyamide particles (F4) in the prepreg.

The existence ratio of the resin particles (F1) in the particle layer can be evaluated by the same method as that for evaluating the existence ratio of the thermoplastic resin particles (F5) in First Embodiment.

The existence ratio of the polyamide particles (F4) in the particle layer can also be evaluated by the same method as that for evaluating the existence ratio of the resin particles (F1) in the particle layer.

The prepreg in Second Embodiment can be prepared by a wet method of dissolving a thermosetting resin composition in a solvent such as methyl ethyl ketone and methanol to reduce the viscosity and impregnating carbon fibers with the solution and a hot melting method of heating a thermosetting resin composition to reduce the viscosity and impregnating carbon fibers with the thermosetting resin composition.

The wet method is a method of preparing a prepreg by immersing carbon fibers in a solution containing a thermosetting resin composition, then pulling up the carbon fibers, and evaporating the solvent with an oven or other units.

The hot melting method is a method of preparing a prepreg by directly impregnating carbon fibers with a thermosetting resin composition having a viscosity lowered by heat application or a method of once preparing a resin film of a thermosetting resin composition on a release paper or the like, next superimposing the film on each side or one side of carbon fibers, and applying heat and pressure to the film to transfer the film and to impregnate the carbon fibers with the thermosetting resin composition. The hot melting method is preferred because no solvent substantially remains in the prepreg.

The carbon fiber-reinforced composite material of Second Embodiment can be produced by, for example, a method of stacking the prepregs prepared by such methods and thermally hardening the epoxy resin (D1) while applying heat and pressure to the obtained laminated body.

Examples of the method of applying heat and pressure include a press molding method, an autoclave molding method, a bagging molding method, a wrapping tape method, and an internal pressure molding method. To specifically produce sporting goods, the wrapping tape method and the internal pressure molding method are preferably employed.

The wrapping tape method is a method of winding the prepreg around a shaft such as a mandrel to form a tube-like product of the carbon fiber-reinforced composite material. This method is preferable for producing a rod-like product such as a golf shaft and a fishing rod. More specifically, the method is a method of winding the prepreg around a mandrel, winding a wrapping tape made of a thermoplastic resin tape around outside of the prepreg for fixing the prepreg and applying pressure, thermally hardening the epoxy resin (D1) in an oven, and removing the shaft to give a tube-like product.

The internal pressure molding method is a method of placing in a mold a preform made by winding the prepreg around an internal pressure applying body such as a thermoplastic resin tube, applying pressure by introducing high pressure gas into the internal pressure applying body and heating the mold at the same time to form a tube-like product. The internal pressure molding method is preferably used for forming a product having a complex shape such as a golf shaft, a bat, and a racket for tennis and badminton.

As one example, the carbon fiber-reinforced composite material of Second Embodiment can be produced by a method of stacking the above prepregs of the present invention in a predetermined form and hardening the epoxy resin (D1) by pressurizing and heating In addition to the method of producing the carbon fiber-reinforced composite material by using the prepregs, examples of the method of producing the carbon fiber-reinforced composite material in Second Embodiment include the same as the methods in First Embodiment, which are appropriately selected and applied depending on a purpose. Any of the molding method can be employed to produce the carbon fiber-reinforced composite material containing the sizing agent-coated carbon fibers and the hardened product of the epoxy resin (D1).

The carbon fiber-reinforced composite material in Second Embodiment is preferably used for aircraft structural members and the same as the applications in First Embodiment.

Third Embodiment

The prepreg pertaining to Third Embodiment of the present invention includes sizing agent-coated carbon fibers coated with a sizing agent, and an epoxy resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy at a photoelectron takeoff angle of 15°. The epoxy resin composition is an epoxy resin composition at least containing an epoxy resin (D1) and a compound (E1) of General Formula (2):

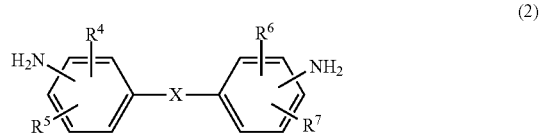

(in Formula (2), $R^4$ to $R^7$ are at least one selected from the group consisting of a hydrogen atom, $C_{1-4}$ aliphatic hydrocarbon groups, alicyclic hydrocarbon groups having a carbon number of 4 or less, and halogen atoms; and X is one selected from —O—, —S—, —CO—, —C(=O)O—, and —C(=O)NH—) as the latent hardener (E).

Fiber-reinforced composite materials including reinforced fibers such as carbon fibers and aramid fibers have high specific strength and high specific modulus and thus have been used as structural materials for aircrafts, automobiles, and other products, for sporting goods such as tennis rackets, golf shafts, and fishing rods, and for other general industrial applications.

Such a fiber-reinforced composite material is produced by a method of impregnating carbon fibers with a matrix resin unhardened to form a prepreg as a sheet-like intermediate material and hardening the prepreg or by resin transfer molding of casting a liquid matrix resin to carbon fibers placed in a mold to yield an intermediate and hardening the intermediate. In the method of using a prepreg of these production methods, a plurality of prepregs are typically stacked, and then the prepregs are heated and compressed, thus yielding a carbon fiber-reinforced composite material. In many cases, the matrix resin used in the prepreg is thermosetting resins, specifically, epoxy resins in terms of productivity such as processability.

Specifically, the structural materials for aircrafts, automobiles, and other products are severely required to have much lighter weight and much higher material strength as the materials have been increasingly demanded. As the carbon fiber-reinforced composite material has been applied particularly as the structural materials for aircrafts, automobiles, and other products, the carbon fiber-reinforced composite material is required have higher strength in severe use environments such as a high temperature and humidity environment or a low temperature environment.

Typically, an improvement in tensile strength in low temperature conditions deteriorates the compressive strength in high temperature and humidity conditions, whereas an improvement in compressive strength in high temperature and humidity conditions deteriorates the tensile strength in low temperature conditions. It is thus very difficult to satisfy both the tensile strength and the compressive strength.

To improve the tensile strength of a carbon fiber-reinforced composite material, carbon fibers are required to have higher strength or higher carbon fiber volume fraction (higher Vf), and Japanese Patent Application Laid-open No. H11-241230 discloses a method for producing carbon fibers having high strength. However, the disclosure describes no strength of a carbon fiber-reinforced composite material to be produced. Typically, carbon fibers having higher strength are likely to impart the strength intrinsic in the carbon fibers. For example, if having higher strand strength, the carbon fibers fail to impart sufficient tensile strength, and the tensile strength translation rate (tensile strength of a carbon fiber-reinforced composite material/(strand strength of carbon fibers×fiber volume fraction)×100) is likely to be lowered. Although such carbon fibers having high strength can be obtained, other technical problems are required to be solved in order to achieve the strength of a carbon fiber-reinforced composite material.

Even if carbon fibers have the same strength, the tensile strength translation rate greatly varies with a matrix resin to be combined or other molding conditions. In particular, a carbon fiber-reinforced composite material hardened at a hardening temperature of 180° C. or higher is unlikely to exhibit high strength due to thermal stress remaining in the carbon fiber-reinforced composite material during the hardening. To address this problem, modifications of a matrix resin have been studied in order to sufficiently achieve tensile strength even through a hardening at a temperature of 180° C.

It is known that a matrix resin having higher tensile breaking elongation is used to give a carbon fiber-reinforced composite material having higher tensile strength translation rate. To improve the tensile breaking elongation of a matrix resin, a reduction in the cross-linking density of the matrix resin is effective, but the reduction of the cross-linking density may reduce the heat resistance of the carbon fiber-reinforced composite material. Thus, the effective amount is limited. To solve the problem, Japanese Patent Application Laid-open No. H09-235397 discloses a technique of giving high tensile strength translation rate by adjusting a tensile breaking elongation and a fracture toughness KIc to a particular ratio. However, if a thermoplastic resin or a rubber component is added in large amounts to a matrix resin in order to improve the fracture toughness KIc, the matrix resin typically has a higher viscosity and may have poor processability and handleability for the production of prepregs.

When the carbon fiber-reinforced composite material is used as a structural material, the compressive strength is also important mechanical characteristics. To measure the compressive strength, a test piece such as a plate without holes, a plate with holes, and a cylinder is used. A plate with bolt holes is used in many practical cases, and thus the compressive strength of a plate with holes, specifically the strength in high temperature and humidity conditions, is particularly important. Although a carbon fiber-reinforced composite material including a conventional polymer as the matrix is advantageously lightweight, the compressive strength may largely deteriorate as the strength and the elastic modulus deteriorate in high temperature and humidity conditions. Thus, the applicable range may be limited.

International Publication WO 1996/17006, Japanese Patent Application Laid-open No. 2003-26768, and Japanese Patent Application Laid-open No. 2002-363253 disclose, as an epoxy resin composition giving a carbon fiber composite material having excellent compressive strength, an epoxy resin composition including tetraglycidyldiaminodiphenylmethane, a bifunctional epoxy resin such as a bisphenol A epoxy resin and diglycidyl resorcinol, and 3,3'-diaminodiphenylsulfone, an epoxy resin composition including a multifunctional epoxy resin, a diglycidylaniline derivative, and 4,4'-diaminodiphenylsulfone, and an epoxy resin composition including a multifunctional epoxy resin, an epoxy resin having a special skeleton, and 3,3'-diaminodiphenylsulfone. These compositions can improve the compressive strength, but the disclosure describes no improvement of the tensile strength in low temperature conditions.

Third Embodiment can provide a prepreg and a carbon fiber-reinforced composite material having excellent mechanical characteristics in severe environments such as a low temperature environment and a high temperature and humidity environment, having excellent adhesiveness between a matrix resin and carbon fibers when an epoxy resin suitable for structural materials is used as the matrix resin, and capable of suppressing the reduction in mechanical characteristics during a long-term storage.

In the prepreg of Third Embodiment, a sizing agent used at least includes an aliphatic epoxy compound (A) and an aromatic epoxy compound (B1) as an aromatic compound (B). In a prepreg of Third Embodiment, the aliphatic epoxy compound (A) and the aromatic epoxy compound (B1) as the aromatic compound (B) are the same as the compounds in First Embodiment and thus description of the compounds is omitted. The carbon fibers used and the sizing agent-coated carbon fibers formed by coating the carbon fibers with the sizing agent can also refer to the description on First Embodiment.

Next, a prepreg and a carbon fiber-reinforced composite material in Third Embodiment will be described in detail.

In Third Embodiment, the prepreg includes the sizing agent-coated carbon fibers described in First Embodiment and a thermosetting resin described below as a matrix resin.

The thermosetting resin (D) used in Third Embodiment is an epoxy resin composition at least containing the following components, an epoxy resin (D1), and a latent hardener (E). Any epoxy compound can be used in the epoxy resin (D1) in Third Embodiment, and the epoxy compound may be one or more compounds selected from bisphenol epoxy compounds, amine epoxy compounds, phenol novolac epoxy compounds, cresol novolac epoxy compounds, resorcinol epoxy compounds, phenol aralkyl epoxy compounds, naphthol aralkyl epoxy compounds, dicyclopentadiene epoxy compounds, epoxy compounds having a biphenyl skeleton, isocyanate-modified epoxy compounds, tetraphenylethane epoxy compounds, and triphenylmethane epoxy compounds. In particular, an epoxy resin (D11) having two or more ring structures that are four- or more-membered rings and having one or two amine glycidyl groups or ether glycidyl groups that are directly bonded to the ring structures is preferably used from the viewpoint of imparting high elastic modulus to an epoxy resin hardened product to be produced. An epoxy resin (D12) having three or more functional groups is also preferably used from the viewpoint of imparting high heat resistance and high elastic modulus to an epoxy resin hardened product to be produced. A combination use of the epoxy resin (D11) and the epoxy resin (D12) in the epoxy resin (D1) may impart toughness to an epoxy resin hardened product to be produced while maintaining high heat resistance and high elastic modulus and thus the combination use is preferable. The latent hardener (E) is a compound (E1) represented by General Formula (2).

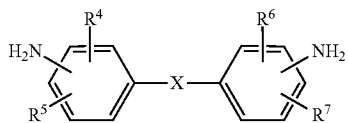

(2)

In Formula (2), $R^4$ to $R^7$ represent at least one group selected from the group consisting of a hydrogen atom, $C_{1-4}$ aliphatic hydrocarbon groups, an alicyclic hydrocarbon group having a carbon number of 4 or less, and halogen atoms. X represents one group selected from —O—, —S—, —CO—, —C(=O)O—, and —C(=O) NH—.

In Third Embodiment, the epoxy resin (D11) contained in the epoxy resin composition and having two or more ring structures that are four- or more-membered rings means that the epoxy resin (D11) has two or more monocyclic structures of four-membered rings or larger rings such as cyclohexane, benzene, and pyridine or has at least one condensed ring structure in which each ring of the condensed ring is made of a four-membered ring or a larger ring such as phthalimide, naphthalene, and carbazole.

The amine glycidyl group or the ether glycidyl group directly bonded to the ring structures of the epoxy resin (D11) means that the epoxy resin (D11) has the structure in which a N atom in the case of the amine glycidyl group or an O atom in the case of the ether glycidyl group is bonded to the ring structure such as benzene or phthalimide. The glycidyl group has one or two epoxy groups in the case of the amine glycidyl group and one epoxy group in the case of the ether glycidyl group. If the epoxy resin (D11) is contained in a small amount in the matrix resin, the improvement effect of the mechanical characteristics of the carbon fiber-reinforced composite material is hardly exerted. If e epoxy resin (D11) is contained in an excessively large amount, heat resistance is significantly impaired. As a result, the epoxy resin (D11) is preferably contained in an amount of 5 to 60% by mass in 100% by mass of the epoxy resin (D1). In the epoxy resin (D11), an epoxy resin (D111) having one epoxy group has a more excellent effect of strength development, whereas an epoxy resin (D112) having two epoxy groups has more excellent heat resistance. Therefore, when the epoxy resin (D111) having one epoxy group is used as the epoxy resin (D11), the epoxy resin (D111) is preferably contained in an amount of 5 to 40% by mass and more preferably 15 to 30% by mass in 100% of the epoxy resin (D1). When the epoxy resin (D112) having two epoxy groups is used as the epoxy resin (D11), the epoxy resin (D112) is preferably contained in an amount of 25 to 60% by mass and more preferably 30 to 50% by mass in 100% of the epoxy resin (D1).

Examples of the epoxy resin (D111) having one epoxy group include glycidylphthalimide, glycidyl-1,8-naphthalimide, glycidylcarbazole, glycidyl-3,6-dibromocarbazole, glycidylindole, glycidyl-4-acetoxyindole, glycidyl-3-methylindole, glycidyl-3-acetylindole, glycidyl-5-methoxy-2-methylindole, o-phenylphenyl glycidyl ether, p-phenylphenyl glycidyl ether, p-(3-methylphenyl)phenyl glycidyl ether, 2,6-dibenzylphenyl glycidyl ether, 2-benzylphenyl glycidyl ether, 2,6-diphenylphenyl glycidyl ether, 4-α-cumylphenyl glycidyl ether, o-phenoxyphenyl glycidyl ether, and p-phenoxyphenyl glycidyl ether.

The epoxy resin (D112) having two epoxy groups has a structure representing by General Formula (3):

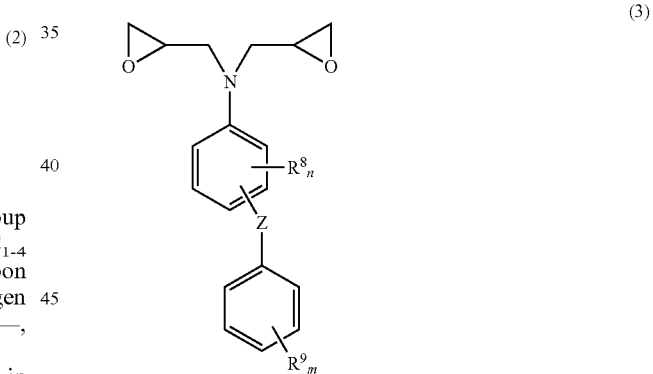

(3)

(in Formula (3), each of $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4 and m is an integer of 0 to 5; when a plurality of $R^8$s or $R^9$s exist, they may be the same or different; and Z represents one group selected from —O—, —S—, —CO—, —C(=O) O—, —SO$_2$—, and —C(=O)NH—). The epoxy resin composition is preferably include the epoxy resin (D112) having two epoxy groups in an amount of 25 to 60% by mass relative to 100% by mass of the total amount of the contained epoxy resin (D1).

The epoxy resin (D112) having two epoxy groups used in Third Embodiment may be the same as the epoxy resin (D112) having two epoxy groups used in First Embodiment.

Examples of the commercially available epoxy resin (D111) having one epoxy group include "Denacol (registered trademark)" Ex-731 (glycidylphthalimide, manufactured by Nagase ChemteX Corporation), OPP-G (o-phenylphenyl glycidyl ether, manufactured by SANKO CO., LTD.). Examples of the commercially available epoxy resin (D112) having two epoxy groups include PxGAN (diglycidyl-p-phenoxyaniline, manufactured by Toray Fine Chemicals Co., Ltd.).

The epoxy resin (D12) having three or more functional groups and used in Third Embodiment is a compound that includes three or more epoxy groups in one molecule or a compound that includes three or more functional groups in total of at least one epoxy group and functional groups other than the epoxy group. The epoxy resin (D12) having three or more functional groups is preferably a compound having three or more epoxy groups in one molecule. Examples of the epoxy resin (D12) having three or more functional groups include a glycidylamine epoxy resin and a glycidyl ether epoxy resin.

In the epoxy resin (D12) having three or more functional groups, the number of the functional groups is preferably 3 to 7 and more preferably 3 to 4. Excessive number of the functional groups causes embrittlement of the matrix resin after hardening and thus the impact resistance of the matrix resin may be impaired.

The epoxy resin (D12) used in Third Embodiment preferably has a structure of General Formula (4):

(4)

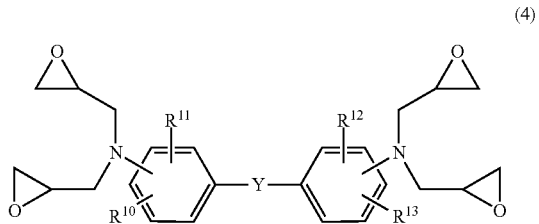

In Formula (4), $R^{10}$ to $R^{13}$ represent at least one group selected from the group consisting of a hydrogen atom, $C_{1-4}$ aliphatic hydrocarbon groups, an alicyclic hydrocarbon group having a carbon number of 4 or less, and halogen atoms. X represents one group selected from —O—, —S—, —CO—, —C(=O)O—, and —C(=O) NH—.

In Formula (4), when $R^{10}$, $R^{11}$, $R^{12}$, and $R^{13}$ have excessively large structure, the epoxy resin composition has excessively high viscosity and thus handling properties are impaired or compatibility to other components in the epoxy resin composition is impaired and thus the strength improvement effect may fail to be obtained. As a result, $R^{10}$, $R^{11}$, $R^{12}$, and $R^{13}$ are preferably at least one selected from the group consisting of a hydrogen atom, $C_{1-4}$ aliphatic hydrocarbon groups, an alicyclic hydrocarbon group having a carbon number of 4 or less, and halogen atoms.

In Formula (4), Y represents one group selected from —CH$_2$—, —O—, —S—, —CO—, —C(=O)O—, —SO$_2$—, and —C(=O) NH— and Y is preferably selected from —CH$_2$— or —O—. In Formula (4), when Y is —CH$_2$— or —O—, an epoxy resin hardened product to be produced obtains excellent elastic modulus. As a result, a carbon fiber-reinforced composite material having excellent mechanical characteristics such as tensile strength and compressive strength in tough environments such as a low temperature environment and a high humidity and temperature environment can be obtained.

In Formula (4), at least one of the diglycidylamino groups is preferably positioned at the meta position. At least one of the diglycidylamino groups positioned at the meta position allows the rigidity of the epoxy resin (D12) represented by General Formula (4) to increase and excellent elastic modulus of an epoxy resin hardened product to be produced to be imparted. As a result, the carbon fiber-reinforced composite material having the excellent mechanical characteristics such as the tensile strength and the compressive strength in tough environments such as a low temperature environment and a high humidity and temperature environment can be obtained When both diglycidylamino groups are positioned at the meta positions, higher elastic modulus can be imparted to the epoxy resin hardened product than the elastic modulus when at least one of the diglycidylamino groups are positioned at the meta position. As a result, the carbon fiber-reinforced composite material retaining the tensile strength at low temperature and having the excellent compressive strength at a high humidity and temperature environment can be obtained.

In Formula (4), positioning the diglycidylamino group at the meta position means that the diglycidylamino group is bonded at the carbon of the position 3 or the position 3' or the position 5 or the position 5' when the carbon on the benzene ring to which Y in General Formula (4) is bonded is defined as the position 1.

The epoxy resin (D12) may be the same as the epoxy resin (D12) used in First Embodiment.

If epoxy resin (D12) is contained in an excessively small amount in the epoxy resin composition in Third Embodiment, heat resistance is impaired. If epoxy resin (D12) is contained in an excessively large amount, cross-linking density is high and thus the material may be brittle, which may impair the impact resistance and the strength of the carbon fiber-reinforced composite material. The epoxy resin (D12) is preferably contained in an amount of 40 to 80% by mass and more preferably 50 to 70% by mass in 100% by mass of the epoxy resin (D1).

In the present invention, an epoxy resin other than the epoxy resin (D11) and the epoxy resin (D12) or a copolymer of an epoxy resin and a thermosetting resin may be contained as the epoxy resin (D1). Examples of the thermosetting resin used by copolymerized with the epoxy resin include unsaturated polyester resins, vinyl ester resins, epoxy resins, benzoxazine resins, phenol resins, urea resins, melamine resins, and polyimide resins. These resin compositions and compounds may be used singly or may be used by appropriately adding them. When at least the epoxy resin other than the epoxy resin (D11) and the epoxy resin (D12) is contained, the epoxy resin other than the epoxy resin (D11) and the epoxy resin (D12) satisfies both flowability and heat resistance after hardening of the matrix resin. In order to improve the flowability of the resin, an epoxy resin that is in a liquid state at room temperature (25° C.) is preferably used. Here, the liquid state is defined as follows. When a metal piece having a specific gravity of 7 or more in the same temperature state as a temperature state of a measured thermosetting resin is placed on the thermosetting resin and the metal piece is instantaneously buried, the thermosetting resin is defined as the liquid state.

Examples of the material of the metal piece having a specific gravity of 7 or more include iron (steel), cast iron, and copper. Addition of at least one epoxy resin in the liquid state and at least one epoxy resin in a solid state imparts a tuck property and a drape property of the prepreg. From the viewpoint of the tuck property and the drape property, the epoxy resin composition of the present invention preferably includes the liquid state epoxy resin including the epoxy resin (D11) and the epoxy resin (D12) in a total amount of 20% by mass or more relative to 100% by mass of the epoxy resin (D1).

The commercially available epoxy resin (D12) may exemplify the same as the epoxy resin (D12) in First Embodiment.

The epoxy resin composition of the present invention is preferably used by adding a compound (E1) represented by General Formula (2) as the latent hardener (E)

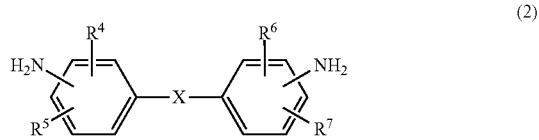

(2)

In Formula (2), X represents one group selected from —O—, —S—, —CO—, —C(=O)O—, and —C(=O)NH— and X is preferably —O—. In Formula (2), when X is —O—, an epoxy resin hardened product to be produced obtains excellent elastic modulus. As a result, a carbon fiber-reinforced composite material having excellent mechanical characteristics such as tensile strength and compressive strength in tough environments such as a low temperature environment and a high humidity and temperature environment can be obtained.

For the compound (E1) in Formula (2), at least one of the amino groups is preferably positioned at the meta position. At least one of the amino groups positioned at the meta position allows the rigidity of the compound (E1) represented by General Formula (2) to increase and excellent elastic modulus of an epoxy resin hardened product to be produced to be imparted. When both amino groups are positioned at the meta positions, higher elastic modulus can be imparted to the epoxy resin hardened product than the elastic modulus when at least one of the amino groups are positioned at the meta position. As a result, the carbon fiber-reinforced composite material having the excellent mechanical characteristics such as the tensile strength and the compressive strength in tough environments such as a low temperature environment and a high humidity and temperature environment can be obtained.

When both amino groups are positioned at the meta positions, higher elastic modulus can be imparted to the epoxy resin hardened product than the elastic modulus when at least one of the amino groups are positioned at the meta position. As a result, the carbon fiber-reinforced composite material retaining the tensile strength at a low temperature environment and having the excellent compressive strength at a high humidity and temperature environment can be obtained.

In Formula (2), positioning the amino group at the meta position means that the amino group is bonded at the carbon of the position 3 or the position 3' or the position 5 or the position 5' when the carbon on the benzene ring to which X in General Formula (2) is bonded is defined as the position 1.

In Third Embodiment, a combination of the epoxy resin (D12) having at least one diglycidylamino group positioned at the meta position and represented by General Formula (4) and the compound (E1) having at least one amino group positioned at the meta position and represented by Formula (2) is preferably contained and used from the viewpoint of the balance of the heat resistance, the elastic modulus and the toughness of an epoxy resin hardened product to be produced. A combination of the epoxy resin (D12) having two diglycidylamino groups positioned at the meta positions and represented by Formula (4) and the compound (E1) having two amino groups positioned at the meta positions and represented by Formula (2) is preferably contained and used from the viewpoint of further increasing elastic modulus of an epoxy resin hardened product to be produced while maintaining heat resistance and toughness. A prepreg made by impregnating the epoxy resin composition containing the above combination can impart a carbon fiber-reinforced composite material having excellent mechanical characteristics such as tensile strength and compressive strength in tough environments such as a low temperature environment and a high humidity and temperature environment.

The latent hardener (E) described here is a hardener for the epoxy resin (D1) contained in the epoxy resin composition of the present invention. The hardener is activated by heat application to react with an epoxy group, and the reaction is preferably activated at 70° C. or higher. Here, being activated at 70° C. means that a reaction initiation temperature is around 70° C. The reaction initiation temperature (hereinafter called activation temperature) can be determined by differential scanning calorimetry (DSC), for example. Specifically, to 100 parts by mass of a bisphenol A epoxy resin having an epoxy equivalent of about 184 to 194 g/eq., 10 parts by mass of a hardener to be evaluated is added to prepare an epoxy resin composition; the epoxy resin composition is analyzed by differential scanning calorimetry to give an exothermic curve obtained from differential scanning calorimetry analysis; and the temperature at the point of intersection of a tangent line at an inflection point of the exothermic curve with a tangent line of the base line is determined as the reaction initiation temperature.

The latent hardener (E) may be may compound (E1) represented by General Formula (2), and specific examples include 3,4'-diaminodiphenyl ether, 3,3'-diaminodiphenyl ether, 3,4'-diamino-2,2'-dimethyldiphenyl ether, 3,4'-diamino-2,2'-dibromodiphenyl ether, 3,4'-diamino-5-methyldiphenyl ether, 3,4'-diamino-2'-methyldiphenyl ether, 3,4'-diamino-3'-methyldiphenyl ether, 3,4'-diamino-5,2'-dimethyldiphenyl ether, 3,4'-diamino-5,3'-dimethyldiphenyl ether, 3,3'-diamino-5-methyldiphenyl ether, 3,3'-diamino-5,5'-dimethyldiphenyl ether, 3,3'-diamino-5,5'-dibromodiphenyl ether, 4,4'-diaminodiphenyl ether, 4,4'-diamino-2,2'-dimethyldiphenyl ether, 4,4'-diamino-2,2'-dibromodiphenyl ether, 4,4'-diamino-5-methyldiphenyl ether, 4,4'-diamino-2'-methyldiphenyl ether, 4,4'-diamino-3'-methyldiphenyl ether, 4,4'-diamino-5,2'-dimethyldiphenyl ether, 4,4'-diamino-5,3'-dimethyldiphenyl ether, 4,4'-diamino-5,5'-dimethyldiphenyl ether, 4,4'-diamino-5,5'-dibromodiphenyl ether, 3,4'-diaminodiphenyl thioether, 3,3'-diaminodiphenyl thioether, 3,4'-diamino-2,2'-dimethyldiphenyl thioether, 3,4'-diamino-2,2'-dibromodiphenyl thioether, 3,4'-diamino-5-methyldiphenyl thioether, 3,4'-diamino-2'-methyldiphenyl thioether, 3,4'-diamino-3'-methyldiphenyl thioether, 3,4'-diamino-5,2'-dimethyldiphenyl thioether, 3,4'-diamino-5,3'-dimethyldiphenyl thioether, 3,3'-diamino-5-methyldiphenyl thioether, 3,3'-diamino-5,5'-dimethyldiphenyl thioether, 3,3'-diamino-5,5'-dibromodiphenyl thioether, 4,4'-diaminodiphenyl thioether, 4,4'-diamino-2,2'-dimethyldiphenyl thioether, 4,4'-diamino-2,2'-dibromodiphenyl thioether, 4,4'-diamino-5-methyldiphenyl thioether, 4,4'-diamino-2'-methyldiphenyl thioether, 4,4'-diamino-3'-methyldiphenyl thioether, 4,4'-diamino-5,2'-dimethyldiphenyl thioether, 4,4'-diamino-5,3'-dimethyldiphenyl thioether, 4,4'-diamino-5,5'-dimethyldiphenyl thioether, 4,4'-diamino-5,5'-dibromodiphenyl thioether, 3,4'-aminobenzophenone, 3,3'-diaminobenzophenone, 3,4'-diamino-2,2'-dimethylbenzophenone, 3,4'-diamino-2,2'-dibromobenzophenone, 3,4'-diamino-5-methylbenzophenone, 3,4'-diamino-2'-methylbenzophenone, 3,4'-diamino-3'-methylbenzophenone, 3,4'-diamino-5,2'-dimethylbenzophenone, 3,4'-diamino-5,3'-dimethylbenzophenone, 3,3'-diamino-5-methylbenzophenone, 3,3'-diamino-5,5'-dimethylbenzophenone, 3,3'-diamino-5,5'-dibromobenzophenone, 4,4'-diaminobenzophenone, 4,4'-diamino-2,2'-dimethylbenzophenone, 4,4'-diamino-2,2'-dibromobenzophenone, 4,4'-diamino-5-methylbenzophenone, 4,4'-diamino-2'-methylbenzophenone, 4,4'-diamino-3'-methylbenzophenone, 4,4'-diamino-5,2'-dimethylbenzophenone, 4,4'-diamino-5,3'-dimethylbenzophenone, 4,4'-diamino-5,5'-dimethylbenzophenone, 4,4'-diamino-5,5'-dibromobenzophenone, 3,4'-diaminodiphenylamide, 3,3'-diaminodiphenylamide, 3,4'-diamino-2,2'-dimethyldiphenylamide, 3,4'-diamino-2,2'-dibromodiphenylamide, 3,4'-diamino-5-methyldiphenylamide, 3,4'-diamino-2'-methyldiphenylamide, 3,4'-diamino-3'-methyldiphenylamide, 3,4'-diamino-5,2'-dimethyldiphenylamide, 3,4'-diamino-5,3'-dimethyldiphenylamide, 3,3'-diamino-5-methyldiphenylamide, 3,3'-diamino-5,5'-dimethyldiphenylamide, 3,3'-diamino-5,5'-dibromodiphenylamide, 4,4'-diaminodiphenylamide, 4,4'-diamino-2,2'-dimethyldiphenylamide, 4,4'-diamino-2,2'-dibromodiphenylamide, 4,4'-diamino-5-methyldiphenylamide, 4,4'-diamino-2'-methyldiphenylamide, 4,4'-diamino-3'-methyldiphenylamide, 4,4'-diamino-5,2'-dimethyldiphenylamide, 4,4'-diamino-5,3'-dimethyldiphenylamide, 4,4'-diamino-5,5'-dimethyldiphenylamide, 4,4'-diamino-5,5'-dibromodiphenylamide, 3-aminophenyl-4-aminobenzoate, 3-aminophenyl-3-aminobenzoate, and 4-aminophenyl-4-aminobenzoate. These hardeners may be used singly or as a mixture of two or more of them.

Examples of the commercially available compound (E1) represented by General Formula (2) include 3,3'-diaminodiphenyl ether (manufactured by Chemical Soft R&D Inc.), 3,4'-diaminodiphenyl ether, 4,4'-diaminobenzophenone, 3,4'-diaminodiphenylamide, 4,4'-diaminodiphenylamide, and 4-aminophenyl-4-aminobenzoate (manufactured by Mitsui Fine Chemical Inc.).

As the hardener other than the compound (E1) represented by General Formula (2), amines such as alicyclic amines, phenol compounds, acid anhydrides, polyaminoamides, organic acid hydrazides, isocyanates, and dicyandiamide or a derivative thereof may be used in combination with the compound (E1) represented by Formula (2).

The preferred combination of the sizing agent of Third Embodiment and the compound (E1) represented by General Formula (2) is as below. The sizing agent and the compound (E1) represented by General Formula (2) are mixed so that the amine equivalent/epoxy equivalent rate of the sizing agent to be applied and the compound (E1) represented by General Formula (2) would be 0.9, and the glass transition point is determined immediately after the mixing and after storage in an environment at a temperature of 25° C. and a relative humidity of 60% for 20 days. A preferred combination of the sizing agent and the compound (E1) has an increase in glass transition point of the mixture by 25° C. or smaller after 20 days. When the combination having an increase in glass transition point by 25° C. or smaller is used to produce a prepreg, the reaction of the outer layer of the sizing agent with the inside of a matrix resin is suppressed, and this suppresses the deterioration of mechanical characteristics such as tensile strength of a carbon fiber-reinforced composite material produced after the prepreg is stored for a long period of time. Such a combination is thus preferred. The increase in glass transition point is more preferably 15° C. or smaller. The increase in glass transition point is even more preferably 10° C. or smaller. The glass transition point can be determined by differential scanning calorimetry (DSC).

The compound (E1) represented by General Formula (2) as a latent hardener is preferably contained in an amount of 20 to 70 parts by mass and more preferably 30 to 50 parts by mass relative to 100 parts by mass of the epoxy resin (D1) from the viewpoint of heat resistance and mechanical characteristics. If the compound (E1) represented by Formula (2) is contained in an amount of less than 20 part by mass, hardening of the hardened product is insufficient and thus the mechanical characteristics such as the tensile strength and the compressive strength of the carbon fiber-reinforced composite material in tough environments such as a low temperature environment and a high humidity and temperature environment may be deteriorated. If the compound (E1) represented by Formula (2) is contained in an amount of more than 70 part by mass, the cross-linking density of the epoxy resin hardened product is excessively high and thus the plastic deformability of the epoxy resin hardened product is insufficient, which may deteriorate the mechanical characteristics such as the tensile strength and the impact resistance of the carbon fiber-reinforced composite material.

The compounds (E1) represented by General Formula (2) are preferably contained in a total amount so as to give an amount of an active hydrogen group ranging from 0.6 to 1.2 equivalents and more preferably ranging from 0.7 to 0.9 equivalent relative to 1 equivalent of the epoxy group in epoxy resin (D1). Here, the active hydrogen group is a functional group that can react with the epoxy group of a hardener component. If the amount of an active hydrogen group is less than 0.6 equivalent, a hardened product may have insufficient reaction rate, heat resistance, and elastic modulus, and a carbon fiber-reinforced composite material to be produced may have insufficient heat resistance, tensile strength, and compressive strength. If the amount of an active hydrogen group is more than 1.2 equivalents, an epoxy resin hardened product has sufficient reaction rate, heat resistance, and elastic modulus but has insufficient plastic deformability, and thus a carbon fiber-reinforced composite material to be produced may have insufficient tensile strength and impact resistance.

A hardening accelerator may be added in order to accelerate the hardening.

Examples of the hardening accelerator include urea compounds, tertiary amines and salts thereof, imidazole and salts thereof, triphenylphosphine and derivatives thereof, metal carboxylates, and Lewis acids, Brønsted acids, and salts thereof. Among them, the urea compound is suitably used from the viewpoint of the balance between long-term storage stability and catalytic ability. In particular, the urea compound is preferably combined with the dicyandiamide as the latent hardener (E).

Examples of the urea compound include the same as the urea compound exemplified in First Embodiment.

The urea compound is preferably contained in an amount of 1 to 4 parts by mass relative to 100 parts by mass of the epoxy resin (D1). If the urea compound is contained in an amount of less than 1 part by mass, a reaction may insufficiently proceed to give the hardened product having insufficient elastic modulus and heat resistance. If the urea compound is contained in an amount of more than 4 parts by mass, the self-polymerization of an epoxy resin interferes with the reaction between the epoxy resin and the hardener, and thus the hardened product may have insufficient toughness or a lower elastic modulus.

In addition, the epoxy resin (D1) and the compound (E1) or a prereacted product of some of them may be contained in the epoxy resin composition. The technique may be effective in viscosity control or long-term storage stability improvement.

In Third Embodiment, the epoxy resin composition is suitably used by dissolving a thermoplastic resin (F3) into the epoxy resin composition. The same thermoplastic resin (F3) as in First Embodiment exemplified above can be used as the above thermoplastic resin (F3).

Better results may often be obtained when the thermoplastic resin (F3) is dissolved in the epoxy resin (D1) than when only the epoxy resin is used. The brittleness of the epoxy resin (D1) is compensated with the toughness of the thermoplastic resin (F3) and difficulty in molding of the thermoplastic resin (F3) is compensated with moldability of the epoxy resin (D1). This imparts a well-balanced base resin. From the viewpoint of the balance, the thermoplastic resin (F3) is preferably contained in a ratio (% by mass) of 1 to 40% by mass, more preferably 5 to 30% by mass, and even more preferably 8 to 20% by mass relative to 100% by mass of the epoxy resin composition as a contained ratio of the epoxy resin (D1) and the thermoplastic resin (F3). If the thermoplastic resin (F3) is contained in an excessively large amount, the viscosity of the epoxy resin composition increases and thus production processability and handling properties of the epoxy resin composition and the prepreg may be impaired. If thermoplastic resin (F3) is contained in an excessively small amount, the toughness of the epoxy resin hardened product is insufficient and thus the tensile strength and the impact resistance of a carbon fiber-reinforced composite material to be produced may be insufficient.

Preferable usable examples of the combination of the epoxy resin (D1) and the thermoplastic resin (F3) of Third Embodiment include the combination of the epoxy resin (D12) represented by General Formula (4) having excellent heat resistance and adhesion to carbon fibers and polyethersulfone having excellent heat resistance and toughness because a hardened product to be produced has high heat resistance and toughness. In particular, when the combination of the epoxy resin (D12) represented by Formula (2) and having an average epoxy equivalent of 100 to 115 g/eq. and polyethersulfone having an average molecular weight of 15,000 to 30,000 g/mol is used, a large amount of polyethersulfone having high heat resistance can be dissolved in the epoxy resin (D12) represented by Formula (4) and thus high toughness can be imparted to the hardened product without deteriorating the heat resistance and high tensile strength can be imparted to the carbon fiber-reinforced composite material with retaining the heat resistance and the impact resistance.

In the epoxy resin composition used in Third Embodiment, a method of uniformly heating and kneading components (constituents) such as the epoxy resin (D1) other than the compound (E1) represented by General Formula (2) as latent hardener at about 140 to about 170° C., cooling the mixture to about 60° C., and adding the compound (E1) and kneading the resultant mixture is preferable. However, a method for adding each component is not limited to this method.

To the epoxy resin composition used in Third Embodiment, thermoplastic resin particles (F7) can also be preferably added. By addition of the thermoplastic resin particles (F7), the toughness of the matrix resin improves and impact resistance of the matrix resin improves when carbon fiber-reinforced composite material is formed.

Usable examples of the material of the thermoplastic resin particles (F7) in Third Embodiment include the same as the material of the thermoplastic resin particles (F5) in First Embodiment exemplified above. Usable examples of the shape of the thermoplastic resin particles (F7) include the same as the shape of the thermoplastic resin particles (F5) in First Embodiment exemplified above. Examples of the commercially available polyamide particles include SP-500, SP-10, TR-1, TR-2, 842P-48, and 842P-80 (manufactured by Toray Industries Inc.), "TORAYPEARL (registered trademark)" TN (manufactured by Toray Industries Inc.), and "Orgasol (registered trademark)" 1002D, 2001UD, 2001EXD, 2002D, 1702D, 3501D, and 3502D (manufactured by Arkema Inc.).

The epoxy resin composition used in Third Embodiment can contain coupling agents, conductive particles such as carbon particles and metal-plated organic particles, thermosetting resin particles, rubber particles such as cross-linked rubber particles and core-shell rubber particles obtained by graft polymerization of the surface of cross-linked rubber particles with a different polymer, inorganic fillers such as silica gel, nano silica, and clay, and conductive fillers to an extent not impairing the effect of the present invention. The conductive particles and the conductive fillers are preferably used because the conductivity of a resin hardened product and a carbon fiber-reinforced composite material to be produced can be improved.

The same the conductive fillers used in First Embodiment is suitably used as the conductive fillers.

The epoxy resin used in Third Embodiment containing the above materials in the predetermined ratio can impart a prepreg having excellent mechanical characteristics such as tensile strength and compressive strength in tough environments such as a low temperature environment and a high humidity and temperature environment, having excellent adhesion between the epoxy resin composition and carbon fibers, and suppressing reduction in mechanical characteristics during a long-term storage.

The prepreg of Third Embodiment is prepared by impregnating sizing agent-coated carbon fiber bundles with an epoxy resin composition as a matrix resin. The prepreg can be prepared, for example, by a wet method of dissolving a matrix resin in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat application or a method of once preparing a coating film of a matrix resin composition on a release paper or the like, next superimposing the film on each side or one side of sizing agent-coated carbon fiber bundles, and applying heat and pressure to the film to impregnate the sizing agent-coated carbon fiber bundles with the matrix resin. The hot melting method is preferred because no solvent remains in the prepreg.

The method for forming a carbon fiber-reinforced composite material by using the prepreg of Third Embodiment is exemplified by a method of stacking prepregs and thermally hardening a matrix resin while applying pressure to the laminate.

Examples of the method of applying heat and pressure include a press molding method, an autoclave molding method, a bagging molding method, a wrapping tape method, and an internal pressure molding method. To specifically produce sporting goods, the wrapping tape method and the internal pressure molding method are preferably employed. For aircraft application necessitating a high quality and high performance carbon fiber-reinforced composite material, the autoclave molding is preferably employed. To produce various vehicle exteriors, the press molding is preferably employed.

The prepreg of Third Embodiment preferably has a carbon fiber mass fraction of 40 to 90% by mass and more preferably 50 to 80% by mass. A prepreg having an excessively low carbon fiber mass fraction yields a carbon fiber-reinforced composite material having an excess mass, and this may impair excellent specific strength and specific modulus that are advantages of a carbon fiber reinforced fiber reinforced composite material. A prepreg having an excessively high carbon fiber mass fraction causes poor impregnation of an epoxy resin composition, and a carbon fiber-reinforced composite material to be produced is likely to contain many voids, which may greatly deteriorate mechanical characteristics of the carbon fiber-reinforced composite material.

The prepreg of Third Embodiment is preferably has a structure in which a layer containing the thermoplastic resin particle (F7) in a high concentration, that is, a layer in which existence of localized thermoplastic resin particles (F7) is clearly ascertained when the cross section of the prepreg is observed (hereinafter, may be called a particle layer) is formed in a part near the surface of the prepreg.

Such a structure easily form a resin layer between the prepreg layers, that is, carbon fiber-reinforced composite material layers when the prepregs are stacked and the epoxy resin is hardened to form the carbon fiber-reinforced composite material. This improves adhesion of the carbon fiber-reinforced composite material layers each other and a carbon fiber-reinforced composite material to be produced exerts high level impact resistance.

Based on this viewpoint, the particle layer may be the same as the particle layer of the thermoplastic resin particles (F5) in First Embodiment exemplified above.

The existence rate of the thermoplastic resin particles (F7) in the particle layer may be the same as the existence ratio of the thermoplastic resin particles (F5) in First Embodiment exemplified above.

Determination of the existence ratio of the thermoplastic resin particles (F7) can refer to the evaluation method of the existence ratio of the thermoplastic resin particles (F3) in First Embodiment.

In addition to the method of producing the carbon fiber-reinforced composite material by using the prepregs, examples of the method of producing the carbon fiber-reinforced composite material in Third Embodiment include the same as the methods in First Embodiment, which are appropriately selected and applied depending on a purpose.

Any of the molding method can be employed to produce the carbon fiber-reinforced composite material containing the sizing agent-coated carbon fibers and the hardened product of the epoxy resin composition.

The carbon fiber-reinforced composite material in Third Embodiment is preferably used for aircraft structural members and the same as the applications in First Embodiment.

Fourth Embodiment 4

The prepreg pertaining to Fourth Embodiment includes sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy at a photoelectron takeoff angle of 15°. The thermosetting resin composition at least contains an epoxy resin (D1), a latent hardener (E), and at least one block copolymer (F2) selected from the group consisting of S-B-M, B-M, and M-B-M. The blocks in the block copolymer (F2) are linked through a covalent bond or linked through covalent bonds with an intermediate molecule having any chemical structure interposed therebetween. The block M is a homopolymer of methyl methacrylate or a copolymer containing methyl methacrylate in an amount of at least 50% by mass; the block B is incompatible with the block M and has a glass transition temperature of 20° C. or lower; and the block S is incompatible with the blocks B and M and has a glass transition temperature higher than that of the block B.

Fiber-reinforced composite materials including reinforced fibers such as carbon fibers and aramid fibers have high specific strength and high specific modulus and thus have been used as structural materials for aircrafts, automobiles, and other products and for sporting goods and other general industrial applications, such as tennis rackets, golf shafts, and fishing rods. The method for producing such fiber-reinforced composite materials commonly uses a prepreg that is a sheet-like intermediate base material prepared by impregnating reinforced fibers with an unhardened matrix resin such as a thermosetting resin and an energy ray hardening resin. The matrix resin used for the prepreg is typically an epoxy resin in terms of processability and handleability.

The matrix resin composed of an epoxy resin exhibits excellent heat resistance and good mechanical characteristics, whereas the epoxy resin has poor elongation and/or toughness in comparison with thermoplastic resins, and thus is used to produce a carbon fiber-reinforced composite material, which may have poor interlaminar toughness or impact resistance. Such an epoxy resin is required to be improved.

To improve the toughness of the epoxy resin, a method of adding a component having excellent toughness, such as a rubber or a thermoplastic resin has been attempted. For example, the addition of a rubber such as terminal-carboxylated acrylonitrile-butadiene rubber to the epoxy resin has been studied since the 1970's and is a well-known technique. However, the rubber has significantly lower elastic modulus, glass transition temperature, and other mechanical characteristics than those of the epoxy resin, and thus a mixture of the epoxy resin with the rubber has a lower elastic modulus and a lower glass transition temperature. Hence, it is difficult to achieve a balance between an improvement of the toughness and the elastic modulus and glass transition temperature. When a particulate rubber such as a core-shell rubber is added to the epoxy resin in order to overcome the drawbacks, an increase in amount of the core-shell rubber to sufficiently enhance the toughness may lower the elastic modulus or the glass transition temperature.

As the method of adding the thermoplastic resin to the epoxy resin, Japanese Examined Patent Application Publication No. 06-43508 discloses a technique of dissolving a thermoplastic resin such as polyethersulfone, polysulfone, and polyetherimide or adding such a thermoplastic resin as fine powder, in an epoxy resin to uniformly disperse the thermoplastic resin in the epoxy resin, thereby improving the toughness without deteriorating the mechanical characteristics of the epoxy resin. The method unfortunately requires that a large amount of the thermoplastic resin is added to the epoxy resin. The addition of a large amount of the thermoplastic resin greatly increases the viscosity of the epoxy resin, and may cause problems in processability and handleability of the epoxy resin.

In recent years, an improvement in toughness and impact resistance of the epoxy resin has been studied by using a block copolymer composed of two blocks or three blocks. For example, Japanese National Publication of International Patent Application No. 2003-535181 and International Publication WO 2006/077153 disclose a method for improving the toughness of an epoxy resin by using a styrene-butadiene-methacrylic acid copolymer or a butadiene-methacrylic acid copolymer. In the method, a combination of a bisphenol A epoxy resin that is liquid at room temperature, as an epoxy resin, and 4,4'-methylenebis(3-chloro-2,6-diethylaniline), as a hardener, is ascertained to achieve an improvement in the toughness of the epoxy resin, and the reduction of the heat resistance is suppressed to several to less than twenty degrees Celsius. However, the improvement effect on the toughness of an epoxy resin remains insufficient.

Fourth Embodiment can provide a prepreg and a carbon fiber-reinforced composite material having excellent adhesiveness between a matrix resin and carbon fibers, undergoing a small change with time during storage, and also having excellent interlaminar toughness.

The sizing agent used in the prepreg of Fourth Embodiment at least includes an aliphatic epoxy compound (A) and an aromatic epoxy compound (B1) as an aromatic compound (B). In the prepreg of Fourth Embodiment, the aliphatic epoxy compound (A) and the aromatic epoxy compound (B1) as the aromatic compound (B) are the same as the compounds in First Embodiment and thus description of the compounds is omitted. The carbon fibers used and the sizing agent-coated carbon fibers formed by coating the carbon fibers with the sizing agent can also refer to the description on First Embodiment.

Next, a prepreg and a carbon fiber-reinforced composite material in Fourth Embodiment will be described in detail.

In Fourth Embodiment, the prepreg includes the sizing agent-coated carbon fibers described in First Embodiment and a thermosetting resin described below as a matrix resin.

A thermosetting resin composition used in Fourth Embodiment includes the epoxy resin (D1), the latent hardener (E), and at least one block copolymer (F2) selected from the group consisting of S-B-M, B-M, and M-B-M. Each block in the block copolymer (F2) may be linked with a covalent bond or linked with a covalent bond through an intermediary molecule having some chemical structures and each block has the following characteristics. The block M is a methyl methacrylate homopolymer or a copolymer containing at least 50% by mass of methyl methacrylate. The block B is incompatible to the block M and has a glass transition temperature of 20° C. or lower. The block S is incompatible to the block B and the block M and has a higher glass transition temperature than that of the block B.

The epoxy resin (D1) in Fourth Embodiment preferably contains a bisphenol epoxy resin (D16). The bisphenol epoxy resin (D16) improves the compatibility between the other epoxy resin (D1) in the thermosetting resin composition and the block copolymer (F2) described below and imparts toughness to the thermosetting resin composition. Such a bisphenol epoxy resin (D16) is thus a preferable component.

The bisphenol epoxy resin (D16) is obtained by reacting bisphenol A, bisphenol F, bisphenol AD, bisphenol S, or halogenated or alkyl-substituted products of these bisphenol compounds as a raw material, or a compound made by the condensation polymerization of these bisphenol compounds as a raw material with epichlorohydrin. The bisphenol epoxy resin may be used singly or as a mixture of different bisphenol epoxy resins.

The bisphenol epoxy resin (D16) having a molecular weight in a range from 600 to 10,000 g/mol is preferably used. The molecular weight is more preferably in a range from 700 to 3000 g/mol and even more preferably in a range from 800 to 2000 g/mol. The bisphenol epoxy resin (D16) having a molecular weight of less than 600 g/mol results in insufficient compatibility because the number of repeating units is low. This insufficient compatibility may cause coarse phase separation of the block copolymer (F2) and thus the toughness of the resin is difficult to be reflected to the mechanical characteristics. The bisphenol epoxy resin (D16) having a molecular weight of more than 10,000 g/mol deteriorates workability because the viscosity of the thermosetting resin composition is high. Here, the molecular weight in the present invention means a number average molecular weight determined by gel permeation chromatography. Examples of a method for measuring the number average molecular weight include a method of preparing two "Shodex (registered trademark)" 80M (manufactured by Showa Denko K.K.) and one "Shodex (registered trademark)" 802 (manufactured by Showa Denko K.K.) as columns, injecting a sample of 0.3 µL, measuring the retention time of the sample measured at a flow rate of 1 mL/min, and determining a molecular weight by converting the retention time to the molecular weight using the retention time of a polystyrene sample for calibration. When a plurality of peaks are observed in the measurement by the liquid chromatography, the target components are separated and the molecular weight of each peak can be converted.

The bisphenol epoxy resin (D16) is preferably contained in an amount of 40 to 90% by mass in the total epoxy resins (D1). The bisphenol epoxy resin (D16) is more preferably contained in an amount of 50 to 80% by mass and even more preferably in an amount of 55 to 75% by mass. If the bisphenol epoxy resin (D16) is contained in an amount of less than 40% by mass, the compatibility of the block copolymer (F2) is insufficient and thus the block copolymer (F2) forms coarse phase separation in the hardened product. This phase separation may result in the insufficient interlayer toughness of the carbon fiber-reinforced composite material. If the bisphenol epoxy resin (D16) is contained in an amount of more than 90% by mass, the elastic modulus of the hardened product is insufficient and the mechanical characteristics of the carbon fiber-reinforced composite material may be insufficient.

The bisphenol epoxy resin (D16) is preferably contained in an amount of 40 to 90% by mass in the total epoxy resin (D1). In this amount of 40 to 90% by mass, a bisphenol F epoxy resin is preferably contained in an amount of 20 to 90% by mass, more preferably in an amount of 28 to 90% by mass, and even more preferably in an amount of 36 to 90% by mass. This can significantly improve elastic modulus by a synergistic effect with an amine epoxy resin. If the bisphenol F epoxy resin is contained in an amount of less than 20%, the elastic modulus improvement of the hardened product is insufficient and thus the mechanical characteristics of the carbon fiber-reinforced composite material may be insufficient.

Examples of the commercially available bisphenol A epoxy resin described above include "jER (registered trademark)" 825, "jER (registered trademark)" 826, "jER (registered trademark)" 827, "jER (registered trademark)" 828, and "jER (registered trademark)" 834 (manufactured by Mitsubishi Chemical Corporation), "EPICLON (registered trademark)" 850 (manufactured by DIC Corporation), "EPOTOHTO (registered trademark)" YD-128 (manufactured by Tohto Kasei Co., Ltd.), DER-331 and DER-332 (manufactured by Dow Chemical Japan Ltd.), "ARALDITE (registered trademark)" LY556 (manufactured by Huntsman Advanced Materials), and "jER (registered trademark)" 1001, "jER (registered trademark)" 1002, "jER (registered trademark)" 1003, "jER (registered trademark)" 1004, "jER (registered trademark)" 1004AF, "jER (registered trademark)" 1007, and "jER (registered trademark)" 1009 (manufactured by Mitsubishi Chemical Corporation). Examples of the brominated bisphenol A epoxy resin include "jER (registered trademark)" 5050, "jER (registered trademark)" 5054, and "jER (registered trademark)" 5057 (manufactured by Mitsubishi Chemical Corporation).

Examples of the commercially available bisphenol F epoxy resin described above include "jER (registered trademark)" 806, "jER (registered trademark)" 807, and "jER (registered trademark)" 1750 (manufactured by Mitsubishi Chemical Corporation), "EPICLON (registered trademark)" 830 (manufactured by DIC Corporation), "EPOTOHTO (registered trademark)" YD-170 and "EPOTOHTO (registered trademark)" YD-175 (manufactured by Tohto Kasei Co., Ltd.), "jER (registered trademark)" 4002, "jER (registered trademark)" 4004P, "jER (registered trademark)" 4007P, and "jER (registered trademark)" 4009P (manufactured by Mitsubishi Chemical Corporation), and "EPOTOHTO (registered trademark)" YDF2001 and "EPOTOHTO (registered trademark)" YDF2004 (manufactured by Tohto Kasei Co., Ltd.). Examples of the tetramethyl bisphenol F epoxy resin include YSLV-80XY (manufactured by Nippon Steel Chemical Co., Ltd.).

Examples of the bisphenol S epoxy resin include "EPICLON (registered trademark)" EXA-1514 (manufactured by DIC Corporation).

The epoxy resin (D1) in Fourth Embodiment also preferably contains an amine epoxy resin (D17) in order to improve the elastic modulus and the heat resistance of the thermosetting resin hardened product. The amine epoxy resin (D17) is an epoxy resin having at least one amino group to which at least two glycidyl group are bonded in a molecule. The amine epoxy resin (D17) is preferably contained in an amount of 10 to 60% by mass, more preferably in an amount of 20 to 50% by mass, and even more preferably in an amount of 25 to 45% by mass in the total epoxy resin (D1). If the amine epoxy resin (D17) is contained in an amount of less than 10% by mass, the elastic modulus of the hardened product is insufficient and thus the mechanical characteristics of the carbon fiber-reinforced composite material may be insufficient. If the amine epoxy resin (D17) is contained in an amount of more than 60% by mass, the plastic deformability of the hardened product is insufficient and thus the interlayer toughness of the carbon fiber-reinforced composite material may be insufficient. A combination use of the amine epoxy resin (D17) and the block copolymer (F2) may improve the toughness while maintaining the heat resistance and the elastic modulus of the hardened product.

In the epoxy resin (D1) in Fourth Embodiment, the combination use of the amine epoxy resin (D17) in addition to the bisphenol epoxy resin (D16) is preferable from the viewpoint of the balance of the toughness, the elastic modulus, and the heat resistance of the thermosetting resin hardened product. When the amine epoxy resin (D17) is contained in addition to the bisphenol epoxy resin (D16), the bisphenol epoxy resin (D16) is preferably contained in an amount of 40 to 90% by mass and the amine epoxy resin (D17) is preferably contained in an amount of 10 to 60% by mass in the total epoxy resin (D1).

Examples of the amine epoxy resin (D17) include tetraglycidyldiaminodiphenylmethane, tetraglycidyldiaminodiphenylsulfone, tetraglycidyldiaminodiphenyl ether, triglycidylaminophenol, triglycidylaminocresol, diglycidylaniline, diglycidyltoluidine, tetraglycidylxylylenediamine, and halogenated, alkyl-substituted, and hydrogenated products of them.

Examples of the commercially available tetraglycidyldiaminodiphenylmethane include "SUMI-EPDXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, and MY725 (manufactured by Huntsman Advanced Materials).

Examples of the commercially available triglycidylaminophenol or triglycidylaminocresol include "SUMI-EPDXY (registered trademark)" ELM100 and ELM120 (manufactured by Sumitomo Chemical Co., Ltd.), "Araldite (registered trademark)" MY0500, MY0510, MY0600, and MY0610 (manufactured by Huntsman Advanced Materials), and "jER (registered trademark)" 630 (manufactured by Mitsubishi Chemical Corporation).

Examples of the commercially available tetraglycidylxylylenediamine and hydrogenated products thereof include "TETRAD (registered trademark)"-X and "TETRAD (registered trademark)"-C (manufactured by Mitsubishi Gas Chemical Company).

Examples of the commercially available tetraglycidyldiaminodiphenylsulfone include TG4DAS and TG3DAS (manufactured by Mitsui Fine Chemical Inc.).

Examples of diglycidylaniline include GAN (manufactured by Nippon Kayaku Co., Ltd.). Examples of diglycidyltoluidine include GOT (manufactured by Nippon Kayaku Co., Ltd.).

The amine epoxy resin (D17) in Fourth Embodiment preferably has a reaction initiation temperature ($T_0$) ranging from 130 to 150° C. and more preferably ranging from 135 to 145° C. determined by differential scanning calorimetry (DSC). Here, $T_0$ is an exothermic onset temperature determined by measuring the temperature rise of a sample made by adding one equivalent of dicyandiamide (hereinafter may be called DICY) in a stoichiometric amount as a hardener and further adding 3-(3,4-dichlorophenyl)-1,1-dimethylurea (DCMU) in an amount of 3 parts by mass relative to 100 parts by mass of the epoxy resin (D1) at a temperature rising rate of 10° C./min. In order to calculate an added amount of dicyandiamide, the calculation should be carried out by defining the active hydrogen equivalent of dicyandiamide as 12 g/eq.

The exothermic onset temperature means a temperature at which the DSC curve is left from the base line. This temperature should be determined from a temperature at which the slope of a tangent line of the DSC curve reaches to 1/10 of the slope of the tangent line at an inflection point where the slope has a positive value in a hardening exothermic peak. Although a detail mechanism is unclear, addition of the amine epoxy resin (D17) having $T_0$ in this range improves the compatibility of the block copolymer (F2) and the phase separation size (the size of a phase separation structure) of the block copolymer (F2) in the hardened product is finer. Such a structure further improves the interlayer toughness of the carbon fiber-reinforced composite material. IF $T_0$ is less than 130° C., the phase separation tends to be larger and the toughness and the plastic deformability of the hardened product and the interlayer toughness of the carbon fiber-reinforced composite material may be insufficient. If $T_0$ is more than 150° C., the hardening reaction may be incomplete and thus a brittle carbon fiber-reinforced composite material may be produced.

An amine epoxy resin having a structure of General Formula (3):

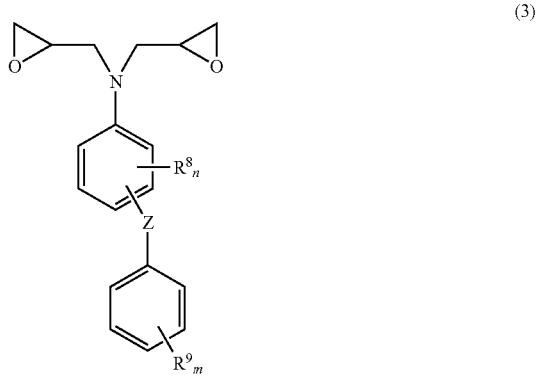

(3)

(in Formula (3), each of $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group; n is an integer of 0 to 4 and m is an integer of 0 to 5; when a plurality of $R^8$s or $R^9$s exist, they may be the same or different; and Z represents one group selected from —O—, —S—, —CO—, —C(=O)O—, and —SO$^2$—) can be preferably used as the amine epoxy resin (D17).

Examples of amine epoxy resin (D17) having a structure of General Formula (3) include N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. These resins can be typically obtained by addition of epichlorohydrin to a phenoxyaniline derivative and cyclization of the epichlorohydrin adduct with an alkali compound. The resin having a higher molecular weight has a higher viscosity, and thus N,N-diglycidyl-4-phenoxyaniline in which both $R^8$ and $R^9$ in Formula (3) are hydrogens is particularly preferably used from the viewpoint of handling properties.

Examples of the phenoxyaniline derivative specifically include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphtyloxyphenoxy)aniline, 4-(1-naphtyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy) aniline.

A method for producing the amine epoxy resin (D17) having a structure of General Formula (3) is the same as the method for producing the epoxy resin (D112) in First Embodiment.

Examples of the commercially available amine epoxy resin (D17) having the structure of General Formula (3) include PxGAN (diglycidyl-p-phenoxyaniline, manufactured by Toray Fine Chemicals Co., Ltd.).

In order to improve workability by adjusting the viscoelasticity at an unhardened state of the epoxy resin (D1) or to improve the elastic modulus and the heat resistance of the thermosetting resin hardened product, an epoxy resin other than the bisphenol epoxy resin (D16) and the amine epoxy resin (D17) can be added to the epoxy resin (D1) of Fourth Embodiment. The epoxy resin other than the bisphenol epoxy resin (D16) and the amine epoxy resin (D17) can be added not only singly but also in combination of a plurality of epoxy resins.

Examples of the epoxy resin other than the epoxy resins (D16) and (D17) include resorcinol epoxy resins, phenol novolac epoxy resins, cresol novolac epoxy resins, phenol aralkyl epoxy resins, dicyclopentadiene epoxy resins, epoxy resins having a biphenyl skeleton, and urethane and isocyanate modified epoxy resins.

Specific examples of the resorcinol epoxy resin include "Denacol (registered trademark)" EX-201 (manufactured by Nagase ChemteX Corporation).

Examples of the commercially available phenol novolac epoxy resin include "jER (registered trademark)" 152 and "jER (registered trademark)" 154 (manufactured by Mitsubishi Chemical Corporation) and "EPICLON (registered trademark)" N-740, "EPICLON (registered trademark)" N-770, and "EPICLON (registered trademark)" N-775 (manufactured by DIC Corporation).

Examples of the commercially available cresol novolac epoxy resin include "EPICLON (registered trademark)" N-660, "EPICLON (registered trademark)" N-665, "EPICLON (registered trademark)" N-670, "EPICLON (registered trademark)" N-673, and "EPICLON (registered trademark)" N-695 (manufactured by DIC Corporation) and EOCN-1020, EOCN-102S, and EOCN-104S (manufactured by Nippon Kayaku Co., Ltd.).

Examples of the commercially available phenol aralkyl epoxy resin include NC-2000 (manufactured by Nippon Kayaku Co., Ltd.).

Examples of the commercially available dicyclopentadiene epoxy resin include "EPICLON (registered trademark)" HP7200, "EPICLON (registered trademark)" HP7200L, and "EPICLON (registered trademark)" HP7200H (manufactured by Dainippon Ink and Chemicals, Inc.), Tactix 558 (manufactured by Huntsman Advanced Materials), and XD-1000-1L and XD-1000-2L (manufactured by Nippon Kayaku Co., Ltd.).

Examples of the commercially available epoxy compound having a biphenyl skeleton include "jER (registered trademark)" YX4000H, EPIKOTE YX4000, and EPIKOTE YL6616 (manufactured by Japan Epoxy Resin Co., Ltd.), and NC-3000 (manufactured by Nippon Kayaku Co., Ltd.).

Examples of the commercially available urethane and isocyanate-modified epoxy resin include AER4152 (manufactured by Asahi Kasei Epoxy Co., Ltd.) and ACR1348 (manufactured by ADEKA), which have an oxazolidone ring.

These epoxy resins other than the epoxy resins (D16) and (D17) components are preferably contained in an amount of 10 to 90% by mass in the epoxy resin (D1). If the epoxy resin is contained in an amount of more than 90% by mass, the compatibility of the block copolymer (F2) may be deteriorated.

The thermosetting resin composition of Fourth Embodiment is used by adding the latent hardener (E). The latent hardener (E) described here is a hardener for the epoxy resin (D1) contained in the thermosetting resin composition of the present invention. The hardener is activated by heat application to react with an epoxy group, and the reaction is preferably activated at 70° C. or higher. Here, being activated at 70° C. means that a reaction initiation temperature is around 70° C. The reaction initiation temperature (hereinafter called activation temperature) can be determined by differential scanning calorimetry (DSC), for example. Specifically, to 100 parts by mass of a bisphenol A epoxy compound having an epoxy equivalent of about 184 to 194 g/eq., 10 parts by mass of a hardener to be evaluated is added to prepare a thermosetting resin composition; the thermosetting resin composition is analyzed by differential scanning calorimetry to give an exothermic curve; and the temperature at the point of intersection of a tangent line at an inflection point of the exothermic curve with a tangent line of the base line is determined as the reaction initiation temperature.

The latent hardener (E) is preferably an aromatic amine hardener (E2) or dicyandiamide or a derivative thereof (E3). The aromatic amine hardener (E2) may be any aromatic amines that are used as the epoxy resin hardener, and specifically, the same as the aromatic amine hardener (E2) in First Embodiment exemplified above can be used.

Usable examples of the commercially available aromatic amine hardener (E2) include the same as the commercially available aromatic amine hardener (E2) in First Embodiment exemplified above.

Usable examples of dicyandiamide or the derivative thereof (E3) include the same as dicyandiamide or the derivative thereof (E3) in First Embodiment exemplified above.

Examples of the commercially available dicyandiamide include DICY-7 and DICY-15 (manufactured by Japan Epoxy Resin Co., Ltd.).

Dicyandiamide or a derivative thereof (E3) is preferably contained in an amount of 1 to 10 parts by mass and more preferably 2 to 8 parts by mass relative to 100 parts by mass of the epoxy resin (D1) from the viewpoint of heat resistance and mechanical characteristics. If dicyandiamide or the derivative thereof (E3) is contained in an amount of less than 1 part by mass, the plastic deformability of the hardened product is insufficient and thus the interlayer toughness of the carbon fiber-reinforced composite material nay be insufficient. If dicyandiamide or the derivative thereof (E3) is contained in an amount of more than 10 part by mass, the block copolymer (F2) forms coarse phase separation and thus the interlayer toughness of the carbon fiber-reinforced composite material may be insufficient. Addition of powdered dicyandiamide or the derivative thereof (E3) to the resin is preferable from the viewpoint of long-term storage stability at room temperature and viscosity stability at the time of prepreg formation. When dicyandiamide or the derivative thereof (E3) is used as powder, the average particle diameter thereof is preferably 10 µm or less and even more preferably 7 µm or less. If the average particle diameter is larger than 10 µm, the powered dicyandiamide or the derivative thereof (E3) is not permeated into carbon fiber bundles and may remain at the surface layer of the carbon fiber bundles at the time of impregnation of the resin composition into the carbon fiber bundles by heating and pressurization when the powdered dicyandiamide or the derivative thereof (E3) is used for, for example, a prepreg application.

As the hardener other than the above described hardener, amines such as alicyclic amines, phenol compounds, acid anhydrides, polyaminoamides, organic acid hydrazides, and isocyanates may be used in combination with the aromatic amine hardener (E2), dicyandiamide or the derivative thereof (E3).

The hardeners are preferably contained in a total amount so as to give an amount of an active hydrogen group ranging from 0.6 to 1.2 equivalents and more preferably ranging from 0.7 to 0.9 equivalent relative to 1 equivalent of the epoxy group in the epoxy resin (D1) components. Here, the active hydrogen group is a functional group that can react with the epoxy group of a hardener component. If the active hydrogen group is contained in an amount of less than 0.6 equivalent, a hardened product may have insufficient reaction rate, heat resistance, and elastic modulus, and a carbon fiber-reinforced composite material to be produced may have insufficient glass transition temperature and strength. If the active hydrogen group is contained in an amount of more than 1.2 equivalents, a hardened product has sufficient reaction rate, glass transition temperature, and elastic modulus but has insufficient plastic deformability, and thus a carbon fiber-reinforced composite material to be produced may have insufficient interlayer toughness.

A hardening accelerator may be added in order to accelerate the hardening.

Examples of the hardening accelerator include urea compounds, tertiary amines and salts thereof, imidazole and salts thereof, triphenylphosphine and derivatives thereof, metal carboxylates, and Lewis acids, Brønsted acids, and salts thereof. Among them, the urea compound is suitably used from the viewpoint of the balance between long-term storage stability and catalytic ability. In particular, the urea compound is preferably combined with the dicyandiamide as the latent hardener (E).

Examples of the urea compound include the same as the urea compound exemplified in First Embodiment.

The urea compound is preferably contained in an amount of 1 to 4 parts by mass relative to 100 parts by mass of the epoxy resin (D1). If the urea compound is contained in an amount of less than 1 part by mass, a reaction may insufficiently proceed to give the hardened product having insufficient elastic modulus and heat resistance. If the urea compound is contained in an amount of more than 4 parts by mass, the self-polymerization of an epoxy compound interferes with the reaction between the epoxy compound and the hardener, and thus the hardened product may have insufficient toughness or lower elastic modulus.

In addition, the epoxy resin (D1) and the hardener or a prereacted product of some of them may be contained in the composition. The technique may be effective in viscosity control or long-term storage stability improvement.

The thermosetting resin composition of Fourth Embodiment includes at least one block copolymer (F2) selected from the group consisting of S-B-M, B-M, and M-B-M (hereinafter may be abbreviated as the block copolymer (F2)). The block copolymer (F2) is the block copolymer described in PCT Patent Publication No. 2003-535181 or International Publication WO 2006/077153 and is an essential component for improving the toughness of the hardened product and the interlayer toughness of the carbon fiber-reinforced composite material while maintaining the excellent heat resistance of the thermosetting resin composition.

Here, each block represented by S, B, and M may be linked with a covalent bond or linked with an intermediary molecule bonded to one block through one covalent bond formation and bonded to the other block through the other covalent bond formation.

The block M is a methyl methacrylate homopolymer or a copolymer containing at least 50% by mass of methyl methacrylate.

The block B is a polymer block incompatible to the block M and has a glass transition temperature Tg (hereinafter may be described as only Tg) of 20° C. or lower.

The block S is a polymer block incompatible to the block B and the block M and has a higher glass transition temperature Tg than that of the block B.

When any of the thermosetting resin composition and each single polymer block of the block copolymer (F2) are used, the glass transition temperature Tg can be measured by a DMA method using RSAII (manufactured by Rheometrics Inc.). Cyclic traction force having a cycle of 1 Hz is applied to a plate-like sample of 1×2.5×34 mm at a temperature of 50 to 250° C. and a maximum value of tan δ is defined as the glass transition temperature Tg. The sample is prepared as follows. When the thermosetting resin composition is used, a plate-like hardened product having no voids can be obtained by defoaming an unhardened resin composition in vacuum and then hardening the unhardened resin composition at a temperature of 135° C. (when dicyandiamide is used) or 180° C. (when diaminodiphenylsulfone is used) for 2 hours in a mold whose thickness is set to 1 mm using a "Teflon (registered trademark)" spacer having a thickness of 1 mm. When each single block of the block copolymer (F2) is used, similarly, a plate having no voids is obtained by using a twin screw extruder. Samples having the above size are cut out from these plates with a diamond cutter and the samples can be evaluated.

Compatibility of any one of the blocks of S, B, and M with the epoxy resin (D1) is preferable from the viewpoint of toughness improvement. In Fourth Embodiment, the compatibility of any of the blocks with the epoxy resin (D1) can be ascertained by dissolution of the block copolymer into an unhardened epoxy resin (D1). When all the blocks are incompatible, the block copolymer is not dissolved in the unhardened epoxy resin (D1). The dissolution can be ascertained by whether a block copolymer (F2) to be evaluated is dissolved into the epoxy resin (D1) when 0.1 part by weight of the block copolymer (F2) is added to the 100 parts by mass of any epoxy resins (D1) and the mixture is stirred in an oil bath of 150 to 180° C. for 2 hours.

The block copolymer (F2) in the thermosetting resin composition is required to be contained in an amount of 1 to 10 parts by mass relative to 100 parts by mass of the epoxy resin (D1). The block copolymer is preferably contained in an amount ranging from 2 to 7 parts by weight and even more preferably in an amount ranging from 3 to 6 parts by weight from the viewpoint of mechanical characteristics and appropriateness for a composite production process. If the block copolymer (F2) is contained in an amount of less than 1 part by mass, the toughness and the plastic deformability of the hardened product is insufficient and thus the interlayer toughness of the carbon fiber-reinforced composite material may be insufficient. If the block copolymer (F2) is contained in an amount of more than 10 parts by mass, the elastic modulus of the hardened product is dominantly deteriorated and thus the mechanical characteristics of the carbon fiber-reinforced composite material is insufficient. In addition, resin flow at a molding temperature is insufficient and thus a carbon fiber-reinforced composite material containing voids is formed.

The introduction of a monomer other than methyl methacrylate to the block M as a copolymer component is preferably carried out from the viewpoint of the compatibility with the epoxy resin (D1) and the control of the various characteristics of the hardened product. Any copolymer components can be appropriately selected from the viewpoint above. Usually, a monomer having high polarity, particularly a water-soluble monomer is suitably used in order to obtain the compatibility to the epoxy resin (D1) having high polarity. Among them, an acrylamide derivative is preferably used and particularly dimethylacrylamide is preferable. The copolymer component of the block M is not limited to the acrylic monomer and a reactive monomer is also applicable.

The reactive monomer means a monomer having a functional group reactable with the oxirane group in an epoxy molecule or the functional group of the hardener. Specific examples of the reactive functional group include an oxirane group, an amine group, and a carboxy group. However, the functional group is not limited to these groups. As the reactive monomer, any other monomers that are (meth) acrylic acid (methacrylic acid and acrylic acid are collectively called (meth)acrylic acid) or generate (meth)acrylic acid by hydrolysis may be used. The reactive monomer is preferably used as the copolymer component because the compatibility with the epoxy resin (D1) and the adhesion between an epoxy-block copolymer interface are improved.

Examples of other monomers constituting the block M include glycidyl methacrylate or tert-butyl methacrylate. The block M is preferably made of at least 60% by mass of syndiotactic PMMA (poly(methyl methacrylate)).

The glass transition temperature Tg of the block B is 20° C. or lower, preferably 0° C. or lower, and more preferably −40° C. or lower. The lower the glass transition temperature Tg, the better from the viewpoint of the toughness of the hardened product. However, a glass transition temperature of lower than −100° C. may cause trouble in processability such as a rough grinded surface generation at the time of producing the carbon fiber-reinforced composite material.

The block B is preferably an elastomer block. Examples of monomers used for synthesizing the elastomer block include dienes selected from butadiene, isoprene, 2,3-dimethyl-1,3-butadiene, 1,3-pentadiene, and 2-phenyl-1,3-butadiene.

The block B is preferably selected from polydienes, particularly polydienes such as polybutadiene, polyisoprene, and a random copolymer thereof, or partially or fully hydrogenated polydienes from the viewpoint of the toughness of the hardened product. Examples of the polydienes may include 1,2-polybutadiene (Tg: approximately 0° C.). However, 1,4-polybutadiene having the lowest glass transition temperature Tg (Tg: approximately −90° C.) is more preferably used. This is because the use of the block B having lower glass transition temperature Tg is advantageous from the viewpoint of the interlayer toughness of the carbon fiber-reinforced composite material and the toughness of the hardened product. The block B may be hydrogenated. This hydrogenation is carried out in accordance with a usual method.

An alkyl (meth)acrylate is also preferably used as the monomer used for synthesizing the block B made of an elastomer. Specific examples of the monomer include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). Here, the values in the parentheses after the names of each acrylate are Tg of the block B when each acrylate is used. Among them, butyl acrylate is preferably used. These acrylates as monomers for synthesizing the block B are not compatible with the block M containing at least 50% by mass of methyl methacrylate. Among them, preferably, the block B is mainly made of 1,4-polybutadiene or poly(butyl acrylate) and poly(2-ethylhexyl acrylate).

When the triblock copolymer S-B-M is used as the block copolymer (F2), the block S is incompatible with the block B and the block M and the glass transition temperature Tg of the block S is preferably higher than that of the block B. Tg or the melting point of the block S is preferably 23° C. or higher and more preferably 50° C. or higher. Examples of the block S include a block obtained from aromatic vinyl compounds such as styrene, α-methylstyrene, or vinyltoluene and a block obtained from an alkyl ester of acrylic acid and/or methacrylic acid having 1 to 18 carbon atoms. The later block obtained from the alkyl ester and/or methacrylic ester having 1 to 18 carbon atoms in the alkyl chain is incompatible each other with the block M containing at least 50% by mass of methyl methacrylate.

When a triblock copolymer M-B-M is used as the block copolymer (F2), the two blocks M in the triblock copolymer M-B-M are the same as or different from each other. The blocks M can be blocks having different molecular weight when the blocks are made of the same monomer.

When the triblock copolymer M-B-M and the diblock copolymer B-M are used in combination as the block copolymer (F2), the block M in the triblock copolymer M-B-M and the block M in the diblock copolymer B-M may be the same as or different from each other, and the block B in the triblock copolymer M-B-M and the block B in the diblock copolymer B-M may be the same as or different from each other.

When the triblock copolymer S-B-M and the diblock copolymer B-M and/or the triblock copolymer M-B-M are used in a combination as the block copolymer (F2), the block M in the triblock copolymer S-B-M, each block M in the triblock copolymer M-B-M, and the block M in the diblock copolymer B-M may be the same as or different from each other and each block B in the triblock copolymer S-B-M, the triblock copolymer M-B-M, and the diblock copolymer B-M may be the same as or different from each other.

The block copolymer (F2) used as the material in Fourth Embodiment can be produced by anion polymerization and, for example, can be produced by the methods described in European Patent EP No. 524,054 and European Patent EP No. 749,987.

Specific examples of the triblock copolymer M-B-M include "Nanostrength (registered trademark)" M22 as methyl methacrylate-butyl acrylate-methyl methacrylate and "Nanostrength (registered trademark)" M22N having a polar functional group manufactured by Arkema Inc. Specific examples of the triblock copolymer S-B-M include "Nanostrength (registered trademark)" 123, "Nanostrength (registered trademark)" 250, "Nanostrength (registered trademark)" 012, "Nanostrength (registered trademark)" E20, "Nanostrength (registered trademark)" E20F, "Nanostrength (registered trademark)" E40, and "Nanostrength (registered trademark)" E40F as copolymers made of styrene-butadiene-methyl methacrylate manufactured by Arkema Inc.

The block copolymer (F2) is preferably contained in an amount of 0.1 part by mass to 30 parts by mass relative to 100 parts by mass of the epoxy resin (D1). The block copolymer (F2) is more preferably contained in an amount of 1 part by mass to 20 parts by mass, even more preferably in an amount of 1 part by mass to 10 parts by mass, and particularly preferably in an amount of 3 to 6 parts by mass. If the block copolymer (F2) is contained in an amount of less than 0.1 part by mass, toughness improvement may be insufficient. If the block copolymer (F2) is contained in an amount of more than 30 parts by mass, the viscosity of the thermosetting resin composition is excessively high and thus workability may be deteriorated.

In order to control viscoelasticity to improve the tuck and drape properties of a prepreg and to improve the mechanical characteristics such as the interlayer toughness of the carbon fiber-reinforced composite material, the thermosetting resin composition in Fourth Embodiment can contain a thermoplastic resin soluble into the epoxy resin (D1), organic particles such as rubber particles and thermoplastic resin particles, nano-silica, inorganic particles, and the like.

Examples of the soluble thermoplastic resin added to the epoxy resin (D1) include a thermoplastic resin generally having a chemical bond selected from the group consisting of a carbon-carbon bond, an amide bond, an imide bond, an ester bond, an ether bond, a carbonate bond, a urethane bond, a thioether bond, a sulfone bond, and a carbonyl bond on the main chain. The thermoplastic resin may have a partial cross-linked structure and may be crystalline or amorphous. In particular, at least one resin selected from the group consisting of polyamide, polycarbonate, polyvinyl formal, polyvinyl butyral, polyvinyl alcohol, polyacetal, polyphenylene oxide, polyphenylene sulfide, polyarylate, polyester, a phenoxy resin, polyamideimide, polyimide, polyetherimide, polyimide having a phenyltrimethylindane structure, polysulfone, polyethersulfone, polyether ether ketone, polyether ether ether ketone, polyaramids, polyether nitrile, and polybenzimidazole is preferably dissolved in the epoxy resin (D1).

The terminal functional group of the thermoplastic resin of a hydroxy group, a carboxy group, a thiol group, an acid anhydride, and other groups can react with a cation-polymerizable compound and thus preferably used. Examples of the thermoplastic resin having a hydroxy group include polyvinyl acetal resins such as polyvinyl formal and polyvinyl butyral, polyvinyl alcohol, and phenoxy resins.

Among them, an average molecular weight is preferably 5,000 to 2,000,000 g/mol. If the average molecular weight is less than 5,000, sufficient compatibility cannot be obtained depending on the type of the combined epoxy resin (D1) and latent hardener (E) component and thus the block copolymer (F2) causes coarse phase separation. If the average molecular weight is more than 2,000,000, even small amount of addition causes excessive increase in viscosity and thus the prepreg may fail to be formed.

Among them, polyvinyl formal, polyvinyl butyral, polyethersulfone, polyetherimide, or polyphenylene ether are preferably used because these resins are easily dissolved into an epoxy resin to improve adhesion between carbon fibers and the thermosetting resin composition without impairing the heat resistance of the hardened product and viscosity is easily adjusted by the selection of molecular weight or the adjustment of an added amount.

Specific examples of the commercially available thermoplastic resin include polyvinyl acetal resins including polyvinyl formal such as "Vinylec (registered trademark)" K, "Vinylec (registered trademark)" L, "Vinylec (registered trademark)" H, and "Vinylec (registered trademark)" E (manufactured by Chisso Corporation), polyvinyl acetal such as "S-LEC (registered trademark)" K (manufactured by SEKISUI CHEMICAL CO., LTD.), and polyvinyl butyral such as "S-LEC (registered trademark)" B (manufactured by SEKISUI CHEMICAL CO., LTD.) and Denka Butyral (manufactured by Denki Kagaku Kogyo K. K.). Specific usable examples of the commercially available polyethersulfone include "SUMIKAEXCEL (registered trademark)" PES3600P, "SUMIKAEXCEL (registered trademark)" PES5003P, "SUMIKAEXCEL (registered trademark)" PES5200P, "SUMIKAEXCEL (registered trademark)" PES7600P, and "SUMIKAEXCEL (registered trademark)" PES7200P (manufactured by Sumitomo Chemical Co., Ltd.), "Ultrason (registered trademark)" E2020P SR and "Ultrason (registered trademark)" E2021SR (manufactured by BASF), "GAFONE (registered trademark)" 3600RP and "GAFONE (registered trademark)" 3000RP (manufactured by Solvay Advanced Polymers), and "Virantage (registered trademark)" PESU VW-10200 and "Virantage (registered trademark)" PESU VW-10700 (registered trademark, manufactured by Solvay Advanced Polymers). Examples of the thermoplastic resin include the copolymerized oligomer of polyethersulfone and polyetherethersulfone as described in PCT Patent Publication No. 2004-506789 and "Ultem (registered trademark)" 1000, "Ultem (registered trademark)" 1010, and "Ultem (registered trademark)" 1040 (manufactured by SABIC Innovative Plastics Japan) as a commercially available polyetherimide.

When the thermoplastic resin is used by dissolving into the epoxy resin (D1), the thermoplastic resin is preferably contained in a ratio ranging from 1 to 40% by mass, more preferably ranging from 5 to 30% by mass, and even more preferably ranging from 8 to 20% by mass in the thermosetting resin composition from the viewpoint of balance. If the thermoplastic resin is contained in an excessively large amount, the viscosity of the thermosetting resin composition increases and thus production processability and handling properties of the thermosetting resin composition and the prepreg may be impaired. If the thermoplastic resin is contained in an excessively small amount, the toughness of the thermosetting resin hardened product is insufficient and the interlayer toughness of a carbon fiber-reinforced composite material to be produced may be insufficient.

The acrylic resins have high compatibility with the epoxy resin (D1) and preferably used for controlling viscoelasticity. Among them, polymethacrylic acid ester is preferably used. Examples of the commercially available polymethacrylic acid ester include "Dianal (registered trademark)" BR-83, "Dianal (registered trademark)" BR-85, "Dianal (registered trademark)" BR-87, "Dianal (registered trademark)" BR-88, "Dianal (registered trademark)" BR-108 (manufactured by Mitsubishi Rayon Co., Ltd.), and "Matsumoto Microsphere (registered trademark)" M, "Matsumoto Microsphere (registered trademark)" M100, and "Matsumoto Microsphere (registered trademark)" M500 (manufactured by Matsumoto Yushi-Seiyaku Co., Ltd.).

The rubber particles are preferably cross-linked rubber particles and core-shell rubber particles obtained by graft polymerization of the surface of cross-linked rubber particles with a different polymer from the viewpoint of handling properties and the like.

Examples of the commercially available cross-linked rubber particles include FX501P (manufactured by JSR Corporation) containing a cross-linked product of a carboxyl-modified butadiene-acrylonitrile copolymer, CX-MN series (manufactured by Nippon Shokubai Co., Ltd.) containing acrylic rubber microparticles, and YR-500 series (manufactured by Nippon Steel Chemical Co., Ltd.).

Examples of the commercially available core-shell rubber particles include "PARALOID (registered trademark)" EXL-2655 (manufactured by Kureha Chemical Industry Co., Ltd.) containing a butadiene-alkyl methacrylate-styrene copolymer, "STAPHYLOID (registered trademark)" AC-3355 and TR-2122 (manufactured by Takeda Pharmaceutical Company Limited) containing an acrylate-methacrylate copolymer, and "PARALOID (registered trademark)" EXL-2611 and EXL-3387 (manufactured by Rohm & Haas) and "Kane Ace (registered trademark)" MX series (manufactured by Kaneka Corporation) containing a butyl acrylate-methyl methacrylate copolymer.

The thermoplastic resin particles may be the same as the various thermoplastic resins exemplified above and is used by mixing in the thermosetting resin composition. Among them, the polyamide is the most preferable thermoplastic resin. Among the polyamides, nylon 12, nylon 6, nylon 11, nylon 6/12 copolymer, and nylon forming semi-IPN (Interpenetrating Polymer Network structure) by the epoxy compound (semi-IPN nylon) described in Example 1 in Japanese Patent Application Laid-open No. H01-104624 impart excellent adhesion strength with the epoxy resin (D1). As for the shape, the thermoplastic resin particles may be spherical particles, nonspherical particles, or porous particles. The spherical particles are preferred for the reasons below. The spherical particles do not deteriorate the flow characteristics of a resin, and thus the resin has excellent viscoelasticity. In addition, the spherical particles are preferable because they have no starting point of a stress concentration and impart high impact resistance, and thus the spherical particles are preferable. Examples of the commercially available polyamide particles include SP-500, SP-10, TR-1, TR-2, 842P-48, and 842P-80 (manufactured by Toray Industries Inc.), "TORAYPEARL (registered trademark)" TN (manufactured by Toray Industries Inc.), and "Orgasol (registered trademark)" 1002D, 2001UD, 2001EXD, 2002D, 1702D, 3501D, and 3502D (manufactured by Arkema Inc.).

In Fourth Embodiment, organic particles such as the rubber particles and the thermoplastic resin particles are preferably contained in an amount of 0.1 to 30 parts by mass and more preferably in an amount of 1 to 20 parts by mass relative to 100 parts by mass of the epoxy resin (D1) from the viewpoint of satisfying both of the elastic modulus and the toughness of a resin hardened product to be produced.

A kneader, a planetary mixer, a three-rollers milling machine, and a twin screw extruder are preferably used for preparing the thermosetting resin composition of Fourth Embodiment. After the block copolymer (F2) is charged into the epoxy resin (D1) and a composition is kneaded, the temperature of the composition is raised to any temperature from 130 to 180° C. while stirring the composition. Thereafter, the block copolymer (F2) is dissolved into the epoxy resin (D1) while maintaining the raised temperature. After obtaining a clear viscous liquid in which the block copolymer (F2) is dissolved into the epoxy resin (D1), the liquid is cooled to a temperature of preferably 100° C. or lower and more preferably 80° C. or lower while stirring and the latent hardener (E) is added. The method for preparing the thermosetting resin composition by adding the latent hardener (E) and a curing catalyst and kneading the composition is preferably used because the coarse separation of the block copolymer (F2) is difficult to be generated and the long-term storage stability of the resin composition is excellent.

When the thermosetting resin composition is used as the matrix resin of the prepreg, the viscosity at 80° C. is preferably ranging from 0.1 to 200 Pa·s, more preferably ranging from 0.5 to 100 Pa·s, and even more preferably ranging from 1 to 50 Pa·s from the viewpoint of processability such as tuck and drape properties. If the viscosity is less than 0.1 Pa·s, a shape retention property of the prepreg is insufficient and thus cracks may be generated in the prepreg. In addition, excessive resin flow is generated at the time of molding and thus a fiber content may fluctuate. If the viscosity is more than 200 Pa·s, thin spots may be generated at a film forming process of the resin composition or a non-impregnated part may be generated during an impregnation process to reinforcing fibers. Here, the viscosity means a complex viscosity $\eta^*$ measured by the dynamic viscoelasticity measurement devices (Rheometer RDA2: manufactured by Rheometrics Inc. and ARES: manufactured by TA Instruments) using a parallel plates having a diameter of 40 mm at a simple temperature rising rate of 2° C./min, a frequency of 0.5 Hz, and a gap of 1 mm.

A preferred combination of a sizing agent and an aromatic amine hardener (E2) in Fourth Embodiment is as below. The sizing agent and the aromatic amine hardener (E2) are mixed so that the amine equivalent/epoxy equivalent rate of the sizing agent to be applied and the aromatic amine hardener (E2) would be 0.9, and the glass transition point is determined immediately after the mixing and after storage in an environment at a temperature of 25° C. and a relative humidity of 60% for 20 days. A preferred combination of the sizing agent and the aromatic amine hardener (E2) has an increase in glass transition point of the mixture by 25° C. or smaller after 20 days. When the combination having an increase in glass transition point by 25° C. or smaller is used to produce a prepreg, the reaction of the outer layer of the sizing agent with the inside of a matrix resin is suppressed, and this suppresses the deterioration of mechanical characteristics such as the tensile strength of a carbon fiber-reinforced composite material produced after the prepreg is stored for a long period of time. Such a combination is thus preferred. The increase in glass transition point is more preferably 15° C. or smaller. The increase in glass transition point is even more preferably 10° C. or smaller. The glass transition point can be determined by differential scanning calorimetry (DSC).

A preferred combination of the sizing agent of the Fourth Embodiment and the dicyandiamide or the derivative thereof (E3) is as below. The sizing agent and the dicyandiamide or the derivative thereof (E3) are mixed so that the amine equivalent/epoxy equivalent rate of the sizing agent to be applied and the dicyandiamide or the derivative thereof (E3) would be 1.0, and the glass transition point is determined immediately after the mixing and after storage in an environment at a temperature of 25° C. and a humidity of 60% for 20 days. A preferred combination of the sizing agent and the dicyandiamide or the derivative thereof (E3) has an increase in glass transition point of 10° C. or less after 20 days. When the combination having an increase in glass transition point of 10° C. or less is used to produce a prepreg, the reaction of the outer layer of the sizing agent with the inside of a matrix resin is suppressed, and this suppresses the deterioration of mechanical characteristics such as tensile strength of a carbon fiber-reinforced composite material produced after the prepreg is stored for a long period of time. Such a combination is thus preferred. The increase in glass transition point is more preferably 8° C. or less.

The hardeners are preferably contained in a total amount so as to give an amount of an active hydrogen group ranging from 0.6 to 1.2 equivalents and more preferably ranging from 0.7 to 0.9 equivalent relative to 1 equivalent of epoxy group in all the epoxy resin (D1) components. Here, the active hydrogen group is a functional group that can react with the epoxy group of a hardener component. If the amount of an active hydrogen group is less than 0.6 equivalent, a hardened product may have insufficient reaction rate, heat resistance, and elastic modulus, and a carbon fiber-reinforced composite material to be produced may have insufficient glass transition temperature and strength. If the amount of an active hydrogen group is more than 1.2 equivalents, a hardened product has sufficient reaction rate, glass transition temperature, and elastic modulus but has insufficient plastic deformability, and thus a carbon fiber-reinforced composite material to be produced may have insufficient impact resistance.

When dicyandiamide or a derivative thereof (E3) is used as the latent hardener (E), the resin toughness (KIc) of a hardened product formed by hardening the thermosetting resin composition at 135° C. for 2 hours is preferably in a range from 0.8 to 2.8 MPa·m$^{1/2}$. The resin toughness (KIc) is more preferably ranging from 1.2 to 2.8 MPa·m$^{1/2}$ and even more preferably ranging from 1.4 to 2.8 MPa·m$^{1/2}$. If KIc is less than 0.8 MPa·m$^{1/2}$, the interlayer toughness of the carbon fiber-reinforced composite material may be insufficient. If KIc is more than 2.8 MPa·m$^{1/2}$, workability of cutting work after formation of the carbon fiber-reinforced composite material may be deteriorated.

When the aromatic amine hardener (E2) is used as the latent hardener (E), the resin toughness (KIc) of a hardened product formed by hardening the thermosetting resin composition at 180° C. for 2 hours is preferably ranging from 0.8 to 2.8 MPa·m$^{1/2}$. The resin toughness (KIc) is more preferably ranging from 1.2 to 2.8 MPa·m$^{1/2}$ and even more preferably ranging from 1.4 to 2.8 MPa·m$^{1/2}$. If KIc is less than 0.8 MPa·m$^{1/2}$, the interlayer toughness of the carbon fiber-reinforced composite material may be insufficient. If KIc is more than 2.8 MPa·m$^{1/2}$, workability of cutting work after formation of the carbon fiber-reinforced composite material may be deteriorated.

When dicyandiamide or the derivative thereof (E3) is used as the latent hardener (E), the glass transition temperature Tg of a hardened product formed by hardening the thermosetting resin composition at 135° C. for 2 hours is preferably 115° C. or higher and even more preferably 120° C. or higher. If the glass transition temperature is lower than the above temperature, the heat resistance of the hardened product may be insufficient and thus warpage and distortion at the time of composite formation or at the time of use may occur. The upper limit of the heat resistance is generally 150° C. or lower because increase in the heat resistance of the hardened product tends to deteriorate plastic deformability and toughness.

When the aromatic amine hardener (E2) is used as the latent hardener (E), the glass transition temperature Tg of a hardened product formed by hardening the thermosetting resin composition at 180° C. for 2 hours is preferably 160° C. or higher and even more preferably 180° C. or higher. If the glass transition temperature is lower than the above temperature, the heat resistance of the hardened product may be insufficient and thus warpage and distortion at the time of composite formation or at the time of use may occur. The upper limit of the heat resistance is generally 220° C. or lower because increase in the heat resistance of the hardened product tends to deteriorate plastic deformability and toughness.

When dicyandiamide or the derivative thereof (E3) is used as the latent hardener (E), the flexural modulus of a hardened product formed by hardening the thermosetting resin composition at 135° C. for 2 hours is preferably 3.3 GPa or more and even more preferably 3.5 GPa or more. A bending deflection, which is the index of the elongation of the thermosetting resin composition, is preferably 5 mm or more, more preferably 7 mm or more, and even more preferably 10 mm or more. If any one of the flexural modulus and the bending deflection is less than the above range, the plastic deformability of the hardened product may be deteriorated. The upper limits of the flexural modulus and the bending deflection are generally 5.0 GPa or less and 20 mm or less, respectively.

When the aromatic amine hardener (E2) is used as the latent hardener (E), the flexural modulus of a hardened product formed by hardening the thermosetting resin composition at 180° C. for 2 hours is preferably 3.3 GPa or more and even more preferably 3.5 GPa or more. A bending deflection, which is the index of the elongation of the thermosetting resin composition, is preferably 5 mm or more, more preferably 7 mm or more, and even more preferably 10 mm or more. If any one of the flexural modulus and the bending deflection is less than the above range, the plastic deformability of the hardened product may be deteriorated. The upper limits of the flexural modulus and the bending deflection are generally 5.0 GPa or less and 20 mm or less, respectively.

The thermosetting resin composition of Fourth Embodiment causes phase separation of the block copolymer (F2) during the hardening process of the thermosetting resin composition and a fine alloy structure is formed. To be precise, a block having less compatibility to the epoxy resin (D1) in a plurality of blocks in the block copolymer (F2) causes phase separation during hardening to form the fine alloy structure.

When dicyandiamide or the derivative thereof (E3) is used as the latent hardener (E), the size of the formed phase separation structure of the thermosetting resin composition hardened product of Fourth Embodiment formed by hardening at 135° C. for 2 hours is preferably ranging from 10 to 1000 nm. Here, the size of the phase separation structure (hereinafter described as a phase separation size) is a number average value of the size of an island phase in the case of the island-sea structure. When the island phase has an elliptic shape, a major axis is used and when the island phase has an irregular shape, the diameter of a circumscribed circle is used. When the island phase has a circles or ellipses in two or more layers, the diameter of a circle or the major axis of an ellipse in the outermost layer is used. For the island-sea structure, major axes of all island phase existing in predetermined regions are measured and the number average value of these major axes is determined as the phase separation size. The predetermined regions are determined as follows based on a photomicrograph. When the phase separation size is expected as 10 nm order (10 nm or more and 100 nm or less), a photomicrograph is taken in a magnification of 20,000 and three regions of 4 mm square are randomly selected on the photomicrograph (regions of 200 nm square on the sample). These three regions are determined as the predetermined regions. Similarly, when the phase separation size is expected as 100 nm order (100 nm or more and 1000 nm or less), a photomicrograph is taken in a magnification of 2,000 and three regions of 4 mm square are randomly selected on the photomicrograph (regions of 2 μm square on the sample). These three regions are determined as the predetermined regions. When the phase separation size is expected as 1 μm order (1 μm or more and 10 μm or less), a photomicrograph is taken in a magnification of 200 and a region is randomly selected as regions of 4 mm square on the photomicrograph (regions of 20 μm square on the sample). This region is determined as the predetermined region.

If the measured phase separation size is out of the expected order, the corresponding region is measured again in a corresponding magnification of an appropriate order and this photomicrograph is employed. When the structure is a co-continuous structure, a line having a predetermined length is drawn on a photomicrograph and the point of intersection of the line and a phase interface is extracted. Distances between adjacent points of intersections are measured and a number average value of the distances is determined as the phase separation size. The predetermined lengths are determined as follows based on a photomicrograph. When the phase separation size is expected as 10 nm order (10 nm or more and 100 nm or less), a photomicrograph is taken in a magnification of 20,000 and three lines are randomly selected in a length of 20 mm on the photomicrograph (length of 1000 nm on the sample). These three lengths of the lines are determined as the predetermined lengths. Similarly, when the phase separation size is expected as 100 nm order (100 nm or more and 1000 nm or less), a photomicrograph is taken in a magnification of 2,000 and three lines are randomly selected in a length of 20 mm on the photomicrograph (length of 10 μm on the sample). These three lines lengths of lines are determined as the predetermined lengths. When the phase separation size is expected as 1 μm order (1 μm or more and 10 μm or less), a photomicrograph is taken in a magnification of 200 and three lines are randomly selected in a length of 20 mm on the photomicrograph (regions of 100 μm length on the sample). These lengths of lines are determined as the predetermined lengths.

If the measured phase separation size is out of the expected order, the corresponding length is measured again in a corresponding magnification of an appropriate order and this photomicrograph is employed. Here, at the time of measurement on the photomicrograph, a phase larger than 0.1 mm is measured as the island phase. The phase separation size is more preferably ranging from 10 to 500 nm, even more preferably ranging from 10 to 200 nm, and particularly preferably ranging from 15 to 100 nm. If the phase separation size is less than 10 nm, the toughness of the hardened product is insufficient and thus the interlayer toughness of the carbon fiber-reinforced composite material may be insufficient. If the phase separation size is a coarse phase separation of more than 1000 nm, the toughness and the plastic deformability of the hardened product is insufficient and thus the interlayer toughness of the carbon fiber-reinforced composite material nay be insufficient. The cross section of the resin hardened product can be observed as the phase separation structure with a scanning electron microscope or a transmission electron microscope. The sample may be stained by osmium and the like, as necessary. The staining is carried out by a common method.

When the aromatic amine hardener (E2) is used as the latent hardener (E), the size of the formed phase separation structure of the thermosetting resin composition hardened product of Fourth Embodiment formed by hardening at 180° C. for 2 hours is preferably ranging from 10 to 1000 nm. The size of the phase separation structure can be measured by the same manner as dicyandiamide or the derivative thereof (E3) is used as the latent hardener (E).

When dicyandiamide or the derivative thereof (E3) is used as the latent hardener (E), the water absorption rate of the hardened product formed by hardening the thermosetting resin composition at 135° C. for 2 hours after immersion in boiled water for 360 hours is preferably 6% by mass or less. Generally, when the water absorption rate is increased, the plastic deformability of the hardened product at the time of water absorption tends to be deteriorated and the mechanical characteristics of the carbon fiber-reinforced composite material at the time of water absorption also tends to deteriorated. The water absorption rate of the hardened product obtained by hardening the thermosetting resin composition containing the amine epoxy resin (D17) tends to be high compared with the water absorption rate of the hardened product obtained by hardening a resin composition not containing the amine epoxy resin (D17) but mainly containing the bisphenol epoxy resin (D16).

When the aromatic amine hardener (E2) is used as the latent hardener (E), the water absorption rate of the hardened product formed by hardening the thermosetting resin composition at 180° C. for 2 hours after immersion in boiled water for 360 hours is preferably 6% by mass or less. Generally, when the water absorption rate is increased, the plastic deformability of the hardened product at the time of water absorption tends to be deteriorated and the mechanical characteristics of the carbon fiber-reinforced composite material at the time of water absorption also tends to be deteriorated. The water absorption rate of the hardened product obtained by hardening the thermosetting resin composition containing the amine epoxy resin (D17) tends to be high compared with the water absorption rate of the hardened product obtained by hardening a resin composition not containing the amine epoxy resin (D2) but mainly containing the bisphenol epoxy resin (D16).

The thermosetting resin composition used in Fourth Embodiment can contain coupling agents, conductive particles such as carbon particles and metal-plated organic particles, thermosetting resin particles, rubber particles such as cross-linked rubber particles and core-shell rubber particles, inorganic fillers such as silica gel, nano silica, and clay, and conductive fillers to an extent not impairing the effect of the present invention. The conductive particles and the conductive fillers are preferably used because the conductivity of the resin hardened product and carbon fiber-reinforced composite material to be produced can be improved.

The same the conductive fillers used in First Embodiment is suitably used as the conductive fillers.

Addition of the above materials in the thermosetting resin composition used in Fourth Embodiment in a predetermined ratio can impart a prepreg having both excellent adhesion between a matrix resin and carbon fibers and long-term storage stability and excellent impact resistance and interlayer toughness of the carbon fiber-reinforced composite material.

The prepreg of the Fourth Embodiment is prepared by impregnating sizing agent-coated carbon fiber bundles with a thermosetting resin composition as a matrix resin. The prepreg can be prepared, for example, by a wet method of dissolving a matrix resin in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat or a method of once preparing a coating film of a matrix resin composition on a release paper or the like, next superimposing the film on each side or one side of sizing agent-coated carbon fiber bundles, and applying heat and pressure to the film to impregnate the sizing agent-coated carbon fiber bundles with the matrix resin. The hot melting method is preferred because no solvent remains in the prepreg.

The method for forming a carbon fiber-reinforced composite material by using the prepreg of the Fourth Embodiment is exemplified by a method of stacking prepregs and thermally hardening a matrix resin while applying pressure to the laminate.

Examples of the method of applying heat and pressure include press molding, autoclave molding, bagging molding, a wrapping tape method, and internal pressure molding method. To specifically produce sporting goods, the wrapping tape method and the internal pressure molding method are preferably employed. For aircraft application necessitating a high quality and high performance laminated composite material, the autoclave molding is preferably employed. To produce various vehicle exteriors, the press molding is preferably employed. The wrapping tape method is a method of winding the prepreg around a shaft such as a mandrel to form a tube-like product of the carbon fiber-reinforced composite material. This method is preferable for producing a rod-like product such as a golf shaft and a fishing rod. More specifically, the method is a method of winding the prepreg around a mandrel, winding a wrapping tape made of a thermoplastic resin tape around outside of the prepreg for fixing the prepreg and applying pressure, thermally hardening the epoxy resin (D1) in an oven, and removing the shaft to give a tube-like product. The internal pressure molding method is a method of placing in a mold a preform made by winding the prepreg around an internal pressure applying body such as a thermoplastic resin tube, applying pressure by introducing high pressure gas into the internal pressure applying body and heating the mold at the same time to form a tube-like product. The internal pressure molding method is preferably used for forming a product having a complex shape such as a golf shaft, a bat, and a racket for tennis and badminton.

The prepreg of Fourth Embodiment preferably contains carbon fibers in an amount of (a carbon fiber areal weight of) 70 to 2000 g/m² per unit area. If the carbon fibers are contained in an amount of less than 70 g/m², the number of stacked layers is required to be increased in order to obtain a predetermined thickness at the time of carbon fiber-reinforced composite material formation and the operation may be cumbersome and complicated. If the carbon fibers are contained in an amount of more than 2000 g/m², the drape property of the prepreg tends to be deteriorated. A carbon fiber mass fraction is preferably 40 to 90% by mass and more preferably 50 to 80% by mass. If the carbon fiber mass fraction is excessively low, the mass of a carbon fiber-reinforced composite material to be produced is excessively high and thus the advantage of the carbon fiber-reinforced composite material having excellent specific strength and specific modulus may be impaired. If the carbon fiber mass fraction is excessively high, poor impregnation of a matrix resin composition and the carbon fiber-reinforced composite material to be produced is likely to contain many voids, which may greatly deteriorate mechanical characteristics of the composite material.

The prepreg of Fourth Embodiment is preferably has a structure in which a layer containing particles such as rubber particles and thermoplastic resin particles in a high concentration, that is, a layer clearly ascertaining existence of localized particles when the cross section of the prepreg is observed (hereinafter, may be called a particle layer) is formed in a part near the surface of the prepreg.

Such a structure easily form a resin layer between the prepreg layers, that is, composite material layers when the prepregs are stacked and the epoxy resin (D1) is hardened to form the carbon fiber-reinforced composite material. This improves adhesion of the composite material layers each other and a carbon fiber-reinforced composite material to be produced exerts high level impact resistance.

From such a viewpoint, the particle layer preferably exists in a depth range of 20% and more preferably in a depth range of 10% from the surface of the prepreg in a direction of thickness relative to 100% of the thickness of the prepreg by setting the surface as the starting point. The particle layer may exist in only one side. However, this structure generates a front surface and a back surface of the prepreg and thus careful handling is needed. If interlayers having particles and interlayers having no particles exist by mishandling the layer stacking of the prepreg, a carbon fiber-reinforced composite material having low impact resistance is produced. In order to eliminate the distinction between the front surface and the back surface and to facilitate the layer stacking, it is preferable that the particle layers exist on both sides of the prepreg.

The existence rate of the particles existing in the particle layers is preferably 90 to 100% by mass and more preferably 95 to 100% by mass relative to 100% by mass of the total amount of the rubber particles and the thermoplastic resin particles in the prepreg.

For example, the existence ratio of the particles can be evaluated by the same method as that for evaluating the existence ratio of the thermoplastic resin particles (F5) in First Embodiment.

In addition to the method of producing the carbon fiber-reinforced composite material by using the prepregs, examples of the method of producing the carbon fiber-reinforced composite material in Fourth Embodiment include the same as the methods in First Embodiment, which are appropriately selected and applied for a purpose. Any of the molding method can be employed to produce a carbon fiber-reinforced composite material including the sizing agent-coated carbon fibers and the thermosetting resin composition hardened product.

The carbon fiber-reinforced composite material in the present invention is preferably used for aircraft structural members and the same as the applications in First Embodiment.

Fifth Embodiment

The prepreg pertaining to Fifth Embodiment includes sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent applied onto the carbon fibers analyzed by X-ray photoelectron spectroscopy at a photoelectron takeoff angle of 15°. The thermosetting resin composition is an epoxy resin composition at least containing a bisphenol epoxy resin (D131) having a number average molecular weight of 1,500 or more, an amine epoxy resin (D141) having three or more functional groups, a bisphenol epoxy resin (D151) having a number average molecular weight of 150 to 1,200, and a latent hardener (E). As for the amounts of the epoxy resins (D131), (D141), and (D151), the bisphenol epoxy resin (D131) is contained in an amount of 20 to 50 parts by mass, the amine epoxy resin (D141) is contained in an amount of 30 to 50 parts by mass, and the bisphenol epoxy resin (D151) is contained in an amount of 10 to 40 parts by mass relative to 100 parts by mass of all the epoxy resin components.

Fiber-reinforced composite materials including reinforced fibers such as carbon fibers and aramid fibers have high specific strength and high specific modulus and thus have been used as structural materials for aircrafts, automobiles, and other products, for sporting goods such as tennis rackets, golf shafts, and fishing rods, and for other general industrial applications. A common method for producing such fiber-reinforced composite materials uses a prepreg that is a sheet-like intermediate material prepared by impregnating reinforced fibers with a matrix resin, and includes stacking a plurality of such prepregs and hardening the stacked prepregs. The method of using a prepreg, which can strictly control the orientation of reinforced fibers and achieves high design flexibility for a lamination structure, has an advantage of easily yielding a fiber-reinforced composite material with high performance. The matrix resin used for a prepreg is typically a thermosetting resin in terms of heat resistance and productivity, and is specifically, preferably an epoxy resin in terms of mechanical characteristics such as the adhesiveness to reinforced fibers.

In addition to the trends toward weight reduction by substituting fiber-reinforced composite materials for conventional materials such as metals, further weight reduction of the fiber-reinforced composite material itself has been increasingly demanded in various applications. The method of achieving the weight reduction is exemplified by a method of using carbon fibers having higher elastic modulus to achieve the weight reduction while maintaining the rigidity of the carbon fiber-reinforced composite material. However, carbon fibers having a higher elastic modulus is likely to have lower mechanical characteristics such as tensile strength including fiber direction compressive strength. To improve the mechanical characteristics such as tensile strength including fiber direction compressive strength, an increase in the elastic modulus of an epoxy resin used as the matrix resin is effective.

The way to improve the elastic modulus of an epoxy resin is exemplified by the addition of an inorganic filler such as carbon nanotubes and the combination of an amine epoxy resin having high elastic modulus.

For example, Japanese Patent Application Laid-open No. S62-1717 discloses that the combination of an amine epoxy resin having high elastic modulus increases the elastic modulus of an epoxy resin, and a carbon fiber-reinforced composite material including the epoxy resin as the matrix resin obtains significantly higher bending strength in the fiber direction, which has a strong correlation with the fiber direction compressive strength. However, the method reduces the toughness of the epoxy resin and thus reduces the impact resistance.

The improvement of the impact resistance of a carbon fiber-reinforced composite material requires an improvement of the elongation of carbon fibers constituting the carbon fiber-reinforced composite material or an improvement of the plastic deformation capacity or the toughness of an epoxy resin. Specifically, an improvement of the toughness of an epoxy resin is considered to be important and effective.

To improve the toughness of an epoxy resin, a method of adding a rubber component or a thermoplastic resin having excellent toughness has been attempted. The rubber unfortunately has a significantly lower elastic modulus and glass transition temperature than those of the epoxy resin, and thus a mixture of the epoxy resin with the rubber has a lower elastic modulus and a lower glass transition temperature. Hence, it is difficult to achieve a balance between the toughness and the elastic modulus. As the method of adding the thermoplastic resin, for example, International Publication WO 2006/077153 and Japanese National Publication of International Patent Application No. 2003-535181 disclose methods of adding a copolymer composed of styrene-butadiene-methyl methacrylate or a block copolymer such as a butadiene-methyl methacrylate block copolymer, thereby greatly improving the toughness of the epoxy resin. However, these methods have drawbacks of poor processability due to a reduction in heat resistance or an increase in viscosity of the epoxy resin, resulting in quality degradation such as void generation of a carbon fiber-reinforced composite material. In addition, the method also fails to achieve sufficient elastic modulus of the epoxy resin.

As the method for improving the balance between the elastic modulus and the toughness of an epoxy resin, International Publication WO 2009/107696 discloses a method of combining a diglycidyl ether epoxy resin having a particular number average molecular weight with an epoxy resin having an SP value different from that of the diglycidyl ether epoxy resin in a particular range. However, the method also fails to achieve a sufficient balance between the elastic modulus and the toughness of an epoxy resin, is likely to give high viscosity, and thus is unsatisfactory.

Fifth Embodiment can provide a prepreg capable of giving a resin hardened product having excellent adhesiveness between a matrix resin and carbon fibers and having high elasticity and high toughness and capable of suppressing the reduction in mechanical characteristics during a long-term storage and can provide such a carbon fiber-reinforced composite material.

The sizing agent used in the prepreg of Fifth Embodiment at least includes an aliphatic epoxy compound (A) and an aromatic epoxy compound (B1) as an aromatic compound (B). In the prepreg of Fifth Embodiment, the aliphatic epoxy compound (A) and the aromatic epoxy compound (B1) as the aromatic compound (B) are the same as the compounds in First Embodiment and thus description of the compounds is omitted. The carbon fibers used and the sizing agent-coated carbon fibers formed by coating the carbon fibers with the sizing agent can also refer to the description on First Embodiment.

Next, a prepreg and a carbon fiber-reinforced composite material in Fifth Embodiment will be described in detail.

In Fifth Embodiment, the prepreg includes the sizing agent-coated carbon fibers described above and an epoxy resin composition as a matrix resin.

The epoxy resin composition of Fifth Embodiment at least includes an epoxy resin (D13) imparting high toughness to a resin hardened product, an epoxy resin (D14) imparting high elasticity to the resin hardened product, an epoxy resin (D15) functioning as a compatibilizer for the epoxy resin (D13) and the epoxy resin (D14), and a latent hardener (E), in which an epoxy resin hardened product obtained by hardening the epoxy resin composition (D1) has a phase separation structure including an epoxy resin (D13) rich phase and an epoxy resin (D14) rich phase.

Here, even when the epoxy resins (D13), (D14), and (D15) are in a state of being uniformly dissolved with each other before hardening, spinodal decomposition preferably occurs during the hardening process and thus a phase separation structure made of the epoxy resin (D13) rich phase and the epoxy resin (D14) rich phase is preferably formed. The phase separation structure period of the phase separation structure is more preferably 1 nm to 5 μm. An even more preferable phase separation structure period is 1 nm to 1 μm. During the hardening process of the epoxy resin composition (D1), the epoxy resin (D15) functions as a compatibilizer for the epoxy resins (D13) and (D14).

If the structure period of the phase separation structure is less than 1 nm, a cavitation effect cannot be exerted and thus not only toughness but also elastic modulus tend to be insufficient. If the structure period of the phase separation structure is more than 5 μm, the cavitation effect cannot be exerted because the structure period is large and thus cracks are not developed to the island phase but developed only in the region of the sea phase, which may result in the insufficient toughness of the resin hardened product. In other words, the resin hardened product of the epoxy resin composition (D1) includes the epoxy resin (D13) rich phase and the epoxy resin (D14) rich phase and has a fine phase separation structure, and whereby the resin hardened product can have both elastic modulus and toughness.

The phase separation structure in Fifth Embodiment means a structure formed by separating two or more phases including the epoxy resin (D13) rich phase and the epoxy resin (D14) rich phase. Here, the epoxy resin (D13) rich phase and the epoxy resin (D14) rich phase mean phases containing the epoxy resin (D13) and the epoxy resin (D14) as main components, respectively. Here, the main component means a component contained in the highest content rate in such a phase. The phase separation structure may be a phase separation structure of three or more phases further containing phases including main components other than the epoxy resin (D13) and the epoxy resin (D14). Contrarily, a uniformly mixed state in molecular level is called a compatible state.

The cross section of the hardened product can be observed as the phase separation structure with a scanning electron microscope or a transmission electron microscope. The sample may be stained by osmium and the like, as necessary. The staining is carried out by a common method.

In Fifth Embodiment, the structure period of the phase separation structure is defined as follows. The phase separation structure includes the co-continuous structure and the island-sea structure, and thus each structure is defined. When the phase separation structure is the co-continuous structure, three lines having a predetermined length are randomly drawn on a photomicrograph and the points of intersection of the lines and a phase interface are extracted. Distances between adjacent points of intersections are measured and a number average value of the distances is determined as the structure period. The predetermined lengths are determined as follows based on a photomicrograph. When the structure period is expected as 0.01 µm order (0.01 µm or more and less than 0.1 µm), a photomicrograph is taken in a magnification of 20,000 and the length of a line drawn in a length of 20 mm on the photomicrograph (length of 1 µm on the sample) is determined as the predetermined length of the line. Similarly, when the phase separation structure period is expected as 0.1 µm order (0.1 µm or more and less than 1 µm), a photomicrograph is taken in a magnification of 2,000 and the length of a line drawn in a length of 20 mm on the photomicrograph (length of 10 µm on the sample) is determined as the predetermined length of the line. When the phase separation structure period is expected as 1 µm order (1 µm or more and less than 10 µm), a photomicrograph is taken in a magnification of 200 and the length of a line drawn in a length of 20 mm on the photomicrograph (length of 100 µm on the sample) is determined as the predetermined length of the line. If the measured phase separation structure period is out of the expected order, the structure period is measured again in a corresponding magnification of an appropriate order.

When the phase separation structure is the island-sea structure, predetermined three regions are randomly selected from the photomicrograph and the sizes of the island phases in the regions are measured. The number average value of the sizes is determined as the structure period. The size of the island phase means the length of a shortest distance line drawn through the island phase from one phase interface to the other phase interface. When the island phase is an elliptic shape, an irregular shape, or circles or ellipses in two or more layers, the shortest distance from one phase interface to the other phase interface through the island phase is determined as the island phase size. The predetermined regions are determined as follows based on a photomicrograph. When the phase separation structure period is expected as 0.01 µm order (0.01 µm or more and less than 0.1 µm), a photomicrograph is taken in a magnification of 20,000 and a region of 4 mm square selected on the photomicrograph (regions of 0.2 µm square on the sample) is determined as the predetermined region. Similarly, when the phase separation structure period is expected as 0.1 µm order (0.1 µm or more and less than 1 µm), a photomicrograph is taken in a magnification of 2,000 and a region of 4 mm square selected on the photomicrograph (regions of 2 µm square on the sample) is determined as the predetermined region. When the phase separation structure period is expected as 1 µm order (1 µm or more and less than 10 µm), a photomicrograph is taken in a magnification of 200 and a region of 4 mm square selected on the photomicrograph (regions of 20 µm square on the sample) is determined as the predetermined region. If the measured phase separation structure period is out of the expected order, the structure period is measured again in a corresponding magnification of an appropriate order.

Next, the specific aspects of the epoxy resin composition used in the present invention will be described. The epoxy resin composition of the present invention has a first aspect and a second aspect. First, the first aspect will be described.

The first aspect of the epoxy resin composition of Fifth Embodiment at least includes a bisphenol epoxy resin (D131) having a number average molecular weight of 1500 or more, an amine epoxy resin (D141) having three or more functional groups, a bisphenol epoxy resin (D141) having a number average molecular weight of 150 to 1200, and a latent hardener (E), in which the epoxy resins (D131), (D141), and (D151) are contained in an amount of the epoxy resins (D131) of 20 to 50 parts by mass, in an amount of the epoxy resins (D141) of 30 to 50 parts by mass, and in an amount of the epoxy resins (D151) of 10 to 40 parts by mass relative to 100 parts by weight of all the epoxy resin (D1) components.

In the first aspect, the bisphenol epoxy resin (D131) having a number average molecular weight of 1500 or more as the epoxy resin (D13) is contained in an amount of 20 to 50 parts by mass in 100 parts by mass of all the epoxy resins. The epoxy resin (D131) is preferably contained in an amount of 30 to 50 parts by mass in 100 parts by mass of all the epoxy resins. If the epoxy resin (D131) is contained in an amount of less than 20 parts by mass, the toughness of the resin hardened product is insufficient. If the epoxy resin (D131) is contained in an amount of more than 50 parts by mass, the elastic modulus and the heat resistance of the resin hardened product are insufficient and the viscosity of the epoxy resin composition is excessively high. If the viscosity of the epoxy resin composition is excessively high, the epoxy resin composition is not sufficiently impregnated between carbon fibers at the time of prepreg production. This generates voids in a carbon fiber-reinforced composite material to be produced and thus the mechanical characteristics such as the tensile strength of the carbon fiber-reinforced composite material are deteriorated.

If the number average molecular weight of the epoxy resin (D131) is less than 1500, the resin hardened product is difficult to form the phase separation structure and thus toughness is insufficient and the impact resistance of the carbon fiber-reinforced composite material is insufficient. The molecular weight of the epoxy resin (D131) is preferably 5000 or less from the viewpoint of impregnation properties of the epoxy resin composition into the carbon fibers and the heat resistance of the carbon fiber-reinforced composite material. Necessity of the determination of the upper limit of the molecular weight of the epoxy resin (D131) is low from the viewpoint of toughness. However, if the molecular weight is more than 5000, the phase separation structure of the resin hardened product is coarse, and the heat resistance may be insufficient and the impact resistance of the carbon fiber-reinforced composite material may be insufficient. If the molecular weight of the epoxy resin (D131) is more than 5000, the lowest viscosity of the epoxy resin composition is excessively high. When this epoxy resin composition is used for the prepreg, the epoxy resin composition is not sufficiently impregnated between carbon fibers at the time of prepreg production and a carbon fiber-reinforced composite material to be produced contains voids, which may deteriorate the mechanical characteristics such as the tensile strength of the carbon fiber-reinforced composite material.

A bisphenol epoxy resin having a softening point of 90° C. or higher is preferable as the epoxy resin (D131). If the softening point of the epoxy resin (D131) is lower than 90° C., the toughness of the resin hardened product is insufficient and thus the impact resistance of the carbon fiber-reinforced composite material may be insufficient.

Preferable usable examples of the epoxy resin (D131) include epoxy resins selected from bisphenol A epoxy resins, bisphenol F epoxy resins, bisphenol AD epoxy resins, bisphenol S epoxy resins, and halogenated, alkyl-substituted, and hydrogenated products of them. Examples of the commercially available bisphenol A epoxy resin include "jER (registered trademark)" 1004, 1004F, 1004AF, 1005F, 1007, 1009P, and 1010P. Examples of the commercially available bisphenol F epoxy resin include 4004P, 4005P, 4007P, 4009P, and 4010P (manufactured by Mitsubishi Chemical Corporation) and "EPOTOHTO (registered trademark)" YDF2004 (manufactured by Tohto Kasei Co., Ltd.). Examples of the commercially available brominated bisphenol A epoxy resin include "jER (registered trademark)" 5057 (manufactured by Mitsubishi Chemical Corporation). Examples of the commercially available hydrogenated bisphenol A epoxy resin include ST4100D and ST5100 (manufactured by Tohto Kasei Co., Ltd.). Among them, the bisphenol A epoxy resin or the bisphenol F epoxy resin are preferable and the bisphenol F epoxy resin is more preferable from the viewpoint of the excellent balance of heat resistance, elastic modulus, and toughness.

In the first aspect, the amine epoxy resin (D141) having three or more functional groups as the epoxy resin (D14) is preferably contained in an amount of 30 to 50 parts by mass in 100 parts by mass of all the epoxy resins. If the epoxy resin (D141) is contained in an amount of less than 30 parts by mass, the elastic modulus of the resin hardened product is insufficient. If the epoxy resin (D141) is contained in an amount of more than 50 parts by mass, the plastic deformability and the toughness of the resin hardened product are insufficient. Among the amine epoxy resins (D141) having three or more functional groups, an amine epoxy resin having three functional groups is preferable because this epoxy resin imparts the excellent balance of the elastic modulus and the toughness of the resin hardened product. Among the amine epoxy resin having three functional groups, an aminophenol epoxy resin is more preferably due to the relatively high toughness of the resin hardened product.

Preferably usable examples of the amine epoxy resin (D141) include epoxy resins selected from amine epoxy resins such as tetraglycidyldiaminodiphenylmethane, tetraglycidyldiaminodiphenylsulfone, tetraglycidyldiaminodiphenyl ether, triglycidylaminophenol, triglycidylaminocresol, and tetraglycidylxylylenediamine, an epoxy resin having triglycidyl isocyanurate skeleton, and halogenated, alkyl-substituted, and hydrogenated products of them.

Examples of tetraglycidyldiaminodiphenylmethane include "SUMI-EPDXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, and MY725 (manufactured by Huntsman Advanced Materials). Examples of tetraglycidyldiaminodiphenyl ether include 3,3'-TGDDE (manufactured by Toray Industries Inc.). Examples of triglycidylaminophenol or triglycidylaminocresol include "Araldite (registered trademark)" MY0500, MY0510, MY0600, and MY0610 (manufactured by Huntsman Advanced Materials), and "jER (registered trademark)" 630 (manufactured by Mitsubishi Chemical Corporation). Examples of tetraglycidylxylylenediamine and the hydrogenated products thereof include "TETRAD (registered trademark)"-X and "TETRAD (registered trademark)"-C (manufactured by Mitsubishi Gas Chemical Company). Examples of the commercially available tetraglycidyldiaminodiphenylsulfone include TG3DAS (manufactured by Konishi Chemical Ind. Co., Ltd.).

In the first aspect, a bisphenol epoxy resin (D151) having a number average molecular weight of 150 to 1200 as the epoxy resin (D15) is contained in an amount of 10 to 40 parts by mass in 100 parts by mass of all the epoxy resins. The epoxy resin (D151) is preferably contained in an amount of 20 to 40 parts by mass in 100 parts by mass of all the epoxy resins. If the epoxy resin (D151) is contained in an amount of more than 40 parts by mass, the toughness of a resin hardened product to be produced is insufficient. If the epoxy resin (D151) is contained in an amount of less than 10 parts by mass, the viscosity of the epoxy resin composition is high. Use of the epoxy resin (D151) having a number average molecular weight of less than 1200 can lower the viscosity of an epoxy resin composition to be produced. As a result, the epoxy resin composition tends to be easily impregnated into carbon fibers in a prepreg production process and thus the fiber content rate of a prepreg to be produced can be increased. If the epoxy resin (D151) has a number average molecular weight of more than 1200, the viscosity of the epoxy resin composition tends to be high. As a result, the epoxy resin composition is difficult to be impregnated into carbon fibers in the prepreg production process and voids are generated in the carbon fiber-reinforced composite material to be produced, which causes difficulty in increase in the fiber content rate of the prepreg. When the epoxy resin (D151) having a number average molecular weight of 150 to 1200 is used, the epoxy resin (D151) has a higher effect as a compatibilizer and thus a fine phase separation structure is easily formed. If the bisphenol epoxy resin (D151) has a number average molecular weight of less than 150 or more than 1200, the epoxy resin (D151) is easy to be compatible with any one of the phases and thus the effect as the compatibilizer is low. As a result, the phase separation structure period of the resin hardened product is large. The epoxy resin (D151) preferably has a number average molecular weight of 150 to 450.

Any bisphenol epoxy resin having the predetermined molecular weight range can be used as the epoxy resin (D151). Preferable example of the bisphenol epoxy resin include bisphenol A epoxy resins, bisphenol F epoxy resins, bisphenol AD epoxy resins, bisphenol S epoxy resins, and halogenated, alkyl-substituted, and hydrogenated products of these bisphenol epoxy resins.

A bisphenol epoxy resin having a softening point of 50° C. or lower is preferably used as the epoxy resin (D151) because the viscosity of the epoxy resin composition can be lowered. Examples of the commercially available epoxy resin (D151) include the following epoxy resins.

Examples of the commercially available bisphenol A epoxy resin include "jER (registered trademark)" 825, 826, 827, 828, 834, 1001, and 1002 (manufactured by Mitsubishi Chemical Corporation). Examples of the commercially available brominated bisphenol A epoxy resin include Epc152 and Epc153 (manufactured by DIC Corporation) and "jER (registered trademark)" 5050 and 5051 (manufactured by Mitsubishi Chemical Corporation). Examples of the commercially available hydrogenated bisphenol A epoxy resin include "Denacol (registered trademark)" EX-252 (manufactured by Nagase ChemteX Corporation) and ST3000, ST5080, and ST4000D (manufactured by Tohto Kasei Co., Ltd.). Examples of the commercially available bisphenol F epoxy resin include "EPICLON (registered trademark)" 830 (manufactured by DIC Corporation), "jER (registered trademark)" 806, 807, and 4002P (manufactured by Mitsubishi Chemical Corporation), and "EPOTOHTO (registered trademark)" YDF2001 (manufactured by Tohto Kasei Co., Ltd.).

The number average molecular weight described in Fifth Embodiment is a value determined by dissolving the epoxy resin to be measured into tetrahydrofuran (THF), measuring a molecular weight by gel permeation chromatograph (GPC), and converting the molecular weight in terms of polystyrene. Measurement conditions in detail are described below.

The latent hardener (E) may be any hardener that hardened an epoxy resin. Examples of the latent hardener (E) include amines such as aliphatic amines, aromatic amines, and alicyclic amines, acid anhydrides, polyaminoamides, organic acid hydrazides, and isocyanates.

The amine hardener is preferable because a resin hardened product to be produced has excellent mechanical characteristics and heat resistance. Preferable examples of the amine hardener include diaminodiphenylsulfone and diaminodiphenylmethane as aromatic amines, dicyandiamide as aliphatic amines or a derivative thereof, and hydrazide compounds. Dicyandiamide or the derivative thereof is particularly preferable because a resin hardened product to be produced has excellent balance between elastic modulus and elongation and the epoxy resin composition has excellent long-term storage stability. Examples of the commercially available dicyandiamide include DICY-7 and DICY-15 (manufactured by Mitsubishi Chemical Corporation). The derivative of dicyandiamide is a compound prepared by bonding with various compounds. Examples of the derivative include a reacted substance with an epoxy resin and a reacted substance with a vinyl compound or an acrylic compound.

Addition of powdered dicyandiamide or the derivative thereof as the latent hardener (E) to the epoxy resin composition is preferable from the viewpoint of long-term storage stability at room temperature and viscosity stability at the time of prepreg formation. When dicyandiamide or the derivative thereof is added to a resin as powder, the average particle diameter thereof is preferably 10 μm or less and even more preferably 7 μm or less. When the epoxy resin composition is impregnated into carbon fiber bundles by heating and pressurizing in the prepreg production process, dicyandiamide or the derivative thereof having a particle diameter of more than 10 μm may fail to be permeated into the carbon fiber bundles and may remain on the surface layer of the carbon fiber bundles.

The latent hardener (E) is preferably contained in a total amount so as to give an amount of an active hydrogen group ranging from 0.6 to 1.0 equivalent and more preferably ranging from 0.7 to 0.9 equivalent relative to the epoxy group in all the epoxy resin component in the epoxy resin composition. If the active hydrogen group is contained in an amount of less than 0.6 equivalent, a resin hardened product may have insufficient reaction rate, heat resistance, and elastic modulus, and a carbon fiber-reinforced composite material to be produced may have insufficient glass transition temperature and mechanical characteristics such as tensile strength. If the active hydrogen group is contained in an amount of more than 1.0 equivalent, a resin hardened product has sufficient reaction rate, glass transition temperature, and elastic modulus but has insufficient plastic deformability, and thus a carbon fiber-reinforced composite material to be produced may have insufficient impact resistance.

The latent hardener (E) may be used in combination with a hardening accelerator and another hardener for an epoxy resin. Examples of the combined hardening accelerator include ureas, imidazoles, and Lewis acid catalysts.

Examples of the urea compound include the same as the urea compound exemplified in First Embodiment.

Examples of the commercially available imidazoles include 2MZ, 2PZ, and 2E4MZ (manufactured by SHIKOKU CHEMICALS CORPORATION). Examples of the Lewis acid catalysts include complexes of a boron halide and a base such as boron trifluoride-piperidine complex, boron trifluoride-monoethylamine complex, boron trifluoride-triethanolamine complex, and boron trichloride-octylamine complex.

Among them, the urea compound is preferably used from the viewpoint of the balance between long-term storage stability and catalytic ability. The urea compound is preferably contained in an amount of 1 to 5 parts by mass relative to 100 parts by mass of all the epoxy resin components contained in the epoxy resin composition. If the urea compound is contained in an amount of less than 1 part by mass, a reaction may insufficiently proceed and thus the resin hardened product tends to have insufficient elastic modulus and heat resistance. If the urea compound is contained in an amount of more than 5 parts by mass, the self-polymerization of an epoxy resin interferes with the reaction between the epoxy resin and the hardener, and thus the resin hardened product may have lower toughness and lower elastic modulus.

Next, a second aspect of the epoxy resin composition of Fifth Embodiment will be described. The epoxy resin composition of the second aspect of Fifth Embodiment at least includes an epoxy resin (D132) having a softening point of 90° C. or higher, an epoxy resin (D142) having a softening point of 50° C. or lower and having an SP value larger by 1.2 or more than the SP values of both the epoxy resin (D132) and an epoxy resin (D152), the epoxy resin (D152) having a softening point of 50° C. or lower, and a latent hardener (E), in which the epoxy resin hardened product obtained by hardening the epoxy resin composition has a phase separation structure including an epoxy resin (D132) rich phase and an epoxy resin (D142) rich phase and the phase separation structure period of the phase separation structure is 1 nm to 5 μm.

In the second aspect, it is required that the softening point of the epoxy resin (D132) be 90° C. or higher and the softening points of the epoxy resins (D142) and (D152) be 50° C. or lower. When the epoxy resins (D132), (D142), and (D152) satisfy these requirements, formation of a uniform structure by dissolving the epoxy resin (D132) and the epoxy resin (D142) each other in a resin hardened product to be produced can be prevented and thus both elastic modulus and toughness are improved.

In the second aspect, the epoxy resin (D142) has an SP value that is 1.2 or more larger than the SP values of both the epoxy resin (D132) and the epoxy resin (D152). Here, the SP value of each epoxy resin means SP values of resin hardened products (D132'), (D142'), and (D152') obtained by reacting the epoxy resins (D132), (D142), and (D152) with the latent hardener (E), respectively and each SP value is required to satisfy the following conditions.

$$\text{(SP value of }(D142'))\geq\text{(SP value of }(D132'))+1.2 \quad (1)$$

$$\text{(SP value of }(D142'))\geq\text{(SP value of }(D152'))+1.2 \quad (2)$$

Here, the SP value means a generally known solubility parameter and is an indicator of solubility and compatibility. The SP value defined in the present invention is a value calculated from a molecular structure based on Fedrds' method described in Polym. Eng. Sci., 14 (2), 147-154 (1974). When the SP value of (D142') is a smaller value than a value of adding 1.2 to the SP value of (D132'), the epoxy resin (D132) and the epoxy resin (D142) are dissolved each other in a resin hardened product to be produced to form the uniform structure and thus the elastic modulus and the toughness of the resin hardened product is insufficient. When the SP value of (D142') is a smaller value than a value of adding 1.2 to the SP value of (D152'), (D152) as a compatibilizer is only dissolved into the epoxy resin (D142) in a resin hardened product to be produced and thus a coarse phase separation between the epoxy resin (D132) rich phase and the epoxy resin (D142) rich phase is generated.

In the second aspect, an epoxy resin composition containing the epoxy resin (D152), dicyandiamide contained in an amount of active hydrogen groups of 0.9 equivalent relative to the epoxy groups of the epoxy resin (D152), and 2 parts by mass of DCMU relative to 100 parts by mass of the epoxy resin (D152) is heated from room temperature to 130° C. at 2.5° C./min and reacted at 130° C. for 90 minutes and a resin hardened product to be produced preferably has an elastic modulus of 3.3 GPa or more. If the resin hardened product has an elastic modulus of less than 3.3 GPa, the resin hardened product obtained from the epoxy resin composition of Fifth Embodiment may fail to impart excellent elastic modulus. The epoxy resin (D152) acts as a compatibilizer and is a component dissolving into the epoxy resin (D132) rich phase and the epoxy resin (D142) rich phase, and thus a resin hardened product to be produced has high elastic modulus due to high elastic modulus of the epoxy resin (D152). Particularly, when the phase separation structure is the island-sea structure, the high the elastic modulus of the sea phase covering the island phase is important and thus an effect that the elastic modulus of the sea phase is high due to dissolution of the epoxy resin (D152) in the sea phase is highly effective. Here, the active hydrogen group is a functional group that can react with the epoxy group. Examples of the active hydrogen group include an amino group and a hydroxy group.

In the second aspect, it is required that the resin hardened product obtained by hardening the epoxy resin composition have the phase separation structure including the epoxy resin (D132) rich phase and the epoxy resin (D142) rich phase and the phase separation structure period of the phase separation structure be 1 nm to 5 μm. An even more preferable phase separation structure period is 1 nm to 1 μm.

The resin hardened product having the phase separation structure can satisfy both the elastic modulus and the toughness of the resin hardened product. If the structure period of is less than 1 nm, a cavitation effect cannot be achieved and thus not only toughness but also elastic modulus tend to be insufficient. If the structure period of the phase separation structure is more than 5 μm, the cavitation effect cannot be exerted because the structure period is large and thus cracks are not developed to the island phase but developed only in the region of the sea phase, which results in the insufficient toughness.

Preferable examples of the epoxy resin (D132) include epoxy resins having a softening point of 90° C. or higher selected from bisphenol epoxy resins, isocyanate-modified epoxy resins, anthracene epoxy resins, and halogenated, alkyl-substituted, and hydrogenated products of them. If the softening point of the epoxy resin (D132) is lower than 90° C., the toughness of the resin hardened product is insufficient and thus the impact resistance of the carbon fiber-reinforced composite material is insufficient.

A bisphenol epoxy resin having a softening point of 90° C. or higher is preferably used as the epoxy resin (D132) because such an epoxy resin imparts high toughness of the resin hardened product. Among them, the bisphenol A epoxy resin or the bisphenol F epoxy resin are preferable from the viewpoint of the excellent balance of heat resistance, elastic modulus, and toughness. The bisphenol F epoxy resin is more preferable because such an epoxy resin imparts high elastic modulus. The epoxy resin (D132) is preferably contained in an amount of 20 to 50 parts by mass in 100 parts by mass of all the epoxy resins and more preferably contained in an amount of 30 to 50 parts by mass in 100 parts by mass of all the epoxy resins. If the epoxy resin (D132) is contained in an amount of less than 20 parts by mass, a resin hardened product to be produced tends to be difficult to form the phase separation structure and toughness tends to be deteriorated. If the epoxy resin (D132) is contained in an amount of more than 50 parts by mass, the elastic modulus and the heat resistance of the resin hardened product tend to be insufficient and the viscosity of the epoxy resin composition tends to be excessively high. If the viscosity of the epoxy resin composition is excessively high, the epoxy resin composition is not sufficiently impregnated between carbon fibers at the time of prepreg production. This generates voids in a carbon fiber-reinforced composite material to be produced and thus the mechanical characteristics such as the tensile strength of the carbon fiber-reinforced composite material may be deteriorated.

Examples of the commercially available epoxy resin (D132) include the following epoxy resins. Examples of the commercially available bisphenol A epoxy resin include "jER (registered trademark)" 1004, 1004F, 1004AF, 1005F, 1007, 1009P, and 1010P. Examples of the commercially available bisphenol F epoxy resin include 4004P, 4005P, 4007P, 4009P, and 4010P (manufactured by Mitsubishi Chemical Corporation) and "EPOTOHTO (registered trademark)" YDF2004 (manufactured by Tohto Kasei Co., Ltd.). Examples of the commercially available brominated bisphenol A epoxy resin include "jER (registered trademark)" 5057 (manufactured by Mitsubishi Chemical Corporation). Examples of the commercially available hydrogenated bisphenol A epoxy resin include ST4100D and ST5100 (manufactured by Tohto Kasei Co., Ltd.).

Examples of the epoxy resin (D142) include epoxy resins having a softening point of 50° C. or lower selected from amine epoxy resins such as tetraglycidyldiaminodiphenylmethane, tetraglycidyldiaminodiphenyl ether, triglycidylaminophenol, triglycidylaminocresol, tetraglycidylxylylenediamine, and an epoxy resin having triglycidyl isocyanurate skeleton, and halogenated, alkyl-substituted, or hydrogenated products of them.

Examples of tetraglycidyldiaminodiphenylmethane include "SUMI-EPDXY (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, and MY725 (manufactured by Huntsman Advanced Materials). Examples of tetraglycidyldiaminodiphenyl ether include 3,3'-TGDDE (manufactured by Toray Fine Chemicals Co., Ltd.). Examples of triglycidylaminophenol or triglycidylaminocresol include "Araldite (registered trademark)" MY0500, MY0510, MY0600, and MY0610 (manufactured by Huntsman Advanced Materials), and "jER (registered trademark)" 630 (manufactured by Mitsubishi Chemical Corporation). Examples of tetraglycidylxylylenediamine and the hydrogenated products thereof include "TETRAD (registered trademark)"-X and "TETRAD (registered trademark)"-C (manufactured by Mitsubishi Gas Chemical Company). Examples of the epoxy resin having triglycidyl isocyanurate skeleton include "TEPIC (registered trademark)" B26 (manufactured by Nissan Chemical Industries, Ltd.).

An amine epoxy resin having three or more functional groups is preferable as the epoxy resin (D142). The epoxy resin (D142) is preferably contained in an amount of 30 to 50 parts by mass in 100 parts by mass of all the epoxy resins. If the epoxy resin (D142) is contained in an amount of less than 30 parts by mass, a resin hardened product to be produced tends to be difficult to form the phase separation structure and elastic modulus tends to be deteriorated. If the epoxy resin is contained in an amount of more than 50 parts by mass, the plastic deformability and the toughness of the resin hardened product tend to be deteriorated. Among the amine epoxy resins having three or more functional groups, an amine epoxy resin having three functional groups is preferable because this epoxy resin imparts the excellent balance of the elastic modulus and the toughness to the resin hardened product. Among the amine epoxy resin having three functional groups, an aminophenol epoxy resin is more preferably due to the relatively high toughness.

Examples of the epoxy resin (D152) include an epoxy resins selected from epoxy resins having a softening point of 50° C. or lower such as bisphenol A epoxy resins, bisphenol F epoxy resins, bisphenol AD epoxy resins, bisphenol S epoxy resins, phenol novolac epoxy resins, cresol novolac epoxy resins, and halogenated, alkyl-substituted, and hydrogenated products of them. Examples of the commercially available bisphenol A epoxy resin include "jER (registered trademark)" 825, 826, 827, 828, and 834 (manufactured by Mitsubishi Chemical Corporation). Examples of the commercially available hydrogenated bisphenol A epoxy resin include "Denacol (registered trademark)" EX-252 (manufactured by Nagase ChemteX Corporation) and ST3000 (manufactured by Tohto Kasei Co., Ltd.). Examples of the commercially available bisphenol F epoxy resin include "EPICLON (registered trademark)" 830 (manufactured by DIC Corporation) and "jER (registered trademark)" 806 and 807 (manufactured by Mitsubishi Chemical Corporation). Examples of the commercially available phenol novolac epoxy resin include "jER (registered trademark)" 152 and 154 (manufactured by Mitsubishi Chemical Corporation) and EPN1179 and EPN1180 (manufactured by Huntsman Advanced Materials). Examples of the commercially available cresol novolac epoxy resin include ECN9511 (manufactured by Huntsman Advanced Materials). If the epoxy resin (D152) has a softening point of higher than 50° C., the viscosity of the epoxy resin composition tends to be high. As a result, the epoxy resin composition is difficult to be impregnated into carbon fibers in the prepreg production process and voids are generated in the carbon fiber-reinforced composite material to be produced, which causes deterioration in impact resistance.

An epoxy resin having a number average molecular weight of 1200 or less is preferable as the epoxy resin (D152) because the epoxy resin imparts high elastic modulus and has excellent compatibility to the epoxy resins (D132) and (D142). The epoxy resin (D152) is preferably contained in an amount of 10 to 40 parts by mass in 100 parts by mass of all the epoxy resins. The epoxy resin (D152) is more preferably contained in an amount of 20 to 40 parts by mass in 100 parts by mass of all the epoxy resins. If the epoxy resin (D152) is contained in an amount of less than 10 parts by mass, the phase separation structure period of the resin hardened product tends to be large. If the epoxy resin (D152) is contained in an amount of more than 40 parts by mass, the epoxy resins (D132) and (D142) tend to be dissolved in each other and the phase separation structure is difficult to be formed, which tends to deteriorate the elastic modulus and the toughness of the resin hardened product. The number average molecular weight can be measured by the same manner as in the first aspect.

Use of the epoxy resin (D152) having a number average molecular weight of less than 1200 can lower the viscosity of an epoxy resin composition to be produced. As a result, the epoxy resin composition tends to be easily impregnated into carbon fibers in a prepreg production process and thus the fiber content rate of a prepreg to be produced can be increased. If the epoxy resin (D152) has a number average molecular weight of more than 1200, the viscosity of the epoxy resin composition tends to be high. As a result, the epoxy resin composition is difficult to be impregnated into carbon fibers in the prepreg production process and voids are generated in the carbon fiber-reinforced composite material to be produced, which causes difficulty in increase in the fiber content rate of the prepreg. When the epoxy resin (D152) having a number average molecular weight of 150 to 1200 is used, the epoxy resin (D152) has a higher effect as a compatibilizer and thus a fine phase separation structure is easily formed. If the epoxy resin (D152) has a number average molecular weight of less than 150 or more than 1200, the component (D152) is easy to be compatible with any one of the phases and thus the effect as the compatibilizer is low. As a result, the phase separation structure period of the resin hardened product is large. The epoxy resin (D152) preferably has a number average molecular weight of 150 to 450.

Examples of the commercially available epoxy resin (D152) having a number average molecular weight of 450 or less include commercially available bisphenol A epoxy resins such as "jER (registered trademark)" 825, 826, 827, and 828 (manufactured by Mitsubishi Chemical Corporation) and commercially available bisphenol F epoxy resins such as "EPICLON (registered trademark)" 830 (manufactured by DIC Corporation) and "jER (registered trademark)" 806 (manufactured by Mitsubishi Chemical Corporation).

In the second aspect, the same latent hardener (E) as described in the first aspect can be used as the latent hardener (E).

In the first aspect and the second aspect, a preferred combination of the sizing agent and the latent hardener (E) is as below. The sizing agent and the latent hardener (E) are mixed so that the amine equivalent/epoxy equivalent rate of the sizing agent to be applied and the latent hardener (E) would be 1.0, and the glass transition point is determined immediately after the mixing and after storage in an environment at a temperature of 25° C. and a humidity of 60% for 20 days. A preferred combination of the sizing agent and the latent hardener (E) has an increase in glass transition point of the mixture by 10° C. or smaller after 20 days. When the combination having an increase in glass transition point by 10° C. or smaller is used to produce a prepreg, the reaction of the outer layer of the sizing agent with the inside of a matrix resin is suppressed, and this suppresses the deterioration of mechanical characteristics such as tensile strength of a carbon fiber-reinforced composite material produced after the prepreg is stored for a long period of time. Such a combination is thus preferred. The increase in glass transition point is more preferably 8° C. or smaller. The glass transition point can be determined by differential scanning calorimetry (DSC).

In the first aspect and the second aspect, the epoxy resin and the latent hardener (E) or a prereacted product of some of them may be contained in the epoxy resin composition. The technique may be effective in viscosity control or long-term storage stability improvement.

In order to improve workability by adjusting the viscoelasticity or to improve the elastic modulus and the heat resistance of the resin hardened product in the first aspect and the second aspect, an epoxy resin other than the epoxy resins (D13), (D14), and (D15) can be added to the epoxy resin composition to an extent not impairing the effect of the present invention. These epoxy resins can be added not only singly but also in combination of a plurality of epoxy resins. Specific example of these epoxy resins include phenol novolac epoxy resins, cresol novolac epoxy resins, resorcinol epoxy resins, phenol aralkyl epoxy resins, dicyclopentadiene epoxy resins, epoxy resins having a biphenyl skeleton, isocyanate modified epoxy resins, anthracene epoxy resins, polyethylene glycol epoxy resins, N,N-diglycidylaniline, and diglycidyl-p-phenoxyaniline.

Examples of the commercially available phenol novolac epoxy resin include EPPN-201 (manufactured by Nippon Kayaku Co., Ltd.) and "EPICLON (registered trademark)" N-770 and N-775 (manufactured by DIC Corporation).

Examples of the commercially available cresol novolac epoxy resin include "EPICLON (registered trademark)" N-660, N-665, N-670, N-673, and N-695 (manufactured by DIC Corporation) and EOCN-1020, EOCN-102S, and EOCN-104S (manufactured by Nippon Kayaku Co., Ltd.).

Specific examples of the resorcinol epoxy resin include "Denacol (registered trademark)" EX-201 (manufactured by Nagase ChemteX Corporation).

Examples of the commercially available dicyclopentadiene epoxy resin include "EPICLON (registered trademark)" HP7200, HP7200L, and HP7200H (manufactured by DIC Corporation), "TACTIX (registered trademark)" 558 (manufactured by Huntsman Advanced Materials), and XD-1000-1L and XD-1000-2L (manufactured by Nippon Kayaku Co., Ltd.).

Examples of the commercially available epoxy resin having a biphenyl skeleton include "jER (registered trademark)" YX4000H, YX4000, and YL6616 (manufactured by Mitsubishi Chemical Corporation) and NC-3000 (manufactured by Nippon Kayaku Co., Ltd.).

Examples of the commercially available isocyanate-modified epoxy resin include "AER (registered trademark)" 4152 (manufactured by Asahi Kasei E-materials Corporation) and XAC4151 (manufactured by Asahi Kasei Chemicals Corporation), which have an oxazolidone ring.

Examples of the commercially available anthracene epoxy resin include YX8800 (manufactured by Mitsubishi Chemical Corporation).

Examples of the commercially available polyethylene glycol epoxy resin include "Denacol (registered trademark)" EX810, 811, 850, 851, 821, 830, 841, and 861 (manufactured by Nagase ChemteX Corporation).

Examples of commercially available diglycidylaniline include GAN and GOT (manufactured by Nippon Kayaku Co., Ltd.).

Examples of commercially available diglycidyl-p-phenoxyaniline include PxGAN (manufactured by Toray Fine Chemicals Co., Ltd.).

In order to control viscoelasticity and to improve the tuck and drape properties of a prepreg and the mechanical characteristics such as the impact resistance of the carbon fiber-reinforced composite material, the epoxy resin composition of the present invention can contain a thermoplastic resin soluble into the epoxy resin, organic particles such as rubber particles and thermoplastic resin particles, inorganic particles, and the like.

Examples of the soluble thermoplastic resin added to the epoxy resin include a thermoplastic resin generally having a chemical bond selected from the group consisting of a carbon-carbon bond, an amide bond, an imide bond, an ester bond, an ether bond, a carbonate bond, a urethane bond, a thioether bond, a sulfone bond, and a carbonyl bond on the main chain. The thermoplastic resin may have a partial cross-linked structure and may be crystalline or amorphous. In particular, at least one resin selected from the group consisting of polyamide, polycarbonate, polyvinyl formal, polyvinyl butyral, polyvinyl alcohol, polyacetal, polyphenylene oxide, polyphenylene sulfide, polyarylate, polyester, a phenoxy resin, polyamideimide, polyimide, polyetherimide, polyimide having a phenyltrimethylindane structure, polysulfone, polyethersulfone, polyether ether ketone, polyether ether ether ketone, polyaramids, polyether nitrile, and polybenzimidazole is preferably dissolved in the epoxy resin.

The terminal functional group of the thermoplastic resin of a hydroxy group, a carboxy group, a thiol group, an acid anhydride, and other groups can react with a cation-polymerizable compound and thus preferably used. Examples of the thermoplastic resin having a hydroxy group include polyvinyl acetal resins such as polyvinyl formal and polyvinyl butyral, polyvinyl alcohol, and phenoxy resins.

Among them, polyvinyl formal, polyvinyl butyral, polyethersulfone, polyetherimide, or polyphenylene ether are preferably used because these resins are easily dissolved into an epoxy resin to improve adhesion between carbon fibers and the epoxy resin composition without impairing the heat resistance of the hardened product and to easily adjust viscosity by the selection of molecular weight or the adjustment of an added amount.

Specific examples of the commercially available thermoplastic resin include polyvinyl acetal resins including polyvinyl formal such as "Vinylec (registered trademark)" K, "Vinylec (registered trademark)" L, "Vinylec (registered trademark)" H, and "Vinylec (registered trademark)" E (manufactured by Chisso Corporation), polyvinyl acetal such as "S-LEC (registered trademark)" K (manufactured by SEKISUI CHEMICAL CO., LTD.), and polyvinyl butyral such as "S-LEC (registered trademark)" B (manufactured by SEKISUI CHEMICAL CO., LTD.) and Denka Butyral (manufactured by Denki Kagaku Kogyo K. K.). Specific usable examples of the commercially available polyethersulfone include "SUMIKAEXCEL (registered trademark)" PES3600P, "SUMIKAEXCEL (registered trademark)" PES5003P, "SUMIKAEXCEL (registered trademark)" PES5200P, "SUMIKAEXCEL (registered trademark)" PES7600P, and "SUMIKAEXCEL (registered trademark)" PES7200P (manufactured by Sumitomo Chemical Co., Ltd.), "Ultrason (registered trademark)" E2020P SR and "Ultrason (registered trademark)" E2021SR (manufactured by BASF SE), "GAFONE (registered trademark)" 3600RP and "GAFONE (registered trademark)" 3000RP (manufactured by Solvay Advanced Polymers), and "Virantage (registered trademark)" PESU VW-10200 and "Virantage (registered trademark)" PESU VW-10700 (registered trademark, manufactured by Solvay Advanced Polymers). Examples of the thermoplastic resin include the copolymerized oligomer of polyethersulfone and polyetherethersulfone as described in PCT Patent Publication No. 2004-506789 and "Ultem (registered trademark)" 1000, "Ultem (registered trademark)" 1010, and "Ultem (registered trademark)" 1040 (manufactured by SABIC Innovative Plastics Japan) as a commercially available polyetherimide.

An acrylic resin has high compatibility with the epoxy resin and preferably used for controlling viscoelasticity. Examples of the commercially available acrylic resin include "Dianal (registered trademark)" BR series (manufactured by Mitsubishi Rayon Co., Ltd.) and "Matsumoto Microsphere (registered trademark)" M, M100, and M500 (manufactured by Matsumoto Yushi-Seiyaku Co., Ltd.).

The rubber particles are preferably cross-linked rubber particles and core-shell rubber particles obtained by graft polymerization of the surface of cross-linked rubber particles with a different polymer from the viewpoint of handling properties and the like.

Examples of the commercially available core-shell rubber particles include "PARALOID (registered trademark)" EXL-2655, EXL-2611, and EXL-3387 (manufactured by Rohm & Haas) containing a butadiene-alkyl methacrylate-styrene copolymer, "STAPHYLOID (registered trademark)" AC-3355 and TR-2122 (manufactured by GANZ Chemical Co., Ltd.), "NANOSTRENGTH (registered trademark)" M22, 51, 52, and 53 (manufactured by Arkema Inc.), and "Kane Ace (registered trademark)" MX (manufactured by Kaneka Corporation) containing an acrylate-methacrylate copolymer.

The thermoplastic resin particles may be the same as the various thermoplastic resins exemplified above and can be used by mixing in the epoxy resin composition. Among them, the polyamide is the most preferable thermoplastic resin. Among the polyamides, nylon 12, nylon 6, nylon 11, nylon 6/12 copolymer, and nylon forming semi-IPN (Inter-penetrating Polymer Network structure) by the epoxy compound (semi-IPN nylon) described in Example 1 in Japanese Patent Application Laid-open No. H01-104624 impart excellent adhesion strength with the epoxy resin. As for the shape, the thermoplastic resin particles may be spherical particles, nonspherical particles, or porous particles. The spherical particles are preferred for the reasons below. The spherical particles do not deteriorate the flow characteristics of a resin and thus the resin has excellent viscoelasticity. In addition, the spherical particles are preferable because they have no starting point of a stress concentration and impart high impact resistance. Examples of the commercially available polyamide particles include SP-500, SP-10, TR-1, TR-2, 842P-48, and 842P-80 (manufactured by Toray Industries Inc.), "TORAYPEARL (registered trademark)" TN (manufactured by Toray Industries Inc.), and "Orgasol (registered trademark)" 1002D, 2001UD, 2001EXD, 2002D, 1702D, 3501D, and 3502D (manufactured by Arkema Inc.).

In Fifth Embodiment, further containing at least one block copolymer selected from the group consisting of S-B-M, B-M, and M-B-M (hereinafter may be called a block copolymer) is effective in improving the toughness and the impact resistance while maintaining the excellent heat resistance of the epoxy resin composition.

Here, S, B, and M mean each block defined below. Each block represented by S, B, and M is directly linked with a covalent bond or linked with a covalent bond through an intermediary molecule having some chemical structures.

It is preferable that any S, B, and M for the block copolymer S-M-B and either B or M for the block copolymer B-M or M-B-M be compatible with epoxy resins from the viewpoint of improvement of toughness.

The block M is a block made of a poly(methyl methacrylate) homopolymer or a copolymer containing at least 50% by mass of methyl methacrylate. The block M is preferably made of at least 60% by mass of syndiotactic PMMA (poly(methyl methacrylate)).

The block B is a block incompatible to the block M and has a glass transition temperature of 20° C. or lower. When any of the epoxy resin compositions and the block copolymers are used, the glass transition temperature of the block B can be measured by a DMA method using the dynamic viscoelasticity measurement devices (RSAII: manufactured by Rheometrics Inc. or Rheometer ARES: manufactured by TA Instruments). More specifically, a plate-like sample having a thickness of 1 mm, a width of 2.5 mm, and a length of 34 mm is formed and a dynamic viscosity is measured by applying stress with a cycle of 1 Hz while sweeping at a temperature from −100 to 250° C., and the glass transition temperature of the block B is determined as a temperature at which a tan δ value of the dynamic viscosity has a maximum value. The sample is prepared as follows. When the epoxy resin composition is used, a plate-like resin hardened product having no voids can be obtained by defoaming an unhardened resin composition in vacuum and then hardening the unhardened resin composition at a temperature of 130° C. for 2 hours in a mold whose thickness is set to 1 mm using a "Teflon (registered trademark)" spacer having a thickness of 1 mm. When only the block copolymer is used, a plate having no voids is formed by using a twin screw extruder. Samples having the above size are cut out from these plates with a diamond cutter and the samples can be evaluated.

The glass transition temperature of the block B is 20° C. or lower, preferably 0° C. or lower, and more preferably −40° C. or lower. The lower the glass transition temperature, the better, from the viewpoint of the toughness of the hardened product. However, a glass transition temperature of lower than −100° C. may cause trouble in processability such as a rough grinded surface generation at the time of producing the carbon fiber-reinforced composite material.

The block B is preferably an elastomer block. Examples of monomers used for constituting the elastomer block include dienes selected from butadiene, isoprene, 2,3-dimethyl-1,3-butadiene, 1,3-pentadiene, and 2-phenyl-1,3-butadiene.

The block B is preferably selected from polydienes, particularly polydienes such as polybutadiene, polyisoprene, and a random copolymer thereof, or partially or fully hydrogenated polydienes from the viewpoint of toughness. The partially or fully hydrogenated polydienes can be prepared in accordance with a usual hydrogenation method. Among the exemplified dienes, 1,4-polybutadiene having the lowest glass transition temperature (glass transition temperature: approximately −90° C.) is more preferably used. This is because the use of the block B having lower glass transition temperature is advantageous from the viewpoint of impact resistance and toughness.

An alkyl (meth)acrylate also may be used as the monomer used for constituting the elastomer block B. Specific examples of the monomer include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). Here, the values in the parentheses after the names of each acrylate are the glass transition temperature of the block B when each acrylate is used. Among them, butyl acrylate is preferably used. These acrylates are not compatible with the block M containing at least 50% by mass of methyl methacrylate. The block B is preferably a block selected from 1,4-polybutadiene, poly(butyl acrylate), and poly(2-ethylhexyl acrylate) and more preferably 1,4-polybutadiene and poly(butyl acrylate).

The block S is a block incompatible to the block B and the block M and has a higher glass transition temperature than that of the block B. The glass transition temperature or the melting point of the block S is preferably 23° C. or higher and more preferably 50° C. or higher. Examples of monomers constituting the block S include aromatic vinyl compounds such as styrene, α-methylstyrene, and vinyltoluene; and an alkyl ester of (meth)acrylic acid in which the alkyl chain has 1 to 18 carbon atoms.

The block copolymer is preferably contained in an amount of 1 to 10 parts by mass and even more preferably in an amount of 2 to 7 parts by weight relative to 100 parts by mass of all the epoxy resin components from the viewpoint of mechanical characteristics and appropriateness for a prepreg production process. If the block copolymer is contained in an amount of less than 1 part by mass, the improvement effect of the toughness and the plastic deformability of the resin hardened product is small and thus the impact resistance of the carbon fiber-reinforced composite material may be deteriorated. If the block copolymer is contained in an amount of more than 10 parts by mass, the elastic modulus of the resin hardened product is lowered and thus the mechanical characteristics of the carbon fiber-reinforced composite material is lowered. In addition, the viscosity of the epoxy resin composition is high and thus the handling properties may be impaired.

When a triblock copolymer M-B-M is used as the block copolymer, the two blocks M in the triblock copolymer M-B-M are the same as or different from each other. The blocks M can be blocks having different molecular weight when the blocks are made of the same monomer.

When the triblock copolymer M-B-M and the diblock copolymer B-M are used in combination as the block copolymer, the block M in the triblock copolymer M-B-M and the block M in the diblock copolymer B-M may be the same as or different from each other and the block B in the triblock copolymer M-B-M and the block B in the diblock copolymer B-M may be the same as or different from each other.

When the triblock copolymer S-B-M and the diblock copolymer B-M and/or the triblock copolymer M-B-M are used in a combination as the block copolymer, the block M in the triblock copolymer S-B-M, each block M in the triblock copolymer M-B-M, and the block M in the diblock copolymer B-M may be the same as or different from each other and each block B in the triblock copolymer S-B-M, the triblock copolymer M-B-M, and the diblock copolymer B-M may be the same as or different from each other.

The block copolymer can be produced by anion polymerization. For example, the block copolymer can be produced by the methods described in European Patent EP No. 524,054 and European Patent EP No. 749,987.

Specific examples of the triblock copolymer M-B-M include Nanostrength M22 (manufactured by Arkema Inc.) as methyl methacrylate-butyl acrylate-methyl methacrylate and Nanostrength M22N (manufactured by Arkema Inc.) having a polar functional group. Specific examples of the triblock copolymer S-B-M include Nanostrength 123, Nanostrength 250, Nanostrength 012, Nanostrength E20, and Nanostrength E40, (manufactured by Arkema Inc.) as styrene-butadiene-methyl methacrylate When the block copolymer is contained, even if the epoxy resins (D13), (D14), and (D15) are in a state of being uniformly dissolved with each other before hardening, spinodal decomposition occurs during the hardening process and thus a phase separation structure including at least three structures of the epoxy resin (D13) rich phase, the epoxy resin (D14) rich phase, and the block copolymer rich phase is tended to be formed.

In the epoxy resin composition of the second aspect, when the epoxy resin composition includes the epoxy resins (D132), (D142), and (D152), the latent hardener (E), and the block copolymer, it is required that a resin hardened product to be produced have a phase separation structure including the epoxy resin (D132) rich phase, the epoxy resin (D142) rich phase, and the block copolymer rich phase and the phase separation structure periods of the epoxy resin (D132) rich phase, the epoxy resin (D142) rich phase, and the block copolymer rich phase be 1 nm to 5 μm.

In the epoxy resin composition of the first aspect, when the epoxy resin composition includes the epoxy resins (D131), (D141), and (D151), the latent hardener (E), and the block copolymer, a resin hardened product to be produced has a phase separation structure including the epoxy resin (D131) rich phase, the epoxy resin (D141) rich phase, and the block copolymer rich phase and the phase separation structure periods of the epoxy resin (D131) rich phase, the epoxy resin (D141) rich phase, and the block copolymer rich phase are preferably 1 nm to 5 μm and the phase separation period of the block copolymer rich phase is more preferably 1 nm to 1 μm.

The epoxy resin composition used in Fifth Embodiment contains coupling agents, thermosetting resin particles, carbon black, conductive particles such as carbon particles and metal-plated organic particles, rubber particles such as cross-linked rubber particles and core-shell rubber particles, inorganic fillers such as silica gel, nano silica, and clay, and conductive fillers to an extent not impairing the effect of the present invention. The conductive particles and the conductive fillers are preferably used because the conductivity of a resin hardened product and a carbon fiber-reinforced composite material to be produced can be improved.

The same the conductive fillers used in First Embodiment is suitably used as the conductive fillers.

In Fifth Embodiment, when the phase separation structure periods of the epoxy resin (D13) rich phase and the epoxy resin (D14) rich phase are excessively small, the phase separation structure periods can be enlarged by carrying out one or more methods of the following methods for adjusting the phase separation structure period to an extent not impairing the effect of the present invention.
(1) To reduce the content rate of the epoxy resin (D15) relative to all the epoxy resins.
(2) To heighten the softening point of the epoxy resin (D13).
(3) To lower the softening point of the epoxy resin (D14).
(4) To increase both content rates of the epoxy resins (D13) and (D14).

The phase separation structure periods of the epoxy resin (D13) rich phase and the epoxy resin (D14) rich phase can be reduced by carrying out one or more methods of the following methods to an extent not impairing the effect of the present invention.
(1) To increase the content rate of the epoxy resin (D15) to all the epoxy resins.
(2) To lower the softening point of the epoxy resin (D13).
(3) To heighten the softening point of the epoxy resin (D14).
(4) To reduce both content rates of the epoxy resins (D13) and (D14).

When the block copolymer is added to the epoxy resin composition, the phase separation structure period of the block copolymer rich phase can be reduced by carrying out one or more methods of the following methods for adjusting the phase separation structure period to an extent not impairing the effect of the present invention.
(1) To reduce the content rate of the block copolymer.
(2) To lower the softening point of the epoxy resin (D13).
(3) To increase the content rates of the epoxy resin (D14).

The phase separation structure period of the block copolymer rich phase can be enlarged by carrying out one or more methods of the following methods to an extent not impairing the effect of the present invention.
(1) To increase the content rate of the block copolymer.
(2) To heighten the softening point of the epoxy resin (D13).
(3) To reduce the content rate of the epoxy resin (D14).

When the epoxy resin composition of Fifth Embodiment is used as the matrix resin of the prepreg, the viscosity of the epoxy resin composition at 80° C. is preferably 0.5 to 200 Pa·s from the viewpoint of processability such as tuck and drape properties. If the viscosity at 80° C. of the epoxy resin composition is less than 0.5 Pa·s, the shape retention property of the produced prepreg is difficult to be maintained and thus cracks may be generated in the prepreg. In addition, excessive resin flow is generated at the time of molding the carbon fiber-reinforced composite material and thus a fiber content may fluctuate. If the viscosity at 80° C. of the epoxy resin is more than 200 Pa·s, the epoxy resin composition is not sufficiently impregnated between carbon fibers at the time of prepreg production. This generates voids in a carbon fiber-reinforced composite material to be produced and thus the mechanical characteristics such as the tensile strength of the carbon fiber-reinforced composite material may be deteriorated. The viscosity of the epoxy resin composition at 80° C. in the prepreg production process is preferably ranging from 5 to 50 Pa·s because the resin is easy to be impregnated into carbon fibers and thus the prepreg having a high fiber content rate can be produced. For the viscosity, a lower viscosity can be achieved by carrying out one or more methods of the following (1) to (2), whereas a higher viscosity can be achieved by carrying out one or more methods of the following (3) to (4) to an extent not impairing the effect of the present invention.
(1) To use an epoxy resin (D13) and/or an epoxy resin (D14) having lower softening point.
(2) To increase the content amount of the epoxy resin (D15).
(3) To use an epoxy resin (D13) and/or an epoxy resin (D14) having higher softening point.
(4) To add a thermoplastic resin.

Here, the viscosity means a complex viscosity η* measured by the dynamic viscoelasticity measurement devices (Rheometer RDA2: manufactured by Rheometrics Inc. or Rheometer ARES: manufactured by TA Instruments) using a parallel plates having a diameter of 40 mm at a simple temperature rising rate of 1.5° C./min, a frequency of 0.5 Hz, and a gap of 1 mm.

The epoxy resin composition of Fifth Embodiment preferably has an elastic modulus of the resin hardened product of the epoxy resin composition is preferably ranging from 3.8 to 5.0 GPa. The elastic modulus is more preferably ranging from 4.0 to 5.0 GPa. If the elastic modulus is less than 3.8 GPa, the static strength of the obtained carbon fiber-reinforced composite material may be deteriorated. If the elastic modulus is more than 5.0 GPa, the plastic deformability of a carbon fiber-reinforced composite material to be produced tends to be deteriorated and the impact resistance of the carbon fiber-reinforced composite material may be deteriorated. A method for measuring the elastic modulus will be described below in detail.

The elastic modulus of the resin hardened product can be improved by carrying out one or more methods of the following methods to an extent not impairing the effect of the present invention.
(1) To use a bisphenol F epoxy resin having high elastic modulus as the epoxy resin (D13).
(2) To increase the content amount of the epoxy resin (D14).
(3) To use amine epoxy resins, and among them, an aminophenol epoxy resin having high elastic modulus as the epoxy resin (D14).
(4) To use a bisphenol F epoxy resin as the epoxy resin (D15).

Hardening temperature and hardening time for obtaining the resin hardened product is selected depending on an added hardening agent or catalyst. For example, when the combined hardened agents of dicyandiamide and DCMU are used, hardening conditions of a temperature of 130 to 150° C. for 90 minutes to 2 hours are preferable and when diaminodiphenylsulfone is used hardening conditions of a temperature of 180° C. for 2 to 3 hours are preferable.

The resin toughness value of the resin hardened product made by hardening the epoxy resin composition of Fifth Embodiment is preferably 1.1 MPa·m$^{0.5}$ or more. More preferably, the resin toughness value is 1.3 MPa·m$^{0.5}$ or more. If the resin toughness value is less than 1.1 MPa·m$^{0.5}$, the impact resistance of the carbon fiber-reinforced composite material to be produced may be deteriorated. A method for measuring the resin toughness value will be described below in detail.

The resin toughness value can be improved by carrying out one or more methods of the following methods to an extent not impairing the effect of the present invention.
(1) To use the epoxy resin (D13) and/or the epoxy resin (D14) having a high number average molecular weight.
(2) To increase the content amount of the epoxy resin (D13).
(3) To add the block copolymer.

A kneader, a planetary mixer, a three-rollers milling machine, and a twin screw extruder are preferably used for preparing the epoxy resin composition of Fifth Embodiment. The epoxy resins (D13), (D14), and (D15) are uniformly dissolved by charging the epoxy resins (D13), (D14), and (D15) and raising the temperature of the epoxy resin mixture to any temperature of 130 to 180° C. while stirring the epoxy resin composition. At this time, other components such as the thermoplastic resin and the block copolymer other than the latent hardener (E) and the hardening accelerator can be added to and kneaded with the epoxy resin composition. Then, the temperature of the epoxy resin composition is preferably lowered to 100° C. or lower, more preferably 80° C. or lower, and even more preferably 60° C. or lower. The latent hardener (E) and the hardening accelerator are added to the cooled epoxy resin composition and are kneaded and dispersed. This method is preferably used because the epoxy resin composition having excellent long-term storage stability can be obtained.

The epoxy resin used in Fifth Embodiment containing the above materials in the predetermined ratio can impart a prepreg having excellent mechanical characteristics in tough environments such as a low temperature environment and a high humidity and temperature environment, having excellent adhesion between the epoxy resin composition and carbon fibers, and suppressing reduction in mechanical characteristics during a long-term storage.

Next, a process for producing the prepreg of Fifth Embodiment will be described.

The prepreg of Fifth Embodiment is prepared by impregnating sizing agent-coated carbon fiber bundles with an epoxy resin composition as a matrix resin. The prepreg can be prepared, for example, by a wet method of dissolving a matrix resin in a solvent such as methyl ethyl ketone and methanol to reduce the viscosity and impregnating carbon fiber bundles with the solution and a hot melting method of heating a matrix resin to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat application or a method of once preparing a coating film of a matrix resin composition on a release paper or the like, next superimposing the film on each side or one side of sizing agent-coated carbon fiber bundles, and applying heat and pressure to the film to impregnate the sizing agent-coated carbon fiber bundles with the matrix resin. The hot melting method is preferred because no solvent remains in the prepreg.

The method for forming a carbon fiber-reinforced composite material by using the prepreg of Fifth Embodiment is exemplified by a method of stacking prepregs and thermally hardening a matrix resin while applying pressure to the laminate.

Examples of the method of applying heat and pressure include press molding, autoclave molding, bagging molding, a wrapping tape method, and internal pressure molding method. To specifically produce sporting goods, the wrapping tape method and the internal pressure molding method are preferably employed. For aircraft application necessitating a high quality and high performance laminated composite material, the autoclave molding is preferably employed. To produce various vehicle exteriors, the press molding is preferably employed.

The prepreg of Fifth Embodiment preferably has a carbon fiber mass fraction of 40 to 90% by mass and more preferably 50 to 80% by mass. A prepreg having an excessively low carbon fiber mass fraction yields a carbon fiber-reinforced composite material having an excess mass, and this may impair excellent specific strength and specific modulus that are advantages of a carbon fiber reinforced fiber reinforced composite material. A prepreg having an excessively high carbon fiber mass fraction causes poor impregnation of an epoxy resin composition, and a carbon fiber-reinforced composite material to be produced is likely to contain many voids, which may greatly deteriorate mechanical characteristics of the carbon fiber-reinforced composite material.

In addition to the method of producing the carbon fiber-reinforced composite material by using the prepregs, examples of the method of producing the carbon fiber-reinforced composite material in Fifth Embodiment include the same as the methods in First Embodiment, which are appropriately selected and applied depending on a purpose. Any of the molding method can be employed to produce the carbon fiber-reinforced composite material containing the sizing agent-coated carbon fibers and the hardened product of the epoxy resin composition.

The carbon fiber-reinforced composite material of Fifth Embodiment is preferably used for sporting goods, general industrial applications, and aircraft and spacecraft applications. More specifically, preferable examples of the sporting goods include golf shafts, fishing rods, rackets for tennis and badminton, sticks for hockey, and ski poles. Preferable examples of the general industrial applications include structural materials for mobile objects such as automobiles, bicycles, ships, and railway vehicles, drive shafts, plate springs, wind mill blades, pressure vessels, fly wheels, rollers for paper production, roof materials, cables, and repair and reinforcement materials.

EXAMPLES

The present invention will next be specifically described with reference to examples, but the invention is not limited to these examples. The preparation and evaluations of prepregs in examples given below were performed in an atmosphere at a temperature of 25° C.±2° C. and 50% relative humidity (RH) unless otherwise noted.

(1) X-Ray Photoelectron Spectroscopy for Sizing Agent Surface of Sizing Agent-Coated Carbon Fibers In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers were cut into 20-mm pieces, and the pieces were spread and arranged on a copper sample holder. $AlK\alpha_{1,2}$ was used as the X-ray source, and the measurement was carried out while the inside of a sample chamber was maintained at $1 \times 10^{-8}$ Torr. The measurement was carried out at a photoelectron takeoff angle of 15°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1 eV, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(2) Washing of Sizing Agent of Sizing Agent-Coated Carbon Fibers

In 50 ml of acetone, 2 g of sizing agent-coated carbon fibers were immersed and subjected to ultrasonic cleaning for 30 minutes three times. Subsequently, the carbon fibers were immersed in 50 ml of methanol and subjected to ultrasonic cleaning for 30 minutes once, and were dried.

(3) X-Ray Photoelectron Spectroscopy of Sizing Agent-Coated Carbon Fibers at 400 eV In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers and sizing agent-coated carbon fibers from which the sizing agent was washed were cut into 20-mm pieces, and the pieces were spread and arranged on a copper sample holder. Saga synchrotron radiation was used as an X-ray source, and the measurement was carried out at an excitation energy of 400 eV while the inside of a sample chamber was maintained at $1 \times 10^{-8}$ Torr. The measurement was carried out at a photoelectron takeoff angle of 55°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1 eV, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(4) Strand Tensile Strength and Elastic Modulus of Carbon Fiber Bundles

The strand tensile strength and the strand elastic modulus of carbon fiber bundles were determined by the test method of resin-impregnated strand described in JIS-R-7608 (2004) in accordance with the procedure below. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions were at normal pressure at a temperature of 125° C. for 30 minutes. Ten strands of carbon fiber bundles were tested, and mean values were calculated as the strand tensile strength and the strand elastic modulus.

(5) Oxygen Concentration (O/C) of Surface of Carbon Fibers

The surface oxygen concentration (O/C) of carbon fibers was determined by X-ray photoelectron spectroscopy in accordance with the procedure below. First, a solvent was used to remove dust adhering to the surface of carbon fibers, then the carbon fibers were cut into about 20-mm pieces, and the pieces were spread on a copper sample holder. Next, the sample holder was set in a sample chamber, and the inside of the sample chamber was maintained at $1 \times 10^{-8}$ Torr. AlK$\alpha_{1,2}$ was used as the X-ray source, and the measurement was carried out at a photoelectron takeoff angle of 90°. As the correction value of the peak associated with electrification during measurement, the binding energy value of the main peak (peak top) of $C_{1s}$ was set to 284.6 eV. The $C_{1s}$ main area was determined by drawing a straight base line in a range from 282 to 296 eV. The $O_{1s}$ peak area was determined by drawing a straight base line in a range from 528 to 540 eV. Here, the surface oxygen concentration is determined as an atom number ratio, using a sensitivity correction value inherent in an apparatus, from the ratio of the $O_{1s}$ peak area and the $C_{1s}$ peak area. The X-ray photoelectron spectrometer used was ESCA-1600 manufactured by Ulvac-Phi, Inc., and the sensitivity correction value inherent in the apparatus was 2.33.

(6) Carboxy Group Concentration (COOH/C) and Hydroxy Group Concentration (COH/C) of Surface of Carbon Fibers A surface hydroxy group concentration (COH/C) was determined by chemical modification X-ray photoelectron spectroscopy in accordance with the procedure below.

First, carbon fiber bundles from which a sizing agent and the like had been removed with a solvent were cut into pieces, and the pieces were spread and arranged on a platinum sample holder. The pieces were exposed to a dry nitrogen gas containing 0.04 mol/L of trifluoroacetic anhydride gas at room temperature for 10 minutes, undergoing chemical modification treatment. Then, the treated pieces were mounted on an X-ray photoelectron spectrometer at a photoelectron takeoff angle of 35°. AlK$\alpha_{1,2}$ was used as the X-ray source, and the inside of the sample chamber was maintained at a degree of vacuum of $1 \times 10^{-8}$ Torr. As the correction for the peak associated with electrification during measurement, the binding energy value of the main peak of $C_{1s}$ was set to 284.6 eV, first. The $C_{1s}$ peak area $[C_{1s}]$ was determined by drawing a straight base line in a range from 282 to 296 eV, and $F_{1s}$ peak area $[F_{1s}]$ was determined by drawing a straight base line in a range from 682 to 695 eV. The reaction rate r was determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C = \{[F_{1s}]/(3k[C_{1s}]-2[F_{1s}])r\} \times 100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

A surface carboxy group concentration (COOH/C) was determined by chemical modification X-ray photoelectron spectroscopy in accordance with the procedure below. First, carbon fiber bundles from which a sizing agent and the like had been removed with a solvent were cut into pieces, and the pieces were spread and arranged on a platinum sample holder. The pieces were exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces were mounted on a X-ray photoelectron spectrometer at a photoelectron takeoff angle of 35°. AlK$\alpha_{1,2}$ was used as the X-ray source, and the inside of the sample chamber was maintained at a degree of vacuum of $1 \times 10^{-8}$ Torr. As the correction for the peak associated with electrification during measurement, the binding energy value of the main peak of $C_{1s}$ was set to 284.6 eV, first. The $C_{1s}$ peak area $[C_{1s}]$ was determined by drawing a straight base line in a range from 282 to 296 eV, and the $F_{1s}$ peak area $[F_{1s}]$ was determined by drawing a straight base line in a range from 682 to 695 eV. The reaction rate r was determined from $C_{1s}$ peak splitting of polyacrylic acid simultaneously subjected to chemical modification treatment, and the residual rate m of a dicyclohexylcarbodiimide derivative was determined from $O_{1s}$ peak splitting.

The surface carboxy group concentration COOH/C is expressed by the value calculated in accordance with the equation below.

$$COOH/C = \{[F_{1s}]/(3k[C_{1s}]-(2+13m)[F_{1s}])r\} \times 100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

(7) Epoxy Equivalent of Sizing Agent and Epoxy Equivalent of Sizing Agent Applied onto Carbon Fibers The epoxy equivalent of a sizing agent was determined by dissolving a sizing agent from which a solvent was removed in a solvent typified by N,N-dimethylformamide, then cleaving the epoxy group with hydrochloric acid, and carrying out acid-base titration. The epoxy equivalent of a sizing agent applied onto carbon fibers was determined by immersing sizing agent-coated carbon fibers in N,N-dimethylformamide, carrying out ultrasonic cleaning to extract the sizing agent from the fibers, then cleaving the epoxy group with hydrochloric acid, and carrying out acid-base titration.

(8) Increase in Glass Transition Point

When a compound (E1) of General Formula (2) or an aromatic amine hardener (E2) was used as the latent hardener (E), a sizing agent and the latent hardener (E) were mixed so as to give an amine equivalent/epoxy equivalent ratio of 0.9, and the glass transition temperature of the prepared mixture was determined with a differential scanning calorimeter (DSC) in accordance with JIS K7121 (1987). Into a sealable sample container having a volume of 50 µl, 3 to 10 mg of a sample (test piece) was placed, then the temperature was raised at a rate of temperature rise of 10° C./min from 30 to 350° C., and the glass transition temperature was determined. The measurement device used here was a differential scanning calorimeter (DSC) manufactured by TA Instruments.

When dicyandiamide or a derivative thereof (E3) was used as the latent hardener (E), a sizing agent and the latent hardener (E3) were mixed so as to give an amine equivalent/epoxy equivalent ratio of 1.0, and the glass transition temperature of the prepared mixture was determined with a differential scanning calorimeter (DSC) in accordance with JIS K7121 (1987). Into a sealable sample container having a volume of 50 µl, 3 to 10 mg of a sample (test piece) was placed, then the temperature was raised at a rate of temperature rise of 10° C./min from 30 to 350° C., and the glass transition temperature was determined. The measurement device used here was a differential scanning calorimeter (DSC) manufactured by TA Instruments.

Specifically, in a steplike change area in the DSC obtained, a temperature at the intersection point of a straight line extending from each base line and equidistant in the vertical axis direction and a curve in the steplike change area of glass transition was regarded as the glass transition temperature.

Next, the prepared mixture was stored in an environment at a temperature of 25° C. and 60% RH for 20 days, and the glass transition temperature was determined by the procedure above. An increase in temperature from the initial state was regarded as the increase in glass transition point (corresponding to "ΔTg with a hardener" in Tables).

(9) Method of Determining Adhesion Amount of Sizing Agent

About 2 g of sizing agent-coated carbon fiber bundles were weighed (W1) (to the fourth decimal place) and then placed in an electric furnace (a volume of 120 cm$^3$) set at a temperature of 450° C. for 15 minutes in a nitrogen stream of 50 mL/min, and consequently the sizing agent was completely thermally decomposed. Next, the carbon fiber bundles were transferred into a container in a dry nitrogen stream of 20 L/min, then cooled for 15 minutes, and weighed (W2) (to the fourth decimal place). The adhesion amount of the sizing agent was calculated in accordance with the equation, W1-W2. The adhesion amount of the sizing agent was converted into a value (round off the number to the second decimal place) relative to 100 parts by mass of the carbon fiber bundles to be parts by mass of the sizing agent coated. The measurement was carried out twice, and the mean value was regarded as the parts by mass of the sizing agent.

(10) Measurement of Interfacial Shear Strength (IFSS)

The interfacial shear strength (IFSS) was determined in accordance with the procedures (I) to (IV).

(I) Preparation of Resin

Into corresponding containers, 100 parts by mass of bisphenol A epoxy compound "jER (registered trademark)" 828 (manufactured by Mitsubishi Chemical Corporation) and 14.5 parts by mass of m-phenylenediamine (manufactured by Sigma-Aldrich Japan) were placed. Then, in order to reduce the viscosity of jER828 and to dissolve m-phenylenediamine, each was heated at a temperature of 75° C. for 15 minutes. Then, both were mixed, and the mixture was degassed in vacuo at a temperature of 80° C. for about 15 minutes.

(II) Fixation of Single Carbon Fiber onto Special Mold

From carbon fiber bundles, a single fiber was taken out, and both ends of the single fiber were fixed onto the longitudinal ends of a dumbbell mold while a constant tension was applied to the single fiber. Then, in order to remove water on the carbon fiber and the mold, the single fiber and the mold were subjected to vacuum drying at a temperature of 80° C. for 30 minutes or more. The dumbbell mold was made of silicone rubber and had a cast molding shape with a central width of 5 mm, a length of 25 mm, an end width of 10 mm, and a total length of 150 mm.

(III) From Casting to Hardening of Resin

Into the mold after vacuum drying in accordance with the procedure (II), the resin prepared in accordance with the procedure (I) was cast. By using an oven, the temperature of the mold was raised at a rate of temperature rise of 1.5° C./min to 75° C., and the temperature was maintained for 2 hours. Next, the temperature was raised at a rate of temperature rise of 1.5° C./min to 125° C., and the temperature was maintained for 2 hours. Then, the temperature was dropped at a rate of temperature drop of 2.5° C./min to 30° C. Subsequently, the mold was removed to give a test piece.

(IV) Measurement of Interfacial Shear Strength (IFSS)

To the test piece obtained in the procedure (III), a tensile force was applied in a fiber axis direction (longitudinal direction) to cause a distortion of 12%, and the number N of fiber breakages was determined in a central region of 22 mm on the test piece. Next, an average length of broken fibers la was calculated in accordance with the equation, la (µm)=22×1,000 (µm)/N. Then, from the average length of broken fibers la, a critical fiber length lc was calculated in accordance with the equation, lc (µm)=(4/3)×la (µm). The strand tensile strength σ and the diameter d of a single carbon fiber were determined, and an interfacial shear strength, IFSS, was calculated as an index of the adhesive strength between carbon fibers and a resin interface in accordance with the equation below. In Examples, the test result was the average of results of the measurement number n=5.

Interfacial shear strength IFSS (MPa)=σ (MPa)×$d$ (µm)/(2×$lc$) (µm)

(11) Definition of 0° of Carbon Fiber-Reinforced Composite Material

As described in JIS K7017 (1999), the fiber direction of a unidirectional carbon fiber-reinforced composite material is regarded as an axis direction; the axis direction is defined as a 0° axis; and a direction orthogonal to the axis is defined as 90°.

(12) Measurement of 0° Tensile Strength (C) of Carbon Fiber-Reinforced Composite Material A unidirectional prepreg within 24 hours after preparation was cut into pieces with a predetermined size, and six prepreg pieces were stacked in one direction. The stacked prepreg pieces were subjected to vacuum bagging and hardened at a temperature of 180° C. and a pressure of 6 kg/cm$^2$ for 2 hours in an autoclave, thus yielding a unidirectional reinforced material (carbon fiber-reinforced composite material). The unidirectional reinforced material was cut into a piece with a width of 12.7 mm and a length of 230 mm, and to each end, a glass fiber-reinforced plastic tab with 1.2 mm and a length of 50 mm was bonded, thus yielding a test piece. The test piece obtained in this manner was subjected to a tensile test at a crosshead speed of 1.27 mm/min with a universal tester manufactured by Instron.

In the present invention, the 0° tensile strength value was divided by the strand strength value determined in (B) to indicate a strength translation rate (%) in accordance with the equation below.

Strength translation rate=tensile strength/((areal weight of CF/190)×Vf/100×strand strength)× 100 Areal weight of CF (carbon fibers)=190 g/m² Vf (carbon fiber volume fraction)=56%

(13) 0° Tensile Strength Translation Rate of Prepreg after Storage

A prepreg was stored at a temperature of 25° C. and 60% RH for 20 days, then the 0° tensile strength of the prepreg was determined in the same manner as in (12), and the strength translation rate was calculated.

(14) Measurement of Glass Transition Temperature

The test piece in (12) was used, and the glass transition temperature of the carbon fiber-reinforced composite material was determined with a differential scanning calorimeter (DSC) in accordance with JIS K7121 (1987). Into a sealable sample container having a volume of 50 µl, 8 to 20 mg of a sample (test piece) was placed, then the temperature was raised at a rate of temperature rise of 10° C./min from 30 to 350° C., and the glass transition temperature was determined. The measurement device used here was a differential scanning calorimeter (DSC) manufactured by TA Instruments. Specifically, in a steplike change area in the DSC obtained, a temperature at the intersection point of a straight line extending from each base line and equidistant in the vertical axis direction and a curve in the steplike change area of glass transition was regarded as the glass transition temperature.

(15) Measurement of Prepreg Volatile Content

A prepreg was cut into a size of 50×50 mm to prepare a test piece. The test piece was weighed (W1), and then the prepreg was placed on an aluminum plate and allowed to stand in a hot-air drier set at a temperature of 160° C. for 20 minutes. The test piece was allowed to cool to 25° C. in a desiccator, and then weighed (W2). The prepreg volatile content (% by mass) was calculated in accordance with the following equation.

PVC=(W1−W2)/W1×100

PVC: prepreg volatile content (% by mass)

Volatile content (% by mass)=PVC×100/RC

RC: prepreg resin content (% by mass)

(16) Ratio of Particles Present in Region of 20% of Depth in Thickness Direction of Prepreg A prepreg was interposed between two polytetrafluoroethylene resin plates having smooth surfaces and thus adhered closely to the plates. The temperature was gradually raised to 150° C. over 7 days, and thus the prepreg underwent gelation and hardening to yield a plate-like resin hardened product. After the hardening, the hardened product was cut in the direction perpendicular to the contact face. The cross section was polished, and an optical micrograph of the cross section was taken at a magnification of over 200 times while the upper and lower faces of the prepreg were present in the visual field. In a similar manner, the distance between the polytetrafluoroethylene resin plates was determined at five positions in the transverse direction in the cross-sectional micrograph, and the mean value (n=5) was calculated as the thickness of the prepreg. A line parallel to the surface of the prepreg was drawn at 20% of the depth in the thickness direction from each surface of the prepreg. Next, the total area of the particles present between the surface of the prepreg and the line and the total area of the particles present in the prepreg across the thickness direction were determined. The ratio of particles present in a region from the surface to 20% of the depth of the prepreg was calculated relative to those in a region of 100% of the thickness of the prepreg. Here, the total area of particles was determined by cutting out areas of the particles in a cross-sectional micrograph and converting the mass of the cut-out areas.

(17) Measurement of Average Particle Size of Thermoplastic Resin Particles (F1, F5, and F6)

The average particle size of particles was determined as follows: a micrograph of particles was taken at a magnification over 1,000 times under a microscope such as a scanning electron microscope; particles were randomly selected; the diameter of a circumcircle of the particle was determined as the particle size; and the mean value of the particle sizes (n=50) was calculated.

(18) Measurement of Compression after Impact of Carbon Fiber-Reinforced Composite Material Twenty-four unidirectional prepreg plies were pseudoisotropically stacked into a [+45°/0°/−45°/90°]$_{3s}$ structure and were molded in an autoclave at a temperature of 180° C. for 2 hours at a pressure of 6 kg/cm² and a rate of temperature rise of 1.5° C./min, yielding a pseudoisotropic material (carbon fiber-reinforced composite material). The pseudo-isotropic material was cut into a sample having a length of 150 mm and a width of 100 mm (a thickness of 4.5 mm). To the center of the sample, a drop impact of 6.7 J/mm was applied in accordance with SACMA SRM 2R-94, and the compression after impact was determined.

(19) Preparation of Flat Plate Made of Carbon Fiber-Reinforced Composite Material for Mode I Interlaminar Fracture Toughness (GIC) Test and GIC Measurement In accordance with JIS K7086 (1993), a unidirectional reinforced material (carbon fiber-reinforced composite material) for GIC test was prepared by the following procedures (a) to (e).

(a) Twenty unidirectional prepreg plies were aligned in the fiber direction and stacked, where a fluorine resin film having a width of 40 mm and a thickness of 50 µm was interposed between the center faces of the laminate (between the tenth ply and the eleventh ply) so as to be perpendicular to the fiber arranging direction.

(b) The stacked prepregs were covered with a nylon film so as to leave no clearance and was heated and pressurized in an autoclave at 180° C. and a pressure of 6 kg/cm² for two hours to be hardened, thus yielding a unidirectional reinforced material (carbon fiber-reinforced composite material).

(c) The unidirectional reinforced material (carbon fiber-reinforced composite material) obtained in (b) was cut into a piece having a width of 20 mm and a length of 195 mm. The fiber direction was parallel to the length direction of the sample.

(d) In accordance with JIS K7086 (1993), a block (a length of 25 mm, made of aluminum) for pin load application was attached to an end (where the film was located) of the test piece.

(e) White paint was applied to both side faces of the test piece in order to make the observation of cracking progress easy.

The unidirectional reinforced material (carbon fiber-reinforced composite material) prepared was used to determine GIC in accordance with the following procedure.

The test was carried out with an Instron universal tester (manufactured by Instron) in accordance with Appendix 1 of JIS K7086 (1993). The crosshead speed was 0.5 mm/min before the length of a crack reached 20 mm and was 1 mm/min after the length reached 20 mm. In accordance with JIS K7086 (1993), the GIC (GIC at the initial stage of cracking) corresponding to the critical load at the initial stage of cracking was calculated from the load, the displacement, and the crack length.

(20) Measurement of Hot, Wet Open Hole Compression of Carbon Fiber-Reinforced Composite Material A unidirectional prepreg was cut into pieces having a predetermined size, and 16 pieces were stacked into a $(+45/0/-45/90\ degree)_{2s}$ structure. The stacked prepregs were placed in a vacuum bag and hardened in an autoclave at a temperature of 180° C. and under a pressure of 6 kg/cm$^2$ for 2 hours, yielding a pseudoisotropic reinforced material (carbon fiber-reinforced composite material). The pseudoisotropic reinforced material was cut into a rectangular piece having a 0° direction length of 304.8 mm and a 90° direction length of 38.1 mm, and a circular hole having a diameter of 6.35 mm was formed at the center of the piece, yielding a plate with a hole as a test piece. The test piece was subjected to open hole compression test (measured at 82° C. after immersion in warm water at 70° C. for two weeks) with an Instron universal tester in accordance with the standard of ASTM-D6484.

(21) Epoxy Equivalent of Sizing Agent and Epoxy Equivalent of Sizing Agent Applied onto Carbon Fibers The epoxy equivalent of a sizing agent was determined by dissolving a sizing agent from which a solvent was removed, in a solvent typified by N,N-dimethylformamide, then cleaving the epoxy group with hydrochloric acid, and carrying out acid-base titration. The epoxy equivalent of a sizing agent applied onto carbon fibers was determined by immersing sizing agent-coated carbon fibers in N,N-dimethylformamide, carrying out ultrasonic cleaning to extract the sizing agent from the carbon fibers, then cleaving the epoxy group with hydrochloric acid, and carrying out acid-base titration.

(22) Size of Phase Separation

The fracture surface of the sample after the test in (19) was observed under a scanning electron microscope (SEM), and an area having a size of 4.5×6.0 μm in the vicinity of the leading end of the crack was micrographed under the following conditions.
Apparatus: S-4100 scanning electron microscope (manufactured by Hitachi, Ltd.)
Acceleration voltage: 3 kV
Deposition: Pt—Pd, about 4 μm
Magnification: 20,000 times or more
The major diameters of all phase-separated islands in the area were determined and the mean value was calculated as the phase separation size.

(23) Measurement of Number Average Molecular Weight

The measurement device used was "HLC (registered trademark)" 8220GPC (manufactured by Tosoh Corporation); the detector used was UV-8000 (254 nm); and the column used was TSK-G4000H (manufactured by Tosoh Corporation). An epoxy resin to be measured was dissolved in THF at a concentration of 0.1 mg/ml and was analyzed at a flow rate 1.0 ml/min and a temperature of 40° C. The retention time of a measurement sample was converted on the basis of retention times of polystyrene samples for calibration into a molecular weight, giving a number average molecular weight.

(24) Measurement of Softening Point (Ring And Ball Method)

The softening point was determined in accordance with ring and ball method, JIS-K7234 (2008).

(25) Calculation of SP Value of Epoxy Resin Composition Material as Structural Unit The SP value of a structural unit estimating a resin hardened product of each of the epoxy resin materials (D132), (D142), and (D152) with the latent hardener (E) was calculated from the molecular structure on the basis of Fedors method described in Polym. Eng. Sci., 14 (2), 147-154 (1974). The unit was $(cal/cm^3)^{1/2}$.

(26) Measurement of Viscosity of Epoxy Resin Composition

The viscosity of an epoxy resin composition was determined with a dynamic viscoelastic measuring apparatus (Rheometer RDA2: manufactured by Rheometrics). Specifically, a parallel plate having a diameter of 40 mm was used; the temperature was simply raised at a rate of temperature rise of 2° C./min; and the complex viscosity $\eta^*$ at 80° C. was determined at a frequency of 0.5 Hz and a gap of 1 mm.

(27) Elastic Modulus of Epoxy Resin Hardened Product

An epoxy resin composition was degassed in vacuo, and then was hardened in a mold set to have a thickness of 2 mm with a "Teflon (registered trademark)" spacer having a thickness of 2 mm, at a temperature of 130° C. for 90 minutes unless otherwise specified, yielding a plate-like resin hardened product having a thickness of 2 mm. The resin hardened product was cut into a test piece having a width of 10 mm and a length of 60 mm. The test piece was subjected to three-point bending with an Instron universal tester (manufactured by Instron) at a span of 32 mm and a crosshead speed of 100 mm/min in accordance with JIS K7171 (1994), giving an elastic modulus. The sample number was 5 (n=5), and the mean value was calculated from the determined values as the elastic modulus.

(28) Measurement of Resin Toughness Value of Epoxy Resin Hardened Product

An epoxy resin composition was degassed in vacuo, and then was hardened in a mold set to have a thickness of 6 mm with a "Teflon (registered trademark)" spacer having a thickness of 6 mm, at a temperature of 130° C. for 90 minutes unless otherwise specified, yielding a plate-like resin hardened product having a thickness of 6 mm. The resin hardened product was cut into a test piece having a width of 12.7 mm and a length of 150 mm. The test piece was processed in accordance with ASTM D5045 (1999), and the measurement was carried out with an Instron universal tester (manufactured by Instron). An initial pre-crack was introduced to the test piece by bringing a razor blade cooled to the liquid nitrogen temperature into contact with the test piece and applying an impact to the razor with a hammer. Here, the resin toughness value means modified mode I (open type) critical stress intensity. The sample number was 5 (n=5), and the mean value was calculated from the determined values as the resin toughness value.

(29) Measurement of Structure Period

The epoxy resin hardened product obtained in (27) was stained, and then cut into thin slices. The slice was observed under a transmission electron microscope (TEM) to prepare a transmission electron image under the following conditions. The stain used was $OsO_4$ and $RuO_4$, which were appropriately used depending on a resin composition so as to give the contrast sufficient for morphology.
Apparatus: H-7100 transmission electron microscope (manufactured by Hitachi, Ltd.)
Acceleration voltage: 100 kV
Magnification: 10,000 times On the transmission electron image, the structure period of an epoxy resin (D131) or (D132) rich phase and an epoxy resin (D141) or (D142) rich phase was observed. The phase separated structure of an epoxy resin hardened product is a two-phase continuous structure or a sea-island structure depending on the type or the ratio of components, and thus each structure was evaluated as follows: The phase separation size was determined by the method described later. A sample having a phase separation size of 1 nm to 1 μm was evaluated as A; a sample having a phase separation size of 1 μm to 5 μm was evaluated as B; a sample having a uniform structure was evaluated as C; and a sample having a phase separation size of more than 5 μm was evaluated as D.

For a phase separated structure as the two-phase continuous structure, three straight lines having a predetermined length were randomly drawn on a micrograph; intersection points of the straight lines and phase interfaces were extracted; the distance between intersection points adjacent to each other was determined; and the number average of the distances was calculated as the structure period. The predetermined length was set on the basis of a micrograph as below. When the structure period was supposed to be of the order of 0.01 μm (0.01 μm or more and less than 0.1 μm), a sample was photographed at a magnification of 20,000 times, and straight lines having a length of 20 mm (a length of 1 μm on the sample) as the predetermined length were drawn on the photograph. In a similar manner, when the phase separated structure period was supposed to be of the order of 0.1 μm (0.1 μm or more and less than 1 μm), a sample was photographed at a magnification of 2,000 times, and straight lines having a length of 20 mm (a length of 10 μm on the sample) as the predetermined length were drawn on the photograph. When the phase separated structure period was supposed to be of the order of 1 μm (1 μm or more and less than 10 μm), a sample was photographed at a magnification of 200 times, and straight lines having a length of 20 mm (a length of 100 μm on the sample) as the predetermined length were drawn on the photograph. If a phase separated structure period determined was out of the order supposed, the structure period was determined once again at a magnification corresponding to the order.

For a phase separated structure as the sea-island structure, three particular regions were randomly selected on a micrograph. The sizes of island phases in the region were determined. The number average of the sizes was calculated as the structure period. The size of an island phase is the length of the shortest line from a phase interface to another phase interface through the island phase. Even when the island phase had an elliptical shape, an indefinite shape, or a circular or ellipsoidal shape including two or more layers, the shortest distance from a phase interface to another phase interface through the island phase was regarded as the island phase size. The particular region was set on the basis of a micrograph as below. When the phase separated structure period was supposed to be of the order of 0.01 μm (0.01 μm or more and less than 0.1 μm), a sample was photographed at a magnification of 20,000 times, and a 4-mm square region on the photograph (a 0.2-μm square region on the sample) was regarded as the particular region. In a similar manner, when the phase separated structure period was supposed to be of the order of 0.1 μm (0.1 μm or more and less than 1 μm), a sample was photographed at a magnification of 2,000 times, and a 4-mm square region on the photograph (a 2-μm square region on the sample) was regarded as the particular region. When the phase separated structure period was supposed to be of the order of 1 μm (1 μm or more and less than 10 μm), a sample was photographed at a magnification of 200 times, and a 4-mm square region on the photograph (a 20-μm square region on the sample) was regarded as the particular region. If a phase separated structure period determined was out of the order supposed, the structure period was determined once again at a magnification corresponding to the order.

(30) Preparation of Tubular Body Made of Carbon Fiber-Reinforced Composite Material for Cylinder Charpy Impact Test By the following procedures (a) to (e), three unidirectional prepreg plies were alternately stacked in such a manner that the fiber direction was 45° or −45° with respect to the cylindrical axis direction, and three unidirectional prepreg plies were further stacked in such a manner that the fiber direction was parallel to the cylindrical axis direction, thus yielding a tubular body made of a carbon fiber-reinforced composite material and having an inner diameter of 6.3 mm. The mandrel used was a stainless-steel rod having a diameter of 6.3 mm and a length of 1,000 mm.

(a) A unidirectional prepreg was cut into two rectangular prepregs having a length of 104 mm and a width of 800 mm (in a manner that the fiber axis direction was 45 degree with respect to the long side direction). The two cut-out prepregs were bonded to each other in such a manner that the fiber directions were intersected and the prepregs were displaced by 10 mm (semiperimeter of the mandrel) in the short side direction.

(b) The bonded prepregs were wound on a mandrel treated with a release agent, in such a manner that the long side direction of the rectangular prepreg was the same as the mandrel axis direction.

(c) On the wound prepregs, a unidirectional prepreg that had been cut into a rectangular shape having a length of 114 mm and a width of 800 mm (the long side direction was the fiber axis direction) was wound in such a manner that the fiber direction was the same as the mandrel axis direction.

(d) On the wound prepregs, a wrapping tape (heat resistant film tape) was wound to cover the wound prepregs, and the prepregs were heated and molded in a hardening oven at 130° C. for 90 minutes unless otherwise specified. The wrapping tape had a width of 15 mm and was wound at a tension of 34 N and a wrapping pitch (displacement for wrapping) of 2.0 mm to form two plies.

(e) The mandrel was then pulled out and the wrapping tape was removed, yielding a tubular body made of a carbon fiber-reinforced composite material.

(31) Charpy Impact Test of Tubular Body Made of Carbon Fiber-Reinforced Composite Material The tubular body made of a carbon fiber-reinforced composite material obtained in (30) was cut into a length of 60 mm to prepare a test piece having an inner diameter of 6.3 mm and a length of 60 mm. Charpy impact test was carried out by giving the impact with a weighing of 300 kg·cm to the side face of the tubular body. Absorbed energy of the impact was calculated from a swing angle in accordance with the following equation:

$$E = WR[(\cos\beta - \cos\alpha) - (\cos\alpha' - \cos\alpha)(\alpha+\beta)/(\alpha+\alpha')]$$

E: Absorbed energy (J)
WR: Moment around rotation axis of hammer (N·m)
α: Hammer lift angle (°)

α': Swing angle (°) when the hammer swings freely from the hammer lift angle α

β: Hammer swing angle (°) after fracture of test piece.

No notch (cutout) was introduced into the test piece. The measurement number was 5 (n=5), and the mean value was calculated as the Charpy impact value.

The materials and the components given below were used in each example and each comparative example of First Embodiment.

Component (A): A-1 to A-3

A-1: "Denacol (registered trademark)" EX-810 (manufactured by Nagase ChemteX Corporation)

Diglycidyl ether of ethylene glycol

Epoxy equivalent: 113 g/eq., the number of epoxy groups: 2

A-2: "Denacol (registered trademark)" EX-611 (manufactured by Nagase ChemteX Corporation)

Sorbitol polyglycidyl ether

Epoxy equivalent: 167 g/eq., the number of epoxy groups: 4

The number of hydroxy groups: 2

A-3: "Denacol (registered trademark)" EX-521 (manufactured by Nagase ChemteX Corporation)

Polyglycerol polyglycidyl ether

Epoxy equivalent: 183 g/eq., the number of epoxy groups: 3 or more

Component (B1): B-1 to B-4

B-1: "jER (registered trademark)" 152 (manufactured by Mitsubishi Chemical Corporation)

Glycidyl ether of phenol novolac

Epoxy equivalent: 175 g/eq., the number of epoxy groups: 3

B-2: "jER (registered trademark)" 828 (manufactured by Mitsubishi Chemical Corporation)

Diglycidyl ether of bisphenol A

Epoxy equivalent: 189 g/eq., the number of epoxy groups: 2

B-3: "jER (registered trademark)" 1001 (manufactured by Mitsubishi Chemical Corporation)

Diglycidyl ether of bisphenol A

Epoxy equivalent: 475 g/eq., the number of epoxy groups: 2

B-4: "jER (registered trademark)" 807 (manufactured by Mitsubishi Chemical Corporation)

Diglycidyl ether of bisphenol F

Epoxy equivalent: 167 g/eq., the number of epoxy groups: 2

Epoxy Resin Component (D11): D11-1 to D11-4

D11-1: N,N-diglycidyl-4-phenoxyaniline synthesized by the following method

Into a four-necked flask equipped with a thermometer, a dropping funnel, a cooling tube, and a stirrer, 610.6 g (6.6 eq.) of epichlorohydrin was placed. The temperature was raised to 70° C. under nitrogen purge. Into the flask, 203.7 g (1.1 eq.) of p-phenoxyaniline dissolved in 1,020 g of ethanol was added dropwise over 4 hours. The mixture was further stirred for 6 hours to complete the addition reaction, giving 4-phenoxy-N,N-bis(2-hydroxy-3-chloropropyl)aniline. Subsequently, the temperature in the flask was decreased to 25° C., then 229 g (2.75 eq.) of 48% aqueous NaOH solution was added dropwise into the flask over 2 hours, and the mixture was further stirred for 1 hour. After the completion of the cyclization reaction, ethanol was distilled off. The residue was extracted with 408 g of toluene, and the extract was washed with 5% salt solution twice. From the organic layer, the toluene and the epichlorohydrin were removed under reduced pressure, yielding 308.5 g of a brown viscous liquid (yield 94.5%). The purity of N,N-diglycidyl-4-phenoxyaniline as the main product was 91% (GC area %).

D11-2: N,N-Diglycidyl-4-(4-nitrophenoxy)aniline Synthesized by the Following Method N,N-diglycidyl-4-(4-nitrophenoxy)aniline was obtained by glycidylation reaction in the same reaction conditions and procedures as those for the N,N-diglycidyl-4-phenoxyaniline except that the amine compound as the precursor of the epoxy resin to be synthesized was changed to 4-(4-nitrophenoxy)aniline.

D11-3: "Denacol (registered trademark)" Ex-731 (N-glycidylphthalimide, manufactured by Nagase ChemteX Corporation)

D11-4: OPP-G (o-phenylphenyl glycidyl ether, manufactured by Sanko Co., Ltd.)

Epoxy Resin Component (D12): D12-1 to D12-7

D12-1: ELM434 (tetraglycidyldiaminodiphenylmethane, manufactured by Sumitomo Chemical Co., Ltd., epoxy equivalent: 125 g/eq.)

D12-2: "jER (registered trademark)" 630 (triglycidyl-p-aminophenol, manufactured by Japan Epoxy Resin Co., Ltd.)

D12-3: 34TGDDE (tetraglycidyl-3,4'-diaminodiphenyl ether) Synthesized by the Following Method Into a four-necked flask equipped with a thermometer, a dropping funnel, a cooling tube, and a stirrer, 610.6 g (6.6 mol) of epichlorohydrin was placed. The temperature was raised to 70° C. under nitrogen purge. Into the flask, 22.2 g (1.1 mol) of 3,4'-diaminodiphenyl ether dissolved in 1,020 g of ethanol was added dropwise over 4 hours. The mixture was further stirred for 6 hours to complete the addition reaction, giving N,N,N',N'-tetrakis(2-hydroxy-3-chloropropyl)-3,4'-diaminodiphenyl ether. Subsequently, the temperature in the flask was decreased to 25° C., then 229 g (2.75 mol) of 48% aqueous NaOH solution was added dropwise to the flask over 2 hours, and the mixture was further stirred for 1 hour. After the completion of the cyclization reaction, ethanol was distilled off. The residue was extracted with 408 g of toluene, and the extract was washed with 5% salt solution twice. From the organic layer, the toluene and the epichlorohydrin were removed under reduced pressure, yielding 416 g of a brown viscous liquid (yield 89%). The purity of tetraglycidyl-3,4'-diaminodiphenyl ether as the main product was 87% (GC area %).

D12-4: 33TGDDE (tetraglycidyl-3,3'-diaminodiphenyl ether) Synthesized by the Following Method Tetraglycidyl-3,3'-diaminodiphenyl ether was obtained by glycidylation reaction in the same reaction conditions and procedures as those for the tetraglycidyl-3,4'-diaminodiphenyl ether except that the amine compound as the precursor of the epoxy resin to be synthesized was changed to 3,3'-diaminodiphenyl ether.

D12-5: 44TGDDE (tetraglycidyl-4,4'-diaminodiphenyl ether) Synthesized by the Following Method Tetraglycidyl-4,4'-diaminodiphenyl ether was obtained by glycidylation reaction in the same reaction conditions and procedures as those for the tetraglycidyl-3,4'-diaminodiphenyl ether except that the amine compound as the precursor of the epoxy resin to be synthesized was changed to 4,4'-diaminodiphenyl ether.

D12-6: TG3DAS (tetraglycidyl-3,3'-diaminodiphenylsulfone, Mitsui Fine Chemical Inc.)

D12-7: "Araldite (registered trademark)" MY721 (tetraglycidyldiaminodiphenylmethane, manufactured by Huntsman Advanced Materials, epoxy equivalent: 112 g/eq.)

Bifunctional Epoxy Resin Other than Epoxy Resins (D11) and (D12)

"EPON (registered trademark)" 825 (bisphenol A epoxy resin, Japan Epoxy Resin Co., Ltd.)

GAN (N-diglycidylaniline, manufactured by Nippon Kayaku Co., Ltd.)

Latent Hardener Component (E): E-1, E-2

E-1: "SEIKACURE (registered trademark)" S (4,4'-diaminodiphenylsulfone, manufactured by Wakayama Seika Kogyo Co., Ltd.)

E-2: 3,3'-DAS (3,3'-diaminodiphenylsulfone, manufactured by Mitsui Fine Chemical Inc.)

Thermoplastic Resin Particles (F5): F5-1, F5-2

F5-1: "Toraypearl (registered trademark)" TN (manufactured by Toray Industries Inc., average particle size: 13.0 µm)

F5-2: "Orgasol (registered trademark)" 1002D (ATOCHEM, average particle size: 21.0 µm)

Thermoplastic Resin (F3): F3-1, F3-2

F3-1: "SUMIKAEXCEL (registered trademark)" PES5003P (polyethersulfone, manufactured by Sumitomo Chemical Co., Ltd., average molecular weight: 47,000 g/mol) F3-2: "Virantage (registered trademark)" VW-10700RP (polyethersulfone, manufactured by Solvay Advanced Polymers, average molecular weight: 21,000 g/mol)

Example 1

Example includes Process I, Process II, and Process III.

Process I: Process for Producing Carbon Fibers as Raw Material

A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration (O/C) was 0.15, the surface carboxylic acid concentration (COOH/C) was 0.005, and the surface hydroxy group concentration (COH/C) was 0.018. The obtained carbon fibers were regarded as carbon fibers A.

Process II: Process for Bonding Sizing Agent to Carbon Fibers

An aqueous dispersion emulsion containing 20 parts by mass of (B-1) as a component (B1), 20 parts by mass of a component (C), and 10 parts by mass of an emulsifier was prepared, and then 50 parts by mass of (A-3) was mixed as a component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent except the solutions in the sizing solution is as listed in Table 1. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 parts by mass relative to 100 parts by mass of the coated carbon fibers. Subsequently, the epoxy equivalent of the sizing agent, the X-ray photoelectron spectrum of the sizing agent surface, the interfacial shear strength (IFSS) of the sizing agent-coated carbon fibers, and the temperature increase of glass transition point ($\Delta Tg$) of a mixture of the sizing agent and a latent hardener (E) were determined. The results are listed in Table 1. The result indicated that all of the epoxy equivalent of the sizing agent, the chemical composition of the sizing agent surface, and $\Delta Tg$ were as expected. The IFSS measurement also revealed a sufficiently high adhesiveness.

Process III: Production, Molding, and Evaluation of Unidirectional Prepreg

In a kneader, 10 parts by mass of (F3-1) as the thermoplastic resin component (F3) was added to 40 parts by mass of (D11-1) as the epoxy resin component (D11) and 60 parts by mass of (D12-1) as the epoxy resin component (D12), and the whole was dissolved. Next, 45 parts by mass of 4,4'-diaminodiphenylsulfone (E-1) as the latent hardener component (E) was added, and the whole was kneaded, yielding a primary resin composition without thermoplastic resin particles (F5). The obtained primary resin composition was applied onto a release paper with a knife coater so as to give a resin areal weight of 32 g/m², thus yielding a primary resin film. The primary resin film was superimposed on each side of sizing agent-coated carbon fibers (an areal weight of 190 g/m²) arranged in one direction, and heat and pressure were applied with a heat roll at 100° C. and 1 atmosphere to impregnate the carbon fibers with the epoxy resin composition for a carbon fiber-reinforced composite material, thus yielding a primary prepreg. Next, a secondary epoxy resin composition that had been prepared by addition of (F5-1) as the thermoplastic resin particles (F5) so that the epoxy resin composition of the final prepreg for a carbon fiber-reinforced composite material had the formulation listed in Table 1 was applied onto a release paper with a knife coater so as to give a resin areal weight of 20 g/m², thus yielding a secondary resin film. The secondary resin film was superimposed on each side of the primary prepreg, and heat and pressure were applied with a heat roll at 100° C. and 1 atmosphere to impregnate the primary prepreg with the epoxy resin composition for a carbon fiber-reinforced composite material, thus yielding a target prepreg. The prepreg volatile content of the obtained prepreg was determined. The obtained prepreg was used, and the 0° tensile strength measurement, the 0° tensile test after long-term storage, the glass transition temperature measurement, and the compressive strength measurement after impact of the carbon fiber-reinforced composite material were carried out. Table 1 lists the results. The results revealed a sufficiently high 0° tensile strength translation rate at the initial state, a sufficiently high compression after impact, and a small reduction in tensile strength translation rate after 20 days. The results also revealed a sufficiently small volatile content during hardening.

Examples 2 to 8

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 1 except that the component (A) and the component (B1) listed in Table 1 were used as the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 1 lists the results.

Process III: Production, Molding, and Evaluation of Unidirectional Prepreg

A prepreg was produced, molded, and evaluated in the same manner as in Example 1. The results revealed a sufficiently high 0° tensile strength translation rate at the initial state, a sufficiently high compression after impact, and a small reduction in tensile strength translation rate after 20 days. The results also revealed a sufficiently small volatile content during hardening. Table 1 lists the results.

TABLE 1

| | | | Example 1 | Example 2 | Example 3 | Example 4 | Example 5 | Example 6 | Example 7 | Example 8 |
|---|---|---|---|---|---|---|---|---|---|---|
| Carbon fibers | Carbon fibers | | A | A | A | A | A | A | A | A |
| Sizing agent | (A) | EX-810 | | | | | | 50 | | |
| | | EX-611 | | | | | | | 50 | 25 |
| | | EX-521 | 50 | 50 | 50 | 50 | 50 | | | 25 |
| | (B1) | jER152 | 20 | | | | | | | |
| | | jER828 | | 20 | | | 10 | 20 | 20 | 20 |
| | | jER1001 | | | 20 | | 10 | | | |
| | | jER807 | | | | 20 | | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 265 | 320 | 250 | 290 | 255 | 290 | 275 |
| Thermosetting resin composition | Epoxy resin (D11) | N,N-diglycidyl-4-phenoxyaniline | 40 | 40 | 40 | 40 | 40 | 40 | 40 | 40 |
| | | N,N-diglycidyl-4-(nitrophenoxy)aniline | | | | | | | | |
| | | Ex-731 | | | | | | | | |
| | | OPP-G | | | | | | | | |
| | Epoxy resin (D12) | ELM434 | 60 | 60 | 60 | 60 | 60 | 60 | 60 | 60 |
| | | jER630 | | | | | | | | |
| | | 34TGDDE | | | | | | | | |
| | | 33TGDDE | | | | | | | | |
| | | 44TGDDE | | | | | | | | |
| | | TG3DAS | | | | | | | | |
| | | MY721 | | | | | | | | |
| | Epoxy resin (epoxy resin other than D11, D12) | EPON825 | | | | | | | | |
| | | GAN | | | | | | | | |
| Thermosetting resin composition | Latent hardener (E) | 4,4'-diaminodiphenylsulfone | 45 | 45 | 45 | 45 | 45 | 45 | 45 | 45 |
| | | 3,3'-diaminodiphenylsulfone | | | | | | | | |
| | Thermoplastic resin particles (F5) | Toraypearl TN | 20 | 20 | 20 | 20 | 20 | 20 | 20 | 20 |
| | | Orgasol 1002D | | | | | | | | |
| | Thermoplastic resin (F3) | SUMIKAEXCEL 5003P | 10 | 10 | 10 | 10 | 10 | 10 | 10 | 10 |
| | | VW-10700RP | | | | | | | | |
| Evaluation item | Sizing agent-coated fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with hardener | 19 | 20 | 18 | 20 | 19 | 16 | 21 | 21 |
| | | Interfacial adhesion: IFSS (MPa) | 43 | 44 | 40 | 46 | 43 | 39 | 43 | 44 |
| | Thermosetting resin composition | Glass transition temperature (° C.) | 182 | 182 | 182 | 182 | 182 | 182 | 182 | 182 |
| | Prepreg | Ratio of particles present in region to 20% depth | 99 | 99 | 98 | 99 | 97 | 99 | 98 | 97 |
| | | Volatile content (% by mass) | 0.9 | 0.9 | 0.9 | 0.9 | 0.9 | 0.9 | 0.9 | 0.9 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Carbon fiber-reinforced composite material | 0° Tensile test (0 days): strength translation rate (%) | 90 | 92 | 89 | 93 | 90 | 89 | 91 | 91 |
|  | 0° Tensile test (20 days): strength translation rate (%) | 85 | 86 | 88 | 86 | 85 | 89 | 86 | 85 |
|  | Compression after impact (MPa) | 330 | 337 | 320 | 360 | 331 | 316 | 330 | 339 |

Examples 9 to 13

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2 except that the sizing agent had the mass ratio listed in Table 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 2 lists the results.

Process III: Production, Molding, and Evaluation of Unidirectional Prepreg

A prepreg was produced, molded, and evaluated in the same manner as in Example 1. The results revealed a sufficiently high 0° tensile strength translation rate at the initial state, a sufficiently high compression after impact compression after impact, and a small reduction in tensile strength translation rate after 20 days. The results also revealed a sufficiently small volatile content during hardening. Table 2 lists the results.

Example 14

Process I: Process for Producing Carbon Fibers as Raw Material

Carbon fibers were produced in the same manner as in Example 1.

Process II: Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved, yielding a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent without the solutions in the sizing solution is as listed in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 2, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 1. The results revealed a sufficiently high 0° tensile strength translation rate at the initial state, a sufficiently high compression after impact compression after impact, and a small reduction in tensile strength translation rate after 20 days. The results also revealed a sufficiently small volatile content during hardening. Table 2 lists the results.

Example 15

Process I: Process for Producing Carbon Fibers as Raw Material

Carbon fibers were produced in the same manner as in Example 1.

Process II: Process for Bonding Sizing Agent to Carbon Fibers

In DMF, 60 parts by mass of (A-3) as the component (A) and 40 parts by mass of (B-2) as the component (B1) were dissolved, yielding a sizing solution. The epoxy equivalent of the sizing agent without the solutions in the sizing solution is as listed in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 2, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 1. The results revealed a sufficiently high 0° tensile strength translation rate at the initial state, a sufficiently high compression after impact compression after impact, and a small reduction in tensile strength translation rate after 20 days. The results also revealed a sufficiently small volatile content during hardening. Table 2 lists the results.

TABLE 2

| | | | Example 9 | Example 10 | Example 11 | Example 12 | Example 13 | Example 14 | Example 15 |
|---|---|---|---|---|---|---|---|---|---|
| Carbon fibers | Carbon fibers | | A | A | A | A | A | A | A |
| Sizing agent | (A) | EX-810 | | | | | | | |
| | | EX-611 | | | | | | | |
| | | EX-521 | 37 | 35 | 40 | 55 | 60 | 55 | 60 |
| | (B1) | jER152 | | | | | | | |
| | | jER828 | 33 | 45 | 30 | 15 | 15 | 22.5 | 40 |
| | | jER1001 | | | | | | | |
| | | jER807 | | | | | | | |
| | (C) | Aromatic polyester | 20 | 10 | 20 | 20 | 20 | 22.5 | |
| | Others | Emulsifier (nonionic surfactant) | 10 | 10 | 10 | 10 | 5 | | |
| | Ratio | (A) (% by mass) | 53 | 44 | 57 | 79 | 80 | 71 | 60 |
| | | (B1) (% by mass) | 47 | 56 | 43 | 21 | 20 | 29 | 40 |
| | | (A) (% by mass) | 37 | 35 | 40 | 55 | 60 | 55 | 60 |
| | | (B) (% by mass) | 63 | 65 | 60 | 45 | 40 | 45 | 40 |
| | Epoxy equivalent (g/eq.) | | 265 | 230 | 265 | 260 | 245 | 240 | 185 |
| Thermosetting resin composition | Epoxy resin (D11) | N,N-diglycidyl-4-phenoxyaniline | 40 | 40 | 40 | 40 | 40 | 40 | 40 |
| | | N,N-diglycidyl-4-(nitrophenoxy)aniline | | | | | | | |
| | | Ex-731 | | | | | | | |
| | | OPP-G | | | | | | | |
| | Epoxy resin (D12) | ELM434 | 60 | 60 | 60 | 60 | 60 | 60 | 60 |
| | | jER630 | | | | | | | |
| | | 34TGDDE | | | | | | | |
| | | 33TGDDE | | | | | | | |
| | | 44TGDDE | | | | | | | |
| | | TG3DAS | | | | | | | |
| | | MY721 | | | | | | | |
| | Epoxy resin (epoxy resin other than D11, D12) | EPON825 | | | | | | | |
| | | GAN | | | | | | | |
| Thermosetting resin composition | Latent hardener (E) | 4,4'-diaminodiphenylsulfone | 45 | 45 | 45 | 45 | 45 | 45 | 45 |
| | | 3,3'-diaminodiphenylsulfone | | | | | | | |
| | Thermoplastic resin particles (F5) | Toraypearl TN | 20 | 20 | 20 | 20 | 20 | 20 | 20 |
| | | Orgasol 1002D | | | | | | | |
| | Thermoplastic resin (F3) | SUMIKAEXCEL 5003P | 10 | 10 | 10 | 10 | 10 | 10 | 10 |
| | | VW-10700RP | | | | | | | |
| Evaluation item | Sizing agent-coated fibers | Epoxy equivalent of sizing agent (g/eq.) | 430 | 370 | 430 | 430 | 400 | 439 | 280 |
| | | X-ray photoelectron spectroscopy analysis of sizing agent surface (a)/(b) | 0.77 | 0.79 | 0.76 | 0.66 | 0.57 | 0.70 | 0.81 |
| | | ΔTg with hardener | 17 | 16 | 18 | 21 | 22 | 20 | 25 |
| | | Interfacial adhesion: IFSS (MPa) | 41 | 40 | 45 | 45 | 45 | 45 | 45 |
| | Thermosetting resin composition | Glass transition temperature (°C.) | 182 | 182 | 182 | 182 | 182 | 182 | 182 |
| | Prepreg | Ratio of particles present in region to 20% depth | 99 | 99 | 99 | 99 | 99 | 99 | 99 |
| | | Volatile content (% by mass) | 0.9 | 0.9 | 0.9 | 0.9 | 0.9 | 0.9 | 0.9 |
| | Carbon fiber-reinforced composite material | 0° Tensile test (0 days): strength translation rate (%) | 90 | 90 | 93 | 93 | 94 | 93 | 93 |
| | | 0° Tensile test (20 days): strength translation rate (%) | 88 | 88 | 86 | 86 | 86 | 86 | 86 |
| | | Compression after impactCompression after impact (MPa) | 325 | 321 | 351 | 352 | 355 | 352 | 354 |

Examples 16 to 27

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 3 lists the results.

Process III: Production, Molding, and Evaluation of Unidirectional Prepreg

As the thermosetting resin composition, the epoxy resin (D11), the epoxy resin (D12), the thermoplastic resin (F3), and the thermoplastic resin particles (F5) (and the epoxy resin other than the epoxy resins (D11) and (D12) if contained) listed in Table 3 were mixed in the ratio listed in Table 3 and dissolved. Next, the latent hardener (E) listed in Table 3 was added, and the whole was kneaded, thus yielding an epoxy resin composition for a carbon fiber-reinforced composite material.

The obtained epoxy resin composition was applied onto a release paper with a knife coater so as to give a resin areal weight of 52 g/m$^2$, thus yielding a resin film. The resin film was superimposed on each side of sizing agent-coated carbon fibers (an areal weight of 190 g/m$^2$) arranged in one direction, and heat and pressure were applied with a heat roll at a temperature of 100° C. and a pressure of 1 atm to impregnate the sizing agent-coated carbon fibers with the epoxy resin composition, thus yielding a prepreg. The prepreg volatile content of the obtained prepreg was determined. The obtained prepreg was used, and the 0° tensile strength measurement, the 0° tensile test after long-term storage, the glass transition temperature measurement, and the compressive strength measurement after impact of the carbon fiber-reinforced composite material were carried out. Table 3 lists the results. The results revealed a sufficiently high 0° tensile strength translation rate at the initial state, a sufficiently high compression after impact compression after impact, and a small reduction in tensile strength translation rate after 20 days. The results also revealed a sufficiently small volatile content during hardening.

TABLE 3

| | | | | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|---|
| Carbon fibers | Carbon fibers | | | A | A | A | A | A | A | A | A | A | A | A | A |
| Sizing agent | (A) | EX-810 | | 50 | 50 | 50 | 50 | 50 | 50 | 50 | 50 | 50 | 50 | 50 | 50 |
| | | EX-611 | | | | | | | | | | | | | |
| | | EX-521 | | | | | | | | | | | | | |
| | (B1) | jER152 | | 20 | 20 | 20 | 20 | 20 | 20 | 20 | 20 | 20 | 20 | 20 | 20 |
| | | jER828 | | | | | | | | | | | | | |
| | | jER1001 | | | | | | | | | | | | | |
| | | jER807 | | | | | | | | | | | | | |
| | (C) | Aromatic polyester | | 20 | 20 | 20 | 20 | 20 | 20 | 20 | 20 | 20 | 20 | 20 | 20 |
| | Others | Emulsifier (nonionic surfactant) | | 10 | 10 | 10 | 10 | 10 | 10 | 10 | 10 | 10 | 10 | 10 | 10 |
| | Ratio | (A) (% by mass) | | 71 | 71 | 71 | 71 | 71 | 71 | 71 | 71 | 71 | 71 | 71 | 71 |
| | | (B1) (% by mass) | | 29 | 29 | 29 | 29 | 29 | 29 | 29 | 29 | 29 | 29 | 29 | 29 |
| | | (A) (% by mass) | | 50 | 50 | 50 | 50 | 50 | 50 | 50 | 50 | 50 | 50 | 50 | 50 |
| | | (B) (% by mass) | | 50 | 50 | 50 | 50 | 50 | 50 | 50 | 50 | 50 | 50 | 50 | 50 |
| | Epoxy equivalent (g/eq.) | | | 265 | 265 | 265 | 265 | 265 | 265 | 265 | 265 | 265 | 265 | 265 | 265 |
| Thermosetting resin composition | Epoxy resin (D11) | N,N-diglycidyl-4-phenoxyaniline | | 20 | 40 | 60 | 20 | 30 | 40 | 40 | | 40 | 40 | 30 | 40 |
| | | N,N-diglycidyl-4-(nitrophenoxy)aniline | | | | | | | | | 40 | | | | |
| | | Ex-731 | | | | | | | | | | | | | |
| | | OPP-G | | | | | | | | | | | | | |
| | Epoxy resin (D12) | ELM434 | | 80 | 60 | 40 | 80 | 70 | 60 | 60 | 60 | | | 50 | 60 |
| | | jER630 | | | | | | | | | | 60 | | | |
| | | 34TGDDE | | | | | | | | | | | | | |
| | | 331TGDDE | | | | | | | | | | | 60 | | |
| | | 44TGDDE | | | | | | | | | | | | | |
| | | TG3DAS | | | | | | | | | | | | | |
| | | MY721 | | | | | | | | | | | | | |
| | Epoxy resin (other than D11, D12) | EPON825 | | | | | | | | | | | | 20 | 60 |
| | | GAN | | | | | | | | | | | | | |
| Thermosetting resin | Latent hardener (E) | 4,4'-diaminodiphenyl-sulfone | | 45 | 45 | 45 | 45 | 45 | 45 | 45 | 45 | 45 | 45 | 45 | |

TABLE 3-continued

| | | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|
| composition | 3,3'-diaminodiphenyl-sulfone | | | | | | | | | | | | 45 |
| | Thermoplastic resin particles (F5) Toraypearl TN Orgasol 1002D | | | | | | | | | | | | |
| | Thermoplastic resin (F3) SUMIKAEXCEL 5003P VW-10700RP | 10 | 10 | 10 | 10 | 10 | 10 | 10 | 10 | 10 | 10 | 10 | 10 |
| Evaluation item | Sizing agent-coated fibers Epoxy equivalent of sizing agent (g/eq.) | 430 | 430 | 430 | 430 | 430 | 430 | 430 | 430 | 430 | 430 | 430 | 430 |
| | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 | 0.64 |
| | ΔTg with hardener | 20 | 20 | 20 | 20 | 20 | 20 | 20 | 20 | 20 | 20 | 20 | 24 |
| | Interfacial adhesion: IFSS (MPa) | 44 | 44 | 44 | 44 | 44 | 44 | 44 | 44 | 44 | 44 | 44 | 44 |
| | Thermosetting resin composition Glass transition temperature (° C.) | 207 | 182 | 158 | 184 | 182 | 169 | 160 | 199 | 170 | 182 | 188 | 191 |
| | Prepreg Ratio of particles present in region to 20% depth | — | — | — | — | — | — | — | — | — | — | — | — |
| | Volatile content (% by mass) | 0.5 | 0.8 | 0.9 | 1.9 | 2.5 | 3.7 | 3.6 | 1 | 0.8 | 0.8 | 0.5 | 0.7 |
| | Carbon fiber-reinforced composite material 0° Tensile test (0 days): strength translation rate (%) | 89 | 92 | 89 | 88 | 90 | 92 | 92 | 91 | 90 | 93 | 90 | 91 |
| | 0° Tensile test (20 days): strength translation rate (%) | 83 | 88 | 83 | 83 | 85 | 86 | 87 | 86 | 84 | 88 | 84 | 84 |
| | Compression after impact Compression after impact (MPa) | 205 | 211 | 204 | 205 | 208 | 212 | 219 | 208 | 199 | 211 | 206 | 199 |

Examples 28 to 39

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and $\Delta$Tg of the sizing agent-coated carbon fibers were determined. All of the epoxy equivalent of the sizing agent, the chemical composition of the sizing agent surface, and $\Delta$Tg were as expected. The IFSS measurement also revealed a moderate adhesiveness. Table 4 lists the results.

Process III: Production, Molding, and Evaluation of Unidirectional Prepreg

A prepreg was produced, molded, and evaluated in the same manner as in Example 1 except that the epoxy resins (D11) and (D12), the thermoplastic resin particles (F3), and the thermoplastic resin (F5) listed in Table 4 were used in the mass ratio in Table 4. Table 4 lists the results. The results revealed a sufficiently high 0° tensile strength translation rate at the initial state, a sufficiently high compression after impact, and a small reduction in tensile strength translation rate after 20 days. The results also revealed a sufficiently small volatile content during hardening.

TABLE 4

| | | | Example 28 | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|---|---|---|
| Carbon fibers sizing agent | Carbon fibers | | A | A | A | A | A | A | A | A | A | A | A | A |
| | (A) | EX-810 | 50 | 50 | 50 | 50 | 50 | 50 | 50 | 50 | 50 | 50 | 50 | 50 |
| | | EX-611 | | | | | | | | | | | | |
| | | EX-521 | | | | | | | | | | | | |
| | (B1) | jER152 | 20 | 20 | 20 | 20 | 20 | 20 | 20 | 20 | 20 | 20 | 20 | 20 |
| | | jER828 | | | | | | | | | | | | |
| | | jER1001 | | | | | | | | | | | | |
| | | jER807 | | | | | | | | | | | | |
| | (C) | Aromatic polyester | 20 | 20 | 20 | 20 | 20 | 20 | 20 | 20 | 20 | 20 | 20 | 20 |
| | Others | Emulsifier (nonionic surfactant) | 10 | 10 | 10 | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 | 265 |
| Thermo-setting resin composition | Epoxy resin (D11) | N,N-diglycidyl-4-phenoxyaniline | 20 | 60 | | 40 | 40 | 40 | 40 | 40 | 40 | 40 | 40 | 40 |
| | | N,N-diglycidyl-4-(nitrophenoxy)aniline | | | | | | | | | | | | |
| | | Ex-731 | | | 40 | | | | | | | | | |
| | | OPP-G | | | | | | | | | | | | |
| | Epoxy resin (D12) | ELM434 | 80 | 40 | 60 | 60 | | | | | | | | |
| | | jER630 | | | | | 60 | | | | | | | |
| | | 34TGDDE | | | | | | 60 | | | | | | |
| | | 33TGDDE | | | | | | | 60 | | | | | |
| | | 44TGDDE | | | | | | | | 60 | | | | |
| | | TG3DAS | | | | | | | | | 60 | | | |
| | | MY721 | | | | | | | | | | 60 | | |
| | Epoxy resin (epoxy resin other than D11, D12) | EPON825 | | | | | | | | | | | 60 | |
| | | GAN | | | | | | | | | | | | 60 |
| | Latent hardener (E) | 4,4'-diaminodiphenyl-sulfone | 45 | 45 | 45 | 45 | 45 | 45 | 45 | 45 | 45 | 45 | 45 | 45 |
| | | 3,3'-diaminodiphenyl-sulfone | | | | | | | | | | | | |

TABLE 4-continued

|  |  |  | Example 28 | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|---|---|---|
| Thermo-setting resin compo-sition | Thermoplas-tic resin particles (F5) | Toraypearl TN Orgasol 1002D | 20 | 20 | 20 | 20 | 20 | 20 | 20 | 20 | 20 | 20 | 20 | 20 |
|  | Thermoplas-tic resin (F3) | SUMIKAEXCEL 5003P VW-10700RP | 10 | 10 | 10 | 10 | 15 | 20 | 35 | 10 | 10 | 10 | 10 | 10 |
| Evalua-tion item | Sizing agent-coated fibers | Epoxy equivalent of sizing agent (g/eq.) | 430 | 430 | 430 | 430 | 430 | 430 | 430 | 430 | 430 | 430 | 430 | 430 |
|  |  | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 | 0.64 |
|  |  | ΔTg with hardener | 20 | 20 | 20 | 20 | 20 | 20 | 20 | 20 | 20 | 20 | 20 | 20 |
|  |  | Interfacial adhesion: IFSS (MPa) | 44 | 44 | 44 | 44 | 44 | 44 | 44 | 44 | 44 | 44 | 44 | 44 |
|  | Thermo-setting resin composition | Glass transition temperature (° C.) | 207 | 158 | 169 | 182 | 182 | 183 | 183 | 182 | 185 | 190 | 182 | 189 |
|  | Prepreg | Ratio of particles present in region to 20% depth | 98 | 97 | 98 | 99 | 97 | 98 | 98 | 98 | 98 | 99 | 98 | 97 |
|  |  | Volatile content (% by mass) | 0.5 | 0.9 | 3.7 | 0.8 | 0.8 | 0.7 | 0.8 | 0.8 | 0.6 | 0.8 | 0.7 | 0.6 |
|  | Carbon fiber-reinforced composite material | 0° Tensile test (0 days): strength translation rate (%) | 89 | 87 | 90 | 92 | 93 | 92 | 93 | 92 | 92 | 91 | 85 | 94 |
|  |  | 0° Tensile test (20 days): strength translation rate (%) | 84 | 82 | 85 | 87 | 86 | 92 | 93 | 87 | 87 | 87 | 80 | 89 |
|  |  | Compression after impact (MPa) | 330 | 305 | 332 | 337 | 338 | 336 | 338 | 335 | 345 | 340 | 322 | 337 |

Comparative Examples 1 to 3

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2 except that the sizing agent had the mass ratio listed in Table 5. Subsequently, the epoxy equivalent of the sizing agent, the X-ray photoelectron spectrum of the sizing agent surface, and the interfacial shear strength (IFSS) and $\Delta Tg$ of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 1. The results revealed a small reduction ratio of the tensile strength after 20 days but a low 0° tensile strength translation rate at the initial state and a low compression after impact.

Comparative Example 4

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2 except that the sizing agent had the mass ratio listed in Table 5. Subsequently, the epoxy equivalent of the sizing agent, the X-ray photoelectron spectrum of the sizing agent surface, and the interfacial shear strength (IFSS) and $\Delta Tg$ of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 1. The results revealed a good 0° tensile strength translation rate at the initial state and a good compression after impact but a large reduction ratio of the 0° tensile strength after 20 days.

Comparative Examples 5 and 6

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) and $\Delta Tg$ of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 1. The results revealed a high 0° tensile strength translation rate at the initial state and a high compression after impact but a large reduction ratio of the tensile strength after 20 days.

Comparative Example 7

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2 except that no aliphatic epoxy compound (A) was used but the aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) and $\Delta Tg$ of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 1. The results revealed a low reduction ratio of the tensile strength after 20 days but an insufficient tensile strength translation rate at the initial state and an insufficient compression after impact.

Comparative Example 8

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 5 lists the results.

Process III: Production, Molding, and Evaluation of Unidirectional Prepreg

No epoxy resin (D12) was used but the epoxy resin (D11) and other components were used as the thermosetting resin composition, and a prepreg was intended to be prepared, molded, and evaluated in the same manner as in Example 1, but cracks were generated on the surface of the carbon fiber-reinforced composite material.

Comparative Example 9

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 5 lists the results.

Process III: Production, Molding, and Evaluation of Unidirectional Prepreg

A prepreg was prepared, molded, and evaluated in the same manner as in Example 1 except that no epoxy resin (D11) was used but the epoxy resin (D12) and other components were used as the thermosetting resin composition. The results revealed a good compression after impact and a low reduction ratio of the tensile strength after 20 days but an insufficient tensile strength translation rate at the initial state.

Comparative Examples 10 to 12

Process I: Process for Producing Carbon Fibers as Raw Material

Carbon fibers were produced in the same manner as in Example 1.

Process II: Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 5 lists the results.

Process III: Production, Molding, and Evaluation of Unidirectional Prepreg

A prepreg was prepared, molded, and evaluated in the same manner as in Example 1 except that the epoxy resins (D11) and (D12) listed in Table 5 were added as the thermosetting resin composition in the mass ratio listed in Table 5. Comparative Examples 10 and 11 resulted in a low reduction ratio of the tensile strength after 20 days but an insufficient tensile strength translation rate at the initial state and an insufficient compression after impact. Comparative Example 12 resulted in a high 0° tensile strength translation rate at the initial state, a high compression after impact, and a moderate reduction in tensile strength translation rate after 20 days, but a very large volatile content.

TABLE 5

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|---|---|
| Carbon fibers | Carbon fibers | | A | A | A | A | A | A | A | A | A | A | A | A |
| Sizing agent | (A) | EX-810 | 20 | 30 | 50 | 70 | 100 | | | | | | | |
| | | EX-611 | | | | | | 50 | | | | | | |
| | | EX-521 | | | | | | | 45 | 50 | 50 | 50 | 50 | 50 |
| | (B1) | jER152 | 35 | 60 | 50 | 12 | | 50 | | 20 | 20 | 20 | 20 | 20 |
| | | jER828 | | | | | | | | | | | | |
| | | jER1001 | | | | | | | | | | | | |
| | | jER807 | | | | | | | | | | | | |
| | (C) Others | Aromatic polyester | 35 | 5 | | 12 | | | 45 | 20 | 20 | 20 | 20 | 20 |
| | | Emulsifier (nonionic surfactant) | 10 | 5 | | 6 | | | 10 | 10 | 10 | 10 | 10 | 10 |
| | Ratio | (A) (% by mass) | 36 | 33 | 50 | 85 | 100 | 100 | 0 | 71 | 71 | 71 | 71 | 71 |
| | | (B1) (% by mass) | 64 | 67 | 50 | 15 | 0 | 0 | 100 | 29 | 29 | 29 | 29 | 29 |
| | | (A) (% by mass) | 20 | 30 | 50 | 70 | 100 | 100 | 0 | 50 | 50 | 50 | 50 | 50 |
| | | (B) (% by mass) | 80 | 70 | 50 | 30 | 0 | 0 | 100 | 50 | 50 | 50 | 50 | 50 |
| | Epoxy equivalent (g/eq.) | | 270 | 210 | 230 | 224 | 180 | 180 | 420 | 265 | 265 | 265 | 265 | 265 |
| Thermo-setting resin composition | Epoxy resin (D11) | N,N-diglycidyl-4-phenoxyaniline | 40 | 40 | 40 | 40 | 40 | 40 | 40 | 100 | | 70 | 30 | 50 |
| | | N,N-glycidyl-4-(nitdirophenoxy)aniline | | | | | | | | | | | | |
| | | Ex-731 | | | | | | | | | | | | |
| | | OPP-G | | | | | | | | | | | | |
| | Epoxy resin (D12) | ELM434 | 60 | 60 | 60 | 60 | 60 | 60 | 60 | | 100 | 30 | | 60 |
| | | jER630 | | | | | | | | | | | | |
| | | 34TGDDE | | | | | | | | | | | | |
| | | 33TGDDE | | | | | | | | | | | | |
| | | 44TGDDE | | | | | | | | | | | | |
| | | TG3DAS | | | | | | | | | | | | |
| | | MY721 | | | | | | | | | | | | |
| | Epoxy resin (epoxy resin other than D11, D12) | EPON825 | | | | | | | | | | | 70 | |
| | | GaN | | | | | | | | | | | | 40 |
| | Latent hardener (E) | 4,4'-diaminodiphenylsulfone | 45 | 45 | 45 | 45 | 45 | 45 | 45 | 45 | 45 | 45 | 45 | 45 |
| | | 3,3'-diaminodiphenylsulfone | | | | | | | | | | | | |
| | Thermoplastic resin particles (F5) | Toraypearl TN | 20 | 20 | 20 | 20 | 20 | 20 | 20 | 20 | 20 | 20 | 20 | 20 |
| | | Orgasol 1002D | | | | | | | | | | | | |
| | Thermoplastic resin (F3) | SUMIKAEXCEL 5003P | 10 | 10 | 10 | 10 | 10 | 10 | 10 | 10 | 10 | 10 | 10 | 10 |
| | | VW-10700RP | | | | | | | | | | | | |
| Evaluation | Epoxy equivalent of sizing agent-coated fibers (g/eq.) | | 430 | 320 | 370 | 350 | 270 | 260 | 900 | 430 | 430 | 430 | 430 | 430 |

TABLE 5-continued

| item | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|---|
| | X-ray photoelectron spectroscopy analysis of sizing agent surface (a)/(b) | 0.91 | 0.93 | 0.91 | 0.49 | 0.29 | 0.26 | 1.01 | 0.64 | 0.64 | 0.64 | 0.64 | 0.64 |
| | ΔTg with hardener | 15 | 17 | 18 | 27 | 32 | 27 | 10 | 20 | 20 | 20 | 20 | 20 |
| | Interfacial adhesion: IFSS (MPa) | 34 | 34 | 36 | 45 | 46 | 41 | 25 | 40 | 44 | 44 | 44 | 44 |
| Thermosetting resin composition | Glass transition temperature (° C.) | 182 | 182 | 182 | 182 | 182 | 182 | 182 | — | 271 | 210 | 146 | 177 |
| Prepreg | Ratio of particles present in region to 20% depth | 99 | 98 | 97 | 99 | 99 | 99 | 97 | — | 99 | 99 | 97 | 98 |
| | Volatile content (% by mass) | 0.9 | 0.9 | 0.9 | 0.9 | 0.9 | 0.9 | 0.9 | — | 0.4 | 0.4 | 0.8 | 5.9 |
| Carbon fiber-reinforced composite material | 0° Tensile test (0 days): strength translation rate (%) | 83 | 83 | 84 | 92 | 94 | 90 | 79 | — | 79 | 78 | 79 | 92 |
| | 0° Tensile test (20 days): strength translation rate (%) | 80 | 81 | 83 | 80 | 79 | 78 | 76 | — | 74 | 73 | 74 | 86 |
| | Compression after impact (MPa) | 280 | 280 | 283 | 360 | 365 | 339 | 268 | — | 310 | 246 | 250 | 370 |

Example 40

In 50 ml of acetone, 2 g of the sizing agent-coated carbon fibers obtained in Example 1 were immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agents remaining after the cleaning were determined. The results are as listed in Table 6.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy 284.6 eV assigned to CHx, C—C, and C=C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) are as listed in Table 6.

Examples 41 to 44

In the same manner as in Example 40, the sizing agent-coated carbon fibers obtained in Example 2, Example 6, Example 10, and Example 13 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 lists the results.

Comparative Example 13

In the same manner as in Example 40, the sizing agent-coated carbon fibers obtained in Comparative Example 5 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 lists the results, which indicate a large ((II)/(I)) ratio. This result revealed that no inclined structure was achieved in the sizing agent.

Comparative Example 14

In the same manner as in Example 40, the sizing agent-coated carbon fibers obtained in Comparative Example 7 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 lists the results, which indicate a large ((II)/(I)) ratio. This result revealed that no inclined structure was achieved in the sizing agent.

TABLE 6

|  |  | Example 40 | Example 41 | Example 42 | Example 43 | Example 44 | Comparative Example 13 | Comparative Example 14 |
|---|---|---|---|---|---|---|---|---|
| Sizing agent-coated carbon fibers |  | Example 1 | Example 2 | Example 6 | Example 10 | Example 13 | Comparative Example 5 | Comparative Example 7 |
|  | Adhesion amount of sizing agent after cleaning of sizing agent | 0.18 | 0.18 | 0.18 | 0.18 | 0.18 | 0.18 | 0.12 |
| XPS (400 eV) | (I) | 0.67 | 0.67 | 0.57 | 0.8 | 0.58 | 0.29 | 1.01 |
|  | (II)/(I) | 0.7 | 0.7 | 0.8 | 0.74 | 0.74 | 1 | 1 |

The materials and the components shown given below were used in each example and each comparative example of Second Embodiment.

Component (A): A-1 to A-3

A-1 to A-3 as the component (A) used in Examples and Comparative Examples of Second Embodiment were the same as A-1 to A-3 used in Examples and Comparative Examples of First Embodiment.

Component (B1): B-1 to B-4

B-1 to B-4 as the component (B1) used in Examples and Comparative Examples of Second Embodiment were the same as B-1 to B-4 used in Examples and Comparative Examples of First Embodiment.

Epoxy Resin Component (D1): D1-1 and D1-2

D1-1: bisphenol A epoxy resin, "EPIKOTE (registered trademark)" 825 (manufactured by Japan Epoxy Resin Co., Ltd.)

D1-2: tetraglycidyldiaminodiphenylmethane, ELM434 (manufactured by Sumitomo Chemical Co., Ltd.)

Latent Hardener Component (E):

"SEIKACURE (registered trademark)" S (4,4'-diaminodiphenylsulfone, manufactured by Wakayama Seika Kogyo Co., Ltd.)

Resin Particles (F1) Having Structure of General Formula (1) and Insoluble in Epoxy Resin (D1): F1-1 and F1-2

F1-1: particles 1 (particles having an average particle size of 13.2 μm and prepared from "TROGAMID (registered trademark)" CX7323 as a raw material, the viscosity change at 80° C. for 2 hours is 0%)

(Method for Producing Particles 1: with Reference to International Publication WO 2009/142231, Pamphlet)

In a 1,000-ml four-necked flask, 20 g of polyamide (a weight average molecular weight of 17,000, "TROGAMID (registered trademark)" CX7323 manufactured by Degussa) as a polymer A, 500 g of formic acid as an organic solvent, and 20 g of polyvinyl alcohol (PVA 1000 manufactured by Wako Pure Chemical Industries, Ltd., an SP value of 32.8 $(J/cm^3)^{1/2}$) as a polymer B were added. The whole was heated to 80° C. and stirred until the polymers were dissolved. The temperature of the system was decreased to 55°

C. While the system was sufficiently stirred at 900 rpm, 500 g of ion-exchanged water as a poor solvent was started to be added dropwise at a speed of 0.5 g/min through a feed pump. The ion-exchanged water was added dropwise while the dropping speed was gradually increased, and was completely added over 90 minutes. When 100 g of ion-exchanged water was added, the system turned white. When a half of the ion-exchanged water had been added dropwise, the temperature of the system was increased to 60° C., and then the remaining ion-exchanged water was successively added. After the complete addition, the system was further stirred for 30 minutes. The suspension was allowed to reach room temperature; then filtered; washed with 500 g of ion-exchanged water; and dried under vacuum at 80° C. for 10 hours, thus yielding 11 g of white solid. The observation of the obtained fine particles under a scanning electron microscope revealed polyamide particles having an average particle size of 13.2 μm.

F1-2: particles 2 (particles having an average particle size of 30.5 μm and prepared from "TROGAMID (registered trademark)" CX7323 as a raw material, the viscosity change at 80° C. for 2 hours is 0%)

(Method for Producing Particles 2: with Reference to International Publication WO 2009/142231, Pamphlet)

In a 1,000-ml four-necked flask, 20 g of polyamide (a weight average molecular weight of 17,000, "TROGAMID (registered trademark)" CX7323 manufactured by Degussa) as a polymer A, 500 g of formic acid as an organic solvent, and 20 g of polyvinyl alcohol (PVA 1000 manufactured by Wako Pure Chemical Industries, Ltd., an SP value of 32.8 $(J/cm^3)^{1/2}$) as a polymer B were added. The whole was heated to 70° C. and stirred until the polymers were dissolved. The temperature of the system was maintained. While the system was sufficiently stirred at 900 rpm, 600 g of ion-exchanged water as a poor solvent was started to be added dropwise at a speed of 0.5 g/min through a feed pump. The ion-exchanged water was added dropwise while the speed was gradually increased, and was completely added over 90 minutes. When 100 g of ion-exchanged water was added, the system turned white. When a half of the ion-exchanged water had been added dropwise, the temperature of the system was increased to 60° C., and then the remaining ion-exchanged water was successively added. After the complete addition, the system was further stirred for 30 minutes. The suspension was allowed to reach room temperature; then filtered; washed with 500 g of ion-exchanged water; and dried under vacuum at 80° C. for 10 hours, thus yielding 11 g of white solid. The observation of the obtained fine particles under a scanning electron microscope revealed polyamide particles having an average particle size of 30.5 μm.

Thermoplastic Resin (F6) Soluble in Epoxy Resin (D1): Polyethersulfone Having Hydroxy Group at Terminal "SUMIKAEXCEL (registered trademark)" PES5003P (manufactured by Sumitomo Chemical Co., Ltd.)

As other components used, polyamide particles (F4) having no structure of General Formula (1) and insoluble in the epoxy resin (D1) were the following resins.

"Toraypearl (registered trademark)" TN (manufactured by Toray Industries Inc., an average particle size of 12.3 μm)

SP-500 (nylon 12 particles, manufactured by Toray Industries Inc., an average particle size of 5 μm)

Example 45

Example includes Process I, Process II, and Process III.

Process I: Process for Producing Carbon Fibers as Raw Material

A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration (O/C) was 0.15, the surface carboxylic acid concentration (COOH/C) was 0.005, and the surface hydroxy group concentration (COH/C) was 0.018. The obtained carbon fibers were regarded as carbon fibers A.

Process II: Process for Bonding Sizing Agent to Carbon Fibers

An aqueous dispersion emulsion containing 20 parts by mass of (B-1) as the component (B1), 20 parts by mass of the component (C), and 10 parts by mass of an emulsifier was prepared, and then 50 parts by mass of (A-3) was mixed as the component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent without the solvents in the sizing solution is as listed in Table 7. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, the interfacial shear strength (IFSS) of the sizing agent-coated carbon fibers, and the increase (ΔTg) in glass transition point of a mixture of the sizing agent and a latent hardener (E) were determined. The results are listed in Table 7. The results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

In a kneader, 50 parts by mass of (D1-1) and 50 parts by mass of (D1-2) as the epoxy resin component (D1) and 10 parts by mass of PES5003P as the thermoplastic resin (F6) were mixed and dissolved. Next, 40 parts by mass of 4,4'-diaminodiphenylsulfone as the latent hardener component (E) was added, and the whole was kneaded, yielding a primary resin composition without resin particles (F1). The obtained primary resin composition was applied onto a release paper with a knife coater so as to give a resin areal weight of 32 g/m², thus yielding a primary resin film. The primary resin film was superimposed on each side of carbon fibers (an areal weight of 190 g/m²) arranged in one direction, and heat and pressure were applied with a heat roll at 100° C. and 1 atmosphere to impregnate the carbon fibers with the thermosetting resin composition, thus yielding a primary prepreg. Next, a secondary epoxy resin composition that had been prepared by addition of (F1-1) as the resin particles (F1) so that the thermosetting resin composition of the final prepreg for a carbon fiber-reinforced composite material had the formulation listed in Table 7 was applied onto a release paper with a knife coater so as to give a resin areal weight of 20 g/m², thus yielding a secondary resin film. The secondary resin film was superimposed on each side of the primary prepreg, and heat and pressure were applied with a heat roll at 100° C. and 1 atmosphere to impregnate the primary prepreg with the thermosetting resin composition for a carbon fiber-reinforced composite material, thus yielding a target prepreg. The obtained prepreg was used to prepare a carbon fiber-reinforced composite material, and the 0° tensile strength measurement, the 0° tensile strength test after long-term storage, the hot, wet open hole compression measurement, and the interlaminar toughness measurement were carried out. Table 7 lists the results. The results revealed a sufficiently high 0° tensile strength translation rate at the initial state, a sufficiently high hot, wet open hole compression, a sufficiently high interlaminar toughness, and a small reduction in tensile strength translation rate after 20 days.

Examples 46 to 52

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 1 except that the component (A) and the component (B1) listed in Table 7 were used as the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 7 lists the results.

Process III: Production, Molding, and Evaluation of Unidirectional Prepreg

A prepreg was produced, molded, and evaluated in the same manner as in Example 44. The results revealed a sufficiently high 0° tensile strength translation rate at the initial state, a sufficiently high hot, wet open hole compression, a sufficiently high interlaminar toughness, and a small reduction in tensile strength translation rate after 20 days.

TABLE 7

| | | | Example 45 | Example 46 | Example 47 | Example 48 | Example 49 | Example 50 | Example 51 | Example 52 |
|---|---|---|---|---|---|---|---|---|---|---|
| Carbon fibers | Carbon fibers | | A | A | A | A | A | A | A | A |
| Sizing agent | (A) | EX-810 | | | | | | | | |
| | | EX-611 | 50 | 50 | | | | 50 | 50 | 25 |
| | | EX-521 | 20 | | 50 | 50 | 50 | | | 25 |
| | (B1) | jER152 | | 20 | 20 | | | 20 | 20 | 20 |
| | | jER828 | | | | | | | | |
| | | jER1001 | | | | | 10 | | | |
| | | jER807 | | | | | 10 | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 265 | 320 | 250 | 290 | 255 | 290 | 275 |
| Thermosetting resin composition | Epoxy resin (D1) | EPIKOTE 825 | 50 | 50 | 50 | 50 | 50 | 50 | 50 | 50 |
| | | ELM434 | 50 | 50 | 50 | 50 | 50 | 50 | 50 | 50 |
| | Thermoplastic resin | PES5003P | 10 | 10 | 10 | 10 | 10 | 10 | 10 | 10 |
| | Latent hardener (E) | 4,4'-diaminodiphenylsulfone | 40 | 40 | 40 | 40 | 40 | 40 | 40 | 40 |
| | Particles (F1) having structure of General Formula (1) and insoluble in epoxy resin | Particles 1 (13.2 μm) | 20 | 20 | 20 | 20 | 20 | 20 | 20 | 20 |
| | | Particles 2 (30.5 μm) | | | | | | | | |
| | Polyamide particles (F4) having no structure of General Formula (1) and insoluble in epoxy resin | Toraypearl TN (12.3 μm) SP-500 (5 μm) | | | | | | | | |
| Evaluation item | Sizing agent-coated fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with hardener | 19 | 20 | 18 | 20 | 19 | 16 | 21 | 21 |
| | | Interfacial adhesion: IFSS (MPa) | 43 | 44 | 41 | 46 | 43 | 40 | 43 | 44 |
| | Prepreg characteristics | Ratio of particles present in region to 20% depth | 99 | 97 | 96 | 98 | 99 | 99 | 98 | 96 |
| | Carbon fiber-reinforced composite | 0° Tensile test (0 days): strength | 83 | 84 | 82 | 84 | 83 | 81 | 83 | 83 |

TABLE 7-continued

| | | Example 45 | Example 46 | Example 47 | Example 48 | Example 49 | Example 50 | Example 51 | Example 52 |
|---|---|---|---|---|---|---|---|---|---|
| material | translation rate (%) 0° Tensile test (20 days): strength translation rate (%) | 78 | 79 | 80 | 76 | 78 | 80 | 79 | 78 |
| | Hot, wet open hole compression (MPa) | 234 | 235 | 233 | 234 | 234 | 235 | 237 | 233 |
| | Interlaminar toughness Gic (J/m$^2$) | 440 | 438 | 438 | 440 | 437 | 440 | 439 | 441 |

Examples 53 to 57

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46 except that the sizing agent had the mass ratio listed in Table 8. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 8 lists the results.

Process III: Production, Molding, and Evaluation of Unidirectional Prepreg

A prepreg was produced, molded, and evaluated in the same manner as in Example 45. The results revealed a sufficiently high 0° tensile strength translation rate at the initial state, a sufficiently high hot, wet open hole compression, a sufficiently high interlaminar toughness, and a small reduction in tensile strength translation rate after 20 days. Table 8 lists the results.

Example 58

Process I: Process for Producing Carbon Fibers as Raw Material

Carbon fibers were produced in the same manner as in Example 45.

Process II: Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved, yielding a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent without the solutions in the sizing solution is as listed in Table 8. In the same manner as in Example 45, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 8, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 45. The results revealed a sufficiently high 0° tensile strength translation rate at the initial state, a sufficiently high hot, wet open hole compression, a sufficiently high interlaminar toughness, and a small reduction in tensile strength translation rate after 20 days. Table 8 lists the results.

Example 59

Process I: Process for Producing Carbon Fibers as Raw Material

Carbon fibers were produced in the same manner as in Example 1.

Process II: Process for Bonding Sizing Agent to Carbon Fibers

In DMF, 60 parts by mass of (A-3) as the component (A) and 40 parts by mass of (B-2) as the component (B1) were dissolved, yielding a sizing solution. The epoxy equivalent of the sizing agent without the solutions in the sizing solution is as listed in Table 8. In the same manner as in Example 45, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 8, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 45. The results revealed a sufficiently high 0° tensile strength translation rate at the initial state, a sufficiently high hot, wet open hole compression, a sufficiently high interlaminar toughness, and a small reduction in tensile strength translation rate after 20 days. Table 8 lists the results.

TABLE 8

| | | | Example 53 | Example 54 | Example 55 | Example 56 | Example 57 | Example 58 | Example 59 |
|---|---|---|---|---|---|---|---|---|---|
| Carbon fibers | Carbon fibers | | A | A | A | A | A | A | A |
| Sizing agent | (A) | EX-810 | | | | | | | |
| | | EX-611 | | | | | | | |
| | | EX-521 | 37 | 35 | 40 | 55 | 60 | 55 | 60 |
| | (B1) | jER152 | | | | | | | |
| | | jER828 | 33 | 45 | 30 | 15 | 15 | 22.5 | 40 |
| | | jER1001 | | | | | | | |
| | | jER807 | | | | | | | |
| | (C) Others | Aromatic polyester | 20 | 10 | 20 | 20 | 20 | 22.5 | |
| | | Emulsifier (nonionic surfactant) | 10 | 10 | 10 | 10 | 5 | | |
| | Ratio | (A) (% by mass) | 53 | 44 | 57 | 79 | 80 | 71 | 60 |
| | | (B1) (% by mass) | 47 | 56 | 43 | 21 | 20 | 29 | 40 |
| | | (A) (% by mass) | 37 | 35 | 40 | 55 | 60 | 55 | 60 |
| | | (B) (% by mass) | 63 | 65 | 60 | 45 | 40 | 45 | 40 |
| | Epoxy equivalent (g/eq.) | | 265 | 230 | 265 | 260 | 245 | 240 | 185 |
| Thermosetting resin composition | Epoxy resin (D1) | EPIKOTE 825 | 50 | 50 | 50 | 50 | 50 | 50 | 50 |
| | Thermoplastic resin (F6) | ELM434 | 50 | 50 | 50 | 50 | 50 | 50 | 50 |
| | Latent hardener (E) | PES5003P | 10 | 10 | 10 | 10 | 10 | 10 | 10 |
| | Particles (F1) having structure of General Formula (1) and insoluble in epoxy resin | 4,4′-diaminodiphenylsulfone | 40 | 40 | 40 | 40 | 40 | 40 | 40 |
| | Polyamide particles (F4) having no structure of General Formula (1) and insoluble in epoxy resin | Particles 1 (13.2 µm) | 20 | 20 | 20 | 20 | 20 | 20 | 20 |
| | | Particles 2 (30.5 µm) | | | | | | | |
| | | Toraypearl TN (12.3 µm) | | | | | | | |
| | | SP-500 (5 µm) | | | | | | | |
| Evaluation item | Sizing agent-coated fibers | Epoxy equivalent of sizing agent (g/eq.) | 430 | 370 | 430 | 430 | 400 | 439 | 280 |
| | | X-ray photoelectron spectroscopy analysis of sizing agent surface (a)/(b) | 0.77 | 0.79 | 0.76 | 0.66 | 0.57 | 0.70 | 0.81 |
| | | ΔTg with hardener | 17 | 16 | 18 | 21 | 22 | 20 | 25 |
| | | Interfacial adhesion: IFSS (MPa) | 41 | 40 | 45 | 45 | 45 | 45 | 45 |
| | Prepreg characteristics | Ratio of particles present in region to 20% depth | 99 | 98 | 97 | 96 | 97 | 99 | 98 |
| | Carbon fiber-reinforced composite material | 0° Tensile test (0 days): strength translation rate (%) | 82 | 81 | 84 | 84 | 85 | 84 | 84 |
| | | 0° Tensile test (20 days): strength translation rate (%) | 80 | 80 | 77 | 76 | 77 | 76 | 76 |
| | | Hot, wet open hole compression (MPa) | 235 | 234 | 233 | 235 | 233 | 234 | 235 |
| | | Interlaminar toughness Gic (J/m²) | 441 | 439 | 438 | 442 | 441 | 440 | 436 |

Examples 60 to 63

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 9 lists the results.

Process III: Production, Molding, and Evaluation of Unidirectional Prepreg

A target prepreg was produced in the same manner as in Example 45 except that the resin particles listed in Table 9 were added in the formulation listed in Table 9 as the resin particles (F1) having the structure of General Formula (1) and insoluble in the epoxy resin (D1). In Examples 61 to 63, SP-500 as the polyamide particles (F4) having no structure of General Formula (1) and insoluble in the epoxy resin (D1) was also added in the ratio listed in Table 9. The obtained prepreg was used to prepare a carbon fiber-reinforced composite material, and the 0° tensile strength measurement, the 0° tensile strength test after long-term storage, the hot, wet open hole compression measurement, and the interlaminar toughness measurement were carried out. Table 9 lists the results. The results revealed a sufficiently high 0° tensile strength translation rate at the initial state, a sufficiently high hot, wet open hole compression, a sufficiently high interlaminar toughness, and a small reduction in tensile strength translation rate after 20 days.

TABLE 9

|  |  |  | Example 60 | Example 61 | Example 62 | Example 63 |
|---|---|---|---|---|---|---|
| Carbon fibers | Carbon fibers |  | A | A | A | A |
| Sizing agent | (A) | EX-810 |  |  |  |  |
|  |  | EX-611 |  |  |  |  |
|  |  | EX-521 | 50 | 50 | 50 | 50 |
|  | (B1) | jER152 |  |  |  |  |
|  |  | jER828 | 20 | 20 | 20 | 20 |
|  |  | jER1001 |  |  |  |  |
|  |  | jER807 |  |  |  |  |
|  | (C) | Aromatic polyester | 20 | 20 | 20 | 20 |
|  | Others | Emulsifier (nonionic surfactant) | 10 | 10 | 10 | 10 |
|  | Ratio | (A) (% by mass) | 71 | 71 | 71 | 71 |
|  |  | (B1) (% by mass) | 29 | 29 | 29 | 29 |
|  |  | (A) (% by mass) | 50 | 50 | 50 | 50 |
|  |  | (B) (% by mass) | 50 | 50 | 50 | 50 |
|  | Epoxy equivalent (g/eq.) |  | 265 | 265 | 265 | 265 |
| Thermosetting resin composition | Epoxy resin (D1) | EPIKOTE 825 | 50 | 50 | 50 | 50 |
|  |  | ELM434 | 50 | 50 | 50 | 50 |
|  | Thermoplastic resin (F6) | PES5003P | 10 | 10 | 10 | 10 |
|  | Latent hardener (E) | 4,4'-diaminodiphenylsulfone | 40 | 40 | 40 | 40 |
|  | Particles (F1) having structure of General Formula (1) and insoluble in epoxy resin | Particles 1 (13.2 μm) |  | 18 | 16 | 12 |
|  |  | Particles 2 (30.5 μm) | 20 |  |  |  |
|  | Polyamide particles (F4) having no structure of General Formula (1) and insoluble in epoxy resin | Toraypearl TN (12.3 μm) |  |  |  |  |
|  |  | SP-500 (5 μm) |  | 2 | 4 | 8 |
| Evaluation item | Sizing agent-coated fibers | Epoxy equivalent of sizing agent (g/eq.) | 430 | 430 | 430 | 430 |
|  |  | X-ray photoelectron spectroscopy analysis of sizing agent surface (a)/(b) | 0.64 | 0.64 | 0.64 | 0.64 |
|  |  | ΔTg with hardener | 18 | 20 | 20 | 20 |
|  |  | Interfacial adhesion: IFSS (MPa) | 44 | 44 | 44 | 44 |
|  | Prepreg characteristics | Ratio of particles present in region to 20% depth | 99 | 98 | 96 | 97 |
|  | Carbon fiber-reinforced composite material | 0° Tensile test (0 days): strength translation rate (%) | 84 | 84 | 83 | 84 |
|  |  | 0° Tensile test (20 days): strength translation rate (%) | 79 | 80 | 78 | 79 |
|  |  | Hot, wet open hole compression (MPa) | 235 | 230 | 225 | 220 |
|  |  | Interlaminar toughness Gic (J/m$^2$) | 402 | 458 | 515 | 517 |

Comparative Examples 15 to 17

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46 except that the sizing agent had the mass ratio listed in Table 10. Subsequently, the epoxy equivalent of the sizing agent, the X-ray photoelectron spectrum of the sizing agent surface, and the interfacial shear strength (IFSS) of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 45. The results revealed a low 0° tensile strength translation rate at the initial state.

Comparative Example 18

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46 except that the sizing agent had the mass ratio listed in Table 10. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 45. The results revealed a good 0° tensile strength translation rate at the initial state but a lower 0° tensile strength after 20 days.

Comparative Examples 19 and 20

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 1 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 45. The results revealed a high 0° tensile strength translation rate at the initial state but a large reduction ratio of the tensile strength after 20 days.

Comparative Example 21

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 2 except that no aliphatic epoxy compound (A) was used but the aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 45. The results revealed a low 0° tensile strength translation rate at the initial state.

Comparative Example 22

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. Both the epoxy equivalent of the sizing agent and the chemical composition of the sizing agent surface were as expected. The IFSS measurement also revealed a moderate adhesiveness. Table 10 lists the results.

Process III: Production, Molding, and Evaluation of Unidirectional Prepreg

A prepreg was produced, molded, and evaluated in the same manner as in Example 45 except that Toraypearl TN was added as the polyamide particles (F4) having no structure of General Formula (1) and insoluble in the epoxy resin (D1) in place of the resin particles (F1) having the structure of General Formula (1) and insoluble in the epoxy resin (D1) as the thermosetting resin composition. The results revealed a high 0° tensile strength translation rate at the initial state, a high hot, wet open hole compression, and a small reduction ratio of the tensile strength after 20 days, but an insufficient interlaminar toughness.

Comparative Example 23

Process I: Process for Producing Carbon Fibers as Raw Material

Carbon fibers were produced in the same manner as in Example 45.

Process II: Process for Bonding Sizing Agent to Carbon Fibers

Sizing agent-coated carbon fibers were obtained in the same manner as in Example 46. Subsequently, the epoxy equivalent of the sizing agent, the X-ray photoelectron spectrum of the sizing agent surface, and the interfacial shear strength (IFSS) and $\Delta Tg$ of the sizing agent-coated carbon fibers were determined. Both the epoxy equivalent of the sizing agent and the chemical composition of the sizing agent surface were as expected. The IFSS measurement also revealed a moderate adhesiveness. Table 10 lists the results.

Process III: Production, Molding, and Evaluation of Unidirectional Prepreg

A prepreg was produced, molded, and evaluated in the same manner as in Example 45 except that SP-500 was added as the polyamide particles (F4) having no structure of General Formula (1) and insoluble in the epoxy resin (D1) in place of the resin particles (F1) having the structure of General Formula (1) and insoluble in the epoxy resin (D1) as the thermosetting resin composition. The results revealed a high 0° tensile strength translation rate at the initial state, a high interlaminar toughness, and a small reduction ratio of the tensile strength after 20 days, but an insufficient hot, wet open hole compression.

TABLE 10

| | | | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|---|---|
| Carbon fibers | Carbon fibers | | A | A | A | A | A | A | A | A | A |
| Sizing agent | (A) | EX-810 | 20 | 30 | | | | | | | |
| | | EX-611 | | | | | | 50 | | | |
| | | EX-521 | | | 50 | 70 | 100 | | | 50 | 50 |
| | (B1) | jER152 | 35 | 60 | 50 | 12 | | 50 | 45 | 20 | 20 |
| | | jER828 | | | | | | | | | |
| | | jER1001 | | | | | | | | | |
| | | jER807 | | | | | | | | | |
| | (C) | Aromatic polyester | 35 | 5 | | 12 | | | 45 | 20 | 20 |
| | Others | Emulsifier (nonionic surfactant) | 10 | 5 | | 6 | | | 10 | 10 | 10 |
| | Ratio | (A) (% by mass) | 36 | 33 | 50 | 85 | 100 | 100 | 0 | 71 | 71 |
| | | (B1) (% by mass) | 64 | 67 | 50 | 15 | 0 | 0 | 100 | 29 | 29 |
| | | (A)/(B1) | 20 | 30 | 50 | 70 | 100 | 100 | 0 | 50 | 50 |
| | | (B) (% by mass) | 80 | 70 | 50 | 30 | 0 | 0 | 100 | 50 | 50 |
| | Epoxy equivalent (g/eq.) | | 270 | 210 | 230 | 224 | 180 | 180 | 420 | 265 | 265 |
| Thermosetting resin composition | Epoxy resin | EPIKOTE 825 | 50 | 50 | 50 | 50 | 50 | 50 | 50 | 50 | 50 |
| | (D1) | ELM434 | 50 | 50 | 50 | 50 | 50 | 50 | 50 | 50 | 50 |
| | Thermoplastic resin (F6) | PES5003P | 10 | 10 | 10 | 10 | 10 | 10 | 10 | 10 | 10 |
| | Latent hardener (E) | 4,4'-diaminodiphenylsulfone | 40 | 40 | 40 | 40 | 40 | 40 | 40 | 48 | 40 |
| | Particles (F1) having structure of General Formula (1) and insoluble in epoxy resin | Particles 1 (13.2 μm) | 20 | 20 | 20 | 20 | 20 | 20 | 20 | | |
| | | Particles 2 (30.5 μm) | | | | | | | | | |
| | Polyamide particles (F4) having no structure of General Formula (1) and insoluble in epoxy resin | Toraypearl TN (12.3 μm) | | | | | | | | 20 | |
| | | SP-500 (5 μm) | | | | | | | | | 20 |
| Evaluation item | Sizing agent-coated fibers | Epoxy equivalent of sizing agent (g/eq.) | 430 | 320 | 370 | 350 | 270 | 260 | 900 | 430 | 430 |

TABLE 10-continued

|  | | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|---|
| | X-ray photoelectron spectroscopy analysis of sizing agent surface (a)/(b) | 0.91 | 0.93 | 0.91 | 0.49 | 0.29 | 0.26 | 1.01 | 0.64 | 0.64 |
| | ΔTg with hardener | 15 | 17 | 18 | 26 | 32 | 26 | 10 | 18 | 20 |
| | Interfacial adhesion: IFSS (MPa) | 34 | 34 | 36 | 45 | 46 | 41 | 25 | 44 | 44 |
| Prepreg characteristics | Ratio of particles present in region to 20% depth | 99 | 98 | 97 | 96 | 97 | 99 | 98 | 97 | 98 |
| Carbon fiber-reinforced composite material | 0° Tensile test (0 days): strength translation rate (%) | 78 | 79 | 79 | 84 | 83 | 84 | 74 | 84 | 83 |
| | 0° Tensile test (20 days): strength translation rate (%) | 78 | 78 | 78 | 69 | 68 | 70 | 74 | 79 | 79 |
| | Hot, wet open hole compression (MPa) | 234 | 233 | 235 | 235 | 234 | 238 | 234 | 234 | 213 |
| | Interlaminar toughness Gic (J/m²) | 434 | 432 | 440 | 442 | 441 | 438 | 433 | 350 | 520 |

Example 64

In 50 ml of acetone, 2 g of the sizing agent-coated carbon fibers obtained in Example 45 were immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agents remaining after the cleaning were determined. The results are as listed in Table 11.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy of 284.6 eV assigned to CHx, C—C, and C=C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) are as listed in Table 11.

Examples 65 to 68

In the same manner as in Example 64, the sizing agent-coated carbon fibers obtained in Example 46, Example 50, Example 54, and Example 57 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 11 lists the results.

Comparative Example 24

In the same manner as in Example 64, the sizing agent-coated carbon fibers obtained in Comparative Example 19 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 11 lists the results, which indicate a large (II/I) ratio. This result revealed that no inclined structure was achieved in the sizing agent.

Comparative Example 25

In the same manner as in Example 64, the sizing agent-coated carbon fibers obtained in Comparative Example 21 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 11 lists the results, which indicate a large (II/I) ratio. This result revealed that no inclined structure was achieved in the sizing agent.

TABLE 11

| | | Example 64 | Example 65 | Example 66 | Example 67 | Example 68 | Comparative Example 24 | Comparative Example 25 |
|---|---|---|---|---|---|---|---|---|
| Sizing agent-coated carbon fibers | | Example 45 | Example 46 | Example 50 | Example 54 | Example 57 | Comparative Example 19 | Comparative Example 21 |
| | Adhesion amount of sizing agent after cleaning of sizing agent | 0.18 | 0.18 | 0.18 | 0.18 | 0.18 | 0.18 | 0.12 |
| XPS (400 eV) | (I) | 0.67 | 0.67 | 0.57 | 0.8 | 0.58 | 0.29 | 1.01 |
| | (II)/(I) | 0.7 | 0.7 | 0.8 | 0.74 | 0.74 | 1 | 1 |

The materials and the components shown given below were used in each example and each comparative example of Third Embodiment.

Component (A): A-1 to A-3

A-1 to A-3 as the component (A) used in Examples and Comparative Examples of Second Embodiment were the same as A-1 to A-3 used in Examples and Comparative Examples of Third Embodiment.

Component (B1): B-1 to B-4

B-1 to B-4 as the component (B1) used in Examples and Comparative Examples of Second Embodiment were the same as B-1 to B-4 used in Examples and Comparative Examples of Third Embodiment.

Epoxy Resin Component (D11): D11-1 and D11-3

D11-1 and D11-3 as the epoxy resin component (D11) used in Examples and Comparative Examples of Third Embodiment were the same as D11-1 and D11-3 used in Examples and Comparative Examples of First Embodiment.

Epoxy Resin Component (D12): D12-1, D12-3, and D12-4

D12-1, D12-3, and D12-4 as the epoxy resin component (D12) used in Examples and Comparative Examples of Third Embodiment were the same as D12-1, D12-3, and D12-4 used in Examples and Comparative Examples of First Embodiment.

Bifunctional Epoxy Resin Other than Epoxy Resins (D11), (D12)

"EPON (registered trademark)" 825 (bisphenol A epoxy resin, manufactured by Japan Epoxy Resin Co., Ltd.) GAN (N-diglycidylaniline, manufactured by Nippon Kayaku Co., Ltd.)

Latent Hardener Component (E1): E1-1 to E1-6

E1-1: 3,3'-diaminodiphenyl Ether (Manufactured by Chemicalsoft Development)

E1-2: 3,4'-diaminodiphenyl ether (manufactured by Mitsui Fine Chemical Inc.)

E1-3: 4,4'-diaminobenzophenone (manufactured by Mitsui Fine Chemical Inc.)

E1-4: 3,4'-diaminodiphenylamide (manufactured by Mitsui Fine Chemical Inc.)

E1-5: 4,4'-diaminodiphenylamide (manufactured by Mitsui Fine Chemical Inc.)

E1-6: 4-aminophenyl-4-aminobenzoate (manufactured by Mitsui Fine Chemical Inc.)

Hardener Other than Latent Hardener (E1)

"SEIKACURE (registered trademark)" S (4,4'-diaminodiphenylsulfone, manufactured by Wakayama Seika Kogyo Co., Ltd.)

Thermoplastic Resin Particles (F7)

"Toraypearl (registered trademark)" TN (manufactured by Toray Industries Inc., average particle size: 13.0 μm)

Thermoplastic Resin (F3): F3-1, F3-2

F3-1: "SUMIKAEXCEL (registered trademark)" PES5003P (polyethersulfone, manufactured by Sumitomo Chemical Co., Ltd., average molecular weight: 47,000 g/mol)

F3-2: "Virantage (registered trademark)" VW-10700RP (polyethersulfone, manufactured by Solvay Advanced Polymers, average molecular weight: 21,000 g/mol)

Example 69

Example includes Process I, Process II, and Process III.

Process I: Process for Producing Carbon Fibers as Raw Material

A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration (O/C) was 0.15, the surface carboxylic acid concentration (COOH/C) was 0.005, and the surface hydroxy group concentration (COH/C) was 0.018. The obtained carbon fibers were regarded as carbon fibers A.

Process II: Process for Bonding Sizing Agent to Carbon Fibers

An aqueous dispersion emulsion containing 20 parts by mass of (B-1) as the component (B1), 20 parts by mass of the component (C), and 10 parts by mass of an emulsifier was prepared, and then 50 parts by mass of (A-3) was mixed as the component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent without the solutions in the sizing solution is as listed in Table 12. The sizing agent was applied onto surface-treated carbon fibers by immersing.

The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, the interfacial shear strength (IFSS) of the sizing agent-coated carbon fibers, the increase ($\Delta Tg$) in glass transition point of a mixture of the sizing agent and the latent hardener (E1) were determined. The results are listed in Table 12. The results indicated that all of the epoxy equivalent of the sizing agent, the chemical composition of the sizing agent surface, and $\Delta Tg$ were as expected. The IFSS measurement also revealed a sufficiently high adhesiveness.

Process III: Production, Molding, and Evaluation of Unidirectional Prepreg

In a kneader, 40 parts by mass of (D11-1) as the epoxy resin component (D11), 60 parts by mass of (D12-1) as the epoxy resin component (D12), and 10 parts by mass of the thermoplastic resin component (F3) were mixed and dissolved. Next, 45 parts by mass of 3,3'-diaminodiphenyl ether (E1-1) as the latent hardener component (E1) was added, and the whole was kneaded, yielding a primary resin composition without thermoplastic resin particles (F7). The obtained primary resin composition was applied onto a release paper with a knife coater so as to give a resin areal weight of 32 g/m$^2$, thus yielding a primary resin film. The primary resin film was superimposed on each side of sizing agent-coated carbon fibers (an areal weight of 190 g/m$^2$) arranged in one direction, and heat and pressure were applied with a heat roll at 100° C. and 1 atmosphere to impregnate the carbon fibers with the epoxy resin composition, thus yielding a primary prepreg. Next, a secondary epoxy resin composition that had been prepared by addition of thermoplastic resin particles (F7) so that the epoxy resin composition of the final prepreg had the formulation listed in Table 12 was applied onto a release paper with a knife coater so as to give a resin areal weight of 20 g/m$^2$, thus yielding a secondary resin film. The secondary resin film was superimposed on each side of the primary prepreg, and heat and pressure were applied with a heat roll at 100° C. and 1 atmosphere to impregnate the primary prepreg with the epoxy resin composition, thus yielding a target prepreg. The obtained prepreg was used, and the 0° tensile strength measurement, the 0° tensile test after long-term storage, and the hot, wet open hole compression measurement of the carbon fiber-reinforced composite material were carried out. Table 12 lists the results. The results revealed a sufficiently high 0° tensile strength translation rate at the initial state, a sufficiently high hot, wet open hole compression, and a small reduction in tensile strength translation rate after 20 days.

Examples 70 to 76

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 69 except that the component (A) and the component (B1) listed in Table 12 were used as the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 12 lists the results.

Process III: Production, Molding, and Evaluation of Unidirectional Prepreg

A prepreg was produced, molded, and evaluated in the same manner as in Example 69. The results revealed a sufficiently high 0° tensile strength translation rate at the initial state, a sufficiently high hot, wet open hole compression, and a small reduction in tensile strength translation rate after 20 days. Table 12 lists the results.

TABLE 12

| | | | Example 69 | Example 70 | Example 71 | Example 72 | Example 73 | Example 74 | Example 75 | Example 76 |
|---|---|---|---|---|---|---|---|---|---|---|
| Carbon fibers | Carbon fibers | | A | A | A | A | A | A | A | A |
| Sizing agent | (A) | EX-810 | | | | | | 50 | | |
| | | EX-611 | | | | | | | 50 | 25 |
| | | EX-521 | 50 | 50 | 50 | 50 | 50 | | | 25 |
| | (B1) | jER152 | 20 | | | | | | | |
| | | jER828 | | 20 | | | 10 | 20 | 20 | 20 |
| | | jER1001 | | | 20 | | 10 | | | |
| | | jER807 | | | | 20 | | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 265 | 320 | 250 | 290 | 255 | 290 | 275 |
| Epoxy resin composition | Epoxy resin (D11) | N,N-diglycidyl-4-phenoxyaniline Ex-731 | 40 | 40 | 40 | 40 | 40 | 40 | 40 | 40 |
| | Epoxy resin (D12) | ELM434 34TGDDE 33TGDDE | 60 | 60 | 60 | 60 | 60 | 60 | 60 | 60 |
| | Epoxy resin (D1) (epoxy resin other than D11, D12) | EPON825 GAN | | | | | | | | |
| | Latent hardener (E1) | 3,3'-diaminodiphenyl ether 3,4'-diaminodiphenyl ether 4,4'-diaminobenzophenone 3,4'-diaminodiphenylamide | 45 | 45 | 45 | 45 | 45 | 45 | 45 | 45 |
| Epoxy resin composition | Latent hardener (E1) | 4,4'-diaminodiphenylamide 4-aminophenyl-4-aminobenzoate | | | | | | | | |
| | Hardener other than (E1) | 4,4'-diaminodiphenylsulfone | | | | | | | | |
| | Thermoplastic resin particles (F7) | Toraypearl TN | 20 | 20 | 20 | 20 | 20 | 20 | 20 | 20 |
| | Thermoplastic resin (F3) | SUMIKAEXCEL 5003P VW-10700RP | 10 | 10 | 10 | 10 | 10 | 10 | 10 | 10 |
| Evaluation item | Sizing agent-coated fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with hardener | 19 | 20 | 18 | 20 | 19 | 16 | 21 | 21 |
| | | Interfacial adhesion: IFSS (MPa) | 43 | 44 | 40 | 46 | 43 | 39 | 43 | 44 |
| | Prepreg | Ratio of particles present in region to 20% depth | 99 | 99 | 99 | 99 | 97 | 99 | 99 | 97 |
| | Carbon fiber-reinforced composite | 0° Tensile test (0 days): strength translation rate (%) | 90 | 92 | 90 | 93 | 90 | 89 | 91 | 91 |

TABLE 12-continued

|  |  | Example 69 | Example 70 | Example 71 | Example 72 | Example 73 | Example 74 | Example 75 | Example 76 |
|---|---|---|---|---|---|---|---|---|---|
| material | 0° Tensile test (20 days): strength translation rate (%) | 85 | 86 | 88 | 86 | 85 | 89 | 86 | 86 |
|  | Hot, wet open hole compression (MPa) | 295 | 296 | 294 | 295 | 294 | 295 | 294 | 295 |

Examples 77 to 81

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70 except that the sizing agent had the mass ratio listed in Table 13. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 13 lists the results.

Process III: Production, Molding, and Evaluation of Unidirectional Prepreg
A prepreg was produced, molded, and evaluated in the same manner as in Example 69. The results revealed a sufficiently high 0° tensile strength translation rate at the initial state, a sufficiently high hot, wet open hole compression, and a small reduction in tensile strength translation rate after 20 days. Table 13 lists the results.

Example 82

Process I: Process for Producing Carbon Fibers as Raw Material

Carbon fibers were produced in the same manner as in Example 69.

Process II: Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved, yielding a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent without the solutions in the sizing solution is as listed in Table 13. In the same manner as in Example 69, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 13, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 69. The results revealed a sufficiently high 0° tensile strength translation rate at the initial state, a sufficiently high hot, wet open hole compression, and a small reduction in tensile strength translation rate after 20 days. Table 13 lists the results.

Example 83

Process I: Process for Producing Carbon Fibers as Raw Material

Carbon fibers were produced in the same manner as in Example 69.

Process II: Process for Bonding Sizing Agent to Carbon Fibers

In DMF, 60 parts by mass of (A-3) as the component (A) and 40 parts by mass of (B-2) as the component (B1) were dissolved, yielding a sizing solution. The epoxy equivalent of the sizing agent without the solutions in the sizing solution is as listed in Table 13. In the same manner as in Example 69, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As listed in Table 13, the results indicated that all of the epoxy equivalent of the sizing agent, the chemical composition of the sizing agent surface, and ΔTg were as expected. The IFSS measurement also revealed a sufficiently high adhesiveness.

Process III: Production, Molding, and Evaluation of Unidirectional Prepreg

A prepreg was produced, molded, and evaluated in the same manner as in Example 69. The results revealed a sufficiently high 0° tensile strength translation rate at the initial state, a sufficiently high hot, wet open hole compression, and a small reduction in tensile strength translation rate after 20 days. Table 13 lists the results.

TABLE 13

|  |  |  | Example 77 | Example 78 | Example 79 | Example 80 | Example 81 | Example 82 | Example 83 |
|---|---|---|---|---|---|---|---|---|---|
| Carbon fibers | Carbon fibers |  | A | A | A | A | A | A | A |
| Sizing agent | (A) | EX-810 |  |  |  |  |  |  |  |
|  |  | EX-611 |  |  |  |  |  |  |  |
|  |  | EX-521 | 37 | 35 | 40 | 55 | 60 | 55 | 60 |
|  | (B1) | jER152 |  |  |  |  |  |  |  |
|  |  | jER828 | 33 | 45 | 30 | 15 | 15 | 22.5 | 40 |
|  |  | jER1001 |  |  |  |  |  |  |  |
|  |  | jER807 |  |  |  |  |  |  |  |
|  | (C) | Aromatic polyester | 20 | 10 | 20 | 20 | 20 | 22.5 |  |
|  | Others | Emulsifier (nonionic surfactant) | 10 | 10 | 10 | 10 | 5 |  |  |
|  | Ratio | (A) (% by mass) | 53 | 44 | 57 | 79 | 80 | 71 | 60 |
|  |  | (B1) (% by mass) | 47 | 56 | 43 | 21 | 20 | 29 | 40 |
|  |  | (A) (% by mass) | 37 | 35 | 40 | 55 | 60 | 55 | 60 |
|  |  | (B) (% by mass) | 63 | 65 | 60 | 45 | 40 | 45 | 40 |
|  | Epoxy equivalent (g/eq.) |  | 265 | 230 | 265 | 260 | 245 | 240 | 185 |
| Epoxy resin composition | Epoxy resin (D11) | N,N-diglycidyl-4-phenoxyaniline | 40 | 40 | 40 | 40 | 40 | 40 | 40 |
|  |  | Ex-731 |  |  |  |  |  |  |  |
|  | Epoxy resin (D12) | ELM434 | 60 | 60 | 60 | 60 | 60 | 60 | 60 |
|  |  | 34TGDDE |  |  |  |  |  |  |  |
|  |  | 33TGDDE |  |  |  |  |  |  |  |
|  | Epoxy resin (D1) (epoxy resin other than D11, D12) | EPON825 |  |  |  |  |  |  |  |
|  |  | GAN |  |  |  |  |  |  |  |
|  | Latent hardener (E1) | 3,3'-diaminodiphenyl ether | 45 | 45 | 45 | 45 | 45 | 45 | 45 |
|  |  | 3,4'-diaminodiphenyl ether |  |  |  |  |  |  |  |
|  |  | 4,4'-diaminobenzophenone |  |  |  |  |  |  |  |
|  |  | 3,4'-diaminodiphenylamide |  |  |  |  |  |  |  |
|  |  | 4,4'-diaminodiphenylamide |  |  |  |  |  |  |  |
|  |  | 4-aminophenyl-4-aminobenzoate |  |  |  |  |  |  |  |
|  | Hardener other than (E1) | 4,4'-diaminodiphenylsulfone |  |  |  |  |  |  |  |
|  | Thermoplastic resin particles (F7) | Toraypearl TN | 20 | 20 | 20 | 20 | 20 | 20 | 20 |
| Epoxy resin composition | Thermoplastic resin (F3) | SUMIKAEXCEL 5003P | 10 | 10 | 10 | 10 | 10 | 10 | 10 |
|  |  | VW-10700RP |  |  |  |  |  |  |  |
| Evaluation item | Sizing agent-coated fibers | Epoxy equivalent of sizing agent (g/eq.) | 430 | 370 | 430 | 430 | 400 | 439 | 280 |
|  |  | X-ray photoelectron spectroscopy analysis of sizing agent surface (a)/(b) | 0.77 | 0.79 | 0.76 | 0.66 | 0.57 | 0.70 | 0.81 |
|  |  | ΔTg with hardener | 17 | 16 | 18 | 21 | 22 | 20 | 25 |
|  |  | Interfacial adhesion: IFSS (MPa) | 41 | 40 | 45 | 45 | 45 | 45 | 45 |
|  | Prepreg | Ratio of particles present in region to 20% depth | 99 | 98 | 99 | 97 | 99 | 98 | 99 |
|  | Carbon fiber-reinforced composite material | 0° Tensile test (0 days): strength translation rate (%) | 90 | 89 | 92 | 93 | 92 | 92 | 93 |
|  |  | 0° Tensile test (20 days): strength translation rate (%) | 88 | 88 | 86 | 86 | 86 | 86 | 86 |
|  |  | Hot, wet open hole compression (MPa) | 296 | 294 | 293 | 295 | 295 | 296 | 294 |

Examples 84 to 95

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 14 lists the results.

Process III: Production, Molding, and Evaluation of Unidirectional Prepreg

A prepreg was produced, molded, and evaluated in the same manner as in Example 69 except that the epoxy resins (D11) and (D12), the latent hardener (E1), the thermoplastic resin particles (F7), and the thermoplastic resin (F3) listed in Table 14 were used in the mass ratio listed in Table 14. The results revealed a sufficiently high 0° tensile strength translation rate at the initial state, a sufficiently high hot, wet open hole compression, and a small reduction in tensile strength translation rate after 20 days. Table 14 lists the results.

TABLE 14

| | | | Example 84 | Example 85 | Example 86 | Example 87 | Example 88 | Example 89 | Example 90 | Example 91 | Example 92 | Example 93 | Example 94 | Example 95 |
|---|---|---|---|---|---|---|---|---|---|---|---|---|---|---|
| Carbon fibers | Carbon fibers | (A) | A | A | A | A | A | A | A | A | A | A | A | A |
| Sizing agent | (B1) | EX-810 | | | | | | | | | | | | |
| | | EX-611 | | | | | | | | | | | | |
| | | EX-521 | 50 | 50 | 50 | 50 | 50 | 50 | 50 | 50 | 50 | 50 | 50 | 50 |
| | | jER152 | 20 | 20 | 20 | 20 | 20 | 20 | 20 | 20 | 20 | 20 | 20 | 20 |
| | | jER828 | | | | | | | | | | | | |
| | | jER1001 | | | | | | | | | | | | |
| | | jER807 | | | | | | | | | | | | |
| | (C) Others | Aromatic polyester | 20 | 20 | 20 | 20 | 20 | 20 | 20 | 20 | 20 | 20 | 20 | 20 |
| | | Emulsifier (nonionic surfactant) | 10 | 10 | 10 | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 | 265 |
| Epoxy resin composition | Epoxy resin (D11) | N,N-diglycidyl-4-phenoxyaniline | 40 | 40 | 40 | 40 | 40 | 40 | 40 | 40 | 40 | 40 | 40 | 40 |
| | Epoxy resin (D12) | Ex-731 | | | | | | | | 40 | | | | |
| | | ELM434 | 60 | 60 | 60 | 60 | 60 | 60 | 60 | 60 | 60 | 60 | 60 | 60 |
| | | 34TGDDE | | | | | | | | | | | | |
| | | 33TGDDE | | | | | | | | | | | | |
| | Epoxy resin (D1) (epoxy resin other than D11, D12) | EPON825 | | | | | | | | | | | | |
| | | GAN | | | | | | | | | | | | |
| | Latent hardener (E1) | 3,3'-diaminodiphenyl ether | 45 | | | | | | | | | | | |
| | | 3,4'-diaminodiphenyl ether | | 45 | | | | | | | | | | |
| | | 4,4-diaminobenzophenone | | | 45 | | | | | | | | | |
| | | 3,4-diaminodiphenylamide | | | | 45 | | | | | | | | |
| | | 4,4-diaminodiphenylamide | | | | | 45 | | | | | | | |
| | | 4-aminophenyl-4-aminobenzoate | | | | | | 40 | 50 | 45 | 45 | 45 | 45 | 45 |
| | Hardener other than (E1) | 4,4-diaminodiphenylsulfone | | | | | | | | | | | | |
| Epoxy resin composition | Thermoplastic resin particles (F7) | Toraypearl TN | 20 | 20 | 20 | 20 | 20 | 20 | 20 | 20 | 20 | 20 | 20 | 20 |
| | Thermoplastic resin (F3) | SUMIKAEXCEL 5003P VW-10700RP | 10 | 10 | 10 | 10 | 10 | 10 | 10 | 10 | 10 | 10 | 10 | 10 |

TABLE 14-continued

| Evaluation item | | | Example 84 | Example 85 | Example 86 | Example 87 | Example 88 | Example 89 | Example 90 | Example 91 | Example 92 | Example 93 | Example 94 | Example 95 |
|---|---|---|---|---|---|---|---|---|---|---|---|---|---|---|
| | Sizing agent-coated fibers | Epoxy equivalent of sizing agent (g/eq.) | 430 | 430 | 430 | 430 | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 | 0.64 |
| | | ΔTg with hardener | 20 | 20 | 19 | 20 | 21 | 20 | 20 | 20 | 20 | 20 | 20 | 19 |
| | | Interfacial adhesion: IFSS (MPa) | 44 | 44 | 44 | 44 | 44 | 44 | 44 | 44 | 44 | 44 | 44 | 44 |
| | Prepreg | Ratio of particles present in region to 20% depth (%) | 99 | 98 | 97 | 96 | 99 | 99 | 98 | 97 | 99 | 99 | 99 | 98 |
| | Carbon fiber-reinforced composite material | 0° Tensile test (0 days): strength translation rate | 91 | 91 | 90 | 92 | 91 | 91 | 91 | 92 | 92 | 91 | 90 | 91 |
| | | 0° Tensile test (20 days): strength translation rate (%) | 86 | 87 | 85 | 87 | 85 | 86 | 85 | 85 | 87 | 86 | 85 | 85 |
| | | Hot, wet open hole compression (MPa) | 285 | 278 | 284 | 279 | 277 | 303 | 295 | 290 | 305 | 310 | 294 | 302 |

Examples 96 to 99 and 101 to 103

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 15 lists the results.

Process III: Production, Molding, and Evaluation of Unidirectional Prepreg

A prepreg was produced, molded, and evaluated in the same manner as in Example 69 except that the epoxy resins (D11), (D12), and (D1), the latent hardener (E1), the thermoplastic resin particles (F7), and the thermoplastic resin (F3) listed in Table 15 were used in the mass ratio in Table 15. Table 15 lists the results. The results revealed a sufficiently high 0° tensile strength translation rate at the initial state, a sufficiently high hot, wet open hole compression, and a small reduction in tensile strength translation rate after 20 days.

Example 100

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected. The IFSS measurement also revealed a moderate adhesiveness. Table 15 lists the results.

Process III: Production, Molding, and Evaluation of Unidirectional Prepreg

As the epoxy resin composition, the epoxy resins (D11) and (D12) and the thermoplastic resin (F3) listed in Table 15 were mixed in the ratio listed in Table 15 and dissolved, then the latent hardener (E1) listed in Table 15 was added, and the whole was kneaded, thus yielding an epoxy resin composition.

The obtained epoxy resin composition was applied onto a release paper with a knife coater so as to give a resin areal weight of 52 g/m$^2$, thus yielding a resin film. The resin film was superimposed on each side of sizing agent-coated carbon fibers (an areal weight of 190 g/m$^2$) arranged in one direction, and heat and pressure were applied with a heat roll at a temperature of 100° C. and a pressure of 1 atm to impregnate the sizing agent-coated carbon fibers with the epoxy resin composition, thus yielding a prepreg. The obtained prepreg was used, and the 0° tensile strength measurement, the 0° tensile test after long-term storage, and the hot, wet open hole compression measurement of the carbon fiber-reinforced composite material were carried out. Table 15 lists the results. The results revealed a sufficiently high 0° tensile strength translation rate at the initial state, a sufficiently high hot, wet open hole compression, and a small reduction in tensile strength translation rate after 20 days.

TABLE 15

| | | | Example 96 | Example 97 | Example 98 | Example 99 | Example 100 | Example 101 | Example 102 | Example 103 |
|---|---|---|---|---|---|---|---|---|---|---|
| Carbon fibers | Carbon fibers | | A | A | A | A | A | A | A | A |
| Sizing agent | (A) | EX-810 | | | | | | | | |
| | | EX-611 | | | | | | | | |
| | | EX-521 | 50 | 50 | 50 | 50 | 50 | 50 | 50 | 50 |
| | (B1) | jER152 | 20 | 20 | 20 | 20 | 20 | 20 | 20 | 20 |
| | | jER828 | | | | | | | | |
| | | jER1001 | | | | | | | | |
| | | jER807 | | | | | | | | |
| | (C) | Aromatic polyester | 20 | 20 | 20 | 20 | 20 | 20 | 20 | 20 |
| | | Emulsifier (nonionic surfactant) | 10 | 10 | 10 | 10 | 10 | 10 | 10 | 10 |
| | Others | | | | | | | | | |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 265 | 265 | 265 | 265 | 265 | 265 | 265 | 265 |
| Epoxy resin composition | Epoxy resin (D11) | N,N-diglycidyl-4-phenoxyaniline | 40 | 50 | 30 | 20 | 40 | 15 | 40 | 40 |
| | | Ex-731 | | | | | | | | |
| | Epoxy resin (D12) | ELM434 | 60 | 50 | 70 | 60 | 60 | 85 | 60 | 60 |
| | | 34TGDDE | | | | | | | | |
| | | 33TGDDE | | | | | | | | |
| | Epoxy resin (D1) (epoxy resin other than D11, D12) | EPON825 | | | | 20 | | | 20 | |
| | | GAN | | | | | | | 20 | |
| | Latent hardener (E1) | 3,3'-diaminodiphenyl ether | 22.5 | | | | | | | |
| | | 3,4'-diaminodiphenyl ether | 22.5 | | | | | | | |
| | | 4,4'-diaminobenzophenone | | | | | | | | |
| | | 3,4'-diaminodiphenylamide | | | | | | | | |
| | | 4,4'-diaminodiphenylamide | | | | | | | | |
| | | 4-aminophenyl-4-aminobenzoate | | | | | | | | |
| | | 4,4'-diaminodiphenylsulfone | | 45 | 45 | 45 | 45 | 45 | 45 | 45 |
| | Hardener other than (E1) | Toraypearl TN | 20 | 20 | 20 | 20 | 20 | 20 | 20 | 20 |
| | Thermoplastic resin particles (F7) | | | | | | | | | |
| | Thermoplastic resin (F3) | SUMIKAEXCEL 5003P | 10 | 10 | 10 | 12 | 10 | 12 | 12 | 25 |
| Evaluation item | Sizing agent-coated fibers | Epoxy equivalent of sizing agent (g/eq.) | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 |
| | | ΔTg with hardener | 20 | 20 | 20 | 20 | 20 | 20 | 20 | 20 |
| | | Interfacial adhesion: IFSS (MPa) | 44 | 44 | 44 | 44 | 44 | 44 | 44 | 44 |

TABLE 15-continued

| | | Example 96 | Example 97 | Example 98 | Example 99 | Example 100 | Example 101 | Example 102 | Example 103 |
|---|---|---|---|---|---|---|---|---|---|
| Prepreg | Ratio of particles present in region to 20% depth | 99 | 97 | 98 | 99 | — | 99 | 99 | 99 |
| Carbon fiber-reinforced composite material | 0° Tensile test (0 days): strength translation rate (%) | 91 | 88 | 88 | 89 | 91 | 90 | 90 | 96 |
| | 0° Tensile test (20 days): strength translation rate (%) | 86 | 82 | 83 | 84 | 86 | 86 | 85 | 89 |
| | Hot, wet open hole compression (MPa) | 292 | 285 | 286 | 283 | 295 | 282 | 279 | 295 |

Comparative Examples 26 to 28

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70 except that the sizing agent had the mass ratio listed in Table 16. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 69. The results revealed a low 0° tensile strength translation rate at the initial state.

Comparative Example 29

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70 except that the sizing agent had the mass ratio listed in Table 16. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. THE IFSS MEASUREMENT REVEALED A SUFFICIENTLY HIGH ADHESIVENESS.

Process III: Production, Molding, and Evaluation of Unidirectional Prepreg

A prepreg was produced, molded, and evaluated in the same manner as in Example 69. The results revealed a good 0° tensile strength translation rate at the initial state but a lower 0° tensile strength after 20 days.

Comparative Examples 30 and 31

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 69. The results revealed a high 0° tensile strength translation rate at the initial state and a high hot, wet open hole compression but a large reduction ratio of the tensile strength after 20 days.

Comparative Example 32

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70 except that no aliphatic epoxy compound (A) was used but the aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 69. The results revealed a low 0° tensile strength translation rate at the initial state.

Comparative Example 33

Process I: Process for Producing Carbon Fibers as Raw Material

Carbon fibers were produced in the same manner as in Example 69.

Process II: Process for Bonding Sizing Agent to Carbon Fibers

Sizing agent-coated carbon fibers were obtained in the same manner as in Example 70. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. Both the epoxy equivalent of the sizing agent and the chemical composition of the sizing agent surface were as expected. The IFSS measurement also revealed a moderate adhesiveness. Table 16 lists the results.

Process III: Production, Molding, and Evaluation of Unidirectional Prepreg

A prepreg was produced, molded, and evaluated in the same manner as in Example 69 except that the hardener other than the latent hardener (E1) was added in the mass ratio listed in Table 16 as the epoxy resin composition. Comparative Example 33 resulted in an insufficient hot, wet open hole compression.

TABLE 16

| | | | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|---|---|
| Carbon fibers | Carbon fibers | | A | A | A | A | A | A | A | A |
| Sizing agent | (A) | EX-810 | | | | | | | 50 | |
| | | EX-611 | | | | | | | | |
| | | EX-521 | 20 | 30 | 50 | 70 | 100 | 50 | | 50 |
| | (B1) | jER152 | | | | | | | | |
| | | jER828 | 35 | 60 | 50 | 12 | | | 45 | 20 |
| | | jER1001 | | | | | | | | |
| | | jER807 | | | | | | | | |
| | (C) | Aromatic polyester | 35 | 5 | | 12 | | | 45 | 20 |
| | Others | Emulsifier (nonionic surfactant) | 10 | 5 | | 6 | | | 10 | 10 |
| | Ratio | (A) (% by mass) | 36 | 33 | 50 | 85 | 100 | 100 | 0 | 71 |
| | | (B1) (% by mass) | 64 | 67 | 50 | 15 | 0 | 0 | 100 | 29 |
| | | (A) (% by mass) | 20 | 30 | 50 | 70 | 100 | 100 | 0 | 50 |
| | | (B) (% by mass) | 80 | 70 | 50 | 30 | 0 | 0 | 100 | 50 |
| | Epoxy equivalent (g/eq.) | | 270 | 210 | 230 | 224 | 180 | 180 | 420 | 265 |
| Epoxy resin composition | Epoxy resin (D11) | N,N-diglycidyl-4-phenoxyaniline | 40 | 40 | 40 | 40 | 40 | 40 | 40 | 40 |
| | | Ex-731 | | | | | | | | |
| | Epoxy resin (D12) | ELM434 | 60 | 60 | 60 | 60 | 60 | 60 | 60 | 60 |
| | | 34TGDDE | | | | | | | | |
| | | 33TGDDE | | | | | | | | |
| | Epoxy resin (D1) (epoxy resin other than D11, D12) | EPON825 | | | | | | | | |
| | | GAN | | | | | | | | |
| | Latent hardener (E1) | 3,3'-diaminodiphenyl ether | 45 | 45 | 45 | 45 | 45 | 45 | 45 | |
| | | 3,4'-diaminodiphenyl ether | | | | | | | | |
| | | 4,4'-diaminobenzophenone | | | | | | | | |
| | | 3,4'-diaminodiphenylamide | | | | | | | | |
| | | 4,4'-diaminodiphenylamide | | | | | | | | |
| | | 4-aminophenyl-4-aminobenzoate | | | | | | | | |
| | Hardener other than (E1) | 4,4'-diaminodiphenylsulfone | | | | | | | | 45 |
| | Thermoplastic resin particles (F7) | Toraypearl TN | 20 | 20 | 20 | 20 | 20 | 20 | 20 | 20 |
| | Thermoplastic resin (F3) | SUMIKAEXCEL 5003P | 10 | 10 | 10 | 10 | 10 | 10 | 10 | 10 |
| | | VW-10700RP | | | | | | | | |
| Evaluation item | Sizing agent-coated fibers | Epoxy equivalent of sizing agent (g/eq.) | 430 | 320 | 370 | 350 | 270 | 260 | 900 | 430 |
| | | X-ray photoelectron spectroscopy analysis of sizing agent surface (a)/(b) | 0.91 | 0.93 | 0.91 | 0.49 | 0.29 | 0.26 | 1.01 | 0.64 |
| | | ΔTg with hardener | 15 | 17 | 18 | 27 | 32 | 27 | 10 | 20 |
| | | Interfacial adhesion: IFSS (MPa) | 34 | 34 | 36 | 45 | 46 | 41 | 25 | 44 |
| | Prepreg | Ratio of particles present in region to 20% depth | 99 | 98 | 97 | 99 | 99 | 99 | 97 | 99 |
| | Carbon fiber-reinforced composite material | 0° Tensile test (0 days): strength translation rate (%) | 82 | 82 | 83 | 92 | 94 | 90 | 79 | 90 |
| | | 0° Tensile test (20 days): strength translation rate (%) | 80 | 81 | 81 | 78 | 79 | 78 | 76 | 85 |

TABLE 16-continued

|  | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|
| Hot, wet open hole compression (MPa) | 293 | 294 | 294 | 295 | 293 | 294 | 290 | 262 |

Example 104

In 50 ml of acetone, 2 g of the sizing agent-coated carbon fibers obtained in Example 69 were immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agents remaining after the cleaning were determined. The results are as listed in Table 17.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy of 284.6 eV assigned to CHx, C—C, and C═C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) are as listed in Table 17.

Comparative Example 36

In the same manner as in Example 104, the sizing agent-coated carbon fibers obtained in Comparative Example 30 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 17 lists the results, which indicate a large (II/I) ratio. This result revealed that no inclined structure was achieved in the sizing agent.

Comparative Example 37

In the same manner as in Example 104, the sizing agent-coated carbon fibers obtained in Comparative Example 32 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 17 lists the results, which indicate a large (II/I) ratio. This result revealed that no inclined structure was achieved in the sizing agent.

TABLE 17

|  |  | Example 104 | Example 105 | Example 106 | Example 107 | Example 108 | Comparative Example 36 | Comparative Example 37 |
|---|---|---|---|---|---|---|---|---|
| Sizing agent-coated carbon fibers |  | Example 69 | Example 70 | Example 74 | Example 78 | Example 81 | Comparative Example 30 | Comparative Example 32 |
|  | Adhesion amount of sizing agent after cleaning of sizing agent | 0.18 | 0.18 | 0.18 | 0.18 | 0.18 | 0.18 | 0.12 |
| XPS (400 eV) | (I) | 0.67 | 0.67 | 0.57 | 0.8 | 0.58 | 0.29 | 1.01 |
|  | (II)/(I) | 0.7 | 0.7 | 0.8 | 0.74 | 0.74 | 1 | 1 |

Examples 105 to 108

In the same manner as in Example 104, the sizing agent-coated carbon fibers obtained in Example 70, Example 74, Example 78, and Example 81 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C═C and (b) is the height (cps) of a component at a binding energy (286.1 eV) assigned to C—O in the $C_{1s}$ core spectrum. Table 17 lists the results.

The materials and the components shown given below were used in each example and each comparative example of Fourth Embodiment.

Component (A): A-1 to A-3

A-1 to A-3 as the component (A) used in Examples and Comparative Examples of Second Embodiment were the same as A-1 to A-3 used in Examples and Comparative Examples of Fourth Embodiment.

Component (B1): B-1 to B-4

B-1 to B-4 as the component (B1) used in Examples and Comparative Examples of Second Embodiment were the same as B-1 to B-4 used in Examples and Comparative Examples of Fourth Embodiment.

Epoxy Resin Component (D1)
Bisphenol epoxy resin component (D16): D16-1 to D16-4
D16-1: "jER (registered trademark)" 828 (bisphenol A epoxy resin, manufactured by Mitsubishi Chemical Corporation, molecular weight: 378 g/mol)
D16-2: "jER (registered trademark)" 807 (bisphenol F epoxy resin, manufactured by Mitsubishi Chemical Corporation, molecular weight: 340 g/mol)
D16-3: "jER (registered trademark)" 1004 (bisphenol A epoxy resin, manufactured by Mitsubishi Chemical Corporation, molecular weight: 1850 g/mol)
D16-4: "EPOTOHTO (registered trademark)" YDF2001 (bisphenol F epoxy resin, manufactured by Tohto Kasei Co., Ltd., molecular weight: 950 g/mol)
Amine epoxy resin component (D17): D17-5 and D17-6
D17-5: "Araldite (registered trademark)" MY0500 (manufactured by Huntsman Advanced Materials, epoxy equivalent: 189 g/eq.)
D17-6: ELM434 (tetraglycidyldiaminodiphenylmethane, manufactured by Sumitomo Chemical Co., Ltd., epoxy equivalent: 125 g/eq.)
Other Epoxy Resin Component (D1)
"jER (registered trademark)" YX4000H (epoxy resin having biphenyl skeleton, manufactured by Japan Epoxy Resin Co., Ltd., epoxy equivalent: 192 g/eq.)
GAN (N-diglycidylaniline, manufactured by Nippon Kayaku Co., Ltd.)
"EPICLON (registered trademark)" HP7200L (dicyclopentadiene epoxy resin, manufactured by Dainippon Ink and Chemicals, Inc., epoxy equivalent: 245 g/eq.)
Block Copolymer Component (F2): F2-1 to F2-3
F2-1: "Nanostrength (registered trademark)" E40F (triblock copolymer S-B-M: styrene (Tg: 90° C.)-1,4-butadiene (Tg: −90° C.)-methyl methacrylate (Tg: 130° C.), manufactured by Arkema Inc.)
F2-2: "Nanostrength (registered trademark)" E20F (triblock copolymer S-B-M: styrene (Tg: 90° C.)-1,4-butadiene (Tg: −90° C.)-methyl methacrylate (Tg: 130° C.), manufactured by Arkema Inc.)
F2-3: "Nanostrength (registered trademark)" M22N (triblock copolymer M-B-M: methyl methacrylate (Tg: 130° C.)-butyl acrylate (Tg: −54° C.)-methyl methacrylate (Tg: 130° C.) manufactured by Arkema Inc.)
Latent Hardener Component (E): E-1, E-2
E-1: "SEIKACURE (registered trademark)" S (4,4'-diaminodiphenylsulfone, manufactured by Wakayama Seika Kogyo Co., Ltd.)
E-2: DICY-7 (dicyandiamide, manufactured by Japan Epoxy Resin Co., Ltd.)
Thermoplastic Resin Particles (F7)
"Toraypearl (registered trademark)" TN (manufactured by Toray Industries Inc., average particle size: 13.0 μm)
Hardening Accelerator
DCMU99 (N,N-dimethyl-N'-(3,4-dichlorophenyl)urea, manufactured by Hodogaya Chemical Co., Ltd.)

Example 109

Example includes Process I, Process II, and Process III.
Process I: Process for Producing Carbon Fibers as Raw Material
A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration (O/C) was 0.15, the surface carboxylic acid concentration (COOH/C) was 0.005, and the surface hydroxy group concentration (COH/C) was 0.018. The obtained carbon fibers were regarded as carbon fibers A.

Process II: Process for Bonding Sizing Agent to Carbon Fibers
An aqueous dispersion emulsion containing 20 parts by mass of (B-1) as the component (B1), 20 parts by mass of the component (C), and 10 parts by mass of an emulsifier was prepared, and then 50 parts by mass of (A-3) was mixed as the component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent without the solutions in the sizing solution is as listed in Table 18. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. The results are listed in Table 18. The results indicated that both the epoxy equivalent of the sizing agent and the chemical composition of the sizing agent surface were as expected. The IFSS measurement also revealed a sufficiently high adhesiveness.

Process III: Production, Molding, and Evaluation of Unidirectional Prepreg
In a kneader, 10 parts by mass of (D16-2) and 50 parts by mass of (D16-4) as the bisphenol epoxy resin component (D16), 40 parts by mass of (D17-6) as the amine epoxy resin component (D17), and 5 parts by mass of (F2-3) as the block copolymer component (F2) were mixed and dissolved, then 45 parts by mass of 4,4'-diaminodiphenylsulfone (E-1) as the latent hardener component (E) was added, and the whole was kneaded, thus yielding a primary resin composition without thermoplastic resin particles (F7). The obtained primary resin composition was applied onto a release paper with a knife coater so as to give a resin areal weight of 32 g/m$^2$, thus yielding a primary resin film. The primary resin film was superimposed on each side of sizing agent-coated carbon fibers (an areal weight of 190 g/m$^2$) arranged in one direction, and heat and pressure were applied with a heat roll at 100° C. and 1 atmosphere to impregnate the carbon fibers with the thermosetting resin composition for a carbon fiber-reinforced composite material, thus yielding a primary prepreg. Next, a secondary thermosetting resin composition that had been prepared by addition of Toraypearl TN as the thermoplastic resin particles (F7) so that the epoxy resin composition of the final prepreg for a carbon fiber-reinforced composite material had the formulation listed in Table 18 was applied onto a release paper with a knife coater so as to give a resin areal weight 20 g/m², thus yielding a secondary resin film. The secondary resin film was superimposed on each side of the primary prepreg, and heat and pressure were applied with a heat roll at 100° C. and 1 atmosphere to impregnate the primary prepreg with the thermosetting resin composition for a carbon fiber-reinforced composite material, thus yielding a target prepreg. The obtained prepreg was used, and the 0° tensile strength measurement, the 0° tensile test after long-term storage, the interlaminar toughness measurement of the carbon fiber-reinforced composite material were carried out. Table 18 lists the results. The results revealed a sufficiently high 0° tensile strength translation rate at the initial state, a sufficiently high interlaminar toughness, and a small reduction in tensile strength translation rate after 20 days.

Examples 110 to 116

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 109 except that the component (A) and the component (B1) listed in Table 18 were used as the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a sufficiently high adhesiveness. Table 18 lists the results.

Process III: Production, Molding, and Evaluation of Unidirectional Prepreg

A prepreg was produced, molded, and evaluated in the same manner as in Example 109. The results revealed a sufficiently high 0° tensile strength translation rate at the initial state, a sufficiently high interlaminar toughness, and a small reduction in tensile strength translation rate after 20 days. Table 18 lists the results.

TABLE 18

| | | | Example 109 | Example 110 | Example 111 | Example 112 | Example 113 | Example 114 | Example 115 | Example 116 |
|---|---|---|---|---|---|---|---|---|---|---|
| Carbon fibers | Carbon fibers | | A | A | A | A | A | A | A | A |
| Sizing agent | (A) | EX-810 | | | | | | | | |
| | | EX-611 | 50 | | | | | 50 | | 25 |
| | | EX-521 | 20 | 50 | 50 | 50 | 50 | | 50 | 25 |
| | (B1) | jER152 | | | | | | | | |
| | | jER828 | | | | 20 | 10 | 20 | 20 | 20 |
| | | jER1001 | | 20 | 20 | 20 | 10 | | | |
| | | jER807 | | | | | | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 265 | 320 | 250 | 290 | 255 | 290 | 275 |
| Thermosetting resin composition | Epoxy resin (D1) | Bisphenol epoxy resin (D16) | jER828 | 10 | 10 | 10 | 10 | 10 | 10 | 10 | 10 |
| | | | jER807 | | | | | | | | |
| | | | jER1004 | 50 | 50 | 50 | 50 | 50 | 50 | 50 | 50 |
| | | Amine epoxy resin (D17) | YDF2001 | | | | | | | | |
| | | | MY0500 | | | | | | | | |
| | | | ELM434 | 40 | 40 | 40 | 40 | 40 | 40 | 40 | 40 |
| | | Others | YX4000H | | | | | | | | |
| | | | GAN | | | | | | | | |
| | | | HP7200L | | | | | | | | |
| | Block copolymer (F2) | Nanostrength E40F | | | | | | | | |
| | | Nanostrength E20F | | | | | | | | |
| | | Nanostrength M22N | | | | | | | | |
| | Latent hardener (E) | 4,4'-diaminodiphenylsulfone | 5 | 5 | 5 | 5 | 5 | 5 | 5 | 5 |
| | | DICY7 | 45 | 45 | 45 | 45 | 45 | 45 | 45 | 45 |
| | Thermoplastic resin particles (F7) | Toraypearl TN | 20 | 20 | 20 | 20 | 20 | 20 | 20 | 20 |
| | Hardening accelerator | DCMU99 | | | | | | | | |
| Evaluation item | Sizing agent-coated fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with hardener | 19 | 20 | 18 | 20 | 19 | 16 | 21 | 21 |
| | | Interfacial adhesion: IFSS (MPa) | 43 | 44 | 40 | 46 | 43 | 39 | 43 | 44 |
| | Prepreg | Ratio of particles present in region to 20% depth | 98 | 99 | 97 | 98 | 99 | 97 | 99 | 98 |

TABLE 18-continued

| Carbon fiber-reinforced composite material | | Example 109 | Example 110 | Example 111 | Example 112 | Example 113 | Example 114 | Example 115 | Example 116 |
|---|---|---|---|---|---|---|---|---|---|
| | 0° Tensile test (0 days): strength translation rate (%) | 84 | 85 | 82 | 87 | 84 | 81 | 85 | 85 |
| | 0° Tensile test (20 days): strength translation rate (%) | 79 | 80 | 80 | 81 | 78 | 79 | 80 | 79 |
| | Interlaminar toughness Gic (J/m$^2$) | 645 | 648 | 642 | 646 | 644 | 642 | 646 | 647 |

Examples 117 to 121

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that the sizing agent had the mass ratio listed in Table 19. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a sufficiently high adhesiveness. Table 19 lists the results.

Process III: Production, Molding, and Evaluation of Unidirectional Prepreg

A prepreg was produced, molded, and evaluated in the same manner as in Example 109. The results revealed a sufficiently high 0° tensile strength translation rate at the initial state, a sufficiently high interlaminar toughness, and a small reduction in tensile strength translation rate after 20 days. Table 19 lists the results.

Example 122

Process I: Process for Producing Carbon Fibers as Raw Material

Carbon fibers were produced in the same manner as in Example 109.

Process II: Process for Bonding Sizing Agent to Carbon Fibers

In DMF, 55 parts by mass of (A-3) as the component (A), 22.5 parts by mass of (B-2) as the component (B1), and 22.5 parts by mass the component (C) were dissolved, yielding a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent without the solutions in the sizing solution is as listed in Table 19. In the same manner as in Example 109, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 19, the results indicated that both the epoxy equivalent of the sizing agent and the chemical composition of the sizing agent surface were as expected. The IFSS measurement also revealed a sufficiently high adhesiveness.

Process III: Production, Molding, and Evaluation of Unidirectional Prepreg

A prepreg was produced, molded, and evaluated in the same manner as in Example 109. The results revealed a sufficiently high 0° tensile strength translation rate at the initial state, a sufficiently high interlaminar toughness, and a small reduction in tensile strength translation rate after 20 days. Table 19 lists the results.

Example 123

Process I: Process for Producing Carbon Fibers as Raw Material

Carbon fibers were produced in the same manner as in Example 109.

Process II: Process for Bonding Sizing Agent to Carbon Fibers

In DMF, 60 parts by mass of (A-3) as the component (A) and 40 parts by mass of (B-2) as the component (B1) were dissolved, yielding a sizing solution. The epoxy equivalent of the sizing agent without the solutions in the sizing solution is as listed in Table 19. In the same manner as in Example 109, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 19, the results indicated that both the epoxy equivalent of the sizing agent and the chemical composition of the sizing agent surface were as expected. The IFSS measurement also revealed a sufficiently high adhesiveness.

Process III: Production, Molding, and Evaluation of Unidirectional Prepreg

A prepreg was produced, molded, and evaluated in the same manner as in Example 109. The results revealed a sufficiently high 0° tensile strength translation rate at the initial state, a sufficiently high interlaminar toughness, and a small reduction in tensile strength translation rate after 20 days. Table 19 lists the results.

TABLE 19

| | | | Example 117 | Example 118 | Example 119 | Example 120 | Example 121 | Example 122 | Example 123 |
|---|---|---|---|---|---|---|---|---|---|
| Carbon fibers | Carbon fibers | | A | A | A | A | A | A | A |
| Sizing agent | (A) | EX-810 | | | | | | | |
| | | EX-611 | | | | | | | |
| | | EX-521 | 37 | 35 | 40 | 55 | 60 | 55 | 60 |
| | (B1) | jER152 | | | | | | | |
| | | jER828 | 33 | 45 | 30 | 15 | 15 | 22.5 | 40 |
| | | jER1001 | | | | | | | |
| | | jER807 | | | | | | | |

TABLE 19-continued

|  |  |  | Example 117 | Example 118 | Example 119 | Example 120 | Example 121 | Example 122 | Example 123 |
|---|---|---|---|---|---|---|---|---|---|
|  | (C) | Aromatic polyester | 20 | 10 | 20 | 20 | 20 | 22.5 |  |
|  | Others | Emulsifier (nonionic surfactant) | 10 | 10 | 10 | 10 | 5 |  |  |
|  | Ratio | (A) (% by mass) | 53 | 44 | 57 | 79 | 80 | 71 | 60 |
|  |  | (B1) (% by mass) | 47 | 56 | 43 | 21 | 20 | 29 | 40 |
|  |  | (A) (% by mass) | 37 | 35 | 40 | 55 | 60 | 55 | 60 |
|  |  | (B) (% by mass) | 63 | 65 | 60 | 45 | 40 | 45 | 40 |
|  | Epoxy equivalent (g/eq.) |  | 265 | 230 | 265 | 260 | 245 | 240 | 185 |
| Thermosetting resin composition | Epoxy resin (D1) | Bisphenol epoxy resin (D16) | jER828 |  |  |  |  |  |  |
|  |  |  | jER807 | 10 | 10 | 10 | 10 | 10 | 10 | 10 |
|  |  |  | jER1004 |  |  |  |  |  |  |  |
|  |  |  | YDF2001 | 50 | 50 | 50 | 50 | 50 | 50 | 50 |
|  |  | Amine epoxy resin (D17) | MY0500 |  |  |  |  |  |  |  |
|  |  |  | ELM434 | 40 | 40 | 40 | 40 | 40 | 40 | 40 |
|  |  | Others | YX4000H |  |  |  |  |  |  |  |
|  |  |  | GAN |  |  |  |  |  |  |  |
|  |  |  | HP7200L |  |  |  |  |  |  |  |
|  | Block copolymer (F2) | Nanostrength E40F |  |  |  |  |  |  |  |  |
|  |  | Nanostrength E20F |  |  |  |  |  |  |  |  |
|  |  | Nanostrength M22N | 5 | 5 | 5 | 5 | 5 | 5 | 5 |
|  | Latent hardener (E) | 4,4'-diaminodiphenylsulfone | 45 | 45 | 45 | 45 | 45 | 45 | 45 |
|  |  | DICY7 |  |  |  |  |  |  |  |
|  | Thermoplastic resin particles (F7) | Toraypearl TN | 20 | 20 | 20 | 20 | 20 | 20 | 20 |
|  | Hardening accelerator | DCMU99 |  |  |  |  |  |  |  |
| Evaluation item | Sizing agent-coated fibers | Epoxy equivalent of sizing agent (g/eq.) | 430 | 370 | 430 | 430 | 400 | 439 | 280 |
|  |  | X-ray photoelectron spectroscopy analysis of sizing agent surface (a)/(b) | 0.77 | 0.79 | 0.76 | 0.66 | 0.57 | 0.70 | 0.81 |
|  |  | ΔTg with hardener | 17 | 16 | 18 | 21 | 22 | 20 | 25 |
|  |  | Interfacial adhesion: IFSS (MPa) | 41 | 40 | 45 | 45 | 44 | 45 | 45 |
|  | Prepreg | Ratio of particles present in region to 20% depth | 99 | 97 | 99 | 98 | 96 | 97 | 98 |
|  | Carbon fiber-reinforced composite material | 0° Tensile test (0 days): strength translation rate (%) | 82 | 81 | 85 | 86 | 85 | 86 | 84 |
|  |  | 0° Tensile test (20 days): strength translation rate (%) | 80 | 79 | 79 | 79 | 78 | 79 | 77 |
|  |  | Interlaminar toughness Gic (J/m$^2$) | 643 | 642 | 646 | 647 | 644 | 648 | 649 |

Examples 124 to 126

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 20 lists the results.

Process III: Production, Molding, and Evaluation of Unidirectional Prepreg

As the thermosetting resin composition, the bisphenol epoxy resin (D16), the amine epoxy resin (D17), and the block copolymer (F2) listed in Table 20 were mixed in the ratio listed in Table 20 and dissolved, then the latent hardener (E) listed in Table 20 was added, and the whole was kneaded, thus yielding a thermosetting resin composition for a carbon fiber-reinforced composite material.

The obtained thermosetting resin composition was applied onto a release paper with a knife coater so as to give a resin areal weight of 52 g/m$^2$, thus yielding a resin film. The resin film was superimposed on each side of sizing agent-coated carbon fibers (an areal weight of 190 g/m$^2$) arranged in one direction, and heat and pressure were applied with a heat roll at a temperature of 100° C. and 1 atmosphere to impregnate the sizing agent-coated carbon fibers with the thermosetting resin composition, thus yielding a prepreg. The obtained prepreg was used, and the 0° tensile strength measurement, the 0° tensile test after long-term storage, and the interlaminar toughness measurement of the carbon fiber-reinforced composite material were carried out. Table 20 lists the results. The results revealed a sufficiently high 0° tensile strength translation rate at the initial state, a sufficiently high interlaminar toughness, and a small reduction in tensile strength translation rate after 20 days.

Examples 127 to 132

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 20 lists the results.

Process III: Production, Molding, and Evaluation of Unidirectional Prepreg

As the thermosetting resin composition, the bisphenol epoxy resin (D16), the amine epoxy resin (D17), and the block copolymer (F2) listed in Table 20 were mixed in the ratio listed in Table 20 and dissolved, then the latent hardener (E) listed in Table 20 was added, and the whole was knead, thus yielding a primary resin composition without thermoplastic resin particles (F7). The obtained primary resin composition was applied onto a release paper with a knife coater so as to give a resin areal weight of 32 g/m$^2$, thus yielding a primary resin film. The primary resin film was superimposed on each side of sizing agent-coated carbon fibers (an areal weight of 190 g/m$^2$) arranged in one direction, and heat and pressure were applied with a heat roll at 100° C. and 1 atmosphere to impregnate the carbon fibers with the thermosetting resin composition for a carbon fiber-reinforced composite material, thus yielding a primary prepreg. Next, a secondary thermosetting resin composition that had been prepared by addition of Toraypearl TN as the thermoplastic resin particles (F7) so that the epoxy resin composition of the final prepreg of a carbon fiber-reinforced composite material had the formulation listed in Table 20 was applied onto a release paper with a knife coater so as to give a resin areal weight of 20 g/m$^2$, thus yielding a secondary resin film. The secondary resin film was superimposed on each side of the primary prepreg, and heat and pressure were applied with a heat roll at 100° C. and 1 atmosphere to impregnate the primary prepreg with the thermosetting resin composition, thus yielding a target prepreg. The obtained prepreg was used, and the 0° tensile strength measurement, the 0° tensile test after long-term storage, the interlaminar toughness measurement of the carbon fiber-reinforced composite material were carried out. Table 20 lists the results. The results revealed a sufficiently high 0° tensile strength translation rate at the initial state, a sufficiently high interlaminar toughness, and a small reduction in tensile strength translation rate after 20 days.

TABLE 20

| | | | Example 124 | Example 125 | Example 126 | Example 127 | Example 128 | Example 129 | Example 130 | Example 131 | Example 132 |
|---|---|---|---|---|---|---|---|---|---|---|---|
| Carbon fibers | Carbon fibers | | A | A | A | A | A | A | A | A | A |
| Sizing agent | (A) | EX-810 | | | | | | | | | |
| | | EX-611 | | | | | | | | | |
| | | EX-521 | 50 | 50 | 50 | 50 | 50 | 50 | 50 | 50 | 50 |
| | (B1) | jER152 | 20 | 20 | 20 | 20 | 20 | 20 | 20 | 20 | 20 |
| | | jER828 | | | | | | | | | |
| | | jER1001 | | | | | | | | | |
| | | jER807 | | | | | | | | | |
| | (C) | Aromatic polyester | 20 | 20 | 20 | 20 | 20 | 20 | 20 | 20 | 20 |
| | Others | Emulsifier (nonionic surfactant) | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 |
| | | (B1) (% by mass) | 29 | 29 | 29 | 29 | 29 | 29 | 29 | 29 | 29 |
| | | (A) (% by mass) | 50 | 50 | 50 | 50 | 50 | 50 | 50 | 50 | 50 |
| | | (B) (% by mass) | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 |
| Thermosetting resin composition | Epoxy resin (D1) | Bisphenol epoxy resin (D16) | jER828 | | | | | | | | | |
| | | | jER807 | 10 | 10 | 10 | 10 | 10 | 10 | 10 | 10 | 10 |
| | | | jER1004 | 50 | 50 | 50 | 50 | 50 | 50 | 50 | 50 | 50 |
| | | | YDF2001 | | | | | | | | | |
| | | Amine epoxy resin (D17) | MY0500 | 40 | 40 | 40 | 40 | 40 | 40 | 40 | 40 | 40 |
| | | | ELM434 | | | | | | | | | |
| | | Others | YX4000H | | | | | | | | | |
| | | | GAN | | | | | | | | | |
| | | | HP7200L | | | | | | | | | |
| | Block copolymer (F2) | Nanostrength E40F | 5 | 5 | | | | | | | |
| | | Nanostrength E20F | | | 5 | 5 | 5 | 1 | 8 | 2.5 | 2 |
| | | Nanostrength M22N | | | | | | | | 2.5 | 2 |
| | Latent hardener (E) | 4,4′-diaminodiphenylsulfone | 45 | 45 | 45 | 45 | 45 | 45 | 45 | 45 | 45 |
| | | DICY7 | | | | | | | | | |
| | Thermoplastic resin particles (F7) | Toraypearl TN | | | | 20 | 20 | 20 | 20 | 20 | 20 |
| | Hardening accelerator | DCMU99 | | | | | | | | | |
| Evaluation item | Sizing agent-coated fibers | Epoxy equivalent of sizing agent (g/eq.) | 430 | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 | 0.64 |
| | | ΔTg with hardener | 20 | 20 | 20 | 20 | 20 | 20 | 20 | 20 | 20 |
| | | Interfacial adhesion: IFSS (MPa) | 44 | 44 | 44 | 46 | 44 | 44 | 45 | 44 | 44 |
| | Prepreg | Ratio of particles present in region to 20% depth | — | — | — | 97 | 97 | 99 | 98 | 96 | 97 |

TABLE 20-continued

| | | Example 124 | Example 125 | Example 126 | Example 127 | Example 128 | Example 129 | Example 130 | Example 131 | Example 132 |
|---|---|---|---|---|---|---|---|---|---|---|
| Carbon fiber-reinforced composite material | 0° Tensile test (0 days): strength translation rate (%) | 84 | 84 | 85 | 84 | 85 | 84 | 85 | 85 | 84 |
| | 0° Tensile test (20 days): strength translation rate (%) | 79 | 78 | 78 | 79 | 80 | 78 | 79 | 79 | 78 |
| | Interlaminar toughness Gic (J/m$^2$) | 610 | 615 | 645 | 615 | 613 | 590 | 650 | 639 | 630 |

Examples 133 to 143

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 21 lists the results.

Process III: Production, Molding, and Evaluation of Unidirectional Prepreg

A prepreg was produced, molded, and evaluated in the same manner as in Example 109 except that the bisphenol epoxy resin (D16) and the amine epoxy resin (D17) listed in Table 21 were used in the mass ratio in Table 21. Table 21 lists the results. The results revealed a sufficiently high 0° tensile strength translation rate at the initial state, a sufficiently high interlaminar toughness, and a small reduction in tensile strength translation rate after 20 days.

TABLE 21

| | | | Example 133 | Example 134 | Example 135 | Example 136 | Example 137 | Example 138 | Example 139 | Example 140 | Example 141 | Example 142 | Example 143 |
|---|---|---|---|---|---|---|---|---|---|---|---|---|---|
| Carbon fibers | Carbon fibers | | A | A | A | A | A | A | A | A | A | A | A |
| Sizing agent | (A) | EX-810 | | | | | | | | | | | |
| | | EX-611 | | | | | | | | | | | |
| | | EX-521 | 50 | 50 | 50 | 50 | 50 | 50 | 50 | 50 | 50 | 50 | 50 |
| | (B1) | jER152 | | | | | | | | | | | |
| | | jER828 | 20 | 20 | 20 | 20 | 20 | 20 | 20 | 20 | 20 | 20 | 20 |
| | | jER1001 | | | | | | | | | | | |
| | | jER807 | | | | | | | | | | | |
| | (C) | Aromatic polyester | 20 | 20 | 20 | 20 | 20 | 20 | 20 | 20 | 20 | 20 | 20 |
| | Others | Emulsifier (nonionic surfactant) | 10 | 10 | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 |
| Thermosetting resin composition | Epoxy resin (D1) | Bisphenol epoxy resin (D16) | jER828 | 10 | | | 10 | | | | | | | |
| | | | jER807 | 50 | | 30 | 25 | 10 | 60 | | | 30 | | |
| | | | jER1004 | | 50 | 30 | 25 | 50 | | 10 | 40 | 60 | 40 | 20 |
| | | | YDF2001 | | | | | 40 | 40 | 40 | 60 | 10 | 60 | |
| | | Amine epoxy resin (D17) | MY0500 | 40 | | 40 | 40 | | | 40 | | | | 80 |
| | | | ELM434 | | | | | | | 20 | | | | |
| | | | YX4000H | | | | | | | | | | | |
| | | Others | GAN | | | | | | | | | | | |
| | | | HP7200L | | | | | | | | | | | |
| | Block copolymer (F2) | | Nanostrength E40F | | | | | | | | | | | |
| | | | Nanostrength E20F | | | | | | | | | | | |
| | | | Nanostrength M22N | | | | | | | | | | | |
| | Latent hardener (E) | | 4,4'-diaminodiphenylsulfone | 5 | 5 | 5 | 5 | 5 | 5 | 5 | 5 | 5 | 5 | 5 |
| | | | DICY7 | 45 | 45 | 45 | 45 | 45 | 45 | 45 | 45 | 45 | 45 | 45 |
| | Thermoplastic resin particles (F7) | | Toraypearl TN | 20 | 20 | 20 | 20 | 20 | 20 | 20 | 20 | 20 | 20 | 20 |
| | Hardening accelerator | | DCMU99 | | | | | | | | | | | |
| Evaluation item | Sizing agent-coated fibers | Epoxy equivalent of sizing agent (g/eq.) | | 430 | 430 | 430 | 430 | 430 | 430 | 430 | 430 | 430 | 430 | 430 |
| | | X-ray photoelectron spectroscopy analysis of sizing agent surface (a)/(b) | | 0.64 | 0.64 | 0.64 | 0.64 | 0.64 | 0.64 | 0.64 | 0.64 | 0.64 | 0.64 | 0.64 |
| | | ΔTg with hardener | | 20 | 20 | 20 | 20 | 20 | 20 | 20 | 20 | 20 | 20 | 20 |
| | | Interfacial adhesion: IFSS (MPa) | | 44 | 44 | 44 | 43 | 44 | 45 | 44 | 44 | 45 | 44 | 44 |
| | Prepreg | Ratio of particles present in region to 20% depth | | 98 | 97 | 99 | 98 | 97 | 99 | 98 | 99 | 99 | 98 | 97 |

TABLE 21-continued

| | | Example 133 | Example 134 | Example 135 | Example 136 | Example 137 | Example 138 | Example 139 | Example 140 | Example 141 | Example 142 | Example 143 |
|---|---|---|---|---|---|---|---|---|---|---|---|---|
| Carbon fiber-reinforced composite material | 0° Tensile test (0 days): strength translation rate (%) | 84 | 83 | 84 | 85 | 85 | 83 | 85 | 84 | 84 | 84 | 85 |
| | 0° Tensile test (20 days): strength translation rate (%) | 79 | 78 | 78 | 79 | 79 | 75 | 79 | 78 | 78 | 77 | 79 |
| | Interlaminar toughness GIc (J/m²) | 635 | 640 | 623 | 625 | 638 | 638 | 609 | 600 | 615 | 638 | 622 |

Examples 144 to 147 and 151

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 22 lists the results.

Process III: Production, Molding, and Evaluation of Unidirectional Prepreg

A prepreg was produced, molded, and evaluated in the same manner as in Example 109 except that the bisphenol epoxy resin (D16), the amine epoxy resin (D17), and other epoxy resins listed in Table 22 were used in the mass ratio in Table 22. Table 22 lists the results. The results revealed a sufficiently high 0° tensile strength translation rate at the initial state, a sufficiently high interlaminar toughness, and a small reduction in tensile strength translation rate after 20 days.

Examples 148 to 150 and 152 to 154

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 22 lists the results.

Process III: Production, Molding, and Evaluation of Unidirectional Prepreg

A prepreg was produced, molded, and evaluated in the same manner as in Example 124 except that the bisphenol epoxy resin (D16), the amine epoxy resin (D17), other epoxy resins, and other materials listed in Table 22 were used in the mass ratio in Table 22. Table 22 lists the results. The results revealed a sufficiently high 0° tensile strength translation rate at the initial state, a sufficiently high interlaminar toughness, and a small reduction in tensile strength translation rate after 20 days.

TABLE 22

| | | | Example 144 | Example 145 | Example 146 | Example 147 | Example 148 | Example 149 | Example 150 | Example 151 | Example 152 | Example 153 | Example 154 |
|---|---|---|---|---|---|---|---|---|---|---|---|---|---|
| Carbon fibers | Carbon fibers | | A | A | A | A | A | A | A | A | A | A | A |
| Sizing agent | (A) | EX-810 | | | | | | | | | | | |
| | | EX-611 | | | | | | | | | | | |
| | | EX-521 | 50 | 50 | 50 | 50 | 50 | 50 | 50 | 50 | 50 | 50 | 50 |
| | (B1) | jER152 | | | | | | | | | | | |
| | | jER828 | 20 | 20 | 20 | 20 | 20 | 20 | 20 | 20 | 20 | 20 | 20 |
| | | jER1001 | | | | | | | | | | | |
| | | jER807 | | | | | | | | | | | |
| | (C) | Aromatic polyester | 20 | 20 | 20 | 20 | 20 | 20 | 20 | 20 | 20 | 20 | 20 |
| | | Emulsifier (nonionic surfactant) | 10 | 10 | 10 | 10 | 10 | 10 | 10 | 10 | 10 | 10 | 10 |
| | Others | | | | | | | | | | | | |
| | Ratio | (A) (% by mass) | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 |
| Thermosetting resin composition | Epoxy resin (D1) | Bisphenol epoxy resin (D16) | jER828 | 10 | 10 | 10 | 10 | 10 | 10 | 10 | 10 | 10 | 10 | 10 |
| | | jER807 | | 50 | | | | | | | | | |
| | | jER1004 | 50 | | 50 | 50 | 50 | 50 | 50 | 50 | 50 | 50 | 50 |
| | | YDF2001 | | | | | | | | | | | |
| | Amine epoxy resin (D17) | MY0500 | | | | | | | | | | | |
| | | ELM434 | 40 | 40 | | | 40 | 40 | 40 | 40 | 40 | 40 | 40 |
| | Others | YX4000H | | | | 30 | | | | | | | 30 |
| | | GAN | | | | 10 | | | | | | | 10 |
| | | HP7200L | | | 40 | | | | | | | 40 | |
| | Block copolymer (F2) | Nanostrength E40F | 5 | 5 | 5 | 5 | | | | | | | |
| | | Nanostrength E20F | | | | | 5 | 5 | | | | | |
| | | Nanostrength M22N | | | | | | | 5 | 5 | 5 | 5 | 5 |
| | Latent hardener (E) | 4,4'-diaminodiphenylsulfone | 45 | 45 | 45 | 45 | | | | | | | |
| | | DICY7 | | | | | 5 | 5 | 5 | 5 | 5 | 5 | 5 |
| | Thermoplastic resin particles (F7) | Toraypearl TN | 20 | 20 | 20 | 20 | | | | 20 | | | |
| | Hardening accelerator | DCMU99 | 3 | 3 | 3 | 3 | 3 | 3 | 3 | 3 | 3 | 3 | 3 |
| Evaluation item | Sizing agent-coated fibers | Epoxy equivalent of sizing agent (g/eq.) | 430 | 430 | 430 | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 |
| | | ΔTg with hardener | 20 | 20 | 20 | 20 | | | | | | | |
| | | Interfacial adhesion: IFSS (MPa) | 44 | 45 | 44 | 43 | 44 | 44 | 44 | 44 | 44 | 44 | 44 |
| | Prepreg | Ratio of particles present in region to 20% depth | 97 | 99 | 99 | 98 | — | — | — | 98 | — | — | — |

TABLE 22-continued

| | | Example 144 | Example 145 | Example 146 | Example 147 | Example 148 | Example 149 | Example 150 | Example 151 | Example 152 | Example 153 | Example 154 |
|---|---|---|---|---|---|---|---|---|---|---|---|---|
| Carbon fiber-reinforced composite material | 0° Tensile test (0 days): strength translation rate (%) | 85 | 84 | 83 | 85 | 81 | 82 | 82 | 82 | 82 | 80 | 83 |
| | 0° Tensile test (20 days): strength translation rate (%) | 77 | 77 | 76 | 78 | 80 | 80 | 81 | 81 | 80 | 78 | 82 |
| | Interlaminar toughness Gic (J/m$^2$) | 644 | 639 | 637 | 645 | 612 | 614 | 643 | 645 | 648 | 634 | 644 |

Comparative Examples 38 to 40

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that the sizing agent had the mass ratio listed in Table 23. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 23, the results indicated that in the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C═C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 109. Table 23 lists the results. The results revealed a high interlaminar toughness and a small reduction ratio of the tensile strength after 20 days but a low 0° tensile strength translation rate at the initial state.

Comparative Example 41

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that the sizing agent had the mass ratio listed in Table 23. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 23, the results indicated that in the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C═C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 109. Table 23 lists the results. The results revealed a good 0° tensile strength translation rate at the initial state and a good interlaminar toughness but a large reduction ratio of the 0° tensile strength after 20 days.

Comparative Examples 42 and 43

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 23, the results indicated that in the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C═C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Prepreg

A prepreg was produced, molded, and evaluated in the same manner as in Example 109. Table 23 lists the results. The results revealed a high 0° tensile strength translation rate at the initial state and a high interlaminar toughness but a large reduction ratio of the tensile strength after 20 days.

Comparative Example 44

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that no aliphatic epoxy compound (A) was used but the aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 23, the results indicated that in the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C═C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Unidirectional Prepreg

A prepreg was produced, molded, and evaluated in the same manner as in Example 109. Table 23 lists the results. The results revealed a high interlaminar toughness and a small reduction ratio of the tensile strength after 20 days but an insufficient tensile strength translation rate at the initial state.

Comparative Example 45

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 23 lists the results.

Process III: Production, Molding, and Evaluation of Unidirectional Prepreg

A prepreg was produced, molded, and evaluated in the same manner as in Example 109 except that no block copolymer (F2) was used but the epoxy resin (D16) and other components were used as the thermosetting resin composition. Table 23 lists the results. The results revealed a good tensile strength translation rate at the initial state and a good reduction ratio of the tensile strength after 20 days but an insufficient interlaminar toughness.

Comparative Example 46

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness.

Process III: Production, Molding, and Evaluation of Unidirectional Prepreg

A prepreg was produced, molded, and evaluated in the same manner as in Example 125 except that no block copolymer (F2) was used but the epoxy resin (D16) and other components were used as the thermosetting resin composition. Table 23 lists the results. The results revealed a good tensile strength translation rate at the initial state and a good reduction ratio of the tensile strength after 20 days but an insufficient interlaminar toughness.

Comparative Example 47

Process I: Process for Producing Carbon Fibers as Raw Material

Carbon fibers were produced in the same manner as in Example 109.

Process II: Process for Bonding Sizing Agent to Carbon Fibers

Sizing agent-coated carbon fibers were obtained in the same manner as in Example 110 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 23, the results indicated that in the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C═C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Unidirectional Prepreg

A prepreg was produced, molded, and evaluated in the same manner as in Example 125 by using the epoxy resin (D16) and other components as the thermosetting resin composition. Table 6 lists the results. The results revealed a good 0° tensile strength translation rate at the initial state and a good interlaminar toughness but a large reduction ratio of the 0° tensile strength after 20 days.

TABLE 23

| | | | Comparative Example 38 | Comparative Example 39 | Comparative Example 40 | Comparative Example 41 | Comparative Example 42 | Comparative Example 43 | Comparative Example 44 | Comparative Example 45 | Comparative Example 46 | Comparative Example 47 |
|---|---|---|---|---|---|---|---|---|---|---|---|---|
| Carbon fibers | Carbon fibers | | A | A | A | A | A | A | A | A | A | A |
| Sizing agent | (A) | EX-810 | 20 | 30 | | | | | | | | |
| | | EX-611 | | | | | | 50 | | | | |
| | | EX-521 | | | 50 | 70 | 100 | | | 50 | 50 | 100 |
| | (B1) | jER152 | 35 | 60 | 50 | 12 | | 50 | 45 | 20 | 20 | |
| | | jER828 | | | | | | | | | | |
| | | jER1001 | | | | | | | | | | |
| | | jER807 | | | | | | | | | | |
| | (C) | Aromatic polyester | 35 | 5 | | 12 | | | 45 | 20 | 20 | 100 |
| | Others | Emulsifier (nonionic surfactant) | 10 | 5 | | 6 | | | 10 | 10 | 10 | |
| | Ratio | (A) (% by mass) | 36 | 33 | 50 | 85 | 100 | 100 | 0 | 71 | 71 | 100 |
| | | (B1) (% by mass) | 64 | 67 | 50 | 15 | 0 | 0 | 100 | 29 | 29 | 0 |
| | | (A) (% by mass) | 20 | 30 | 50 | 70 | 100 | 100 | 0 | 50 | 50 | 100 |
| | | (B) (% by mass) | 80 | 70 | 50 | 30 | 0 | 0 | 100 | 50 | 50 | 0 |
| | Epoxy equivalent (g/eq.) | | 270 | 210 | 230 | 224 | 180 | 180 | 420 | 265 | 265 | 180 |
| Thermosetting resin composition | Epoxy resin (D1) | Bisphenol epoxy resin (D16) | jER828 | 10 | 10 | 10 | 10 | 10 | 10 | 10 | 10 | 10 | 10 |
| | | | jER807 | 50 | 50 | 50 | 50 | 50 | 50 | 50 | 50 | 50 | 50 |
| | | | jER1004 | 40 | 40 | 40 | 40 | 40 | 40 | 40 | 40 | 40 | 40 |
| | | | YDF2001 | | | | | | | | | | |
| | | Amine epoxy resin (D17) | MY0500 | | | | | | | | | | |
| | | | ELM434 | | | | | | | | | | |
| | | Others | YX4000H | | | | | | | | | | |
| | | | GAN | | | | | | | | | | |
| | | | HP7200L | | | | | | | | | | |
| | Block copolymer (F2) | Nanostrength E40F | | | | | | | | | | | |
| | | Nanostrength E20F | | | | | | | | | | | |
| | | Nanostrength M22N | 5 | 5 | 5 | 5 | 5 | 5 | 5 | | | 5 |
| | Latent hardener (E) | 4,4'-diaminodiphenylsulfone | 45 | 45 | 45 | 45 | 45 | 45 | 45 | 45 | | 5 |
| | | DICY7 | | | | | | | | | | |
| | Thermoplastic resin particles (F7) | Toraypearl TN | 20 | 20 | 20 | 20 | 20 | 20 | 20 | 20 | | |
| | Hardening accelerator | DCMU99 | | | | | | | | | 3 | 3 |
| Evaluation item | Sizing agent-coated fibers | Epoxy equivalent of sizing agent (g/eq.) | 430 | 320 | 370 | 350 | 270 | 260 | 900 | 430 | 430 | 270 |
| | | X-ray photoelectron spectroscopy analysis of sizing agent surface (a)/(b) | 0.91 | 0.93 | 0.91 | 0.49 | 0.29 | 0.26 | 1.01 | 0.64 | 0.64 | 0.29 |
| | | ΔTg with hardener | 15 | 17 | 18 | 27 | 32 | 27 | 10 | 20 | 7 | 14 |
| | | Interfacial adhesion: IFSS (MPa) | 33 | 34 | 36 | 45 | 47 | 41 | 25 | 43 | 44 | 47 |

TABLE 23-continued

| | | Comparative Example 38 | Comparative Example 39 | Comparative Example 40 | Comparative Example 41 | Comparative Example 42 | Comparative Example 43 | Comparative Example 44 | Comparative Example 45 | Comparative Example 46 | Comparative Example 47 |
|---|---|---|---|---|---|---|---|---|---|---|---|
| Prepreg | Ratio of particles present in region to 20% depth | 99 | 97 | 99 | 98 | 99 | 98 | 99 | 99 | — | — |
| Carbon fiber-reinforced composite material | 0° Tensile test (0 days): strength translation rate (%) | 73 | 73 | 75 | 85 | 87 | 82 | 69 | 84 | 82 | 85 |
| | 0° Tensile test (20 days): strength translation rate (%) | 73 | 74 | 74 | 68 | 69 | 66 | 69 | 79 | 81 | 77 |
| | Interlaminar toughness GIc (J/m²) | 637 | 643 | 642 | 645 | 644 | 644 | 633 | 385 | 386 | 647 |

The materials and the components listed below were used in each example and each comparative example of Fifth Embodiment. Table 24 lists the SP values, the softening points, the elastic moduli, and the number average molecular weights of the epoxy resin (D131) or (D132), the epoxy resin (D141) or (D142), the epoxy resin (D151) or (D152), and other epoxy resins.

Component (A): A-1 to A-3

A-1 to A-3 as the component (A) used in Examples and Comparative Examples of Second Embodiment were the same as A-1 to A-3 used in Examples and Comparative Examples of Fifth Embodiment.

Component (B1): B-1 to B-4

B-1 to B-4 as the component (B1) used in Examples and Comparative Examples of Second Embodiment were the same as B-1 to B-4 used in Examples and Comparative Examples of Fifth Embodiment.

Epoxy Resin (D13) ((D131) or (D132))

D13-1: "jER (registered trademark)" 1007 (manufactured by Mitsubishi Chemical Corporation)

Number average molecular weight: 3,950, bisphenol A epoxy resin

D13-2: "jER (registered trademark)" 4007P (manufactured by Mitsubishi Chemical Corporation)

Number average molecular weight: 4,540, bisphenol F epoxy resin

D13-3: "jER (registered trademark)" 4010P (manufactured by Mitsubishi Chemical Corporation)

Number average molecular weight: 8,800, bisphenol F epoxy resin

Epoxy Resin (D14) ((D141) or (D142))

D14-1: "SUMI-EPDXY (registered trademark)" ELM434 (manufactured by Sumitomo Chemical Co., Ltd.)

Tetraglycidyldiaminodiphenylmethane, number average molecular weight: 480

D14-2: "Araldite (registered trademark)" MY0500 (manufactured by Huntsman Advanced Materials)

Triglycidyl-p-aminophenol, number average molecular weight: 330

Epoxy Resin (D15) ((D151) or (D152))

D15-1: "EPICLON (registered trademark)" 830 (manufactured by DIC Corporation)

Bisphenol F epoxy resin, number average molecular weight: 340

D15-2: "jER (registered trademark)" 828 (manufactured by Mitsubishi Chemical Corporation)

Bisphenol A epoxy resin, number average molecular weight: 378

D15-3: "jER (registered trademark)" 834 (manufactured by Mitsubishi Chemical Corporation)

Bisphenol A epoxy resin, number average molecular weight: 500

D15-4: "EPOTOHTO (registered trademark)" YDF2001 (manufactured by Tohto Kasei Co., Ltd.)

Bisphenol F epoxy resin, number average molecular weight: 950

D15-5: "jER (registered trademark)" 152 (manufactured by Mitsubishi Chemical Corporation)

Phenol novolac resin, number average molecular weight: 370

Other Epoxy Resin (D1)

"jER (registered trademark)" 1001 (manufactured by Mitsubishi Chemical Corporation)

Bisphenol A epoxy resin, number average molecular weight: 900

GAN (manufactured by Nippon Kayaku Co., Ltd.)

N-diglycidylaniline, number average molecular weight: 500

"Denacol (registered trademark)" EX821 (manufactured by Nagase ChemteX Corporation)

Polyethylene glycol epoxy resin, number average molecular weight: 370

Latent Hardener Component (E)

DICY7 (manufactured by Mitsubishi Chemical Corporation, dicyandiamide)

Thermoplastic Resin (F8)

"Vinylec (registered trademark)" PVF-K (polyvinyl formal, manufactured by JNC)

Hardening Accelerator

DCMU99 (3-(3,4-dichlorophenyl)-1,1-dimethylurea, manufactured by Hodogaya Chemical Co., Ltd.)

TABLE 24

| | | SP value [$(cal/cm^3)^{1/2}$] | Softening point [° C.] | Elastic modulus [GPa] | Number average molecular weight |
|---|---|---|---|---|---|
| Epoxy resin (D131) or (D132) | jER1007 | 12.2 | 128 | | 3950 |
| | jER4007P | 12.9 | 108 | | 4540 |
| | jER4010P | 12.9 | 135 | | 8800 |
| Epoxy resin (D141) or (D142) | ELM434 | 14.4 | 50° C. or lower | | 480 |
| | MY0500 | 14.8 | | | 330 |
| Epoxy resin (D151) or (D152) | Epc830 | 13.1 | | 3.7 | 340 |
| | jER828 | 12.8 | | 3.5 | 378 |
| | jER834 | 12.7 | | 3.3 | 500 |
| | YDF2001 | 13.2 | 55 | 3.5 | 950 |
| Epoxy resin (D152) | jER152 | 13 | 50° C. or lower | 3.6 | 370 |
| Others epoxy resin (D1) | jER1001 | 12 | 64 | | 900 |
| | GAN | 13.7 | 10° C. or lower | | 500 |
| | EX821 | 12.3 | 50° C. or lower | 1.0 | 370 |

Example 155

Example includes Process I, Process II, and Process III.

Process I: Process for Producing Carbon Fibers as Raw Material

A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration (O/C) was 0.15, the surface carboxylic acid concentration (COOH/C) was 0.005, and the surface hydroxy group concentration (COH/C) was 0.018. The obtained carbon fibers were regarded as carbon fibers A.

Process II: Process for Bonding Sizing Agent to Carbon Fibers

An aqueous dispersion emulsion containing 20 parts by mass of (B-1) as the component (B1), 20 parts by mass of the component (C), and 10 parts by mass of an emulsifier was prepared, and then 50 parts by mass of (A-3) was mixed as the component (A) to prepare a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent without the solutions in the sizing solution is as listed in Table 25. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. The results are listed in Table 25. The results indicated that both the epoxy equivalent of the sizing agent and the chemical composition of the sizing agent surface were as expected. The IFSS measurement also revealed a sufficiently high adhesiveness.

Process III: Production, Molding, and Evaluation of Epoxy Resin Composition and Unidirectional Prepreg In a kneader, 50 parts by mass of (D13-2) as the epoxy resin component (D13), 30 parts by mass of (D14-2) as the epoxy resin component (D14), and 20 parts by mass of (D15-1) as the epoxy resin component (D15) were mixed and dissolved, then dicyandiamide having 0.9 equivalent of active hydrogen group relative to the epoxy group of all the epoxy resins as the latent hardener (E) and 2 parts by mass of DCMU99 as the hardening accelerator were added, and the whole was knead, thus yielding an epoxy resin composition. The obtained epoxy resin composition had a good viscosity at 80° C. The temperature of the obtained epoxy resin composition was raised at a rate of 2.5° C./min, and the composition was hardened at 130° C. over 90 minutes. The obtained resin hardened product had a fine phase separated structure and good mechanical characteristics. The obtained epoxy resin composition was applied onto a release paper with a knife coater so as to give a resin areal weight of 21 g/m² or 52 g/m², thus yielding two resin films. The resin film having a resin areal weight of 21 g/m² was superimposed on each side of sizing agent-coated carbon fibers (an areal weight of 125 g/m²) arranged in one direction, and heat and pressure were applied with a heat roll at a temperature of 100° C. and a pressure of 1 atm to impregnate the sizing agent-coated carbon fibers with the epoxy resin composition, thus yielding a prepreg having a carbon fiber mass fraction of 75% by mass. The resin film having a resin areal weight of 52 g/m² was superimposed on each side of sizing agent-coated carbon fibers (an areal weight of 190 g/m²) arranged in one direction, and heat and pressure were applied with a heat roll at a temperature of 100° C. and a pressure of 1 atm to impregnate the sizing agent-coated carbon fibers with the epoxy resin composition, thus yielding a prepreg having a carbon fiber mass fraction of 65% by mass. Subsequently, the prepreg having a carbon fiber mass fraction of 75% by mass was used to prepare a tubular body made of a carbon fiber-reinforced composite material, and the tubular body was subjected to the Charpy impact test. The prepreg having a carbon fiber mass fraction of 65% by mass was used to prepare a carbon fiber-reinforced composite material, which was subjected to the 0° tensile test at the initial state and the 0° tensile test after long-term storage. Table 25 lists the results. The results revealed a sufficiently high 0° tensile strength translation rate at the initial state, a sufficiently high impact resistance, and a low reduction ratio of the tensile strength after 20 days.

Examples 156 to 162

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that the component (A) and the component (B1) listed in Table 25 were used as the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. Table 25 lists the results.

Process III: Production, Molding, and Evaluation of Epoxy Resin Composition and Unidirectional Prepreg An epoxy resin composition and a prepreg were produced, molded, and evaluated in the same manner as in Example 155. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 25 lists the results.

TABLE 25

| | | | Example 155 | Example 156 | Example 157 | Example 158 | Example 159 | Example 160 | Example 161 | Example 162 |
|---|---|---|---|---|---|---|---|---|---|---|
| Carbon fibers | Carbon fibers | | A | A | A | A | A | A | A | A |
| Sizing agent | (A) | EX-810 | | | | | | | | 25 |
| | | EX-611 | 50 | 50 | | | | 50 | 50 | 25 |
| | | EX-521 | 20 | | | | | | | |
| | (B1) | jER152 | | | 50 | 50 | | | | |
| | | jER828 | | 20 | | | | 20 | 20 | 20 |
| | | jER1001 | | | 20 | | | | | |
| | | jER807 | | | | | 10 | | | |
| | (C) | Aromatic polyester | 20 | 20 | 20 | 20 | 10 | | | |
| | Others | Emulsifier (nonionic surfactant) | 10 | 10 | 10 | 10 | 20 | 20 | 20 | 20 |
| | | | | | | | 10 | 10 | 10 | 10 |
| | Ratio | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | Epoxy equivalent (g/eq.) | | 260 | 265 | 320 | 250 | 290 | 255 | 290 | 275 |
| Epoxy resin composition | (D131) or (D132) | jER1007 | 50 | 50 | 50 | 50 | 50 | 50 | 50 | 50 |
| | | jER4007P | | | | | | | | |
| | | jER4010P | | | | | | | | |
| | (D141) or (D142) | ELM434 | 30 | 30 | 30 | 30 | 30 | 30 | 30 | 30 |
| | | MY0500 | 20 | 20 | 20 | 20 | 20 | 20 | 20 | 20 |
| | (D151) or (D152) | Epc830 | | | | | | | | |
| | | jER828 | | | | | | | | |
| | | jER834 | | | | | | | | |
| | | YDF2001 | | | | | | | | |
| | (D152) | jER152 | | | | | | | | |
| | Latent hardener (E) | DICY7 | 0.9 | 0.9 | 0.9 | 0.9 | 0.9 | 0.9 | 0.9 | 0.9 |
| | | (equivalent weight) | | | | | | | | |
| | Other epoxy resin (D1) | jER1001 | | | | | | | | |
| | | GAN | | | | | | | | |
| | | EX821 | | | | | | | | |
| | Thermoplastic resin (F8) | PVF-K | | | | | | | | |
| | Hardening accelerator | DCMU99 | 2 | 2 | 2 | 2 | 2 | 2 | 2 | 2 |
| Evaluation item | Sizing agent-coated fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with hardener | 7 | 7 | 5 | 9 | 6 | 5 | 7 | 7 |
| | | Interfacial adhesion: IFSS (MPa) | 43 | 44 | 40 | 46 | 43 | 39 | 43 | 44 |
| | Resin | Phase separation of resin hardened product *1 | A | A | A | A | A | A | A | A |

TABLE 25-continued

| | | Example 155 | Example 156 | Example 157 | Example 158 | Example 159 | Example 160 | Example 161 | Example 162 |
|---|---|---|---|---|---|---|---|---|---|
| | Resin toughness value [MPa·m$^{0.5}$] | 1.6 | 1.6 | 1.6 | 1.6 | 1.6 | 1.6 | 1.6 | 1.6 |
| | Elastic modulus (GPa) of resin hardened product | 3.9 | 3.9 | 3.9 | 3.9 | 3.9 | 3.9 | 3.9 | 3.9 |
| | Viscosity (Pa·s) at 80° C. | 34 | 34 | 34 | 34 | 34 | 34 | 34 | 34 |
| | Glass transition temperature (° C.) of resin hardened product | 89 | 89 | 89 | 89 | 89 | 89 | 89 | 89 |
| Carbon fiber-reinforced composite material | 0° Tensile test (0 days): strength translation rate (%) | 85 | 85 | 80 | 87 | 84 | 79 | 84 | 85 |
| | 0° Tensile test (20 days): strength translation rate (%) | 84 | 83 | 80 | 84 | 83 | 79 | 83 | 84 |
| | Charpy impact value (J) | 14.5 | 14.7 | 14.0 | 15.0 | 14.5 | 13.9 | 14.5 | 14.7 |

Examples 163 to 167

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that the sizing agent had the mass ratio listed in Table 26. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. Table 26 lists the results.

Process III: Production, Molding, and Evaluation of Epoxy Resin Composition and Unidirectional Prepreg An epoxy resin composition and a prepreg were produced, molded, and evaluated in the same manner as in Example 155. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 26 lists the results.

Example 168

Process I: Process for Producing Carbon Fibers as Raw Material

Carbon fibers were produced in the same manner as in Example 155.

Process II: Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved, yielding a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent without the solutions in the sizing solution is as listed in Table 26. In the same manner as in Example 155, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 26, the results indicated that both the epoxy equivalent of the sizing agent and the chemical composition of the sizing agent surface were as expected. The IFSS measurement also revealed a sufficiently high adhesiveness.

Process III: Production, Molding, and Evaluation of Epoxy Resin Composition and Unidirectional Prepreg An epoxy resin composition and a prepreg were produced, molded, and evaluated in the same manner as in Example 155. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 26 lists the results.

Example 169

Process I: Process for Producing Carbon Fibers as Raw Material

Carbon fibers were produced in the same manner as in Example 155.

Process II: Process for Bonding Sizing Agent to Carbon Fibers

In DMF, 60 parts by mass of (A-3) as the component (A) and 40 parts by mass of (B-2) as the component (B1) were dissolved, yielding a sizing solution. The epoxy equivalent of the sizing agent without the solutions in the sizing solution is as listed in Table 26. In the same manner as in Example 155, the sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) of the sizing agent-coated carbon fibers were determined. As listed in Table 26, the results indicated that both the epoxy equivalent of the sizing agent and the chemical composition of the sizing agent surface were as expected. The IFSS measurement also revealed a sufficiently high adhesiveness.

Process III: Production, Molding, and Evaluation of Epoxy Resin Composition and Unidirectional Prepreg An epoxy resin composition and a prepreg were produced, molded, and evaluated in the same manner as in Example 155. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 26 lists the results.

TABLE 26

| | | | Example 163 | Example 164 | Example 165 | Example 166 | Example 167 | Example 168 | Example 169 |
|---|---|---|---|---|---|---|---|---|---|
| Carbon fibers | Carbon fibers | | A | A | A | A | A | A | A |
| Sizing agent | (A) | EX-810 | | | | | | | |
| | | EX-611 | | | | | | | |
| | | EX-521 | 37 | 35 | 40 | 55 | 60 | 55 | 60 |

TABLE 26-continued

|  |  |  | Example 163 | Example 164 | Example 165 | Example 166 | Example 167 | Example 168 | Example 169 |
|---|---|---|---|---|---|---|---|---|---|
|  | (B1) | jER152 |  |  |  |  |  |  |  |
|  |  | jER828 | 33 | 45 | 30 | 15 | 15 | 22.5 | 40 |
|  |  | jER1001 |  |  |  |  |  |  |  |
|  |  | jER807 |  |  |  |  |  |  |  |
|  | (C) | Aromatic polyester | 20 | 10 | 20 | 20 | 20 | 22.5 |  |
|  | Others | Emulsifier (nonionic surfactant) | 10 | 10 | 10 | 10 | 5 |  |  |
|  | Ratio | (A) (% by mass) | 53 | 44 | 57 | 79 | 80 | 71 | 60 |
|  |  | (B1) (% by mass) | 47 | 56 | 43 | 21 | 20 | 29 | 40 |
|  |  | (A) (% by mass) | 37 | 35 | 40 | 55 | 60 | 55 | 60 |
|  |  | (B) (% by mass) | 63 | 65 | 60 | 45 | 40 | 45 | 40 |
|  |  | Epoxy equivalent (g/eq.) | 265 | 230 | 265 | 260 | 245 | 240 | 185 |
| Epoxy resin composition | (D131) or (D132) | jER1007 |  |  |  |  |  |  |  |
|  |  | jER4007P | 50 | 50 | 50 | 50 | 50 | 50 | 50 |
|  |  | jER4010P |  |  |  |  |  |  |  |
|  | (D141) or (D142) | ELM434 |  |  |  |  |  |  |  |
|  |  | MY0500 | 30 | 30 | 30 | 30 | 30 | 30 | 30 |
|  | (D151) or (D152) | Epc830 | 20 | 20 | 20 | 20 | 20 | 20 | 20 |
|  |  | jER828 |  |  |  |  |  |  |  |
|  |  | jER834 |  |  |  |  |  |  |  |
|  |  | YDF2001 |  |  |  |  |  |  |  |
|  | (D152) | jER152 |  |  |  |  |  |  |  |
|  | Latent hardener (E) | DICY7 (equivalent weight) | 0.9 | 0.9 | 0.9 | 0.9 | 0.9 | 0.9 | 0.9 |
|  | Other epoxy resin (D1) | jER1001 |  |  |  |  |  |  |  |
|  |  | GAN |  |  |  |  |  |  |  |
|  |  | EX821 |  |  |  |  |  |  |  |
|  | Thermoplastic resin (F8) | PVF-K |  |  |  |  |  |  |  |
|  | Hardening accelerator | DCMU99 | 2 | 2 | 2 | 2 | 2 | 2 | 2 |
| Evaluation item | Sizing agent-coated fibers | Epoxy equivalent of sizing agent (g/eq.) | 430 | 370 | 430 | 430 | 400 | 439 | 280 |
|  |  | X-ray photoelectron spectroscopy analysis of sizing agent surface (a)/(b) | 0.77 | 0.79 | 0.76 | 0.66 | 0.57 | 0.70 | 0.81 |
|  |  | ΔTg with hardener | 5 | 5 | 8 | 8 | 7 | 8 | 8 |
|  |  | Interfacial adhesion: IFSS (MPa) | 41 | 40 | 45 | 45 | 44 | 45 | 45 |
|  | Resin | Phase separation of resin hardened product *1 | A | A | A | A | A | A | A |
|  |  | Resin toughness value [Mpa · m$^{0.5}$] | 1.6 | 1.6 | 1.6 | 1.6 | 1.6 | 1.6 | 1.6 |
|  |  | Elastic modulus (GPa) of resin hardened product | 3.9 | 3.9 | 3.9 | 3.9 | 3.9 | 3.9 | 3.9 |
|  |  | Viscosity (Pa · s) at 80° C. | 34 | 34 | 34 | 34 | 34 | 34 | 34 |
|  |  | Glass transition temperature (° C.) of resin hardened product | 89 | 89 | 89 | 89 | 89 | 89 | 89 |
|  | Carbon fiber-reinforced composite material | 0° Tensile test (0 days): strength translation rate (%) | 81 | 80 | 86 | 85 | 85 | 85 | 86 |
|  |  | 0° Tensile test (20 days): strength translation rate (%) | 81 | 80 | 84 | 83 | 84 | 83 | 84 |
|  |  | Charpy impact value (J) | 14.1 | 14.0 | 14.7 | 14.9 | 14.6 | 14.7 | 14.9 |

Examples 170 to 180

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 27 lists the results.

Process III: Production, Molding, and Evaluation of Epoxy Resin Composition and Unidirectional Prepreg An epoxy resin composition and a prepreg were produced, molded, and evaluated in the same manner as in Example 155 except that the epoxy resin (D131) or (D132), the epoxy resin (D141) or (D142), the epoxy resin (D151) or (D152), and the thermoplastic resin (F8) listed in Table 27 were used in the mass ratio listed in Table 27. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 27 lists the results.

TABLE 27

| | | | Example 170 | Example 171 | Example 172 | Example 173 | Example 174 | Example 175 | Example 176 | Example 177 | Example 178 | Example 179 | Example 180 |
|---|---|---|---|---|---|---|---|---|---|---|---|---|---|
| Carbon fibers | Carbon fibers | | A | A | A | A | A | A | A | A | A | A | A |
| Sizing agent | (A) | EX-810 | | | | | | | | | | | |
| | | EX-611 | 50 | 50 | 50 | 50 | 50 | 50 | 50 | 50 | 50 | 50 | 50 |
| | | EX-521 | | | | | | | | | | | |
| | (B1) | jER152 | 20 | 20 | 20 | 20 | 20 | 20 | 20 | 20 | 20 | 20 | 20 |
| | | jER828 | | | | | | | | | | | |
| | | jER1001 | | | | | | | | | | | |
| | | jER807 | | | | | | | | | | | |
| | (C) Others | Aromatic polyester | 20 | 20 | 20 | 20 | 20 | 20 | 20 | 20 | 20 | 20 | 20 |
| | | Emulsifier (nonionic surfactant) | 10 | 10 | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 |
| Epoxy resin composition | (D131) or (D132) | jER1007 | 30 | 30 | 40 | 40 | | 45 | 30 | | | | 30 |
| | | jER4007P | | | | | 40 | | | | | 20 | |
| | | jER4010P | | | | | | | | 50 | 20 | | 40 |
| | (D141) or (D142) | ELM434 | 40 | 40 | 40 | 40 | | 45 | 50 | 30 | 40 | 40 | |
| | | MY0500 | | | | | 40 | | | | | | |
| | (D151) or (D152) | Epc830 | 30 | 30 | 20 | 20 | 20 | 10 | 20 | 20 | 40 | 40 | 30 |
| | | jER828 | | | | | | | | | | | |
| | | jER834 | | | | | | | | | | | |
| | | YDF2001 | | | | | | | | | | | |
| | (D152) | jER152 | | | | | | | | | | | |
| | Latent hardener (E) | DICY7 | 0.9 | 0.9 | 0.9 | 0.9 | 0.9 | 0.9 | 0.9 | 0.9 | 0.9 | 0.9 | 0.9 |
| | | (equivalent weight) | | | | | | | | | | | |
| | Other epoxy resin (D1) | jER1001 | | | | | | | | | | | |
| | | GAN | | | | | | | | | 20 | | |
| | | EX821 | | | | | | | | | | | |
| | Thermoplastic resin (F8) | PVF-K | | | | | | | | | | 10 | |
| | Hardening accelerator | DCMU99 | 2 | 2 | 2 | 2 | 2 | 2 | 2 | 2 | 2 | 2 | 2 |
| Evaluation item | Sizing agent-coated fibers | Epoxy equivalent of sizing agent (g/eq.) | 430 | 430 | 430 | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 |
| | | ΔTg with hardener | 7 | 7 | 7 | 7 | 7 | 7 | 7 | 7 | 7 | 7 | 7 |
| | | Interfacial adhesion: IFSS (MPa) | 44 | 44 | 44 | 44 | 44 | 44 | 44 | 44 | 44 | 44 | 44 |
| | Resin | Phase separation of resin hardened product *1 | A | A | A | A | A | A | A | A | A | A | A |

TABLE 27-continued

| | | Example 170 | Example 171 | Example 172 | Example 173 | Example 174 | Example 175 | Example 176 | Example 177 | Example 178 | Example 179 | Example 180 |
|---|---|---|---|---|---|---|---|---|---|---|---|---|
| | Resin toughness value [Mpa · m$^{0.5}$] | 1.4 | 1.4 | 1.4 | 1.5 | 2 | 1.6 | 1.4 | 2.1 | 1.3 | 1.3 | 1.3 |
| | Elastic modulus (GPa) of resin hardened product | 4.0 | 4.2 | 4.0 | 4.2 | 4.2 | 4.3 | 4.5 | 3.8 | 4.3 | 4.3 | 3.8 |
| | Viscosity (Pa · s) at 80° C. | 47 | 11 | 41 | 27 | 50 | 48 | 20 | 86 | 2 | 31 | 30 |
| | Glass transition temperature (° C.) of resin hardened product | 110 | 92 | 93 | 90 | 92 | 90 | 93 | 87 | 90 | 90 | 87 |
| Carbon fiber-reinforced composite material | 0° Tensile test (0 days): strength translation rate (%) | 85 | 86 | 85 | 86 | 86 | 87 | 88 | 84 | 86 | 86 | 84 |
| | 0° Tensile test (20 days): strength translation rate (%) | 83 | 85 | 83 | 84 | 84 | 85 | 87 | 82 | 84 | 84 | 82 |
| | Charpy impact value (J) | 12.0 | 12.2 | 12.2 | 12.5 | 16.1 | 13.9 | 12.3 | 16.3 | 10.3 | 11.4 | 11.3 |

Examples 181 to 191

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 28 lists the results.

Process III: Production, Molding, and Evaluation of Epoxy Resin Composition and Unidirectional Prepreg An epoxy resin composition and a prepreg were produced, molded, and evaluated in the same manner as in Example 155 except that the epoxy resin (D131) or (D132), the epoxy resin (D141) or (D142), the epoxy resin (D151) or (D152), the other epoxy resin (D1), and the thermoplastic resin (F8) listed in Table 28 were used in the mass ratio listed in Table 28. The resin hardened product obtained from the epoxy resin composition of each Example had a fine phase separated structure and good mechanical characteristics. The results indicated that the carbon fiber-reinforced composite material produced by using the prepreg had a sufficiently high 0° tensile strength translation rate at the initial state, a sufficiently high impact resistance, and a small reduction in tensile strength translation rate after 20 days. Table 28 lists the results.

TABLE 28

| | | | Example 181 | Example 182 | Example 183 | Example 184 | Example 185 | Example 186 | Example 187 | Example 188 | Example 189 | Example 190 | Example 191 |
|---|---|---|---|---|---|---|---|---|---|---|---|---|---|
| Carbon fibers | Carbon fibers | | A | A | A | A | A | A | A | A | A | A | A |
| Sizing agent | (A) | EX-810 | | | | | | | | | | | |
| | | EX-611 | | | | | | | | | | | |
| | | EX-521 | 50 | 50 | 50 | 50 | 50 | 50 | 50 | 50 | 50 | 50 | 50 |
| | (B1) | jER152 | 20 | 20 | 20 | 20 | 20 | 20 | 20 | 20 | 20 | 20 | 20 |
| | | jER828 | | | | | | | | | | | |
| | | jER1001 | | | | | | | | | | | |
| | | jER807 | | | | | | | | | | | |
| | (C) | Aromatic polyester | 20 | 20 | 20 | 20 | 20 | 20 | 20 | 20 | 20 | 20 | 20 |
| | Others | Emulsifier (nonionic surfactant) | 10 | 10 | 10 | 10 | 10 | 10 | 10 | 10 | 10 | 10 | 10 |
| | Ratio | (A) (% by mass) | 71 | 71 | 71 | 71 | 71 | 71 | 71 | 71 | 71 | 71 | 71 |
| | | (B1) (% by mass) | 29 | 29 | 29 | 29 | 29 | 29 | 29 | 29 | 29 | 29 | 29 |
| | | (A) (% by mass) | 50 | 50 | 50 | 50 | 50 | 50 | 50 | 50 | 50 | 50 | 50 |
| | | (B) (% by mass) | 50 | 50 | 50 | 50 | 50 | 50 | 50 | 50 | 50 | 50 | 50 |
| | Epoxy equivalent (g/eq.) | | 265 | 265 | 265 | 265 | 265 | 265 | 265 | 265 | 265 | 265 | 265 |
| Epoxy resin composition | (D131) or (D132) | jER1007 | 30 | 30 | 30 | 30 | 40 | | | 20 | 35 | 35 | 40 |
| | | jER4007P | | | | | | 60 | 10 | | | | |
| | | jER4010P | | | | | | | 50 | | | | |
| | (D141) or (D142) | ELM434 | 20 | | | 30 | 20 | 20 | 40 | 30 | 20 | 20 | 40 |
| | | MY0500 | | | | 15 | 40 | | | 50 | 45 | 45 | |
| | (D151) or (D152) | Epc830 | | | | | | | | | | | |
| | | jER828 | 20 | | | | | | | | | | |
| | | jER834 | | 20 | | | | | | | | | |
| | | YDF2001 | | | 20 | | | | | | | | 20 |
| | (D152) | jER152 | | | | | | | | | | | |
| | Latent hardener (E) | DICY7 | 0.9 | 0.9 | 0.9 | 0.9 | 0.9 | 0.9 | 0.9 | 0.9 | 0.9 | 0.9 | 0.9 |
| | | (equivalent weight) | | | | | | | | | | | |
| | Other epoxy resin (D1) | jER1001 | | | | | | | | | | | |
| | | GAN | | | | 5 | | | | | | | |
| | | EX821 | | | | | | | | | | | |
| | Thermoplastic resin (F8) | PVF-K | | | | | | | | | 5 | 5 | |
| | Hardening accelerator | DCMU99 | 2 | 2 | 2 | 2 | 2 | 2 | 2 | 2 | 2 | 3 | 2 |
| Evaluation item | Sizing agent-coated fibers | Epoxy equivalent of sizing agent (g/eq.) | 430 | 430 | 430 | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 | 0.64 | 0.64 | 0.64 |
| | | ΔTg with hardener | 7 | 7 | 7 | 7 | 7 | 8 | 7 | 7 | 8 | 7 | 7 |
| | | Interfacial adhesion: IFSS (MPa) | 44 | 44 | 44 | 43 | 44 | 45 | 44 | 44 | 45 | 44 | 44 |
| | Resin | Phase separation of resin hardened product *1 | A | A | A | A | A | A | A | A | A | A | A |

TABLE 28-continued

| | | Example 181 | Example 182 | Example 183 | Example 184 | Example 185 | Example 186 | Example 187 | Example 188 | Example 189 | Example 190 | Example 191 |
|---|---|---|---|---|---|---|---|---|---|---|---|---|
| | Resin toughness value [Mpa · m$^{0.5}$] | 1.6 | 1.7 | 1.8 | 1.6 | 1.4 | 0.9 | 0.9 | 0.9 | 1.2 | 1.2 | 1.4 |
| | Elastic modulus (GPa) of resin hardened product | 3.6 | 3.5 | 3.7 | 4.1 | 3.7 | 3.9 | 3.9 | 3.8 | 3.9 | 3.9 | 3.8 |
| | Viscosity (Pa · s) at 80° C. | 32 | 49 | 68 | 29 | 25 | 10 | 6 | 15 | 111 | 122 | 76 |
| | Glass transition temperature (° C.) of resin hardened product | 93 | 90 | 87 | 87 | 112 | 95 | 97 | 91 | 95 | 93 | 95 |
| Carbon fiber-reinforced composite material | 0° Tensile test (0 days): strength translation rate (%) | 82 | 81 | 83 | 85 | 82 | 85 | 85 | 84 | 85 | 85 | 84 |
| | 0° Tensile test (20 days): strength translation rate (%) | 81 | 80 | 81 | 83 | 81 | 83 | 83 | 82 | 83 | 83 | 83 |
| | Charpy impact value (J) | 14.5 | 14.5 | 14.7 | 15.0 | 11.8 | 9.8 | 9.8 | 9.7 | 11.3 | 11.7 | 12.0 |

Comparative Examples 48 to 50

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that the sizing agent had the mass ratio listed in Table 29. Subsequently, the epoxy equivalent of the sizing agent, the X-ray photoelectron spectrum of the sizing agent surface, and the interfacial shear strength (IFSS) of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Epoxy Resin Composition and Unidirectional Prepreg An epoxy resin composition and a prepreg were produced, molded, and evaluated in the same manner as in Example 155. The results revealed a small reduction ratio of the 0° tensile strength translation rate after 20 days and a high impact resistance but a small 0° tensile strength translation rate at the initial state.

Comparative Example 51

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that the sizing agent had the mass ratio listed in Table 29. Subsequently, the epoxy equivalent of the sizing agent, the X-ray photoelectron spectrum of the sizing agent surface, and the interfacial shear strength (IFSS) of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Epoxy Resin Composition and Unidirectional Prepreg An epoxy resin composition and a prepreg were produced, molded, and evaluated in the same manner as in Example 155. The results revealed a good 0° tensile strength translation rate at the initial state and a good impact resistance but a large reduction ratio of the tensile strength after 20 days.

Comparative Examples 52 and 53

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that no aromatic epoxy compound (B1) was used but the aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III: Production, Molding, and Evaluation of Epoxy Resin Composition and Unidirectional Prepreg An epoxy resin composition and a prepreg were produced, molded, and evaluated in the same manner as in Example 155. The results revealed a high 0° tensile strength translation rate at the initial state and a high impact resistance but a large reduction ratio of the tensile strength after 20 days.

Comparative Example 54

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156 except that no aliphatic epoxy compound (A) was used but the aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III: Production, Molding, and Evaluation of Epoxy Resin Composition and Unidirectional Prepreg An epoxy resin composition and a prepreg were produced, molded, and evaluated in the same manner as in Example 155. The results revealed a small reduction ratio of the tensile strength after 20 days but a low 0° tensile strength translation rate at the initial state and a low impact resistance.

Comparative Examples 55 to 58

Process I: Process for Producing Carbon Fibers as Raw Material

Carbon fibers were produced in the same manner as in Example 155.

Process II: Process for Bonding Sizing Agent to Carbon Fibers

Sizing agent-coated carbon fibers were obtained in the same manner as in Example 156. Subsequently, the epoxy equivalent of the sizing agent, the X-ray photoelectron spectrum of the sizing agent surface, and the interfacial shear strength (IFSS) of the sizing agent-coated carbon fibers were determined. Both the epoxy equivalent of the sizing agent and the chemical composition of the sizing agent surface were as expected. The IFSS measurement also revealed a moderate adhesiveness. Table 29 lists the results.

Process III: Production, Molding, and Evaluation of Epoxy Resin Composition and Unidirectional Prepreg A prepreg was produced, molded, and evaluated in the same manner as in Example 155 except that the epoxy resin (D131) or (D132), the epoxy resin (D141) or (D142), the epoxy resin (D151) or (D152), and the other epoxy resin (D1) listed in Table 29 were used in the mass ratio listed in Table 29. Comparative Examples 55, 57, and 58 resulted in a small reduction ratio of the 0° tensile strength translation rate at the initial state and a small reduction ratio of the 0° tensile strength translation rate after 20 days but an insufficient impact resistance. Comparative Example 56 resulted in a small reduction ratio of the 0° tensile strength translation rate after 20 days and a high impact resistance but a low 0° tensile strength translation rate at the initial state.

TABLE 29

| | | Comparative Example 48 | Comparative Example 49 | Comparative Example 50 | Comparative Example 51 | Comparative Example 52 | Comparative Example 53 | Comparative Example 54 | Comparative Example 55 | Comparative Example 56 | Comparative Example 57 | Comparative Example 58 |
|---|---|---|---|---|---|---|---|---|---|---|---|---|
| Carbon fibers | Carbon fibers | A | A | A | A | A | A | A | A | A | A | A |
| Sizing agent | (A) EX-810 | | | | | | | | | | | |
| | EX-611 | 20 | 30 | | | | 50 | | | | | |
| | EX-521 | | | 50 | 70 | 100 | 50 | | 50 | 50 | 50 | 50 |
| | (B1) jER152 | 35 | 60 | 50 | 12 | | | | 20 | 20 | 20 | 20 |
| | jER828 | | | | | | | 45 | | | | |
| | jER1001 | | | | | | | | | | | |
| | jER807 | | | | | | | | | | | |
| | (C) Aromatic polyester | 35 | 5 | | 12 | | | 45 | 20 | 20 | 20 | 20 |
| | Others Emulsifier (nonionic surfactant) | 10 | 5 | | 6 | | | 10 | 10 | 10 | 10 | 10 |
| | Ratio (A) (% by mass) | 36 | 33 | 50 | 85 | 100 | 100 | 0 | 71 | 71 | 71 | 71 |
| | (B1) (% by mass) | 64 | 67 | 50 | 15 | 0 | 0 | 100 | 29 | 29 | 29 | 29 |
| | (A) (% by mass) | 20 | 30 | 50 | 70 | 100 | 100 | 0 | 50 | 50 | 50 | 50 |
| | (B) (% by mass) | 80 | 70 | 50 | 30 | 0 | 0 | 100 | 50 | 50 | 50 | 50 |
| Epoxy equivalent (g/eq.) | | 270 | 210 | 230 | 224 | 180 | 180 | 420 | 265 | 265 | 265 | 265 |
| Epoxy resin composition | (D131) or (D132) jER1007 | 50 | 50 | 50 | 50 | 50 | 50 | 50 | | 40 | 50 | |
| | jER4007P | | | | | | | | | | | |
| | jER4010P | | | | | | | | | | | |
| | (D141) or (D142) ELM434 | 30 | 30 | 30 | 30 | 30 | 30 | 30 | 40 | | | 50 |
| | MY0500 | | | | | | | | | | | |
| | (D151) or (D152) Epc830 | 20 | 20 | 20 | 20 | 20 | 20 | 20 | 20 | 30 | | 50 |
| | jER828 | | | | | | | | | | | |
| | jER834 | | | | | | | | | | | |
| | YDF2001 | | | | | | | | | | | |
| | (D152) jER152 | | | | | | | | | | | |
| | Latent hardener (E) DICY7 (equivalent weight) | 0.9 | 0.9 | 0.9 | 0.9 | 0.9 | 0.9 | 0.9 | 0.9 | 0.9 | 0.9 | 0.9 |
| | Other epoxy resin (D1) jER1001 | | | | | | | | 40 | | | |
| | GAN | | | | | | | | | 30 | | |
| | EX821 | | | | | | | | | | | |
| | PVF-K | | | | | | | | | | | |
| | Thermoplastic resin (F8) | | | | | | | | | | | |
| | Hardening accelerator DCMU99 | 2 | 2 | 2 | 2 | 2 | 2 | 2 | 2 | 2 | 2 | 2 |
| Evaluation item | Sizing agent-coated fibers Epoxy equivalent of sizing agent (g/eq.) | 430 | 320 | 370 | 350 | 270 | 260 | 900 | 430 | 430 | 430 | 430 |
| | X-ray photoelectron spectroscopy analysis of sizing agent surface (a)/(b) | 0.91 | 0.93 | 0.91 | 0.49 | 0.29 | 0.26 | 1.01 | 0.64 | 0.64 | 0.64 | 0.64 |
| | ΔTg with a hardener | 2 | 2 | 3 | 12 | 14 | 12 | 2 | 7 | 7 | 7 | 7 |
| | Interfacial adhesion: IFSS (MPa) | 33 | 34 | 36 | 45 | 47 | 41 | 25 | 44 | 44 | 44 | 44 |

TABLE 29-continued

|  |  | Comparative Example 48 | Comparative Example 49 | Comparative Example 50 | Comparative Example 51 | Comparative Example 52 | Comparative Example 53 | Comparative Example 54 | Comparative Example 55 | Comparative Example 56 | Comparative Example 57 | Comparative Example 58 |
|---|---|---|---|---|---|---|---|---|---|---|---|---|
| Resin | Phase separation of resin hardened product *1 | A | A | A | A | A | A | A | C | C | D | C |
|  | Resin toughness value [Mpa · m$^{0.5}$] | 1.6 | 1.6 | 1.6 | 1.6 | 1.6 | 1.6 | 1.6 | 0.5 | 1.0 | 1.1 | 0.8 |
|  | Elastic modulus (GPa) of resin hardened product | 3.9 | 3.9 | 3.9 | 3.9 | 3.9 | 3.9 | 3.9 | 3.7 | 2.0 | 3.5 | 4.0 |
|  | Viscosity (Pa · s) at 80° C. | 34 | 34 | 34 | 34 | 34 | 34 | 34 | 15 | 12 | 681 | 0.4 |
|  | Glass transition temperature (° C.) of resin hardened product | 89 | 89 | 89 | 89 | 89 | 89 | 89 | 117 | 77 | 90 | 136 |
| Carbon fiber-reinforced composite material | 0° Tensile test (0 day): strength translation rate (%) | 72 | 72 | 74 | 86 | 88 | 81 | 68 | 83 | 68 | 81 | 86 |
|  | 0° Tensile test (20 days): strength translation rate (%) | 72 | 72 | 74 | 78 | 80 | 74 | 68 | 82 | 67 | 79 | 85 |
|  | Charpy impact value (J) | 11.8 | 12.0 | 12.5 | 14.7 | 15.0 | 13.5 | 10.2 | 7.0 | 10.6 | 9.2 | 8.2 |

INDUSTRIAL APPLICABILITY

The prepreg of the present invention has excellent adhesiveness between carbon fibers and a matrix resin, long-term storage stability, and high-order processability and thus is suitably applied to woven fabrics and prepregs. The carbon fiber-reinforced composite material of the present invention obtained from carbon fibers and a matrix resin is lightweight but excellent in strength and elastic modulus and thus is suitably used in various fields including aircraft members, spacecraft members, automobile members, ship members, constructional materials, and sporting goods.

The invention claimed is:
1. A prepreg comprising:
sizing agent-coated carbon fiber bundles coated with a sizing agent; and
a thermosetting resin composition impregnated into the sizing agent-coated carbon fiber bundles,
wherein
the sizing agent includes an aliphatic epoxy compound (A) and an aromatic compound (B) at least containing an aromatic epoxy compound (B1),
the aliphatic epoxy compound (A) and the aromatic epoxy compound (B1) are contained in a mass ratio of 52/48 to 80/20,
the aliphatic epoxy compound (A) comprises a glycidyl ether epoxy compound obtained by reaction of epichlorohydrin with a polyol selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol,
the sizing agent has an epoxy equivalent of 350 to 550 g/eq,
the sizing agent-coated carbon fiber bundles have an (a)/(b) ratio of 0.50 to 0.90, where (a) is a height (cps) of a component at a binding energy (284.6 eV) assigned to CHx, C—C, and C═C and (b) is a height (cps) of a component at a binding energy (286.1 eV) assigned to C—O in a $C_{1s}$ core spectrum of a surface of the sizing agent applied onto the carbon fiber bundles analyzed by X-ray photoelectron spectroscopy using $AlK\alpha_{1,2}$ as an X-ray source at a photoelectron takeoff angle of 15°,
the thermosetting resin composition is an epoxy resin composition at least containing
an epoxy resin (D11) of Formula (3) below and
an epoxy resin (D12) of Formula (4) below, and
the epoxy resin composition contains the epoxy resin (D11) in an amount of 25 to 50% by mass and the epoxy resin (D12) in an amount of 40 to 80% by mass relative to 100% by mass of the total epoxy resins contained,
the thermosetting resin composition includes a latent hardener which is an aromatic amine hardener (E2) that is used in combination with the sizing agent, and if the sizing agent and the aromatic amine hardener (E2) are mixed in an amine equivalent/epoxy equivalent ratio of 0.9 to form a first mixture, and the first mixture is stored in an atmosphere of 25° C. and 60% RH for 20 days, then the glass transition point of the first mixture will increase by 25° C. or less, wherein the epoxy resin (D11) has a structure of Formula (3):

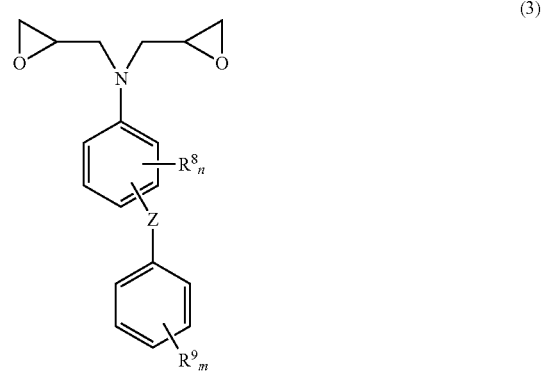

wherein in Formula (3),
each of $R^8$ and $R^9$ is at least one selected from the group consisting of $C_{1-4}$ aliphatic hydrocarbon groups, $C_{3-6}$ alicyclic hydrocarbon groups, $C_{6-10}$ aromatic hydrocarbon groups, halogen atoms, acyl groups, a trifluoromethyl group, and a nitro group;
n is an integer of 0 to 4;
m is an integer of 0 to 5;
when a plurality of $R^8$s or $R^9$s exist, $R^8$s and $R^9$s are each optionally the same or different; and
Z is one selected from —O—, —S—, —CO—, —C(═O)O—, —SO$_2$—, and —C(═O)NH—); and
wherein the epoxy resin (D12) has a structure of Formula (4):

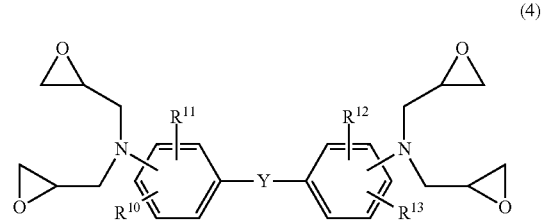

wherein in Formula (4),
$R^{10}$ to $R^{13}$ are at least one selected from the group consisting of a hydrogen atom, $C_{1-4}$ aliphatic hydrocarbon groups, alicyclic hydrocarbon groups having a carbon number of 4 or less, and halogen atoms; and
Y is one selected from —CH$_2$—, —O—, —S—, —CO—, —C(═O)O—, —SO$_2$—, and —C(═O)NH—.

2. The prepreg according to claim 1, wherein the thermosetting resin composition is an epoxy resin composition at least containing an epoxy resin (D1) as the thermosetting resin (D) and a compound (E1) of General Formula (2):

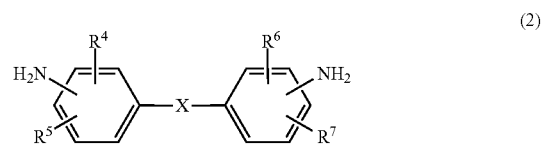

(in Formula (2), $R^4$ to $R^7$ are at least one selected from the group consisting of a hydrogen atom, $C_{1-4}$ aliphatic hydrocarbon groups, alicyclic hydrocarbon groups having a carbon number of 4 or less, and halogen atoms; and X is one selected from —O—, —S—, —CO—, —C(=O)O—, and —C(=O)NH—) as the latent hardener (E).

3. The prepreg according to claim 1, wherein
the thermosetting resin composition is an epoxy resin composition at least containing an epoxy resin (D1) as the thermosetting resin (D) and at least one block copolymer (F2) selected from the group consisting of S-B-M, B-M, and M-B-M as the additive (F),
the blocks in the block copolymer (F2) are linked through a covalent bond or linked through covalent bonds with an intermediate molecule having any chemical structure interposed therebetween,
the block M is a homopolymer of methyl methacrylate or a copolymer containing methyl methacrylate in an amount of at least 50% by mass,
the block B is incompatible with the block M and has a glass transition temperature of 20° C. or lower, and
the block S is incompatible with the blocks B and M and has a glass transition temperature higher than that of the block B.

4. The prepreg according to claim 1, wherein
the thermosetting resin composition is an epoxy resin composition at least containing an epoxy resin (D132) having a softening point of 90° C. or higher, an epoxy resin (D152) having a softening point of 50° C. or lower, an epoxy resin (D142) having a softening point of 50° C. or lower and having a solubility parameter (SP) value that is 1.2 or more larger than an SP value of the epoxy resin (D132) and an SP value of the epoxy resin (D152) as the thermosetting resin (D),
an epoxy resin hardened product obtained by hardening the epoxy resin composition has a phase separated structure including a phase rich in the epoxy resin (D132) and a phase rich in the epoxy resin (D142), and
the phase separated structure has a phase separated structure period of 1 nm to 5 mm.

5. The prepreg according to claim 1, wherein the sizing agent contains at least the aliphatic epoxy compound (A) in an amount of 35 to 65% by mass and the aromatic compound (B) in an amount of 35 to 60% by mass relative to a total amount of the sizing agent except solvents.

6. The prepreg according to claim 1, wherein the aromatic epoxy compound (B1) is a bisphenol A epoxy compound or a bisphenol F epoxy compound.

7. The prepreg according to claim 1, wherein the sizing agent contains an ester compound (C) having no epoxy group in a molecule in an amount of 2 to 35% by mass relative to a total amount of the sizing agent except solvents.

8. The prepreg according to claim 1, wherein the sizing agent-coated carbon fibers satisfy relation (III):

$$0.50 \leq (I) \leq 0.90 \text{ and } 0.60 < (II)/(I) < 1.0 \qquad \text{(III)}$$

wherein
(I) is a value of (a)/(b) of surfaces of the sizing agent-coated carbon fibers before ultrasonication, and
(II) is a value of (a)/(b) of the surfaces of the sizing agent-coated carbon fibers where an adhesion amount of the sizing agent is reduced to 0.09 to 0.20% by mass by ultrasonic cleaning of the sizing agent-coated carbon fibers in an acetone solvent, (a) is the height (cps) of a component at a binding energy (284.6 eV) assigned to CHx, C—C, and C=C, and (b) is the height (cps) of a component at a binding energy (286.1 eV) assigned to C—O in a $C_{1s}$ core spectrum of the sizing agent-coated carbon fibers analyzed by X-ray photoelectron spectroscopy using an X-ray at 400 eV at a photoelectron takeoff angle of 55°.

9. The prepreg according to claim 1, wherein Z is —O— in Formula (3).

10. The prepreg according to claim 1, wherein Y is —CH$_2$— in Formula (4).

11. The prepreg according to claim 1, wherein the epoxy resin (D12) has a Formula (4) structure wherein Y is CH$_2$— and has an epoxy equivalent of 100 to 115 g/eq.

12. The prepreg according to claim 1, wherein the epoxy resin composition further comprises a thermoplastic resin (F3) soluble in the epoxy resin (D11) or the epoxy resin (D12).

13. The prepreg according to claim 12, wherein the thermoplastic resin (F3) is polyethersulfone.

14. The prepreg according to claim 13, wherein the polyethersulfone has an average molecular weight of 15,000 to 30,000 g/mol.

15. A carbon fiber-reinforced composite material produced by molding the prepreg according to claim 1.

* * * * *